(12) United States Patent
Burke et al.

(10) Patent No.: US 9,760,601 B2
(45) Date of Patent: Sep. 12, 2017

(54) ANALYTICS

(76) Inventors: Eugene Burke, Surrey (GB); Tom Gibbs, Surrey (GB); Alex Rees, Surrey (GB); Scott Jonathon Perham, Surrey (GB); Paul Levett, London (GB); Lotte Andersson, Surrey (GB)

( * ) Notice: Subject to any disclaimer, the term of this patent is extended or adjusted under 35 U.S.C. 154(b) by 362 days.

(21) Appl. No.: 14/343,265

(22) PCT Filed: Sep. 6, 2012

(86) PCT No.: PCT/GB2012/052198
§ 371 (c)(1),
(2), (4) Date: Sep. 8, 2014

(87) PCT Pub. No.: WO2013/034917
PCT Pub. Date: Mar. 14, 2013

(65) Prior Publication Data
US 2015/0134694 A1    May 14, 2015

(30) Foreign Application Priority Data

Sep. 6, 2011 (GB) .................................. 1115418.4
Sep. 29, 2011 (GB) .................................. 1116863.0
Jan. 18, 2012 (GB) .................................. 1200884.3

(51) Int. Cl.
*G06F 17/30* (2006.01)
*G06Q 10/00* (2012.01)
*G06Q 10/06* (2012.01)

(52) U.S. Cl.
CPC ....... *G06F 17/30424* (2013.01); *G06Q 10/00* (2013.01); *G06Q 10/06398* (2013.01)

(58) Field of Classification Search
CPC ............... G06F 17/30; G06F 17/30424; G06F 17/30539

(Continued)

(56) References Cited

U.S. PATENT DOCUMENTS

2006/0031150 A1* 2/2006 Senturk .................. G06Q 40/00
705/35

OTHER PUBLICATIONS

Communication pursuant to Article 94(3) EPC, issued in related European Application No. 12783642.7 on Sep. 23, 2016, 4 pages.

(Continued)

*Primary Examiner* — Isaac M Woo
(74) *Attorney, Agent, or Firm* — Fish & Richardson P.C.

(57) ABSTRACT

Apparatus for and a method of providing access to comparison metrics data relating to the comparison of a test or target group with a reference group, such as a benchmark group. An analytics system is also described. The apparatus comprises: a database of reference metrics data determined from testing of members of a reference population; means for selecting target group metrics data, the metrics data determined from testing of the members of the target group and associated with metadata relating to the target group; means for selecting at least one item of metadata; means for selecting a reference group from the reference population in dependence on the selected metadata, the reference group being associated with reference group metrics data determined from testing of the members of the reference group and associated with metadata relating to the reference group; means for selecting a comparison aspect, the comparison aspect being associated with a subset of metrics data; means for generating comparison data relating to the comparison of the distribution of metrics data values for the target group with that of the reference group in accordance with the selected comparison aspect; and means for outputting the resulting comparison data.

20 Claims, 93 Drawing Sheets

(58) Field of Classification Search
USPC .................................................. 707/600–899
See application file for complete search history.

(56) References Cited

OTHER PUBLICATIONS

Patent Examination Report No. 1, issued in related Australian Application No. 2012306084 dated Sep. 8, 2016, 3 pages.
International Search Report, issued in related Int. Application No. PCT/GB2012/052198 dated Aug. 1, 2013, 2 pages.
Notice from the European Patent Office dated Oct. 1, 2007 concerning business methods, 2 pages.

* cited by examiner

*People intelligence* Central

Business results          home : Central : contact us

Welcome     my account :: basket :: order history :: sign out

Site Actions▼

▶ Home   ▶ Talent Analytics Help   ▶ My Applications   ▶ Administration Tasks     Search Options:                                                                        *Not saved*

Use data

*Benchmarks*

Leadership Potential Benchmarks
   SHL Leadership Potential Benchmark
Competency Benchmarks
   SHL Competency Benchmark
Ability Benchmarks
   SHL Verbal Reasoning Benchmark
   SHL Numerical Reasoning Benchmark
   SHL Inductive Reasoning Benchmark

Leadership Potential Benchmark

The SHL Leadership Potential Benchmark shows you the health of your leadership pipeline in delivering people who can achieve and be effective in a leadership role. The benchmark gives you the capability to look at the leadership potential through the lens of the industries and geographies in which you compete for leadership talent. Whether your questions on leadership centre on your graduate or college hire programmes, your managerial and professional hires or your existing employees, the benchmark provides you with a simple five band metric to answer your leadership questions. Drill downs at all levels of the benchmark identify the learning and development actions to realise leadership potential in your organisation. The Resource Centre accessible through this site provides further information on this benchmark as well as the Insight Reports that deliver more extensive and custom analytics to address your leadership questions.

Read more about the      Leadership Potential Benchmark

☐ Filter My Data

| Site Map | Accessibility | Privacy | Terms of Use | Terms of Business

*People intelligence* | Central
Business results

Site Actions ▼

Welcome    home : shl.com : about SHL Central : contact us
my account :: basket :: order history :: sign out

| ▶ Home | ▶ Talent Analytics Help | ▶ My Applications | ▶ Administration Tasks | Search |

Options:

Advanced Search 🔍 Clear Search ⊗                                              Not saved

*My Data*                                                                       Use data ☑ Only if compatible with selected benchmark

Selected Filters:
*None*

☐ Select All                                                    1 items selected  ✕ ✎

| | Name | ID | Date | Location | Source | Test Takers |
|---|---|---|---|---|---|---|
| ✎ ▶ | Business_Sales | 100086336 | 30/03/2010 | | OPQ | 150 |
| ✎ ▶ | 1162943-YAP Candidates | 100227721 | 02/06/2011 | | OPQ | 68 |
| ✎ ▶ | sdp 2011 selection2 | 100197255 | 28/02/2011 | Vodacom | OPQ IR | 57 |
| ✎ ▶ | 15/11/2010 | 100166032 | 15/11/2010 | Cape Town | OPQ | 29 |
| ✎ ▶ | 26/5/2011 | 100225523 | 26/05/2011 | Cape Town | OPQ VR NR | 24 |
| ✎ ▶ | 15/02/2011 | 100193086 | 15/02/2011 | Cape Town | OPQ VR NR | 16 |

I◀ ◀◀ Page 1 of 21 ▶▶ ▶I  10     View 1 - 10 of 210

☐ Filter My
  Data

| Site Map ∥ Accessibility ∥ Privacy ∥ Terms of Use ∥ Terms of Business

*People intelligence*
Business results | Central home : shl.com : about SHL Central : contact us Site Actions ▼

› Home | › Talent Analytics Help | › My Applications | › Administration Tasks

Welcome my account :: basket :: order history :: sign out

Search

Not saved

Options:

Benchmark by this

Use data

*Industry Sector*

▶ Global

| ▶ Aerospace & Defense | ▶ Forestry & Paper | ▶ Nonlife Insurance |
| ▶ Alternative Energy | ▶ Gas Water & Multiutilities | ▶ Oil & Gas Producers |
| ▶ Automobiles & Parts | ▶ General Retailers | ▶ Personal Goods |
| ▶ Banks | ▶ Health Care Equipment & Services | ▶ Pharmaceuticals & Biotechnology |
| ▶ Beverages | ▶ Household Goods & Home Construction | ▶ Public Sector & NGOs |
| ▶ Chemicals | ▶ Industrial Engineering | ▶ Real Estate Investment & Services |
| ▶ Construction & Materials | ▶ Industrial Metals & Mining | ▶ Software & Computer Services |
| ▶ Electricity | ▶ Industrial Transportation | ▶ Support Services |
| ▶ Electronic & Electrical Equipment | ▶ Leisure Goods | ▶ Technology Hardware & Equipment |
| ▶ Financial Services | ▶ Life Insurance | ▶ Tobacco |
| ▶ Fixed Line Telecommunications | ▶ Media | ▶ Travel & Leisure |
| ▶ Food & Drug Retailers | ▶ Mining | |
| ▶ Food Producers | ▶ Mobile Telecommunications | |

☐ Filter My Data

| Site Map || Accessibility || Privacy || Terms of Use || Terms of Business

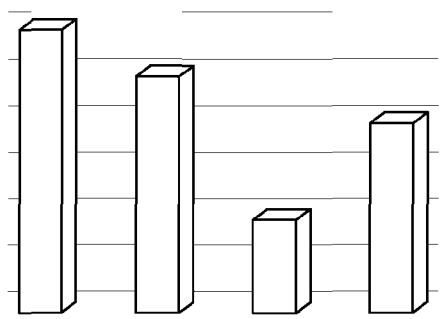
a)
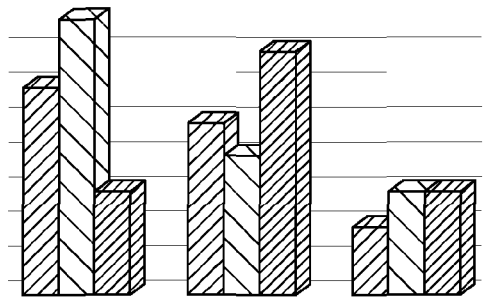
b)
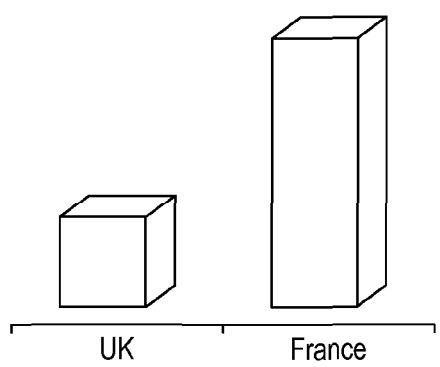
c)
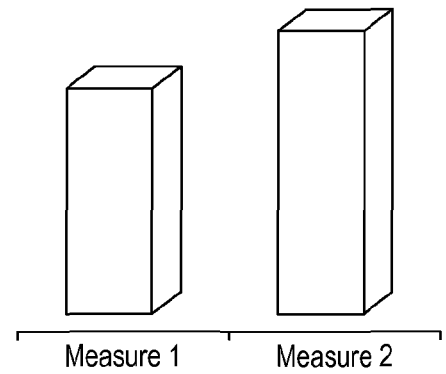
d)
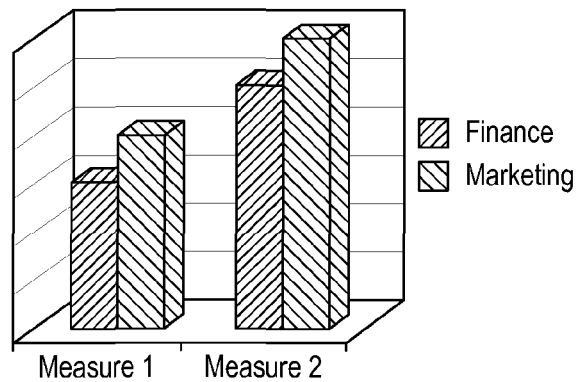
e)
FIG. 41

| TalentIndex | | |
|---|---|---|
| PK, FK1 | Id | int identity |
| | ClientId | int |
| | Username | nvarchar(30) |
| | DataActive | bit |
| | ProjectId | int |
| | LocationId | int |
| | FirstName | nvarchar(40) |
| | LastName | nvarchar(40) |
| | EmailAddress | nvarchar(255) |
| | DateLastTestTaken | datetime |
| | InstrumentLanguage | int |
| | YearOfLastTestTaken | int |
| | Gender | int |
| | Age | int |
| | Education | int |
| | University | int |
| | WorkExperience | int |
| | Ethnicity | int |
| | FirstLanguage | int |
| | CountryOfResisdence | int |
| | UCF1_1Benchmark | int |
| | UCF1_2Benchmark | int |
| | UCF2_1Benchmark | int |
| | UCF2_2Benchmark | int |
| | UCF3_1Benchmark | int |
| | UCF3_2Benchmark | int |
| | UCF3_3Benchmark | int |
| | UCF4_1Benchmark | int |
| | UCF4_2Benchmark | int |
| | UCF4_3Benchmark | int |
| | UCF5_1Benchmark | int |
| | UCF5_2Benchmark | int |
| | UCF5_3Benchmark | int |
| | UCF6_1Benchmark | int |
| | UCF6_2Benchmark | int |
| | UCF6_3Benchmark | int |
| | UCF7_1Benchmark | int |
| | UCF7_2Benchmark | int |
| | UCF8_1Benchmark | int |
| | UCF8_2Benchmark | int |
| | Great8_1Benchmark | int |
| | Great8_2Benchmark | int |
| | Great8_3Benchmark | int |
| | Great8_4Benchmark | int |
| | Great8_5Benchmark | int |
| | Great8_6Benchmark | int |
| | Great8_7Benchmark | int |
| | Great8_8Benchmark | int |
| | OverallRiskBand | int |
| | PeopleRiskBand | int |
| | ProcessRiskBand | int |

FIG. 55

| | Behaviours | Organisational benefits |
|---|---|---|
| Leading & deciding | Takes control and initiates action by giving direction and taking responsibility | Clearer objectives and commitment to achieving those objectives |
| Supporting & cooperating | Works effectively with individuals and teams, and provides a consistent role model for the organisation's values | Greater collaboration and greater cohesion across employees, and stronger client perceptions that they are being listened to |
| Interacting & presenting | Builds positive relationships by communicating, networking and influencing effectively | More effective communication and buy-in internally and externally to proposals and plans |
| Analysing & interpreting | Gets to the heart of complex issues and problems through clear analytical thinking and effective application of expertise | More effective user and better understanding of data to drive strategy and decision making |
| Creating & conceptualising | Applies innovation and creativity to develop new solutions in the context of the organisation's wider strategy | Ideas are translated into outcomes more effectively and with a clearer understanding of the wider context driving innovation |
| Organising & executing | Promotes clear systems for the delivery of projects, products and services focused on quality and customer satisfaction | Stronger project and programme management with better quality in what is delivered and greater customer satisfaction |
| Adapting & coping | Adapts and responds to change positively and effectively, and copes with setbacks | Greater likelihood that change initiatives are successful and that setbacks to achieving objectives are overcome |
| Enterprising & performing | Achieves personal goals, and approaches tasks and opportunities with a view to commercial and financial factors | More consistent achievement of target and KPIs associated with more efficient operations, revenues and margins |

FIG. 67

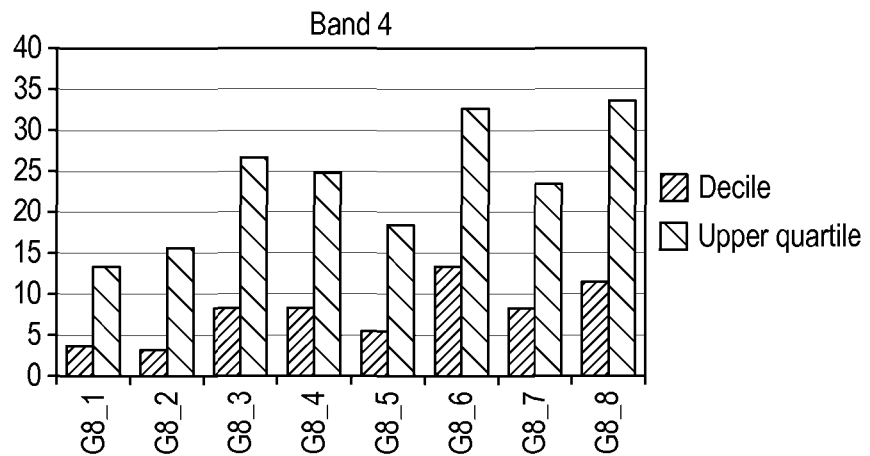
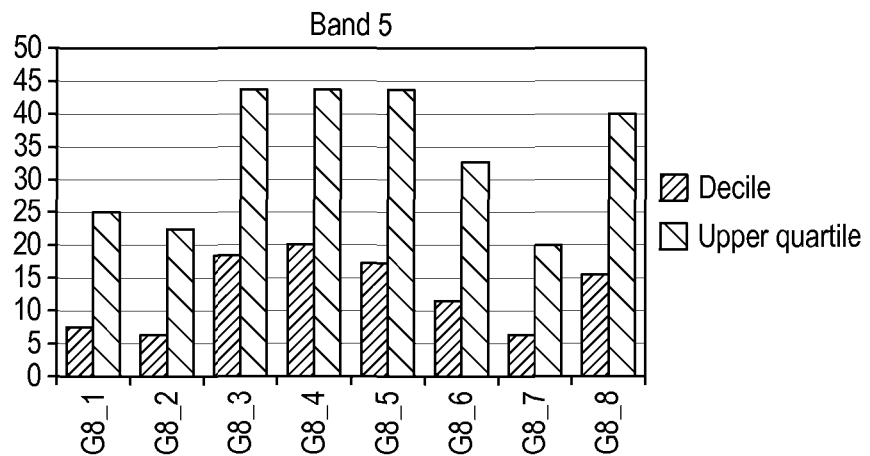
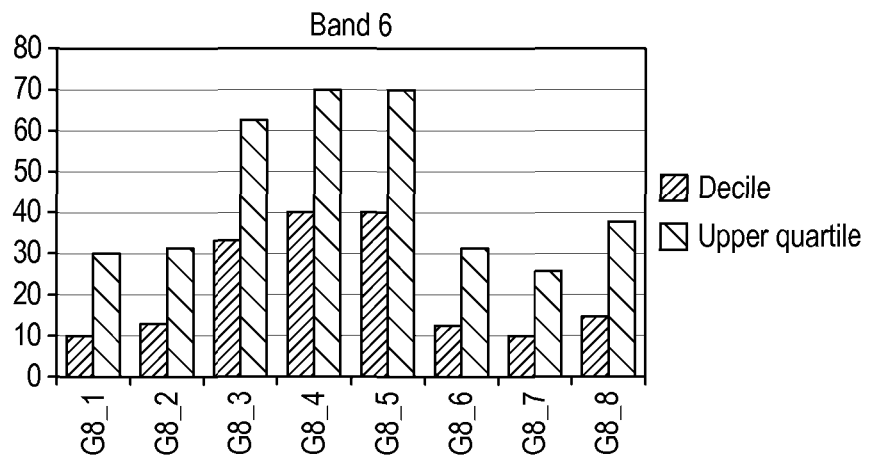
FIG. 77 Cont'd

| | Name | ID | Date | Instrument | Completed |
|---|---|---|---|---|---|
| | Project 1 - Grad Rec | 2757 | 27 Mar 2010 | OPQ32 | 243 |
| | Project 23 - Grad Rec | 2778 | 02 Feb 2010 | OPQ32 | 343 |
| | Project 45 - Grad Rec | 1578 | 07 Sep 2009 | OPQ32 | 134 |

3 Projects in search results
14 Projects selected

Geography ○
Industry ●
Business Function ○
Job Level ○

Project
Date range [ ] to [ ]
Search

Select All  Clear All

Pagination controls

Projects

Measures
Properties

Ok  Cancel

Update Projects Details

Update  Close

- Geography ○
- Industry ●
- Business Function ○
- Job Level ○
- Projects
- Measures
- Properties

| A | ▶ | UCF8_1Benchmark: |
| A | ▶ | UCF8_2Benchmark: |
| A | ▶ | Geat8_5Benchmark |
| B | ▶ | Geat8_6Benchmark |
| C | ▶ | Geat8_7Benchmark |
| D | ▶ | DTVBenchmark |
| ☐ | ▶ | STGBenchmark |
| ☐ | ▶ | GSBenchmark |
| ☐ | ▶ | DCBenchmark |
| ☐ | ▶ | PeopleRiskBand |
| ☐ | ▶ | ProcessRiskBand |

[Ok] [Cancel]

[Update] [Close]

LOGO    Page Header, etc

Build Benchmark    My Saved Benchmarks    My Assessment Data

I want to understand [Employer Brand / Recruitment Process / Quality of Applicant / Quality of Hire / Demographic] By looking at [abilities / styles / motivation / competencies/ strengths / performance] Benchmarked by [geography / industry sector] (Go)

Page Footer

LOGO        Page Header, etc

| Build Benchmark | My Saved Benchmarks | My Assessment Data |

Benchmark

| | Owner | | | | |
|---|---|---|---|---|---|
| People Risk benchmarked by Industry | steve.jones | Edit | Deactivate | Delete | Copy |
| Motivation benchmarked over time | SHL | | | | Copy |
| Leadership within Europe benchmarked by country | SHL | | | | Copy |
| Quality of Applicants over time | steve.jones | Edit | Deactivate | Delete | Copy |
| Demographic | steve.jones | Edit | Deactivate | Delete | Copy |

Page Footer

*FIG. 95*

Are your employees aligned to the behaviours you want?

| | Sales | Services | Customer services | Finance | HR | R&D |
|---|---|---|---|---|---|---|
| Leadership | Green | Red | Green | Amber | Green | Amber |
| Management | Red | Red | Green | Green | Green | Amber |
| Individual contributors | Green | Amber | Green | Amber | Green | Green |

Your values:
- Bold
- Quick & agile
- Solution focused
- Passionate

FIG. 99

ANALYTICS

This invention relates to apparatus for and a method of providing access to comparison metrics data relating to the comparison of a test or target group with a reference group, such as a benchmark group. An analytics system is also described. The invention has particular relevance in the sphere of talent management. In some embodiments, the invention allows for a user or organisation to determine or identify a parameter such as a "benchstrength" in talent acquisition (recruitment and selection), talent development and succession against a number of defined metrics through which actions to improve their talent management processes can be identified.

Comparison of the characteristics of an individual against those of a group or a population is commonplace. Traditionally, assessment testing has followed similar thinking, typically comparing an individual's scores on an assessment or personality test with the mean test scores of a group or a population. Such a comparison allows evaluation and ranking of the individual relative to the group or population and consequent conclusions are often drawn, for example regarding the individual's suitability for a particular role. Although such comparisons have proved useful, it has been appreciated pursuant to the present invention that further pertinent information may be extracted from assessment test data, and in particular from comparisons based on macro aggregation of assessment data through which organisations can be compared to industry sector benchmarks as well as by geography and business function.

A related problem is how to provide interested parties with access to this further information given the inherent, not least commercial, value and sensitivity of what may be a large body of test data, which can be manipulated to provide an analytics view of a user's talent goals and issues, and which requires a balance to be struck between ease-of-access and data security.

The present invention aims to address at least some of these problems.

Benchmarking

According to an aspect of the invention there is provided apparatus for providing access to comparison data relating to a comparison of properties of a target group with those of a reference group, the apparatus comprising any some or all of the following features: a database of reference metrics data determined from testing of members of a reference population; means for selecting target group metrics data, the metrics data determined from testing of the members of the target group and associated with metadata relating to the target group; means for selecting at least one item of metadata; means for selecting a reference group from the reference population in dependence on the selected metadata, the reference group being associated with reference group metrics data determined from testing of the members of the reference group and associated with metadata relating to the reference group; means for selecting a comparison aspect, the comparison aspect being associated with a subset of metrics data; means for generating comparison data relating to the comparison of the distribution of metrics data values for the target group with that of the reference group in accordance with the selected comparison aspect; and means for outputting the resulting comparison data.

Preferably, the apparatus further comprises means for preventing a user from gaining direct access to the database of reference metrics data.

Preferably, the apparatus further comprises means for selecting a particular reference group for comparison with the target group. Preferably the particular reference group is a standardised group. The particular reference group may be an idealised group.

Preferably, the testing of the members of the target group comprises applying a substantially identical test for each member.

The target group may be an individual.

Preferably, the metrics data relates to at least one personal characteristic. The personal characteristic may comprise at least one of: aptitude, ability, competency, skill, personality, knowledge, motivation, or behaviour.

Preferably, the comparison aspect relates to a potential future property of the target group. The comparison aspect may be one of: Leadership potential, Competency, or Ability. Preferably, the Ability is one of: verbal, numerical or inductive reasoning.

Preferably, the metadata relates to a property of the metrics data. The metadata may relate to a property of the testing, for example at least one of: type of test, type of parameter tested, date of test, location of test, language in which test was conducted, or reason for the testing. The metadata may relate to the outcome of the testing, for example at least one of: an offer of a position, acceptance of an offer, successful employment for a specific duration, or progression of the employee.

Preferably, the metadata relates to a property of the target group, for example: spoken language(s), place of birth, residence, nationality, age, gender, level of education, or field of education.

Preferably, the metadata relates to a relationship with an organisation.

Preferably, the metadata relates to: Geography, Industry sector, Business function, or Job-level.

Preferably, the metadata relates to an employment status or role, for example, the employment status may comprise at least one of: full or part-time employment, consultancy, prospective employment, or retirement; the employment role may comprise at least one of: employment location, level, role, function, field, or type.

Preferably, the metadata relates to a property of the organisation. Preferably, the property of the organisation comprises at least one of: company; industry; sector; location; or size.

Preferably, the metadata relates to performance of the target group or individual. The performance may comprise at least one of: sales volume, profit, or public ranking.

Preferably, the apparatus further comprises means for editing the metadata of the target group metrics data.

Preferably, the metadata relates to an assessment of a property of the target group.

Preferably, the value of the metadata is identical for target and reference groups.

Preferably, the output comparison data comprises an aggregate of resulting comparison data. The apparatus may further comprise means for separating the aggregated resulting comparison data into constituent parts. The apparatus may further comprise means for filtering the resulting comparison data. Preferably, the means for filtering is adapted to filter in dependence on a selected a further item of metadata; alternatively or in addition, the means for filtering may be adapted to filter in dependence on a selected comparison aspect.

Preferably, the apparatus further comprises means for presenting a series of prior comparison data outputs in the form of a carousel; or, alternatively or in addition, in the form of a slide deck.

Preferably, the apparatus further comprises means for periodically updating the database of reference metrics data. Preferably, the apparatus further comprises means for periodically updating the comparison data.

Preferably, the apparatus further comprises means for generating a comparison parameter in dependence on the comparison data, comprising a value for the proportion of the target group having metrics data values in a pre-determined segment of the reference group metrics data value distribution. Preferably, the comparison parameter comprises a percentage, fraction or segment. More preferably, the comparison parameter comprises at least one of: top decile, bottom decile, top quartile, bottom quartile, top percentile, or bottom percentile.

Preferably, the apparatus further comprises means for providing a commentary relating to at least one element of the comparison data, more preferably the commentary is adapted to provide information correlating the metrics data value or value range to an outcome.

According to another aspect of the invention there is provided a method of providing access to comparison data relating to a comparison of properties of a target group with those of a reference group, the method comprising: providing a database of reference metrics data determined from testing of members of a reference population; selecting target group metrics data, the metrics data determined from testing of the members of the target group and associated with metadata relating to the target group; selecting at least one item of metadata; selecting a reference group from the reference population in dependence on the selected metadata, the reference group being associated with reference group metrics data determined from testing of the members of the reference group and associated with metadata relating to the reference group; selecting a comparison aspect, the comparison aspect being associated with a subset of metrics data; generating comparison data relating to the comparison of the distribution of metrics data values for the target group with that of the reference group in accordance with the selected comparison aspect; and outputting the resulting comparison data.

Preferably, the method further comprises preventing a user from gaining direct access to the database of reference metrics data.

Preferably, the method further comprises selecting a particular reference group for comparison with the target group. The particular reference group may be a standardised group. The particular reference group may be an idealised group.

Preferably, testing of the members of the target group comprises applying a substantially identical test for each member.

The target group may be an individual.

Preferably, the metrics data relates to at least one personal characteristic. The personal characteristic may comprise at least one of: aptitude, ability, competency, skill, personality, knowledge, motivation, or behaviour.

Preferably, the comparison aspect relates to a potential future property of the target group. The comparison aspect may be one of: Leadership potential, Competency, or Ability. The Ability may be one of: verbal, numerical or inductive reasoning.

Preferably, the metadata relates to a property of the metrics data.

Preferably, the metadata relates to a property of the testing. This may be at least one of: type of test, type of parameter tested, date of test, location of test, language in which test was conducted, or reason for the testing. The metadata may relate to the outcome of the testing. The outcome may be at least one of: an offer of a position, acceptance of an offer, successful employment for a specific duration, or progression of the employee.

Preferably, the metadata relates to a property of the target group. The metadata may relate to: spoken language(s), place of birth, residence, nationality, age, gender, level of education, or field of education.

The metadata may relate to a relationship with an organisation.

The metadata may relate to: Geography, Industry sector, Business function, or Job-level.

Preferably, the metadata relates to an employment status or role. This may be at least one of: full or part-time employment, consultancy, prospective employment, or retirement; alternatively, or in addition, it may be at least one of: employment location, level, role, function, field, or type.

Preferably, the metadata relates to a property of the organisation. The property of the organisation may comprise at least one of: company; industry; sector; location; or size.

The metadata may relate to performance of the target group or individual. The performance may comprise at least one of: sales volume, profit, or public ranking.

Preferably, the method further comprises means for editing the metadata of the target group metrics data.

The metadata may relate to an assessment of a property of the target group.

The value of the metadata may be identical for target and reference groups.

Preferably, the method further comprises outputting comparison data comprising an aggregate of resulting comparison data. Preferably, the method further comprises separating the aggregated resulting comparison data into constituent parts.

Preferably, the method further comprises filtering the resulting comparison data. This may be in dependence on a selected a further item of metadata. Alternatively, this may be in dependence on a selected comparison aspect.

Preferably, the method further comprises presenting a series of prior comparison data outputs in the form of a carousel; or, alternatively (or in addition) in the form of a slide deck.

Preferably, the method further comprises periodically updating the database of reference metrics data. Preferably, the method further comprises periodically updating the comparison data.

Preferably, the method further comprises generating a comparison parameter in dependence on the comparison data, comprising a value for the proportion of the target group having metrics data values in a pre-determined segment of the reference group metrics data value distribution.

The comparison parameter may comprise a percentage, fraction or segment. Preferably, the comparison parameter comprises at least one of: top decile, bottom decile, top quartile, bottom quartile, top percentile, or bottom percentile.

Preferably, the method further comprises providing a commentary relating to at least one element of the comparison data. Preferably, the commentary is adapted to provide information correlating the metrics data value or value range to an outcome.

Also provided may be apparatus for providing access to comparison metrics data relating to the comparison of a test or target group (such as an organisation or part thereof) with a reference group, such as a benchmark group, the apparatus comprising:

means (such as a computer interface) for selecting test or target group metrics data, the test or target group metrics data comprising metrics data, preferably obtained from a particular measurement series, with each metric datum having (preferably a plurality of) metadata associated with it;

means for selecting reference group, such as a benchmark group, metrics data, the reference (benchmark) group metrics data comprising metrics data from a plurality of (further) target groups for which only metrics data having a predefined combination of metadata associated with them are included;

means for generating a comparison of the distribution of the metrics data values between the target group and reference (benchmark) group; and means for outputting the results of the comparison.

By comparing a test or target group of individuals against a reference group, such as a benchmark group—the groups being defined by metadata associated with the respective metrics data, thereby allowing a specific reference benchmark group to be chosen by means of selecting a predefined combination of metadata—useful information may be extracted from a set of individuals' data. For example, the comparison may allow evaluation of a group or groups as a whole, rather than an individual, and therefore may enable identification of features that may be systemic rather than individual.

The results of the comparison of the test or target group (such as an organisation or part thereof) with a reference group, such as a benchmark group, may be expressed in terms of a parameter referred to as a "benchstrength".

The metrics data in the reference group is preferably drawn from a larger group or pool that includes metrics data from a plurality of (further) target groups. The pool from which metrics data for the reference group is selected may include metrics data from a large range of sources. For example, the data pool may include data from target groups that are for instance from different companies, from different nations, and/or taken at different times.

A predefined combination of metadata is preferably used to select a reference group (or benchmark group). A user may specify metadata of interest. A selection may for example include metrics data that has a particular value in a particular type of metadata, The predefined combination of metadata may include metrics data that has a particular value in a particular type of metadata, and any value in any other type of metadata. If only one type of metadata is in use, the predefined combination may just be a single value.

Means for defining the combination of metadata used for selection may include a user input for example via a web interface, the user selection being inputted with a mouse, keyboard, or other input device. In some embodiments a plurality of metadata may be combined as a single new instance of metadata.

Metadata is preferably descriptive of the data contents. Metadata may include values, or tags or other descriptors.

Preferably one type of metrics data is selected for comparison. If more than one type of metrics data is selected for comparison, then preferably metrics data of the same type is compared. In some embodiments requests to combine metrics data of different and/or incompatible types is detected and optionally prevented.

Also provided may be a corresponding method of providing access to comparison metrics data relating to the comparison of a test or target group with a reference group, such as a benchmark group, is also provided. The method, of providing access to comparison metrics data relating to the comparison of a test or target group (such as an organisation or part thereof) with a reference group, such as a benchmark group, comprises:

selecting target group metrics data, the target group metrics data comprising metrics data, preferably obtained from a particular measurement series, with each metric datum having (preferably a plurality of) metadata associated with it;

selecting reference group, such as a benchmark group, metrics data, the reference (benchmark) group metrics data comprising metrics data from a plurality of (further) target groups for which only metrics data having a predefined combination of metadata associated with them are included;

generating a comparison of the distribution of the metrics data values between the target group and reference (benchmark) group; and outputting the results of the comparison.

Aspects of the invention may be combined to produce an analytics system for comparison of metrics data—such as that obtained from assessment testing or assessment data—between a test or target group and one or more reference groups, such as benchmark groups.

A reference or benchmark group that includes data from a plurality of target groups may be representative of a wider range of scenarios and possibilities than data from a single target group, and comparison against the former in preference to the latter may help identify features that are unusual. Comparison across multiple target groups may allow for a wider scope of reference, enabling more robust and meaningful comparisons. The information gained by the comparison may provide basis for decisions and may allow identification of conflicts.

Preferably, comparison of a target group against a benchmark group is made against a subset of metrics data. The subset may be user-selectable.

In some alternatives the comparison of a target group against a benchmark group is aggregated and/or determined at a first level of detail or coarseness, optionally at a second level of detail or coarseness. Further features of the invention—which may be provided dependently on or independently of the above or any other aspect(s) of the invention, in any appropriate combination—preferably include:

At least one database for storing each of the target group or user's assessment or metrics data, the reference or benchmark group metrics data, and the comparison of the distribution of the metrics data values. The sets of metrics metadata and metrics data values, user data and benchmark data values, may be stored in separate databases; alternatively, multiple of the metrics metadata and metrics data values, and/or of the user data and benchmark data values may be stored in a single database.

At least one server, for housing and/or controlling the at least one database. A plurality of servers may also be used, for example in a distributed or redundant arrangement.

At least one server, for processing the assessment and benchmark data, and adapted to access the data from the one or more databases.

At least one server, for providing access for a client or user either directly or via a computer, for example via a web interface, to the results of processing the assessment and benchmark data.

One or more server functions may be combined in a single server.

Preferably, the metrics data is obtained from assessments relating to at least one personal characteristic such as: aptitude, ability, competency, skill, personality, knowledge, motivation and behaviour.

Preferably, providing a tool which caters for a broader category of assessment data than psychometric or personality testing, and which can include all of the above-mentioned classes.

The target group may be a group of individuals that all relate to an institution (such as a company, charity, industry body or other organisation) in a particular way. The individuals that form a target group are preferably subject to substantially the same series of measurements (such as a set of assessments or tests). Examples of the relationship between the individuals and an institution may include employment status or role, for example at least one of: full or part-time employment; consultancy; prospective employment; retirement; or any other appropriate relationship.

For a user who holds assessment data of a variety of classes
storing benchmark data through which the user can get a sense of their, for example, institution or group, "benchstrength" against a number of analytic indices; and providing a tool that looks at groups broken down using a number of filters related to demographics, business function and other categories.

The reference group may be a "benchmark" group (for example, a "best-in-class" or "best-of-breed" group). The benchmark group is preferably a group of individuals that each relate to a respective one of a plurality of institutions (such as a company, other corporate body or organisation).

Preferably, the individuals contributing metrics data are a representative worldwide selection of individuals. Each individual may be categorised by one or more parameters such as: spoken language(s), place of birth, residence or nationality.

Preferably, the types of metadata include at least one of: characteristics of the metrics data; characteristics of the relationship between the individual and the institution; characteristics of the institution; and/or characteristics of the individual. For example:

Characteristics of the metrics data may include at least one of: type of test; type of parameter tested; date of test; location of test; language in which test was conducted; or further information relating to the test or the metrics data.

Characteristics of the relationship between the individual and the institution may include at least one of: reason of conducting test; characteristic of the occupation to which test relates (location, level, role, function, field, type); and further information relating to the relationship between the individual and the institution.

Characteristics of the institution may include at least one of: company; industry; sector; location; size of institution; and further information relating to the institution.

Characteristics of the individual may include at least one of: nationality; country of residence; age; gender; ethnic origin; level of education; field of education; language; culture; or further information relating to the individual.

The types of metadata may further include information relating to the outcome of the test. For example, after testing an applicant, the following may be steps in progression of the test outcome:
offer of a position;
acceptance of an offer;
successful employment for a duration of for example at least twelve, six, four, three, two months or at least one month;
progression of the employee into for example a management role;

Further outcomes of the test may also be determined throughout the duration of the relationship between the individual and the organisation.

The types of metadata may further include information relating to outcomes, especially business outcomes, or measures of performance, for example at least one of: sales volume; profit; public ranking; or further information relating to business outcomes or measures of performance. The information may relate specifically to an individual, it may relate to a group of individuals, or it may relate to a group to which an individual is associated.

By associating these types of metadata to the metrics data, the predefined combination of metadata may be chosen to select a very specific benchmark group. This may allow comparisons across organisations, across groups within organisations, across stages in the progression of the relationship between organisations and individuals, across time periods, across groups of success, or across many other groups. The wide range of choice in selection of a benchmark group may allow tailoring a comparison to a wide range of situations and investigations, and may therefore provide a very versatile tool. The ability to tailor a comparison to a very specific situation or investigation may provide highly meaningful comparisons, and therefore result in a powerful analysis tool.

Preferably, comparison of the distribution of the metrics data values between the target and benchmark group results in the generation of a graphical display, for example a plurality of histograms, to enable the user to extract insight from the "benchstrength" view presented. Alternatively or in addition other forms of display may be generated. Examples of suitable displays may include horizontal and vertical bar charts, line charts, pie charts, area charts, 3D charts, surface charts, or other charts. Further, a measure may be extracted from the comparison of the distribution of the metrics data values between the target and reference group. For example, a value for the proportion or percentage of the target group that have metrics data values in a pre-determined segment of the reference group metrics data value distribution may calculated. The pre-determined segment may be the top decile, the bottom decile, the top quartile, the bottom quartile, the top percentile, the bottom percentile, or any other percentage, fraction or segment.

Preferably, a commentary or narrative is included in the display; more preferably, the commentary or narrative relates to an element of a chart, such as a bar in a bar chart or a segment in a pie chart. The commentary or narrative may also relate to a particular metrics data value or value range. Preferably, the commentary or narrative provides information correlating the metrics data value or value range to an outcome, for example a business outcome. The commentary or narrative may be provided in at least one of: a mouse-over text field;

a hover-over text field; a static or dynamic text panel; a linked document; a linked web page; and a linked application page.

Preferably the data included in the benchmark group metrics data is updated periodically, preferably every other year, annually, every 6 months, every 4 months, every 3 months, every 2 months, monthly, or weekly.

Preferably the data included in the benchmark group metrics data is recent as in less than 20 years, 10 years, 7 years, 6 years, 5 years, 4 years, 3 years, 2 years, or 1 year old; more preferably, the benchmark group metrics data is less than 6 months, 4 months, 3 months, 2 months, 1 month, or at most one week old.

Prediction

There may also be provided an apparatus for generating a reference distribution of metrics data, the apparatus comprising:

means for obtaining metrics data (e.g. from a plurality of measurement series) with each metric datum having associated with it a plurality of metadata, wherein the metadata comprises at least one outcome, for example a business outcome;

means for selecting a benchmark group having at least one predefined value in at least one predefined outcome, for example a business outcome; and means for generating a distribution of the metrics data values in the benchmark group.

There may also be provided a method of generating a reference distribution of metrics data, the method comprising:

obtaining metrics data (e.g. from a plurality of measurement series) with each metric datum having associated with it a plurality of metadata, wherein the metadata comprises at least one outcome, for example a business outcome;

selecting a benchmark group having at least one predefined value in at least one predefined outcome, for example a business outcome; and generating a distribution of the metrics data values in the benchmark group.

By generating a reference distribution of metrics data that relates to a particular outcome, for example a business outcome, the characteristics of particularly successful or unsuccessful groups may be identified.

This may allow optimisation of groups to reflect characteristics that have the potential to be successful. In particular, identification of an individual that would bring a group closer to an 'ideal profile' may be possible.

Further features of the invention—which may be provided dependently on or independently of the above or any other aspect(s) of the invention, in any appropriate combination—preferably include:

Preferably, the metrics data is obtained from assessment tests relating to at least one of: aptitude, ability, competency, skill, personality, knowledge, motivation and behaviour.

Preferably, the outcome, for example a business outcome, is determined from at least one of: sales volume; profit; public ranking; or further information relating to business outcomes or measures of performance. The business outcome may relate specifically to an individual, it may relate to a group of individuals, or it may relate to a group to which an individual is associated.

Preferably the metadata further includes ones or more of: characteristics of the metrics data; characteristics of the relationship between the individual and the institution; characteristics of the institution; and characteristics of the individual. The metadata may further include information relating to the outcome of the test. For example after testing an applicant, the following may be steps in progression of the test outcome: offer of a position; acceptance of an offer; successful employment for a duration of, for example, at least twelve, six, four, three or two months or at least one month; progression of the employee into for example a management role; or further outcomes of the test throughout the duration of the relationship between the individual and the organisation.

By associating these types of metadata to the metrics data, a combination of metadata may be chosen to select a very specific benchmark group. This may allow comparisons across organisations, across groups within organisations, across stages in the progression of the relationship between organisations and individuals, across time periods, or across many other groups. The ability to tailor a benchmark group to a very specific situation or investigation may provide highly specific benchmark groups, and therefore a stronger correlation between the characteristics and the outcome. The wide range of choice in selection of a benchmark group may allow tailoring to a wide range of situations and investigations, and therefore may provide a very versatile tool.

Aggregate Parameters

There may also be provided a method of generating a measure of personal potential comprising combining personality metrics, and apparatus for generating a measure of personal potential comprising combining personality metrics.

Based, for example, on an individual's knowledge, personality, and motivation, a measure for the individual's potential for success (or risk for failure) may be defined. Certain components of the metrics data from assessment testing may be combined into aggregate parameters that may be indicative of the potential of an individual. Conversely, a risk parameter may be defined based on a combination of metrics data. This might be especially useful for assessing individuals who have not been in full time employment in the past and therefore only little confidence can be placed in assessments relating to work experience, work skills, or work-related competencies.

Further features of the invention—which may be provided dependently on or independently of the above or any other aspect(s) of the invention, in any appropriate combination—preferably include The use of aggregated metrics data for an individual or a group may be used to define a 'fingerprint' for that individual or group. Comparison may therefore be made between the aggregated metrics for the individual or group and those for benchmark groups. The differences between these values may be identified each difference independently or as an aggregate difference. Identifiers, system or software flags may be generated in dependence on the extent and/or nature of the identified differences. These may result in the generation of summary or interpretive commentary.

In some alternatives, a range of alternative aggregations of metrics data is provided. These may be selected, submitted by upload or otherwise defined by a client or user of the analytics system, for example according to particular interest, requirements or according to access permissions, optionally set for example by a subscription level.

User-selected, submitted or otherwise defined aggregations of metrics data may be stored for future retrieval, optionally by other parties.

In some alternatives, user test data may be incorporated into the main body of test or reference data. This may be a condition of use of the analytics system and may occur as part of the comparison process. Future user comparisons may be offered with or without including the user test data in the main body of test data.

Preferably, the output results of the comparison of the distribution of the metrics data values between the target group and reference (benchmark) group comprise at least one chart; preferably the chart is a histogram.

Preferably, generated charts form a series and are navigable via a carousel display, preferably comprising an active foreground chart and at least one inactive background chart, wherein the background chart is user-selectable and consequently made active and brought to the foreground.

Preferably, the apparatus comprises means for selecting a subset of metrics data and/or benchmark group by means of at least one filter process. Preferably, the apparatus further comprises means for applying the same or equivalent filter process to the target group.

Certain terms used in this specification are evidently used interchangeably, for example:

user, client, customer test data, test results, metrics data, assessment data, assessment results analytics system, platform (especially when referring to the web-enabled, remotely-accessible embodiments), application organisation, institution The invention extends to methods and/or apparatus substantially as herein described with reference to the accompanying drawings.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

Any apparatus feature as described herein may also be provided as a method feature, and vice versa. As used herein, means plus function features may be expressed alternatively in terms of their corresponding structure, such as a suitably programmed processor and associated memory.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

Furthermore, features implemented in hardware may generally be implemented in software, and vice versa. Any reference to software and hardware features herein should be construed accordingly.

These and other aspects of the present invention will become apparent from the following exemplary embodiments that are described with reference to the following figures in which:

FIG. 9 shows an example of the benchmark information screen;

FIGS. 10 to 13 show examples benchmark categories selectable by the user;

FIGS. 14 and 15 show examples of the data selection interface;

FIGS. 16 and 17 show examples of the data search options interface in "basic" and "advanced" variants;

FIG. 20 shows a further benchmark selection interface;

FIG. 21 shows a basic benchmarking output display screen;

FIG. 22 shows a display screen with a pop-up commentary;

FIG. 23 shows a display with reference groups and target groups;

FIG. 24 shows a display for a plurality of metrics;

FIG. 25 shows an example of a benchmarking output screen;

FIG. 26 shows a further example of a benchmarking output screen;

FIG. 27 shows the carousel feature in use;

FIG. 28 shows the slide deck feature in use;

FIG. 29 shows an example of the stored views interface;

FIGS. 34 and 35 show further examples of benchmarking output screens;

FIG. 41 shows various examples of render charts;

FIG. 53 shows how Analytics sits within the Central system but sources its data primarily from external databases;

FIG. 54 shows the interaction between the Analytics layers (Central, Central Business Layer, WCF Service Layer and Business Layer) with the Analytics Data;

FIG. 55 shows database tables for the Benchmark and index measures;

FIG. 56 shows database tables for the Content Metadata;

FIG. 57 shows an overview of the Feedback Updates process;

FIG. 58 shows the ETL process in outline;

FIG. 59 shows the Service Contract in overview;

FIGS. 60 and 61 show the Data Contracts in overview;

FIGS. 62 and 63 show some sequence diagrams;

FIG. 64 shows the caching service in overview;

FIG. 65 shows an example of a suitable class design for the caching implementation;

FIG. 66 shows an example of ETL workflow;

FIG. 67 shows the Universal Competency Framework Great 8;

FIGS. 78 to 96 show various further features of the analytics system; and

FIGS. 97 to 100 show further aspects of the analytics system.

OVERVIEW

Figure 1:
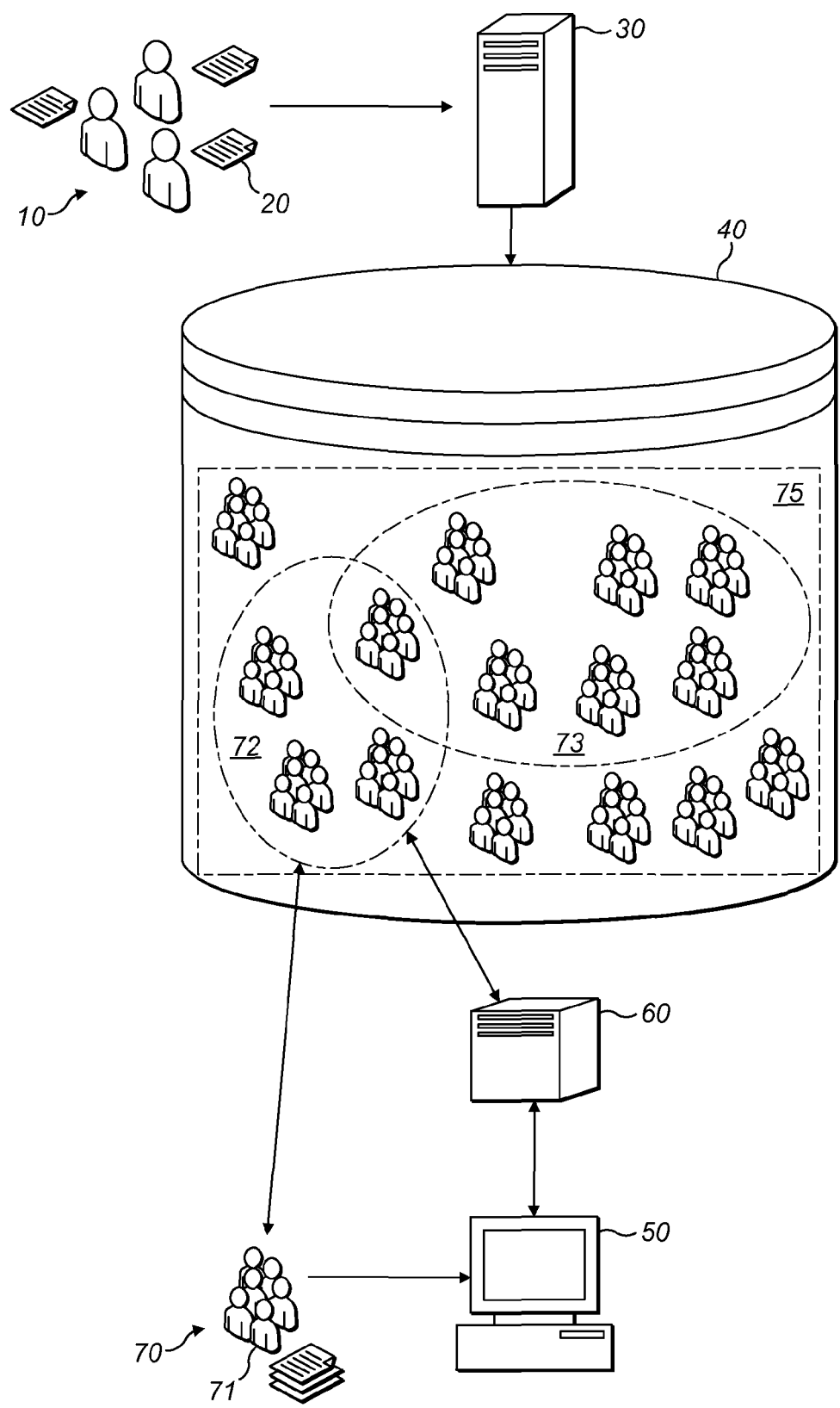
FIG. 1 shows an overview of a process for comparing assessment test metrics of a test or target group with those of a reference group.

FIG. 1 shows an overview of a process for comparing assessment test metrics of a test or target group with those of a reference group. A plurality of individuals 10 participate in assessment testing, the results of which 20 are collected and processed by processor 30 and stored in database 40. The assessments may be standard ones, in which the individuals complete a questionnaire designed to draw out particular characteristics of interest. Such assessments may be computerised or paper-based questionnaires subsequently scanned or otherwise digitised for processing.

The collection, processing and storage of the results (preferably anonymised) of a large number of assessments—potentially over many years—results in database 40 becoming a large body of test data of significant value.

Subsequently, an interested and authorised party may use client computer 50 to access services of the analytics system—such as a benchmark tool—provided by server 60 which allow the characteristics of the test or target group 70 (the individuals of which have also participated in assessment testing) to be compared against those of a reference or "benchmark" group 72, 73, which may be considered as reference groups. Optionally, the characteristics of an individual 71 may also be compared against those of the population 75.

The benchmark tool therefore allows a user of computer 50 to compare a particular test or target group 70 or an individual 71 against a benchmark group 72, 73.

Typically, server 60 is configured to allow only very restricted access to the data of database 40. For example, in some configurations client computer 50 may only access database 40 indirectly, server 60 only providing aggregated summary information and the results of comparative calculations, for example via a web interface and/or with suitable firewalls and other network access restrictions. Some configurations make use of a secondary database—which may be a partially mirrored or replicated version of database 40 or only store aggregated data—to further isolate database 40 from client computer 50.

Suitable computer servers may run common operating systems such as the Windows systems provided by Microsoft Corporation, OS X provided by Apple, various Linux or Unix systems or any other suitable operating system.

Suitable databases include ones based on SQL, for example as provided by Microsoft Corporation or those from Oracle or others.

Remote access to the analytics system may be provided via one or more web servers configured to provide a website or other remotely-accessible interface. Web interfaces and other code may be written in any suitable language including PHP and JavaScript. A Microsoft .Net based stack may be used.

Figure 2:
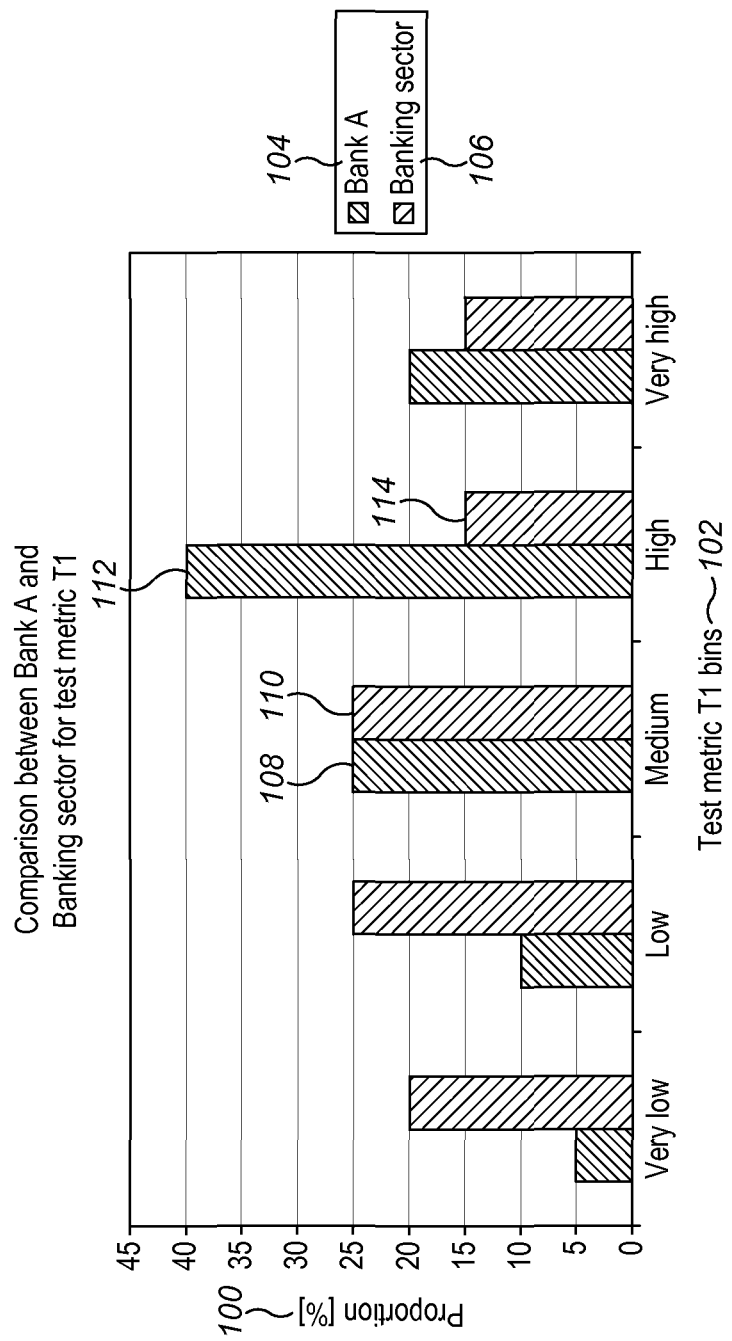
FIG. 2 shows an example of the results of a comparison between a test or target group and a reference group.

FIG. 2 shows an example of the results of a comparison between a test or target group and a reference group. In this example, an employer (bank A) may wish to compare the characteristics of job applicants the employer attracts (the particular test or target group) against those of the applicants the industry attracts overall (the reference group). Such a comparison could, for example, give an indication as to whether the job applicants the employer attracts compare unfavourably to the job applicants the industry attracts overall, and the employer might consequently wish to re-evaluate their recruitment strategy.

Referring to FIG. 2, the relative proportions 100 of members of the respective test and reference groups with a test metric T1 102 are plotted as a histogram or bar chart. The distribution of test metric scores (histogram bars) that relates to the bank A 104 is shown alongside that of the test results of the group that relates to the banking sector overall 106. The values are grouped in range 'bins'. In this example, the proportion 108 in bank A and the proportion 110 in the banking sector overall which fall within the 'medium' bin of test metric T1 are the same, while a far greater proportion 112 in bank A fall within the 'high' bin of test metric T1 than in the banking sector overall 114.

The data under comparison (test metric T1) may be comprise one or more metrics relating to aptitude, ability, competencies, skills, personality, knowledge, and/or behaviour, obtained by a suitable assessment test. The data under comparison may also be aggregate parameters based on these metrics. These are created according to equations which translate test taker assessment results into an interpretation model, for example relating to sales, teamwork, leadership or risk profiles. In some variants they can also be based on more than one result from more than one test or assessment instrument.

The data for each individual of a group contributes to a distribution for the group. In addition to the ability to compare an individual against a reference distribution and determine the ranking or position of the individual compared to the reference, the user's target group distribution is compared to a reference distribution. By comparing a particular target group distribution against a reference group distribution more information can be extracted from already available data. The comparison may provide visibility and inform strategic decisions.

For a meaningful comparison, the reference group may relate in a particular way to the target group. For example, the reference group may relate to the same industry, or the same nationality, or the same career level. In the example described above, the reference and target group both relate to the same industry and to applicants undergoing testing.

By providing a reference group for reference, more meaningful comparisons between different particular target groups may be conducted. For example, comparison of annual graduate job applicant test results may be drawn up to assess attractiveness of the employer. This may however depend upon external factors such as economic environment or media coverage of an industry. For example, during an industry-wide advertising or public relations slump fewer highly qualified graduates might apply to a particular industry overall. If an employer compares its graduate job applicants of one year to those of a second year, then it might appear that the employer has suddenly attracted fewer highly qualified applicants. If however the employer's graduate job applicants of one year in reference to an industry norm job applicant group of that year are compared to those of a second year in reference to industry norm applicant group of the second year, then it might become evident that although the employer has attracted fewer highly qualified applicants than in other years, compared to the rest of the industry, the employer still attracts more highly qualified applicants than its competitors. The employer might therefore conclude that investing more effort in the recruitment strategy would not be the most efficient allocation of resources.

Comparison of the distribution of characteristics of a test or target group to those of a particular reference group may provide further information of interest. For example, instead of comparing the distribution of a characteristic of the middle management of a company to the distribution of the same characteristic in the middle management of the overall industry, an analysis may rather compare the distribution of the same characteristic of the middle management of a company to the distribution of the same characteristic in the middle management associated with a particular role. If, for example, an aim of a company is to develop a culture that resembles a 'sales' mentality, then a strategy could be to assemble a middle management group that is similar in characteristics to a 'sales' reference group. In this manner comparisons across groups that would normally not necessarily relate to one another may be a useful tool.

Comparisons of groups within an organisation may also provide meaningful information. For example, comparison of the characteristics of a present-day sales group to that of the sales group of one year ago and the sales group of two years ago may help identify changes that could be a cause for problems. Other time periods may also be compared. In some alternatives a series of characteristics over successive time periods may be compared to allow for the tracing of the evolution of group characteristics. This may allow for overall group characteristics to be compared even when the individual members of the group undergo changes in their own characteristics (for example, as a result of training) or when the constituent members of the group change due to individuals joining or leaving the group.

In some alternatives, other measures of metrics distribution may be provided. For example, the proportion (e.g. the percentage) of the target group that is in the top quartile of the reference group may be calculated. If more detailed information is required, then for example values for the top quartile and the top decile may be helpful; alternatively, values for the top and bottom quartile, for example, could be informative. This condenses the distribution comparison to a single value (or a manageable number of values), which gives a measure of the metric distribution in the target group compared to the reference group. With the distribution reduced to a single value (or a manageable number of values), a larger range of variables can be considered in the comparison, for instance different metrics, or different groups that all relate to the same (or different) reference groups. The top quartile value may be considered as expressing the "breadth" of a metric; the top decile value may be considered as expressing the "depth" of a metric.

Global collection of metrics data, across different languages, over a period of many years, provides a large body of metrics data. The metric data contains test responses that reflect characteristics of individuals. By supplementing each set of metrics data with further information that relates to the respective set of metrics data (herein referred to as 'metrics metadata'), a variety of reference groups can be defined. The metrics metadata can provide information for associating the metrics data with a particular reference group. Such information can, for example, relate to the circumstance under which the individual is tested, e.g.:

Test reason (applicant pre-screen, applicant selection, employee development, HR research)
Job level (e.g. graduate, lower management)
Job type (e.g. sales, research and development, finance)
Job location
Company or organisation
Industry or sector
Date of test Alternatively, or in addition, the metrics metadata can potentially relate to the individual being tested, e.g.:
Nationality
Country of residence
Age
Gender
Ethnic origin
Level of education
Type of education
Language
Culture These data may be useful for investigating the demographics of a group.

The metrics metadata may include further aspects, such as outcome of the test. For example after testing an applicant, the following may be steps in progression of the test outcome:
offer of a position
acceptance of an offer
new employee remains after the first six months of employment
new employee becomes a top/upper quartile performer in the role This type of information can provide reference groups characterised in terms such as 'candidates that entered into permanent employment'. Monitoring further along the career progression of the employee can provide further useful information, such as reference groups of 'graduate applicants who progressed to upper management roles'. Such reference groups may provide helpful information, not only regarding the characteristics of successful individuals, but also for comparing groups. For example, comparison of a group of unsuccessfully employed candidates (applicants that accept an offer but do not complete a probation period) to a reference group of unsuccessfully employed candidates may help identify systematic problems in the recruitment process.

The metrics metadata may also include other information not supplied by the metric data, for example sales volume, profit, or other business outcomes or measures of performance. By relating this type of outcome to the individual, or a group the individual is associated with, reference groups such as 'employees in teams of above-average profitability' or 'managers of groups with high sales volume' could be formed. Such reference groups may provide helpful information in identifying how especially successful groups are composed. The measures of performance may be obtained from an external source, such as a public ranking (e.g. FORTUNE, Forbes, or other rankings).

The correlation of an outcome to metric data is a useful tool. The analysis may be at a group level, where for example a particular combination of individuals has the potential to perform especially well; or it may be at the individual level, where for example a particular test result in a graduate applicant indicates the individual has the potential to perform especially well.

Based on the above-described correlation between individuality and performance, particular personality metrics may be combined to determine a measure of potential and extrapolated to make a prediction. Thus certain components of the metrics data may be combined into aggregate parameters that may be indicative of the potential of an individual.

Conversely, a risk parameter may be defined based on a combination of metrics data. An example of where this might be especially useful is in the assessment of graduates. An individual who has not been in full time employment in the past may not have substantial work experience, work skills, or work-related competencies. Based, for example, on an individual's knowledge, personality, and motivation, a measure for the individual's potential for success (or risk for failure) may be defined.

While it may be possible to define aggregate parameters that are generally useful and indicative of success, the correlation between individuality and success may produce other useful information. By correlating individuality and success, for example by analysing a reference group of highly successful people, it may be possible to determine an 'ideal individual'. The correlation could be particularly reliable if the reference group is narrowed down, for example to a particular job (occupation, task, role, or situation), in a particular industry, in a particular country. Notably, such an ideal individuality profile may not necessarily reflect high test results in all areas, and an individual with exceptional scores in an area might not be highly suitable for a particular job. Similarly, it might be possible to identify areas that are especially relevant to success, and others that are less relevant. By comparing an individual's test results to the 'ideal individual', it might be possible to predict which individuals have the potential to achieve well.

Figure 3:
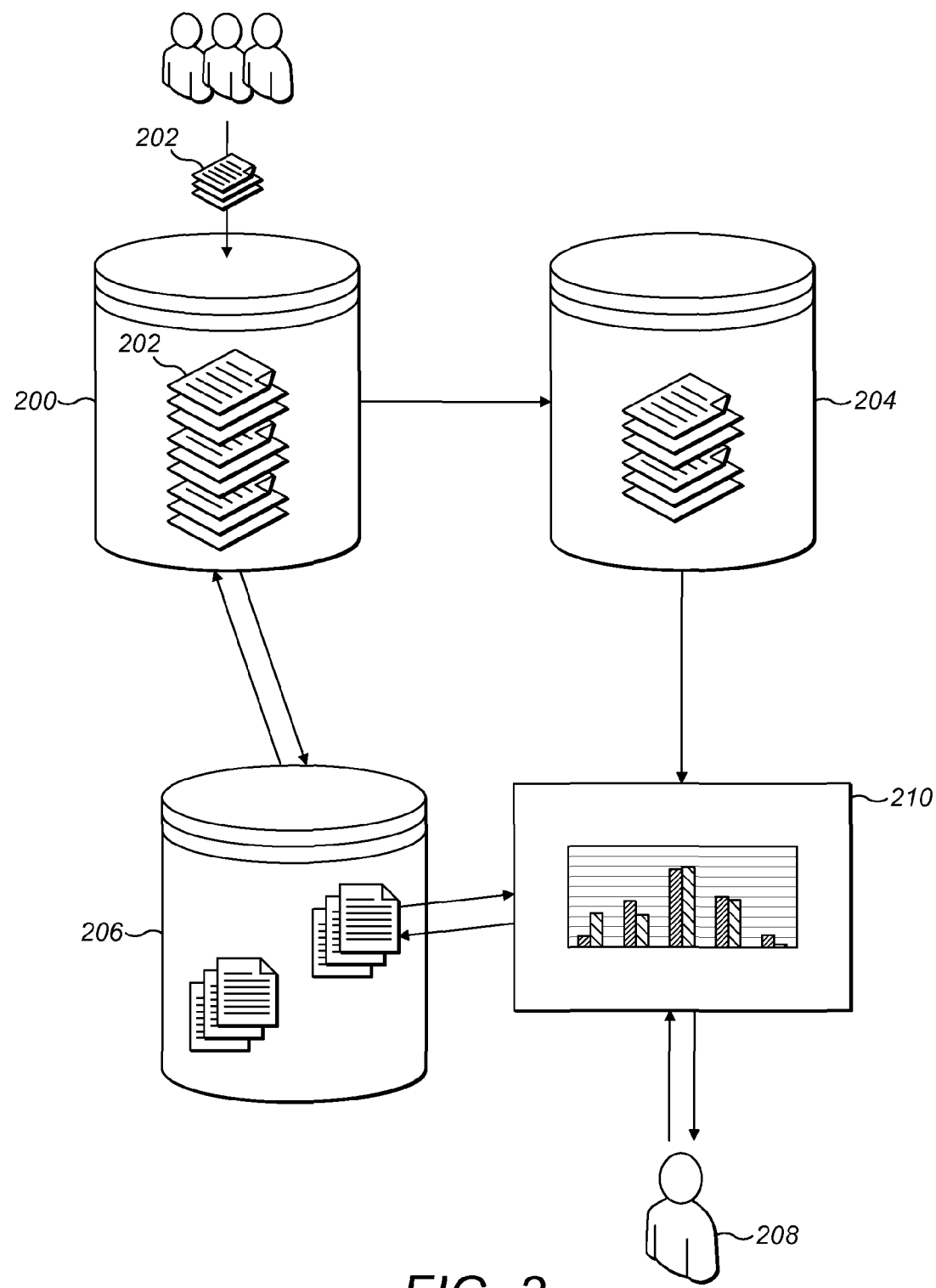
FIG. 3 shows a system that is designed to provide the comparison.

FIG. 3 shows a metrics data database 200 that contains all the client metrics data 202. A benchmark database 204 contains all the benchmarks (benchmark groups). Aggregate parameters (such as risk) are calculated based on data from the metrics data database 200 and stored in an aggregate parameters database. In alternative arrangements, aggregate parameters may be stored in the metrics data database 200 alongside the metrics data, or elsewhere. Metrics metadata are stored in a metrics metadata database, or alternatively in the metrics data database 200 alongside the metrics data, or elsewhere. User data is stored in a separate user database 206.

Decisions about where to store aggregate parameters and other data are based on the physical location of the applications that are to query the data, taking account of the need to minimise latency effects. Also, in some variants, the aggregate parameters and other data may be used by other services than the server 60. As the aggregate parameters or other data is based on a subset of the metrics data in database 200, the schema may be different, in which case they may be kept in a separate database.

Metrics metadata (demographics) may not always be stored directly with the metrics, which may, for example, be for historical system reasons. In some alternatives, a shared metrics metadata database may be implemented to be shared by different testing systems, data being aggregated from multiple systems.

Usually, the term 'benchmark' refers to a 'best-in-class' group (e.g. the ten most profitable companies in an industry), whereas a 'norm group' is representative of a specific group (e.g. an industry) but not necessarily a ranked selection. As used herein, the term 'benchmark' is used in reference to norm groups as well as to best-in-class groups or any further types of reference groups.

The benchmark database 204 may contain metrics data from the metrics database 200 as well as aggregate parameters. The metrics data that is included in the benchmark database is selected to be representative of the reference groups defined by the metrics metadata. In particular, not each data set in the metrics data database 200 is included in the benchmark database 204. For example, if the metrics data were to have an over-representative proportion of data from the US, then not all of the US data would be included. Further, data may be excluded if it does not satisfy data quality standards. The selection of data for the benchmark database 204 may occur automatically according to a predefined set of rules, or it may be done manually or semi-automatically or in any other manner. Once the metrics data sets for inclusion in the benchmark database 204 are selected, the metrics data sets may be stored for the user to access and filter as required to produce reference groups. The selected metrics data sets may also be subjected to analysis, and the distribution determined for each metric in each group, and the distributions stored in the benchmark database 204. In this case the user would not access and filter the metrics data sets, only retrieve the required reference group metric distribution.

The benchmark data may only include data for a predetermined time period, such as the last five years. The update frequency of the benchmark data may for example be annual. A very high update frequency increases the effort the maintenance requires, and may not provide a significant advantage, if the underlying test results only change very slowly. If data selection occurs automatically then a high update frequency is possible, however automatic data selection may be more susceptible to errors and the benchmark data may not be as robust.

The user database 206 contains the metrics data sets that belong to the user's particular target groups (for example: graduate applicants who participated in an assessment exercise). The data sets associated to a user 208 may be organised into groups or "projects". A project is a predefined group of candidates that undergo a predefined assessment or set of tests. Examples of projects could be:
  members of the marketing group undergoing an annual competence test;
  band 2 employees undergoing a skill test for HR research;
  applicants for a position in the engineering group in Switzerland undergoing a recruitment test.

The user database 206 is refreshed more frequently than the benchmark database 204, for example daily. In this case new test results only appear in an existing project the next day. The user 208 can supplement the metrics data sets with metrics metadata. For example, a test result for an employee may be labelled with the employee's job level and job function. This metadata may be stored in the user database 206, and it may also be added to the metrics data database 200 alongside the metrics data.

Different levels of access rights and available functionality may be defined for different users. For example:
  public users can access a demonstration data set and some sample analyses;
  on-demand users can access the benchmark database 204, but not store, access or use data on the user database 206; and
  full users can access the benchmark database 204, and store, access and use their own data on the user database 206.

Another example of different levels of access rights and available functionality for different users may be:
  public users can access a demonstration data set and some sample analyses;
  authorised users can access all benchmarks and save (and store) data on the user database 206; and
  authorised clients (or data users) can also add their own data to the application.

Example of Operation

Figure 4:
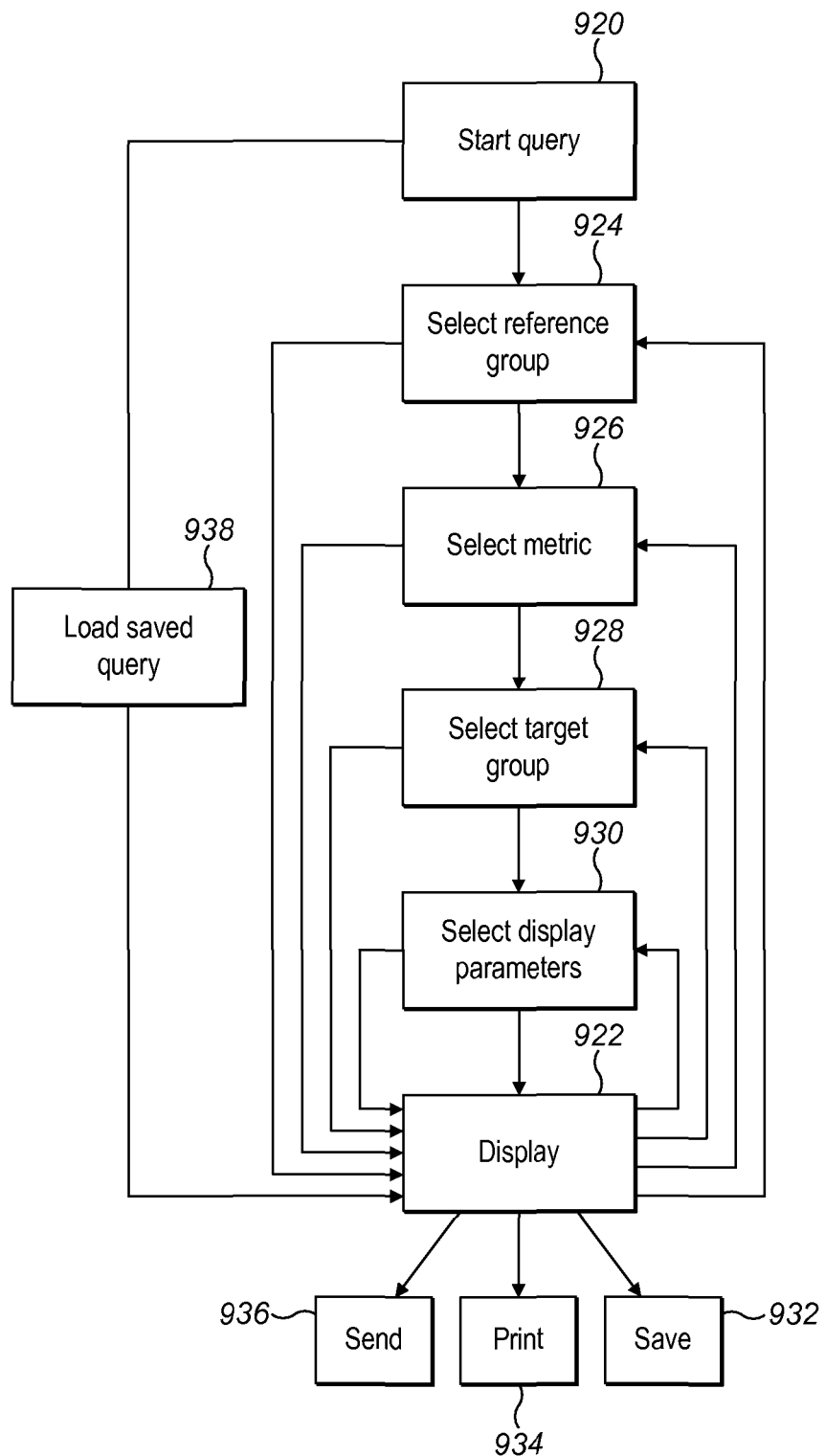
FIG. 4 shows the steps in obtaining a display.

FIG. 4 shows the steps in obtaining a display (by building a comparison). From the start of a new query 920 to obtaining the desired display 922 the following steps may be included in the process:

select reference group 924
select metric 926
select target group 928
select display parameters 930

The sequence of the above-listed steps may vary. Further, some of the steps may be combined, for instance selection of groups may include definition of their display parameters such as colour. Some of the steps may be omitted. Further, it may be possible to revisit the steps once a display is obtained. A desired display may be saved 932, printed 934 or sent 936 or otherwise submitted for further use. If 60 saved queries are available, they may be loaded 938 to obtain the desired display.

Figure 5:
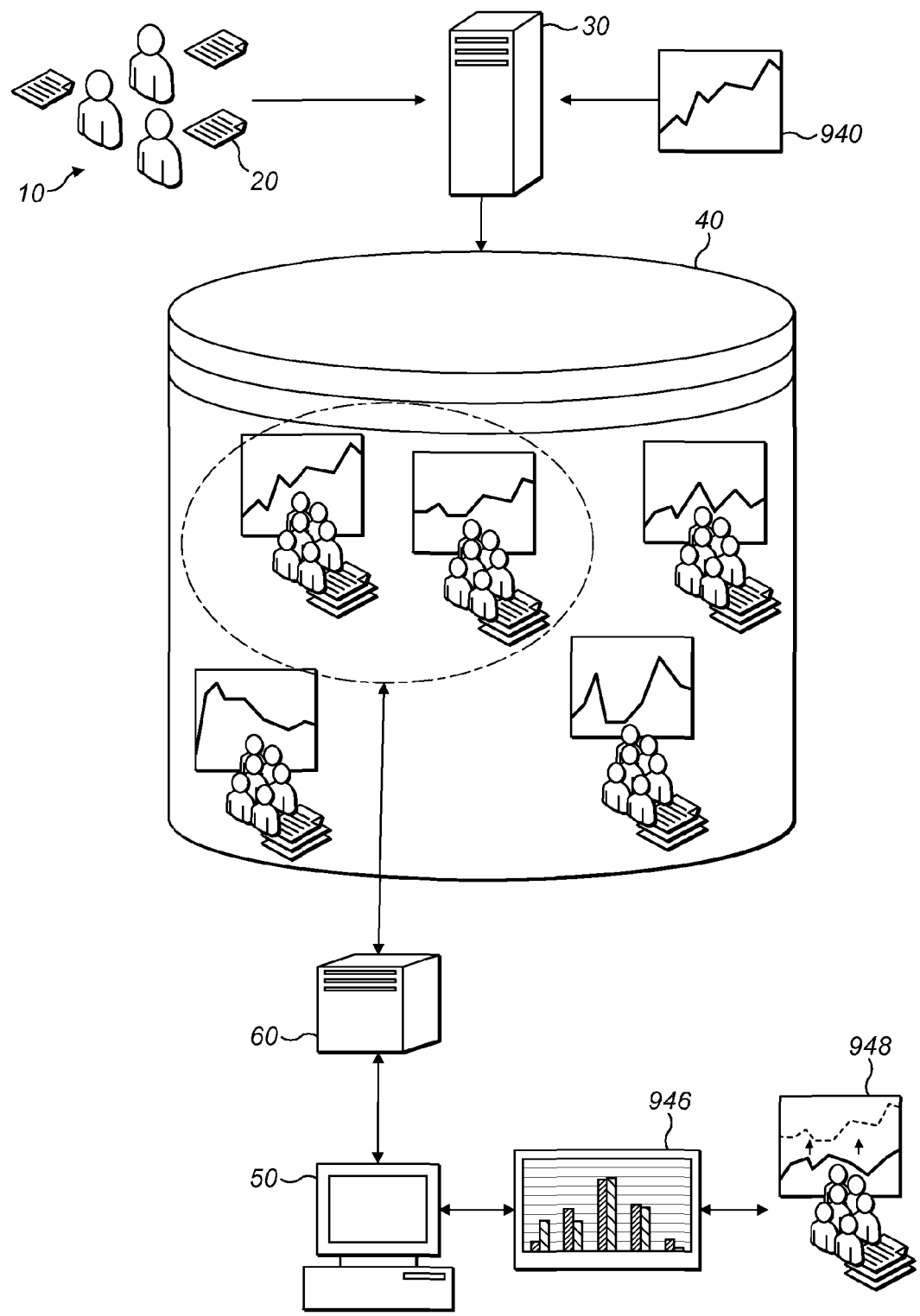
FIG. 5 shows an overview of a process for identifying the characteristics of particularly successful or unsuccessful groups.

FIG. 5 shows an overview of a process for identifying the characteristics of particularly successful or unsuccessful groups. A plurality of individuals 10 participate in assessment testing, the results of which 20 are collected and processed by processor 30 and stored in database 40. Further, data 940 that relates to a particular outcome, for example a business outcome, is collected and processed by processor 30 and stored in database 40 (or in alternative processor and/or database).

Subsequently, a computer 50 may be used to access services (for example provided by server 60) which allow selection 942 of groups with particular outcomes (such as business success) and analysis 946 of characteristics of the group. This may allow optimisation of groups to reflect characteristics that have the potential to be successful 948. Further, the characteristics of individual that would bring a group closer to an 'ideal profile' may be identified.

Figure 6:
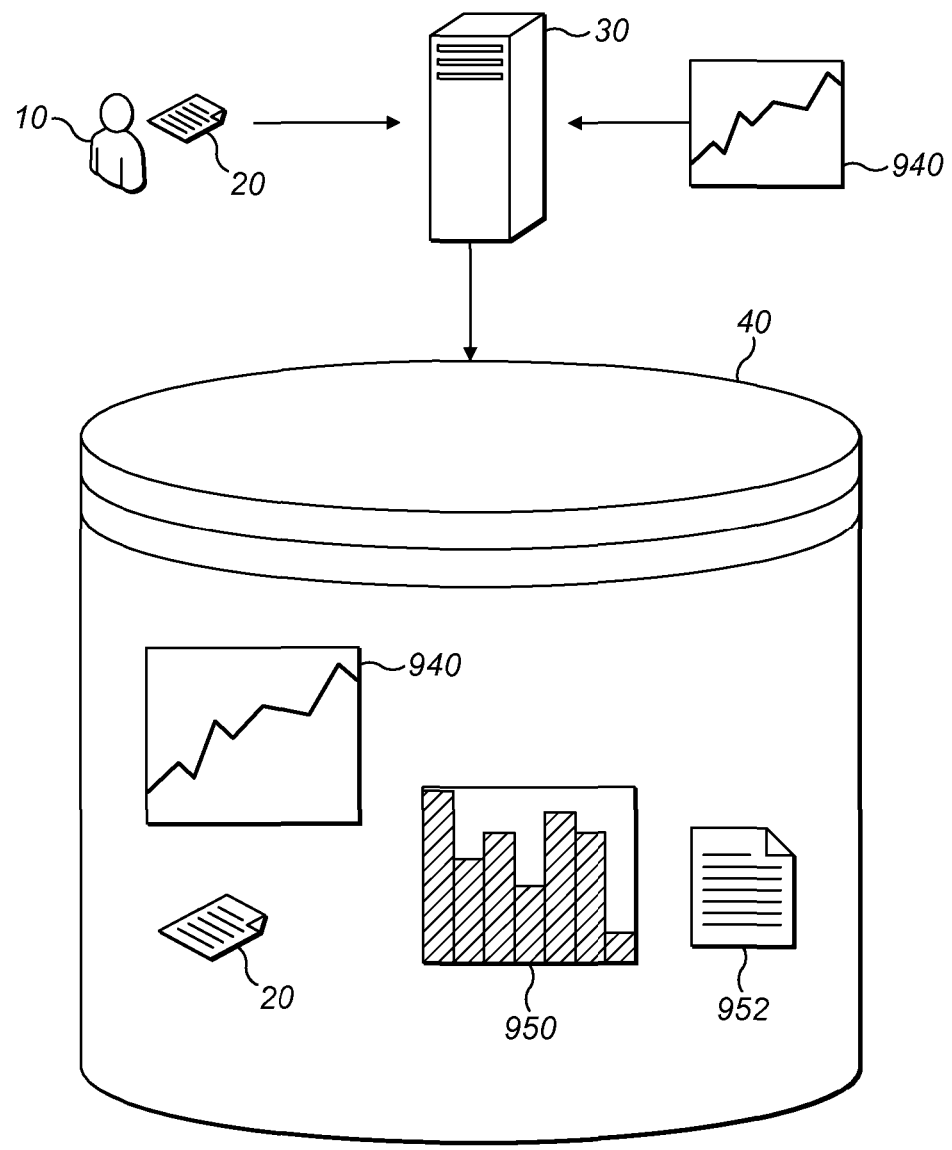
FIG. 6 shows an overview of a process for generating aggregate parameters that are a measure of, for example, personal potential.

FIG. 6 shows an overview of a process for generating aggregate parameters that are a measure of, for example, personal potential. A plurality of individuals 10 participate in assessment testing, the results of which 20 are collected and processed by processor 30 and stored in database 40. Further, data 940 that relates to a particular outcome, for example a business outcome, is collected and processed by processor 30 and stored in database 40 (or in alternative processor and/or database). The processor 30 processes the test results 20 (and potentially the outcomes data 940) to generate a new measure, or a variety of new measures, that are particularly representative of the individual. In particular as test results may include a large number of different measures, it is useful to distil the test results into representatives 950 952 that are available for further analysis, for instance comparison with other individuals and/or groups. For generating the aggregate parameters a subset of test results of an individual may be combined. An average may be calculated over all or some test results, and a difference may be calculated. Further, the standard deviation of the test results of the individual may be used for calculation of an aggregate parameter. Thus by combining personality (and other) metrics, large amounts of information may be combined into a manageable amount of particularly useful data.

A software application that is designed to provide the functionality outlined above is described in the following section.

A user 208 logs on to a platform 210 where the user 208 has already been granted suitable access to the appropriate databases.

Figure 7:
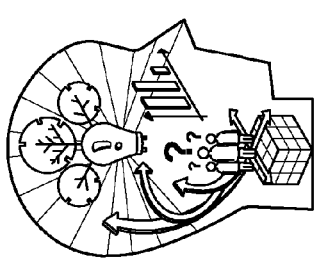
FIG. 7 shows the user welcome screen.

FIG. 7 shows the user welcome screen once the user has logged on and is beginning to use the talent analytics system. As will be described in more detail below, the user is presented with options for selecting benchmarks, for selecting data to be benchmarked and for accessing previously saved results.

The user 208 starts the application and selects the desired query in an entry screen.

Benchmark Selection

Figure 8:
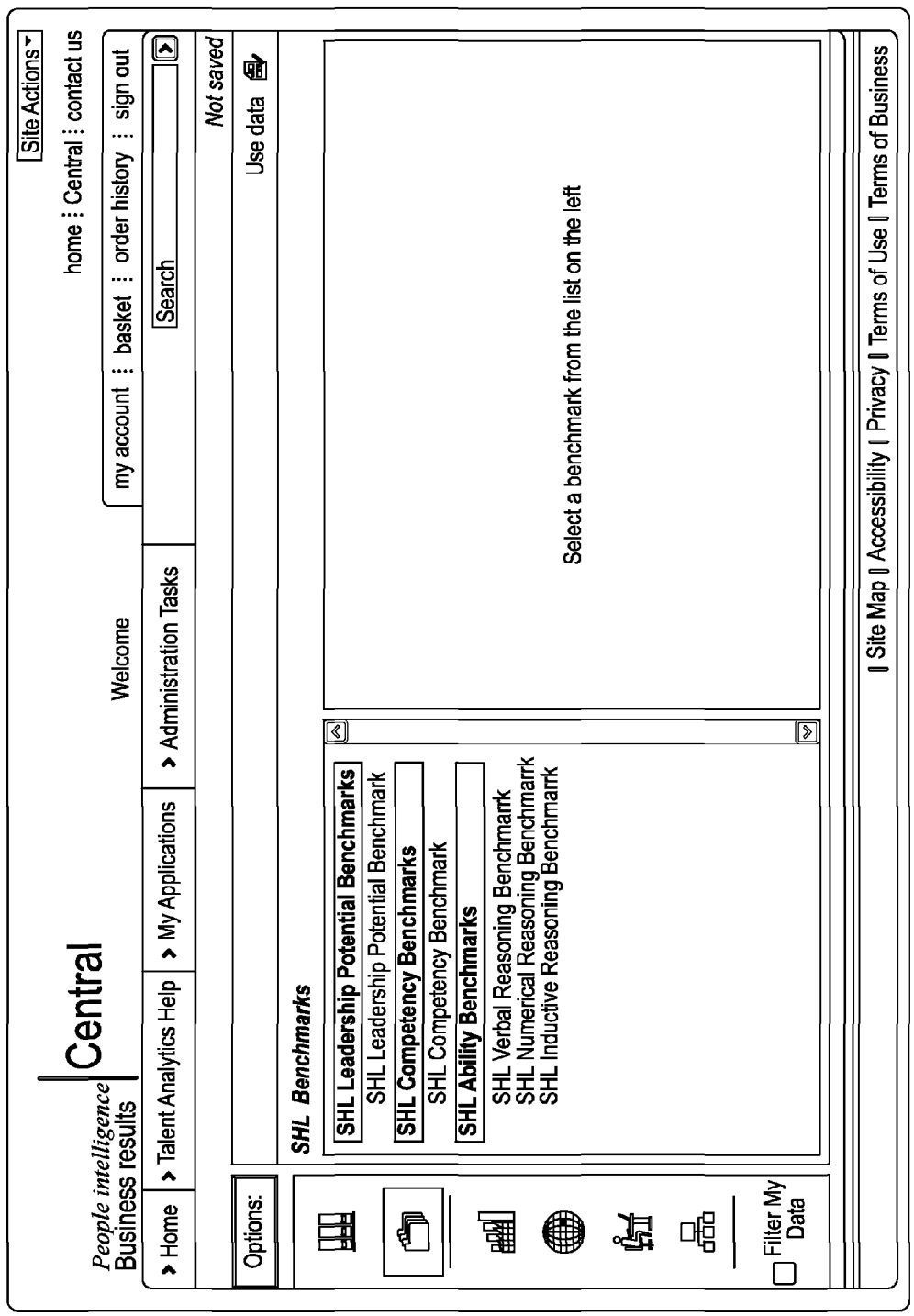
FIG. 8 shows an example of the main benchmark selection interface.

FIG. 8 shows an example of the main benchmark selection interface. Several benchmarks are available for selection by the user, including:

Leadership potential benchmarks

Competency benchmarks

Ability benchmarks (including Verbal, Numerical and Inductive Reasoning benchmarks)

These are discussed in more detail below. In some embodiments, the user benchmark selection for a desired query is guided by means of a directed menu with pre-formulated propositions.

FIG. 9 shows an example of the benchmark information screen displayed when the corresponding benchmark is selected by the user.

Benchmarks such as Leadership Potential and Competency benchmarks, which are based on personality Assessments such as OPQ32, allow for more detailed or nuanced benchmarking, accessible via a "drill down" facility, to permit investigation of benchmarking to specific detailed criteria. Benchmarks such as Verbal, Numeric and Inductive Reasoning benchmarks are based on simpler 'assessments such as "Verify". These assessments provide a coarser assessment, without a "drill down" option.

Figure 10:

FIGS. 10-13 show examples of benchmark categories selectable by the user, arranged by:

Geography (FIG. 10)

Figure 11:

Industry Sector (FIG. 11)

Figure 12:
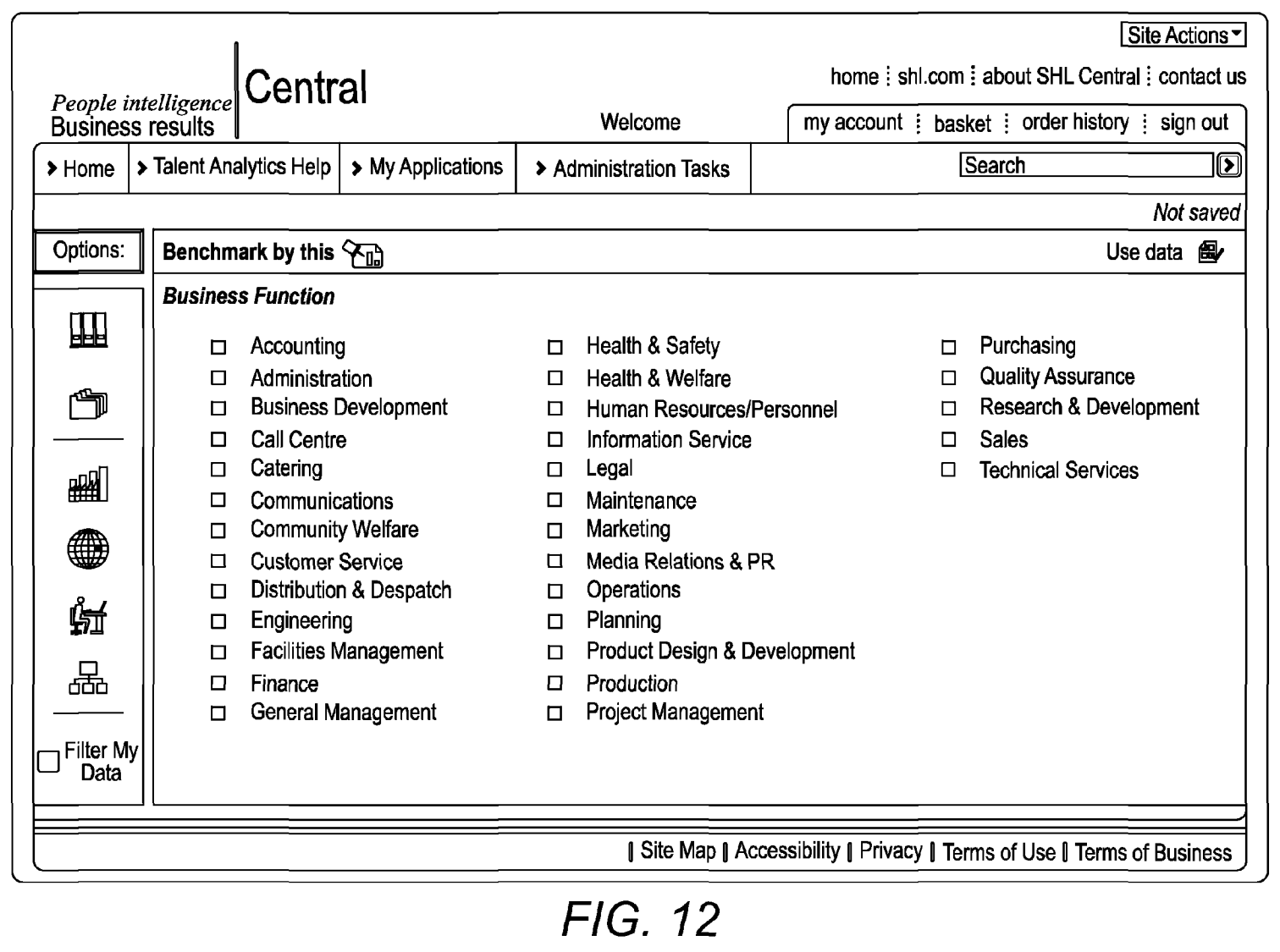

Business Function (FIG. 12)

Figure 13:

Job-level (FIG. 13)

The user may access a benchmark via a query tool as described above. In some examples, the user may be offered a list of benchmarks on a home (or library) screen and/or the user may start by looking at their data/projects and then selecting the index/benchmark they want to compare against.

Data Selection

Figure 14:
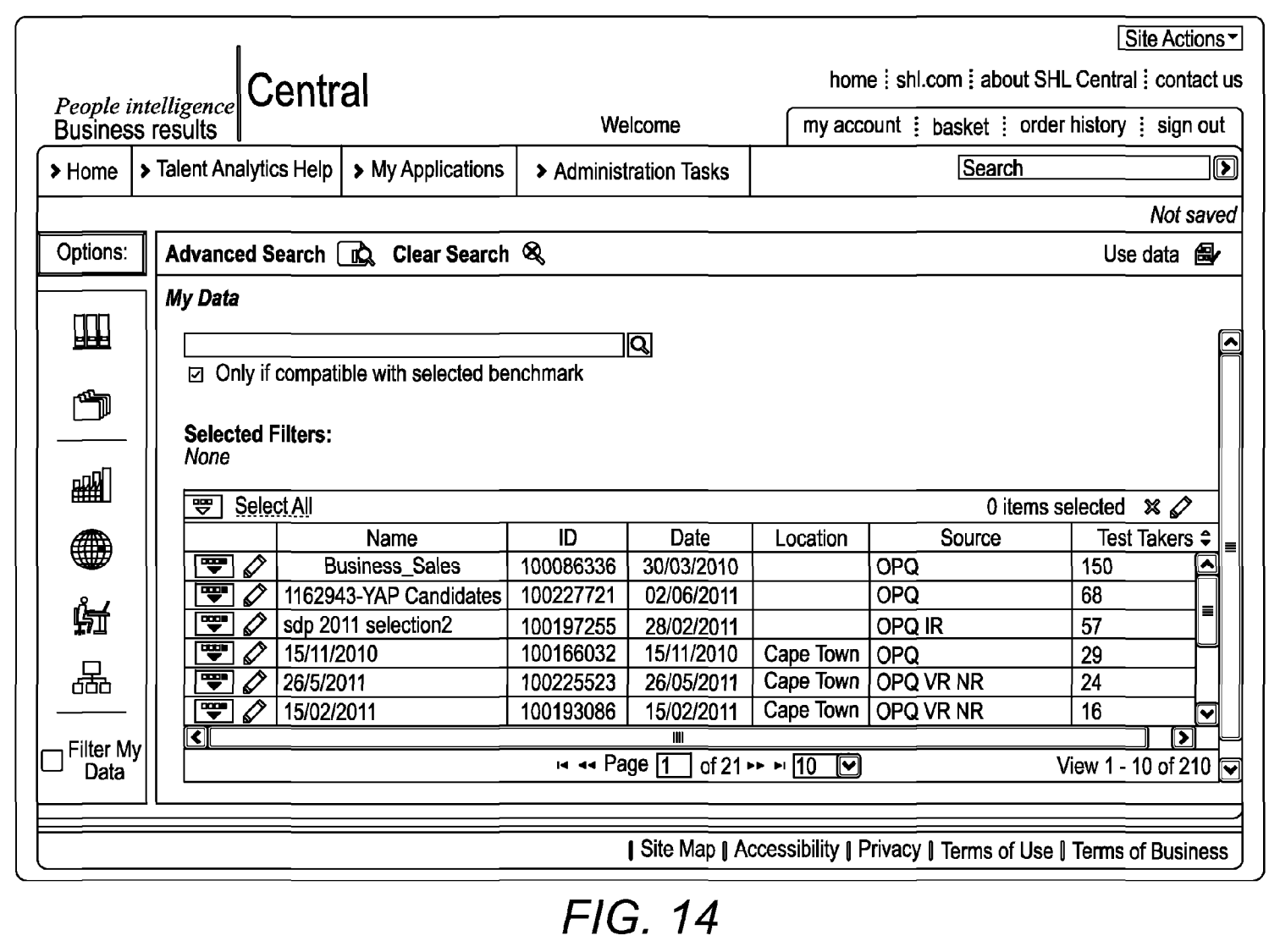

FIGS. 14 and 15 show examples of the data selection interface. User test data may be searched for by name (optionally filtered by compatibility with the selected benchmark) and/or by other parameters such as date, location and test name and/or type; sets of data may be ordered by, for example, name, date, location, source (test name and/or type), number of test takers (candidates). A colour may be assigned to the selected data set; multiple selections may selected and assigned different colours (for identification in subsequent views), and/or variously combined by assigning the same colour.

In the example shown, a business sales group comprising 150 OPQ test takers has been selected and assigned the colour "blue".

Figure 16:
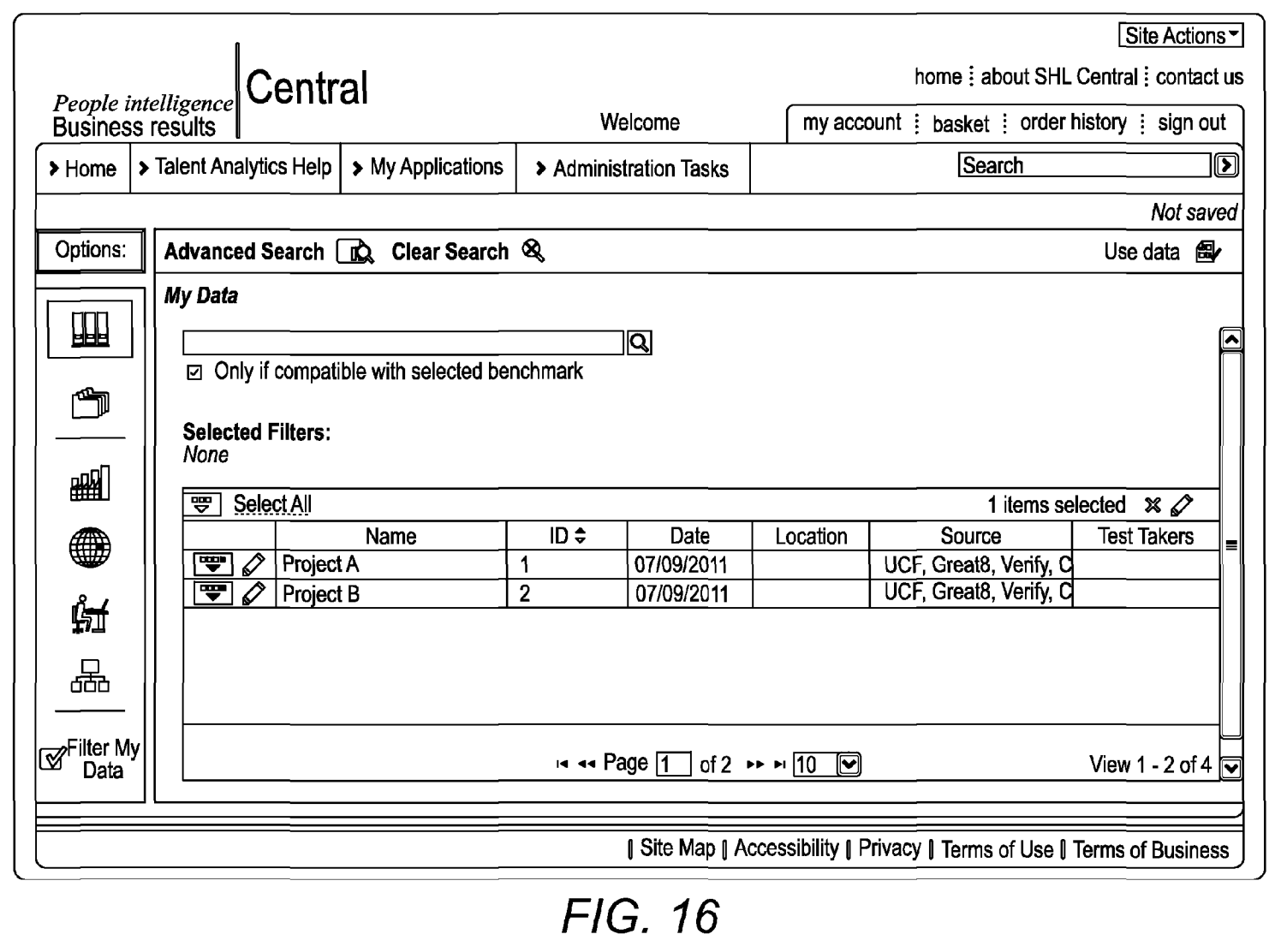
Figure 17:
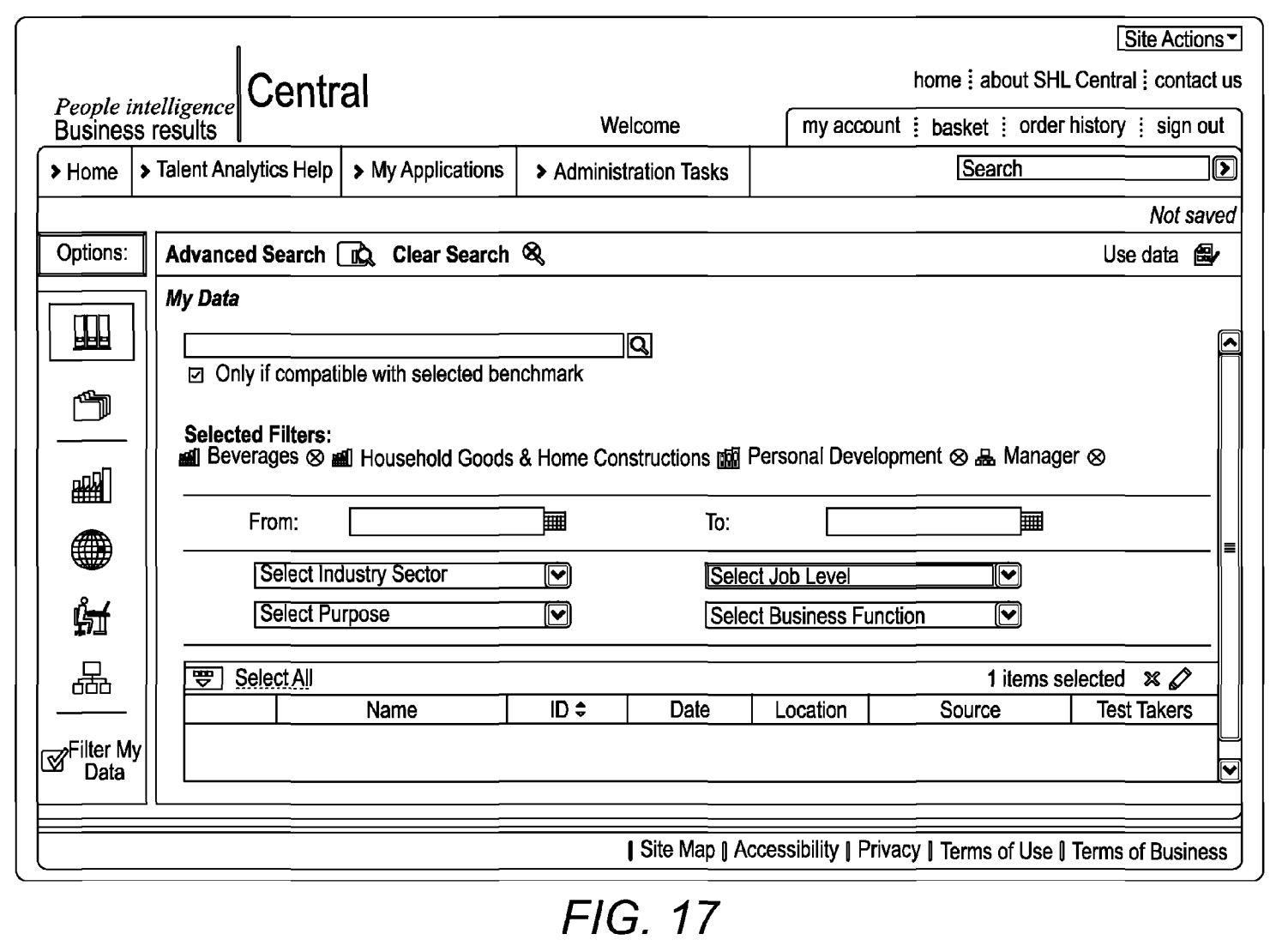

FIGS. 16 and 17 show examples of the data search options interface in "basic" and "advanced" variants, the former providing a simple keyword search, the latter further options.

If a target group is smaller than a pre-defined minimum, for example ten individuals, then display in the list may be suppressed or marked as unavailable.

The list of available test data groups may be filtered depending on the selection of the reference group. For example if "Switzerland" is selected as category under "geography", only Swiss test takers (or only Swiss test data groups) could be included. Display of projects older than a pre-defined age (for instance older than 5 years) may be suppressed. Selection of a project may allow determining display details, for instance colour of the bar in a bar chart. Multiple groups may be combined for display as a single group. A plurality of groups may be selected and displayed as individual groups. Options may be provided to clear a selection, save a selection, update the chart display, navigate to a previous selection, or perform other operations.

The selection of the reference group may include one, two or more selection fields, such as: career lever (applicant, employee, management); benchmark criteria (geography, industry).

Benchmark queries can be grouped into pre-formulated propositions, such as: analysis for 'quality of hire'. In this case a reference group is associated to the proposition, and may be narrowed down further by user selection.

Data Update Function

Figure 18:
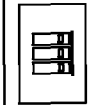
FIG. 18 shows an example of the update data function.

FIG. 18 shows an example of the update data function. The test data may also be 'edited' or 'back-filled' to add further information. This feature (accessed by the user via the 'pencil' icon adjacent a data entry) may be used when the uploaded data is missing (known) information, for example location or category details, which once added to the user data may allow for improved benchmarking.

View Selection

Once the benchmark and user data have been selected, there are several options for selecting how the results are to be displayed.

Figure 19:
FIG. 19 shows the different available options for viewing (benchmarking) the selected data

FIG. 19 shows the different available options for viewing (benchmarking) the selected data:

by Industry Sector by Geography by Business Function by Job-level

FIG. 20 shows a further benchmark selection interface, wherein the selected benchmark or subcategory thereof may be identified more precisely for comparison with the user test taker data.

In the example shown, where the selection is made from a grid arrangement of available benchmarks, the "global" benchmark across all industry sectors has been selected and assigned the colour "green"; benchmark selection may be more granular by selecting subcategories either singly or in combination.

Other means for selecting groups may be presented, for example a cascade or tree structure, which allows for drilling down into the data or filtering for a particular selection.

Subgroups may be combined (e.g. combine data for banks and insurance into a group and display as a single group), and a plurality of groups may be selected for display (e.g. display data for banks and insurance as individual groups). Selection of a project may allow determining display details, for instance colour of the bar in a bar chart. Options may be provided to clear a selection, save a selection, update the chart display, navigate to a previous selection, or perform other operations.

The benchmarking category currently being used is indicated by a pin icon.

By default, the entirety of the selected user test taker data is used in the benchmarking; a "Filter my data" option is optionally provided which allows for a subset of the selected user test taker data to be used, for example matching the selected benchmark subcategory. To ensure statistical meaningfulness, a minimum number of test takers (typically 30) is required for benchmarking to be performed—otherwise the user is informed that insufficient test data exists. This is especially useful in those embodiments which allow multiple filters to be applied.

The user initiates the benchmarking calculation of the selected user test taker data against the selected benchmark by selecting the "Use data" option.

Analytics Output

Once the query has been selected, a display screen is generated. The default display screen may be a bar chart with the variables being measured in the x axis, and the magnitude being measured in the y-axis.

FIGS. 21 to 24 show examples of basic benchmarking output display screens.

Figure 21:
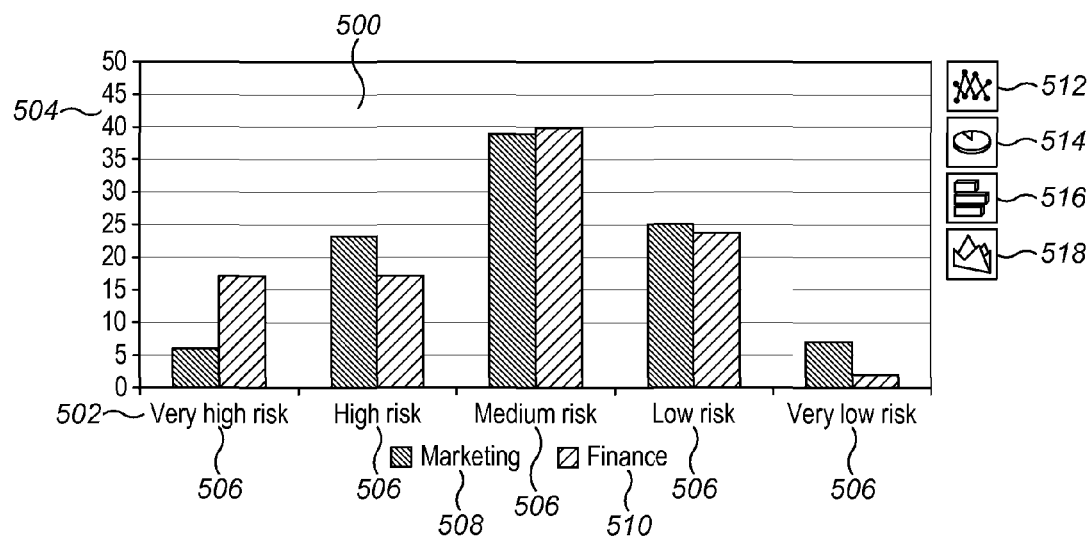
FIGS. 21 to 24 show examples of basic benchmarking output display screens.

FIG. 21 shows a basic benchmarking output display screen, comprising histogram 500 (or bar chart) where the variable being measured is risk 502, and the magnitude is the proportion of the group (in percent) 504 that falls within one of the risk categories 506 (or bins). Two adjacent bars indicate different industry sectors (here: marketing 508 and finance 510). Other types of charts may be selected and displayed, including line charts 512, pie charts 514, horizontal bar charts 516, and area charts 518.

If one of the selected reference groups is smaller than a pre-defined minimum, for example ten individuals, then display may be suppressed. Small groups may not be highly representative and may not be suitable for use as a reference group.

Figure 22:
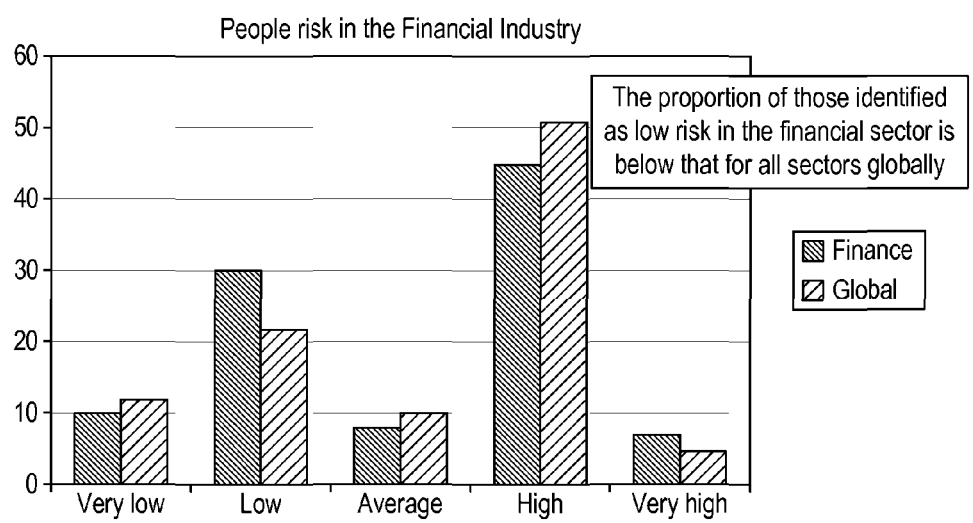

FIG. 22 shows a display screen with a pop-up commentary 600 that can be displayed when the user moves an indicator or cursor over areas of the chart. This hover-over narrative provides information for interpreting the chart. The hover-over may also provide information regarding how a distribution differs from an 'ideal' profile as determined from the correlation between performance and a metric. For example, a narrative may indicate "these individuals may provide a 10% increase in sales".

Figure 23:
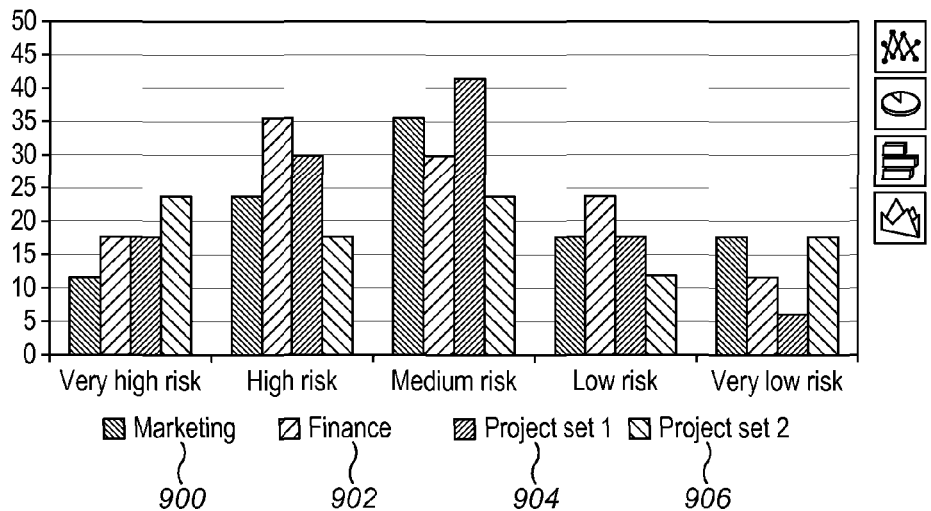

FIG. 23 shows a display with reference groups and target groups. The reference groups are (in this example) marketing 900 and finance 902, as already described in an earlier example; here, additionally, two project groups 904 906 are also displayed. In this example, the display shows that the risk distribution in the group 'project set 2' 906 is different to both of the references 900 902, whereas the group 'project set 1' 904 is roughly comparable to the marketing reference group 900.

Figure 24:
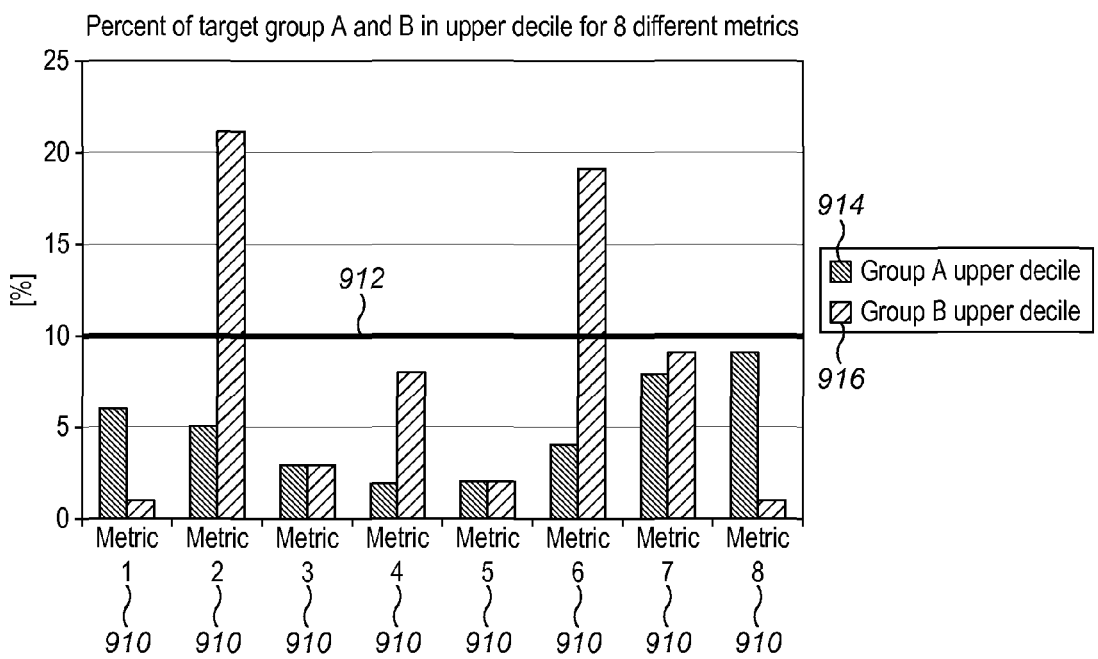

FIG. 24 shows an example of a display for a plurality of metrics 910. In this example, a comparison against a corresponding reference group is undertaken, and a value for the percentage of two target groups A and B that is in the top decile of the reference group is calculated. This shows that group B 916 achieves particularly high test results in metrics 2 and 8, and in metrics 1 and 8 group B achieves fewer high test results than the reference group 912, and than group A 914. Here group A and B share a common reference group, but for a different analysis group A and B may each have a respective reference group. An option for selecting this type of display may be included in the application, along with suitable selections of metrics, target groups and reference groups.

FIGS. 25 to 28 show examples of more sophisticated benchmarking output display screens.

Figure 25:
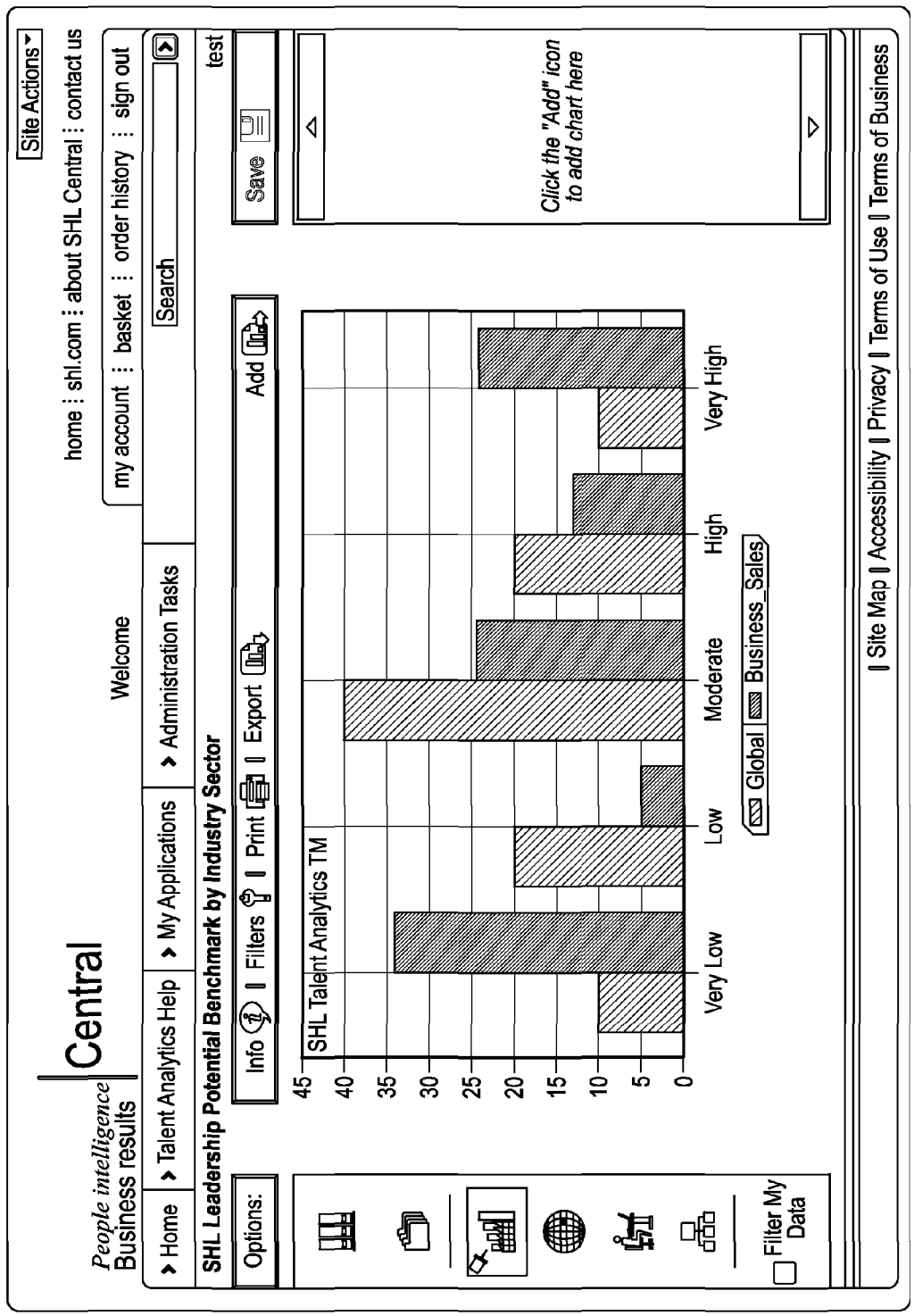
FIGS. 25 to 28 show examples of more sophisticated benchmarking output display screens

FIG. 25 shows an example of a benchmarking output screen, showing a chart or graph generated by the benchmarking calculation.

In the example shown, the selected data set (a business sales group) has been benchmarked against Leadership Potential by industry sector. The result is displayed as a comparative histogram, with scoring for the selected data set shown alongside that for the benchmark group for a range of "potential" scores or values from "very low"—via "low", "moderate" and "high"—to "very high".

The selected data set exhibits a distribution representative of the results determined from test scores deemed to be relevant to leadership potential; in the present case, the benchmark group is "global" and therefore exhibits an expected normal distribution of scores.

The user can access the benchmark information screens via a "info" option. Further options are provided to
  display the current filters applied
  print the results chart (with or without benchmark information)
  export the results chart in various formats
  save the results chart (optionally overwriting an existing saved chart)
  add the results chart to a "slide stack" (displayed to one side of the chart)

Figure 26:
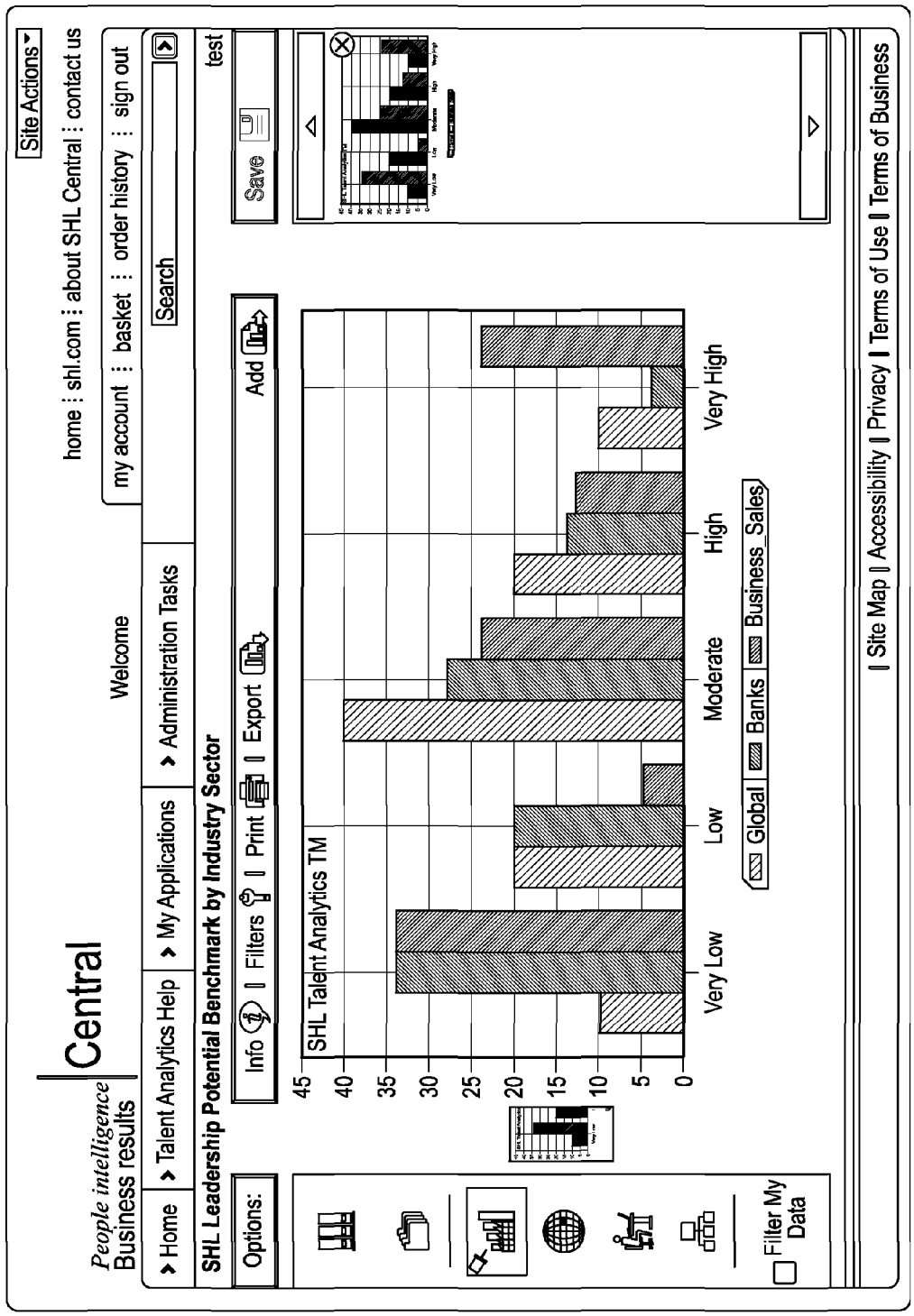

FIG. 26 shows a further example of a benchmarking output screen.

In the example shown, a further benchmarking comparison category "banks" has been added (assigned the colour "orange" for the corresponding histogram bars) and the previous chart has been added to the slide deck.

The slide deck allows for multiple charts to be saved for later recall—initially in a preview mode, with the user option to revert to the chart in question becoming the active chart.

Also shown is the "carousel" feature, which effectively provides an "infinite undo" facility (including for charts which have not been saved by the user). A previous chart "A" is shown in the background and displayed to one side and partially obscured by the present or active chart "B". Chart A, can be selected by the user and brought to the fore of the display—thereby becoming the active chart and in turn relegating chart B to the background. As the user continues to work and generates multiple charts, a history or "carousel" of charts remains accessible to the user by selection of the chart displayed either side of the active chart. By default, the carousel maintains the order charts according to their time creation; other orderings and/or filters may be available in alternative embodiments.

Figure 27:
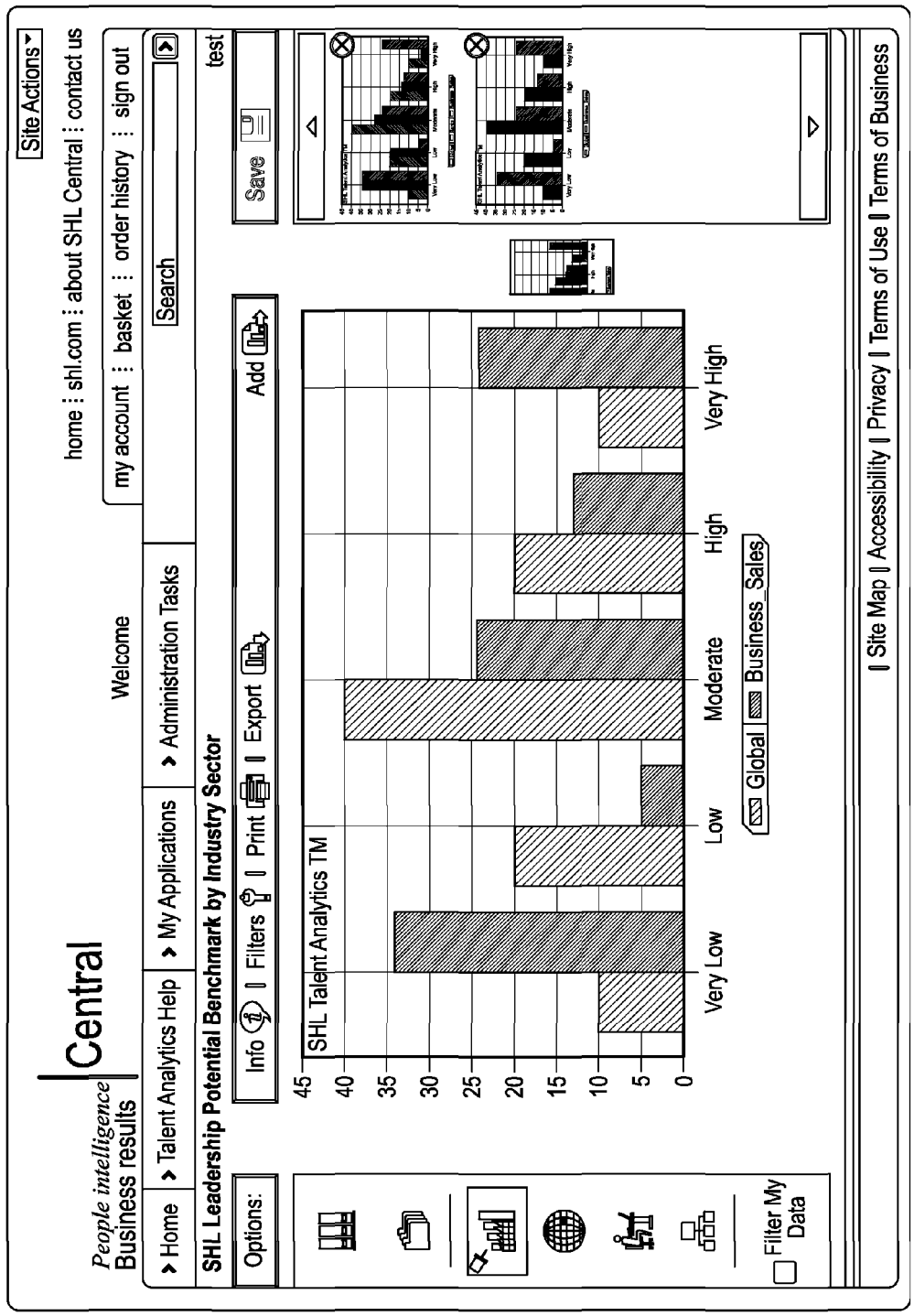

FIG. 27 shows the carousel feature in use, with the previous chart brought to the fore and made active, the previous chart relegated to the background.

Figure 28:
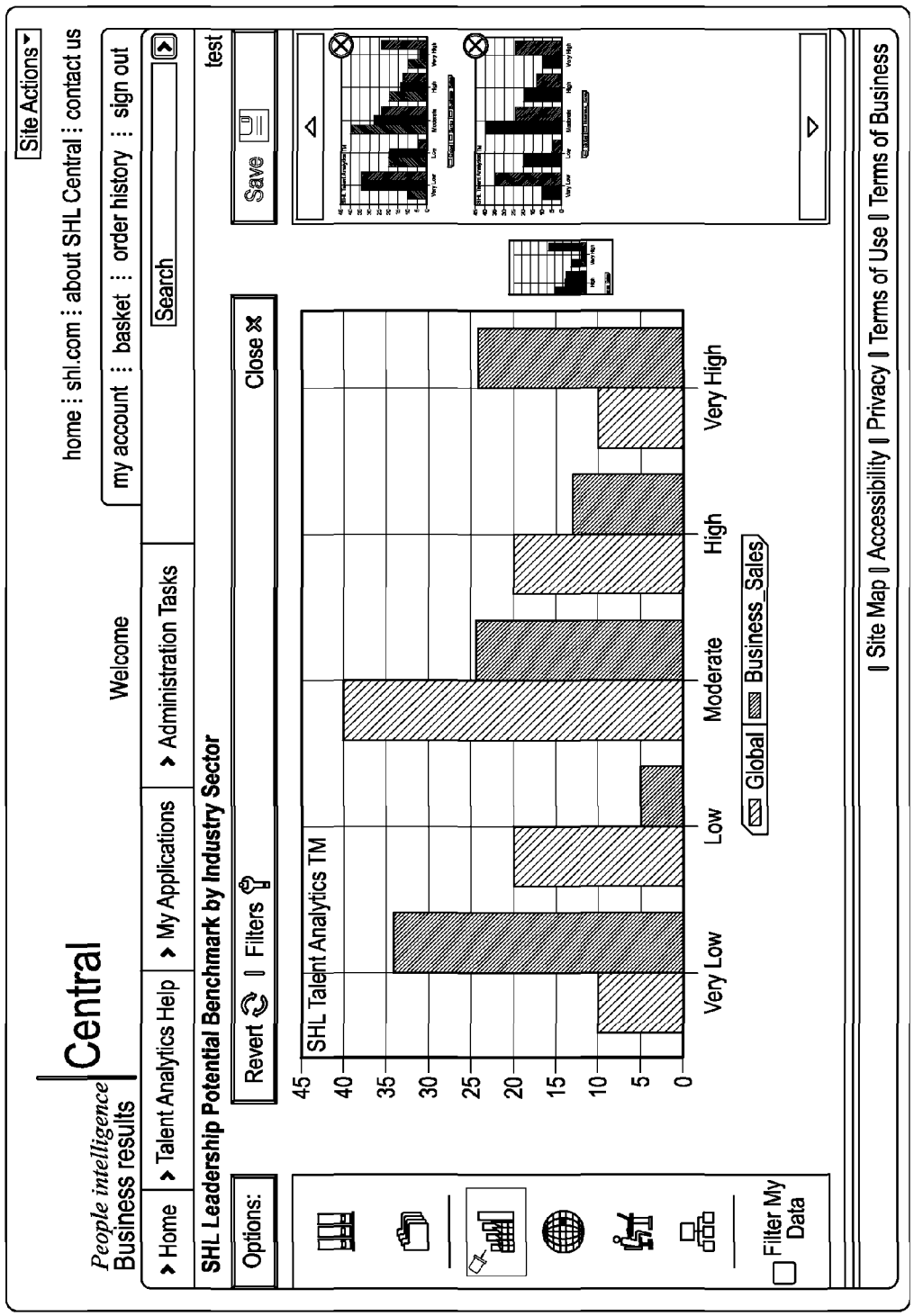

FIG. 28 shows the slide deck feature in use, with a selected saved chart being previewed, with option to revert and make the chart being previewed the active chart. The user also has the option of displaying the filter(s) in use.

Figure 29:
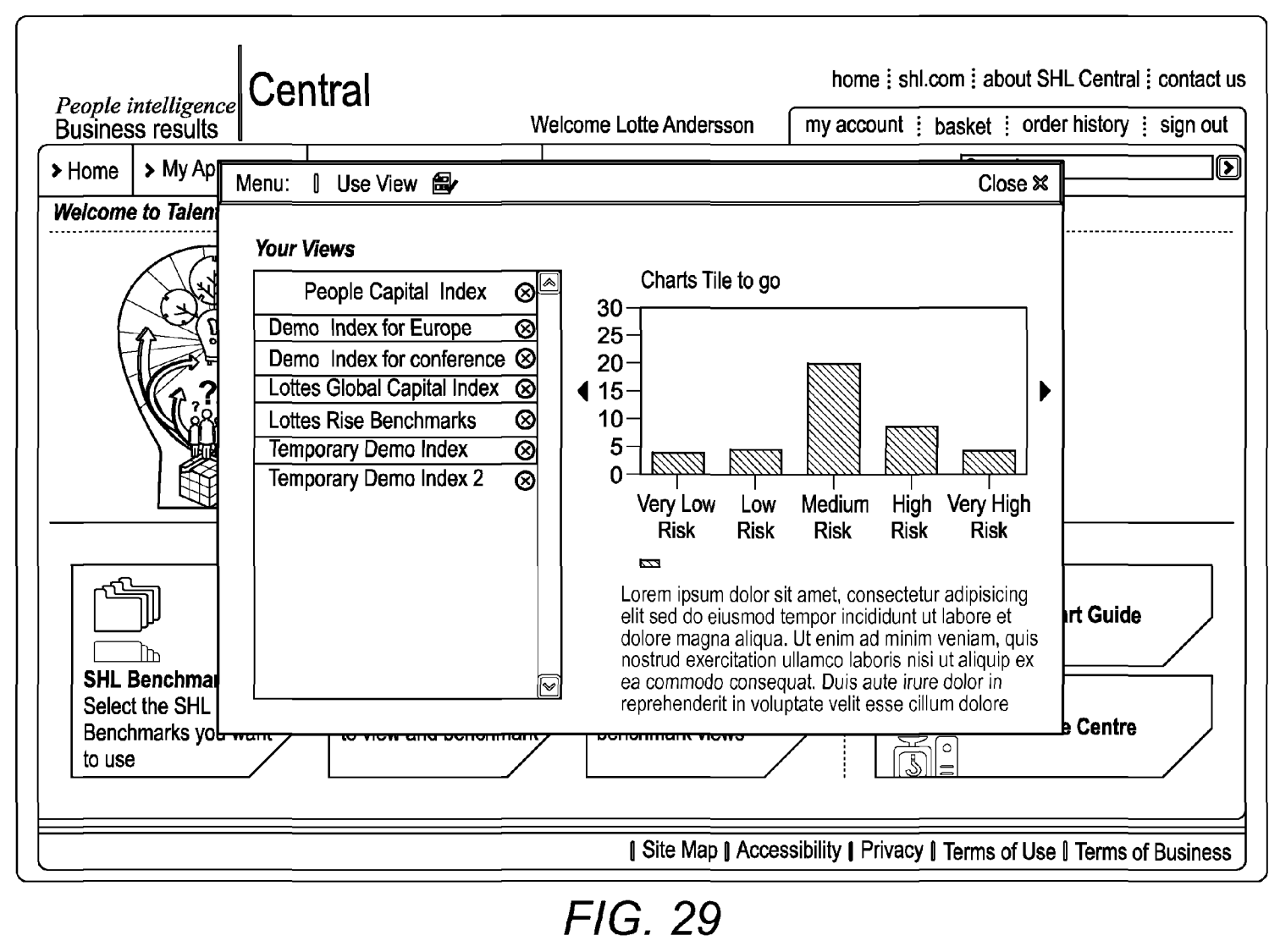

FIG. 29 shows an example of the stored views interface, which allows for previous benchmarking results to be recalled by the user.

"Drill-Down" Facility

Figure 30:
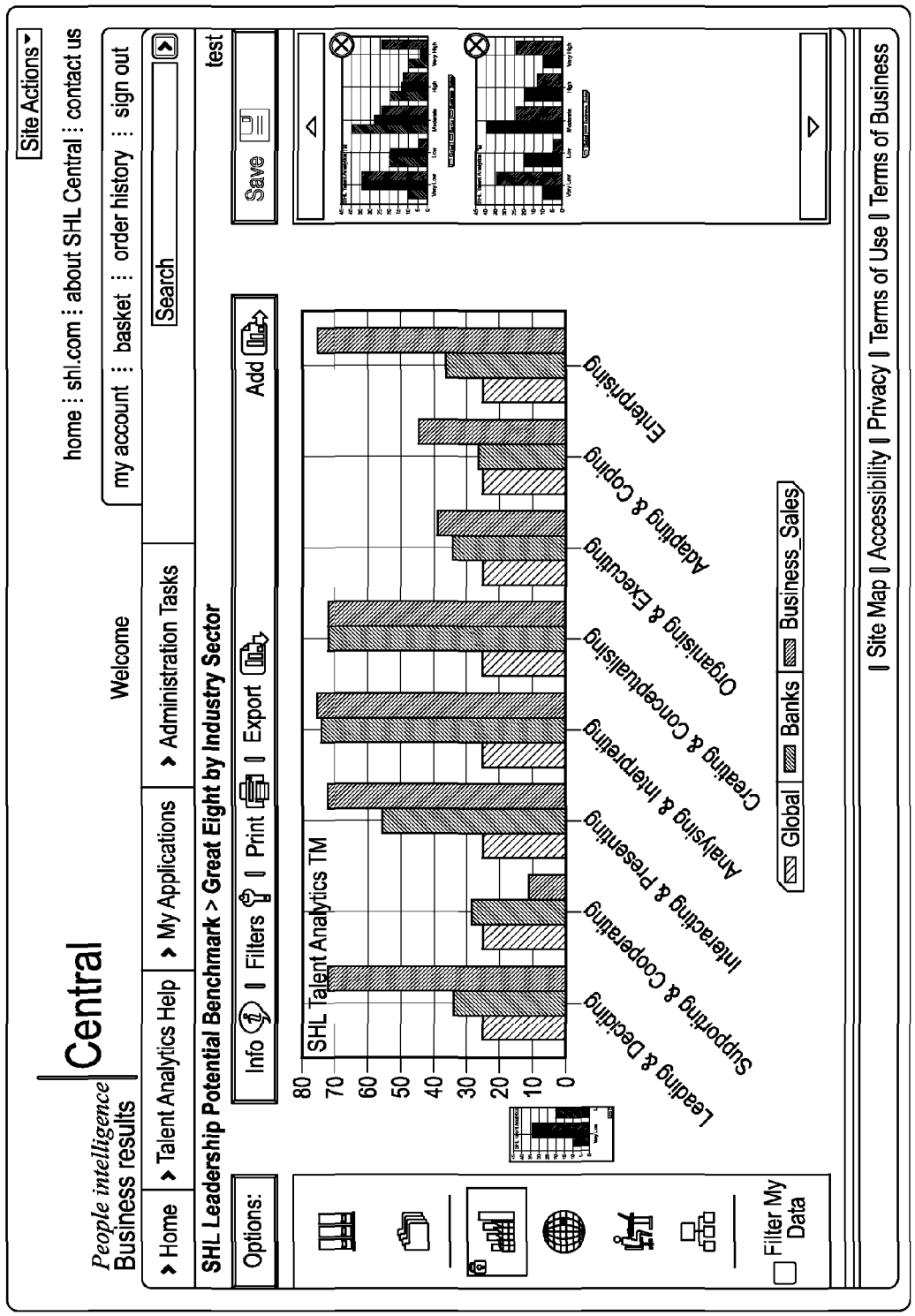
FIG. 30 shows the "drill-down" facility in more detail.

FIG. 30 shows the "drill-down" facility in more detail. This is accessed by the user selecting any of the "potential" values ranges ("very low", "low", "moderate", "high" or "very high") of the benchmarking results chart, and results in display of a further chart showing the breakdown of the (aggregate) potential value scores into their constituent benchmark scores (termed "Great Eight" characteristics).

For the example shown, the scores in a "very high" leadership potential (by industry sector) range are shown decomposed into the separate scores for those (eight) tested characteristics used to determine the aggregate scores, namely:
  leading and deciding
  supporting and co-operating
  interacting and presenting analysing and interpreting
creating and conceptualising
organising and executing
adapting and coping
enterprising This allows the user to relate a benchmarked score more directly to specific characteristics of the test takers.

Figure 31:
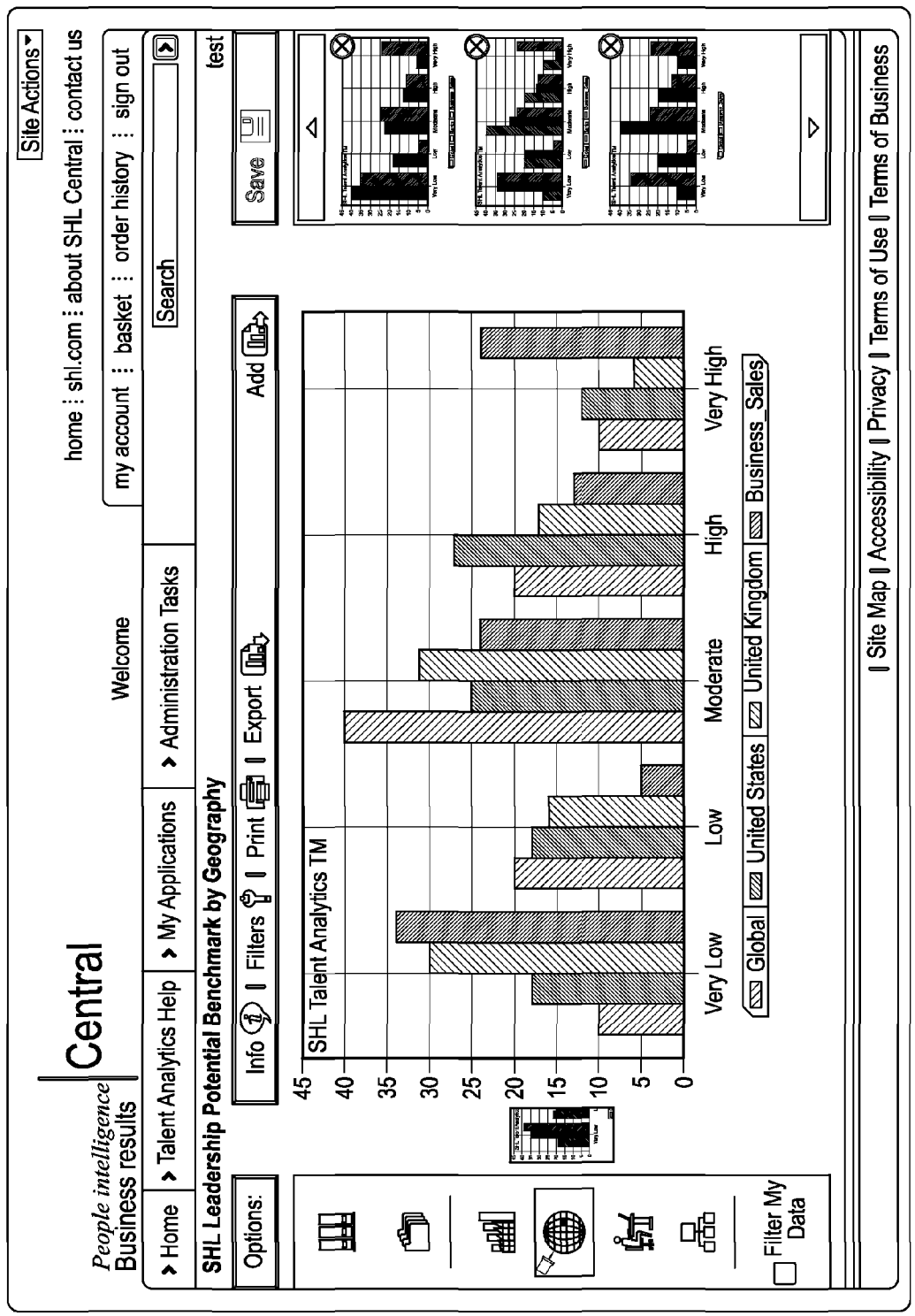
FIG. 31 shows a further example of a benchmarking output screen.

The display of a padlock icon indicated the drill-down facility is in use and that filtering and/or editing is (temporarily) disabled. Similar drill-down charts are provided for each of the score ranges, FIG. 31 shows a further example of a benchmarking output screen. In the example shown, the test data is benchmarked for leadership potential by geography, with comparisons with global, UK and US data. The slide deck is shown populated with several saved previous charts, and the carousel shows the user has the option to navigate to an earlier chart.

Figure 32:
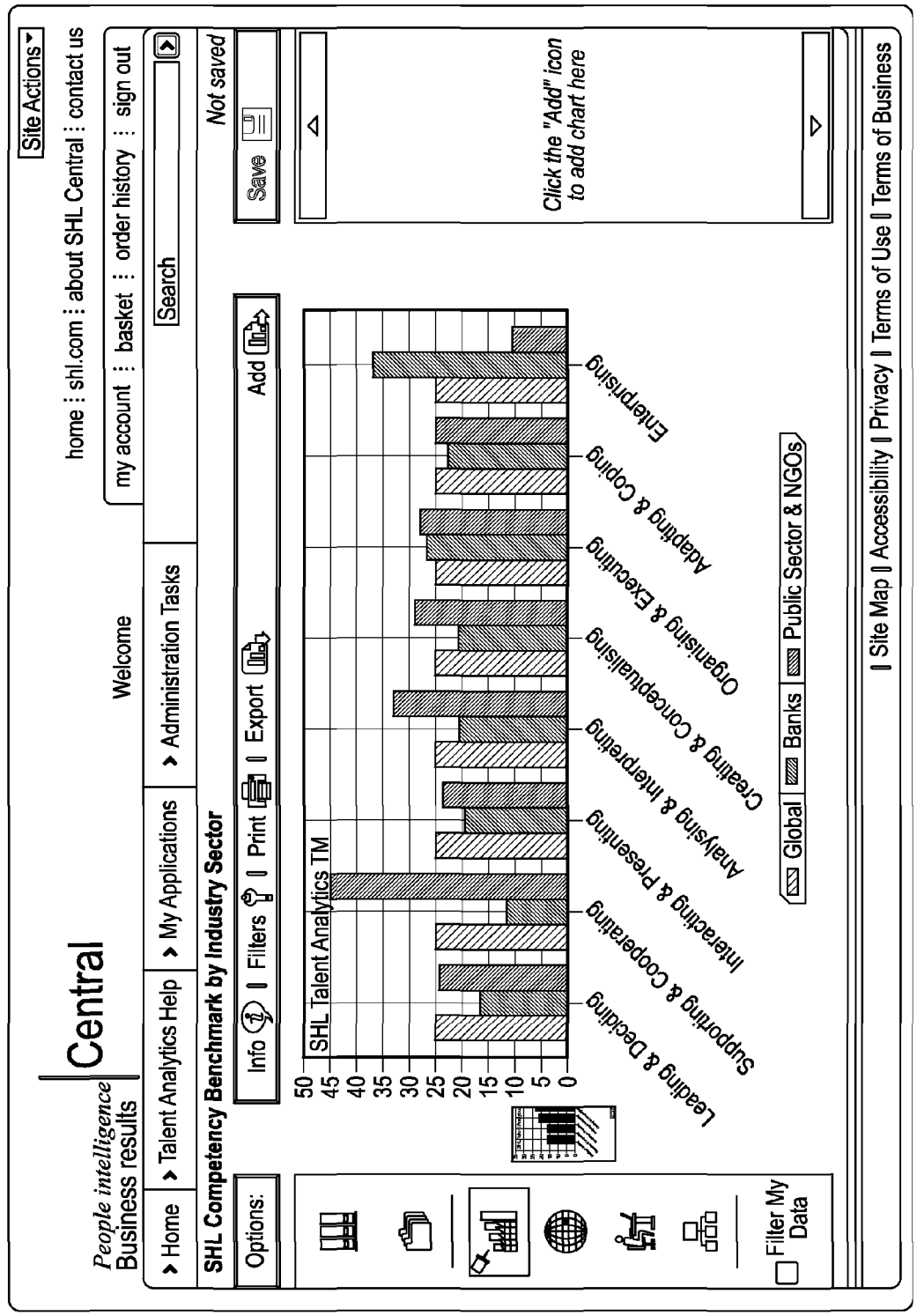
FIG. 32 shows a further example of a benchmarking output screen.

FIG. 32 shows a further example of a benchmarking output screen. In the example shown, the test data is benchmarked for competency by industry sector, with comparisons with global, banking and Public Sector & NGO data.

Figure 33:
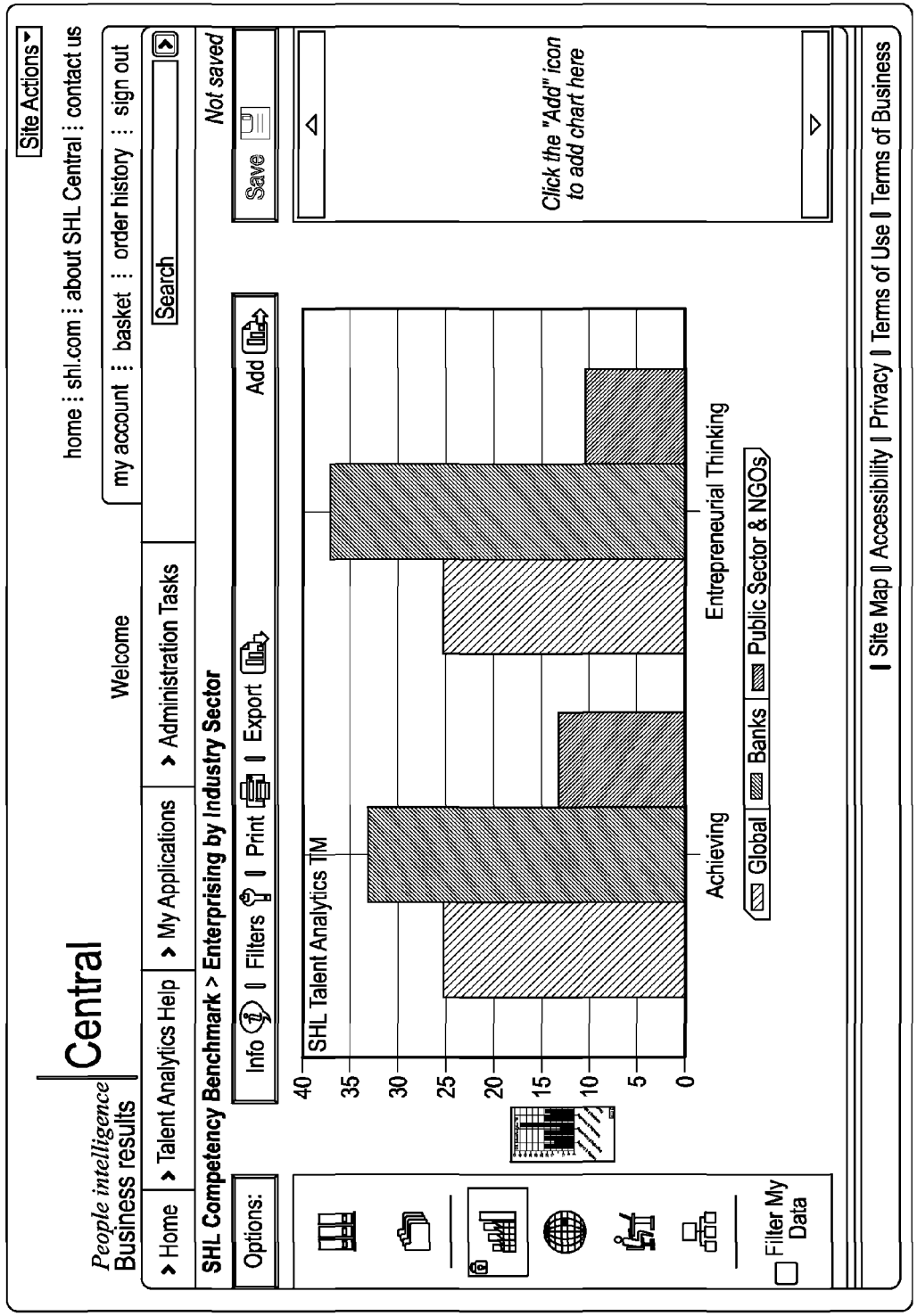
FIG. 33 shows the corresponding drill-down.

FIG. 33 shows the corresponding drill-down into the detail of the scoring for the 'Enterprising' characteristic—namely the "Achieving" and "Entrepreneurial Thinking" aspects.

Figure 34:
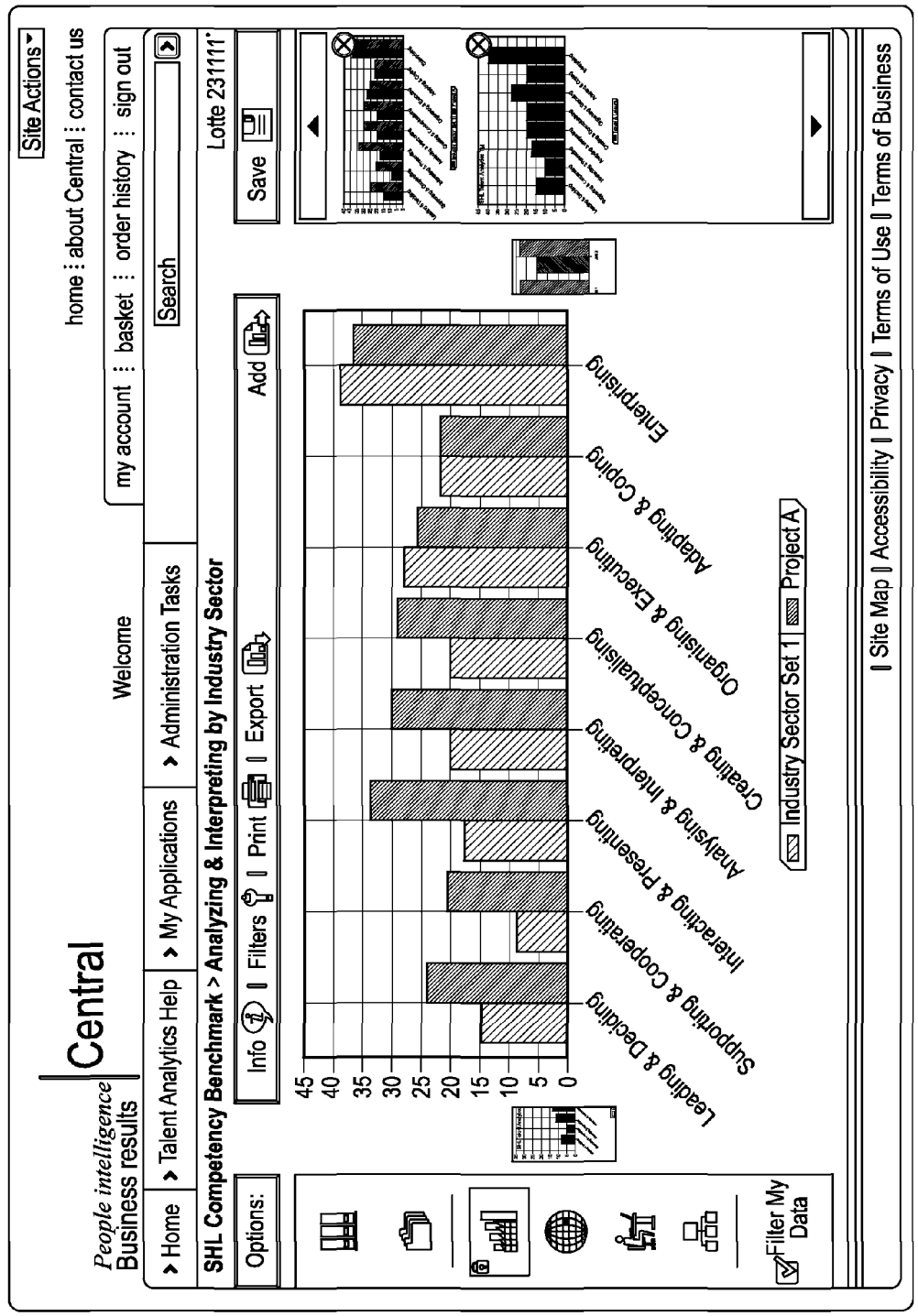
Figure 35:
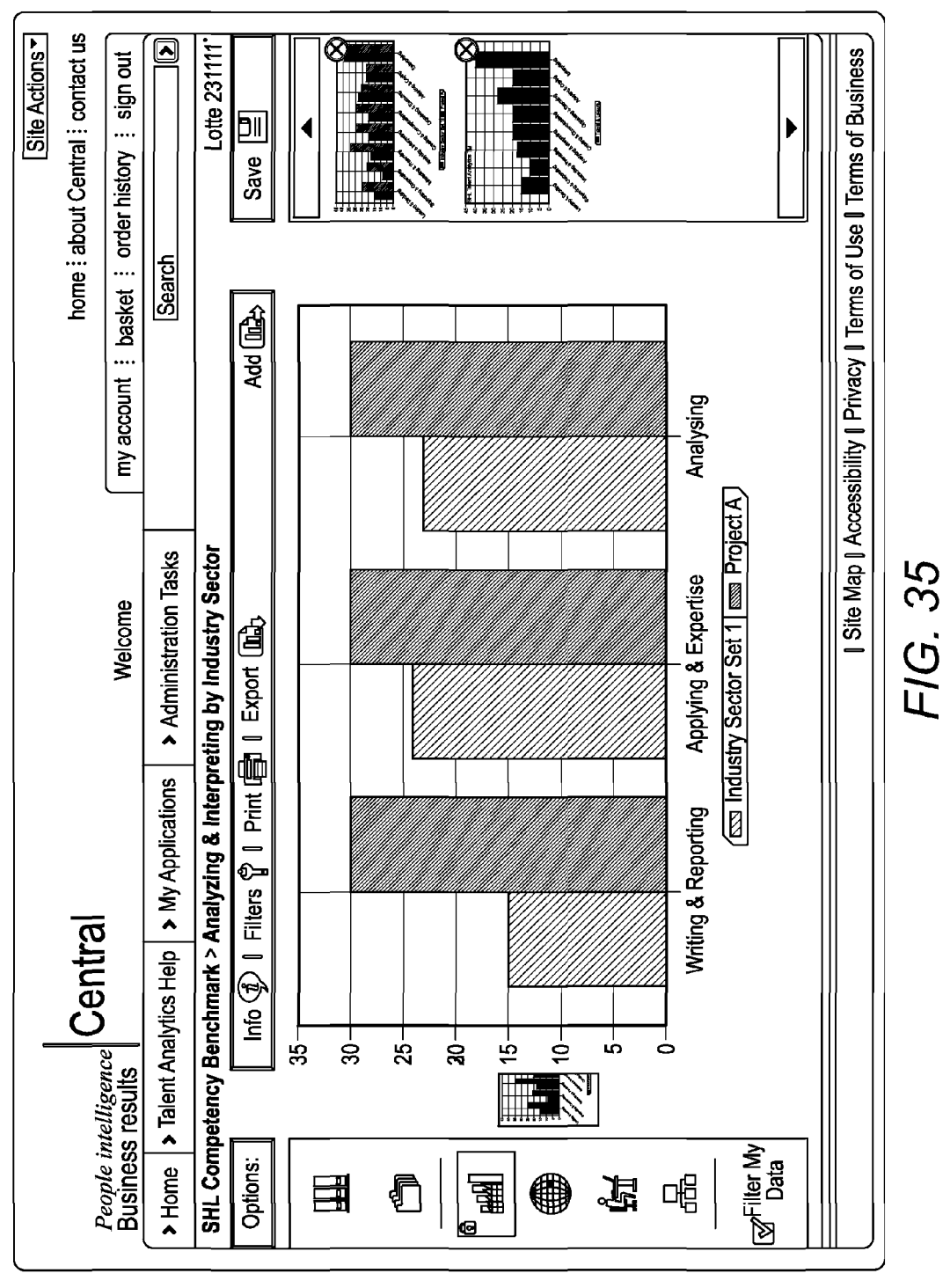

FIGS. 34 and 35 show further examples of benchmarking output screens.

Figure 36:
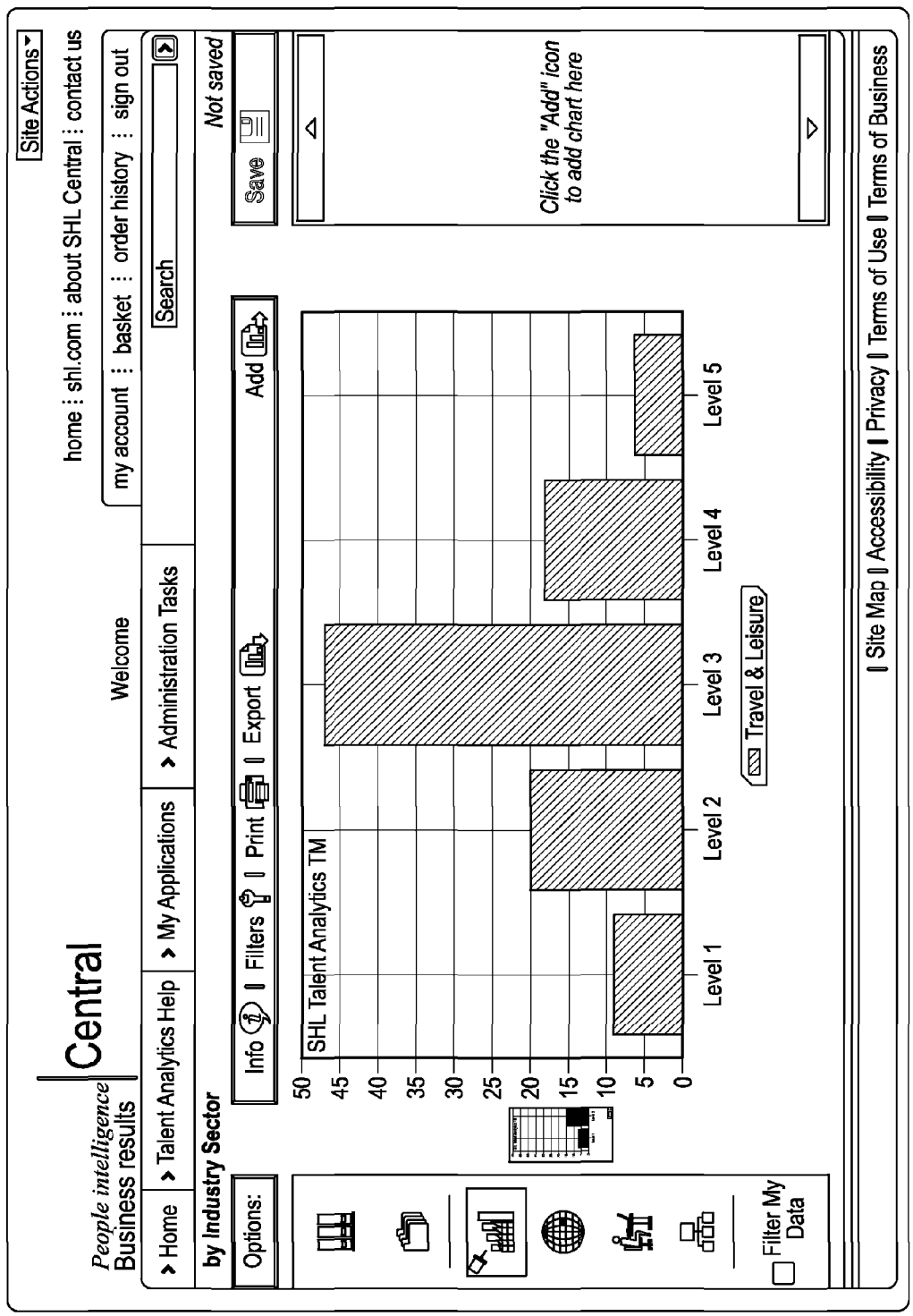
FIG. 36 shows an example of a Numerical reasoning benchmark.

FIG. 36 shows an example of a Numerical reasoning benchmark. As explained above, this is based on much coarser test data and no drill-down feature is available.

The display may include information summarising the active settings, such as the selected reference group(s) and target group(s) along with their display settings. Further options may be provided to save display views, and/or print display views. The application may also provide graphic charts without numeric values. The application may provide options to save, retrieve, copy, edit, or delete queries.

Further disclosure of the invention is provided in the following sections.

BACKGROUND

With online assessments it is possible to collect a vast amount of assessment and bio data from individuals assessed in the workspace. This data is mainly of value for validation of products and creation of comparison groups.

The following type of statement articulate the comparisons of data that can be made in one sentence (with interchangeable words at key points) and the answers to the "so what" question that this comparison would raise. All words in bold are interchangeable for several other options—this example is for talent acquisition:

What we can do—We can benchmark the strengths and motives of the people who decline your offer against top performers who accept sales positions in other UK pharmaceuticals companies.

"So what?"—This enables you to identify if you have issues with your Employee Value Proposition and put corrective actions in place if necessary.

So, use of this data would enable seeing if the candidates with the best potential are lost at offer stage.

Over the last few years it has become increasingly popular and in many cases necessary for organisations to benchmark and compare their current staff and job applicants, both over the years and between organisations and industries.

Overall Goal

The goal is to create a single source web application that combines assessment data from assessment platforms. It should also provide an easy to use, modern looking interface where authorised users can access the benchmark data as well as relevant data from their organisation's assessment projects on the same platform, and combine the information to allow for detailed analytics and graphical viewing.

Go to Market

The access to this type of benchmarking tool can be both a real value to clients and as a key differentiator. It helps in the following key areas:

1. Analytics of the data may create news-worthy stories around indexes, industry findings and trends
2. Analytics can tease clients to ask the right questions in their organisations (e.g. are my candidates of a lower calibre than in my competition?), it can also lead on to talent audit service and other exercises
3. Improved business outcome studies and "over time" analytics may add even more value.
4. The benchmarking tool may also provide a unique capability linked to products and services clients have already purchased.

Clients may be given access to the benchmarking tool as part of a product/platform license or subscription fee deal. Additional charge may apply within the subscription for data access. A charge may be added for transactional clients who would like access (annually, per project or one-off), via subscriptions charges or a pay as you go cost.

Use Cases

Depending on the type of organisation, or who in an organisation is interested in the data, there are different needs as to what data they are looking for and how they would use it. Below are some example outlined as use cases:

A. A graduate recruitment manager in a bank wants to see how the bank's candidates this year compare with last year or with the rest of the industry and competition when it comes to scores on a numeric reasoning test.

The user logs on to a platform where access to the application has already been granted The user opens the application and selects the desired query (e.g. industry comparison)

The user filters the data on their industry (e.g. financial services), country (e.g. UK) and the type of role (e.g. graduate)

The user can preview the benchmark at any time

The user then selects the project(s) in an on-demand database where the data they want to benchmark against resides (e.g. Grad 2010 and Grad 2011)

If these projects lack any of the essential firmographics data (e.g. industry, type of project or job level) the user is asked to enter this data to improve the benchmark exercise. This data may then be stored in a benchmark database going forward.

The user can view their data in the application, both compared to the same data of last year (2 projects), and compared to the general benchmarking data from the benchmark database (e.g. UK financial services organisations who use the numeric reasoning test).
- The user can view average numeric percentile scores, high/low scores and see their own data compared with the benchmark in a graphical format on the screen
- The user can change the view of data from e.g. monthly values to different score types
- The user can filter further to view assessment results from only a sub set of test takers, e.g. male applicants or people under 20 years of age.

B. A VP of HR want to look at trends on competency score values across management teams globally and see how their senior managers compare against the management team in other organisations of a similar size and area of business.
- The user logs on to a platform where access to the application has already been granted
- The user opens the application and selects the desired query (e.g. competency comparison)
- The user filters the data on job level/type of role (e.g. senior managers), country (e.g. global/all) and period (e.g. 2010)
  - The user can preview the benchmark at any time to make sure it displays what they are expecting and to look at general trends
- The user then selects the project in an on-demand database where the data they want to benchmark against resides; in this example the user undertook a specific project to assess their management team last October (e.g. management October 2010)
  - In this example all essential firmographics data were entered when the project was created.
- The user can now view their data in the application compared to the general benchmarking data from the benchmark database (global organisations that used the same test for competency assessments last year).
  - The user can view average competency scores on a 5 or 10 point scale, high/low scores and see their own data compared with the benchmark in a graphical format on the screen
  - The user can change the view of data from e.g. monthly values to different score types
  - The user can filter further to view assessment results from only a sub set of test takers, e.g. only applicants in companies with more than 500 employees.

C. The leadership team in an organisation want to see their staffs overall results or competency profiles for a specific role and compare it to a group of best of breed companies in their market.
- The user logs on to a platform where access to the application has already been granted
- The user opens the application and selects the desired query (e.g. job (level) comparison)
- The user filters the data on job level/type of role (e.g. sales staff), country (e.g. US) and industry (e.g. retail)
  - The user can preview the benchmark at any time to make sure it displays what they are expecting and to look at general trends
- The user then selects the project in an on-demand database where the data they want to benchmark against resides; in this example they use assessment data from the last 3 years from both their recruitment and development assessment projects.
  - They update firmographics if essential information is missing
  - They filter on test takers who are flagged as "employees"
- The user can now view their data in the application compared to the general benchmarking data from the benchmark database (US retail organisations that used the assessments to evaluate staff or new recruits in sales).
  - The user can view both competency scores and ability scores and see their own data compared with the benchmark in a graphical format on the screen
  - The user can change the view of data from e.g. monthly values to different score types
  - The user can filter further to view assessment results from only a sub set of test takers, e.g. entry level sales roles or sales team leads.

High Level Requirements

The following summarises key features and functions. This is not an all inclusive list.
- Creation of a high performance database to store assessment data copied/replicated from other platforms.
  - It is yet to be determined whether to leverage an existing database, create a specific one for the application, or create a wider data warehouse.
  - The database will require data from a large number of data sources such as on demand assessment and score platforms, test taker demographics bio data, project firmographics information, client information and industry codes.
  - The database is stored and indexed to allow for high performance queries and data views.
  - The database should allow for the assessment data to be categorised by multiple attributes. These attributes will be used to enable search, query and filter functionality in the analytics/user interface. (Initially we can use a number of pre defied data sets (canned views) with parameters that can be varied rather than a fully scoped data base.)
  - The data will be stored both in the original assessment results format but also in calculated formats to allow for models such as competencies to be used, even where these were not use in the original client project
- Provide the ability for internal and external users to access/query the single source database through a web interface.
  - An internal user is defined as a user within a pre-defined network
  - An external user is defined as an approved user
- Provide a graphical interface for the user to select the data they want to use and the actions they want to take to do a comparison/benchmarking exercise using the data.
  - Search the database for products, industries, dates of assessment events etc. to find a benchmark/data set they want to view and use.
  - Search their organisation's assessment database on the platform and select the projects, jobs, assessment types, dates etc. which they want to use for the comparison. View their data compared with the benchmark/dataset they selected.
  - Filter and drilldown to see e.g. data for a specific market/country, date interval, specific biodata combinations, job or assessment product/score It should be possible for the user to add classification/tags to this data where it is needed/missing (e.g. type of assessment) and for these to be added to the database for future use A user is be able to save their selection and queries and re-use this when they return to the application Create the ability for internal administrator users to administer and manage the database and the standard benchmark data sets. Administration of the database includes, but is not limited to, adding new data, modifying existing data, deleting data, adding data tags to data, creating new benchmark sets, designing new views.

Create a manual or (longer term) automated process for extracting, cleaning up, tagging and uploading data to the database from any active platform on a regular basis (2-4 times a year).

Possible Future Enhancements

The creation of real-time integrations between the database and any assessment platform.

The creation of integrations between the database and third party providers such as integrators who may currently have connections between an assessment platform and their system.

Any features related to the above

Other Issues

1. Data extracts are costly and take time to get prioritised; a standardised way of regularly extracting all relevant assessment data may be used
2. The quality of the assessment data that goes into the benchmark database and benchmarks is important, therefore data cleaning, tagging and analysis resources are assigned to ensure data quality and support the ongoing data management process.

Figure 37:
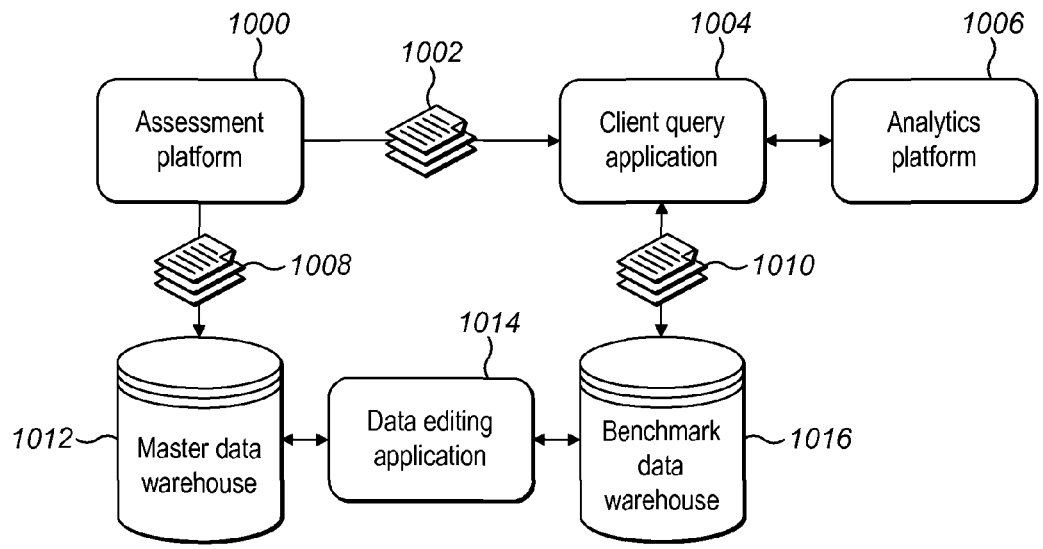
FIG. 37 shows an example of a design overview with a single platform.

FIG. 37 shows an example of a design overview with a single platform. From the assessment platform 1000 assessment data 1008 is passed to the master data warehouse 1012. The data editing application 1014 interfaces between the master data warehouse 1012 and the benchmark data warehouse 1016, and serves to clean and consolidate assessment data and industry benchmark information. The user can log into a platform 1006 for performing and controlling analytics. Via a client query application 1004 client specific live assessment data 1002 from the assessment platform 1000 may be accessed. Benchmark data 1010 from the benchmark data warehouse 1016 is accessed via the same client query application 1004.

Figure 38:
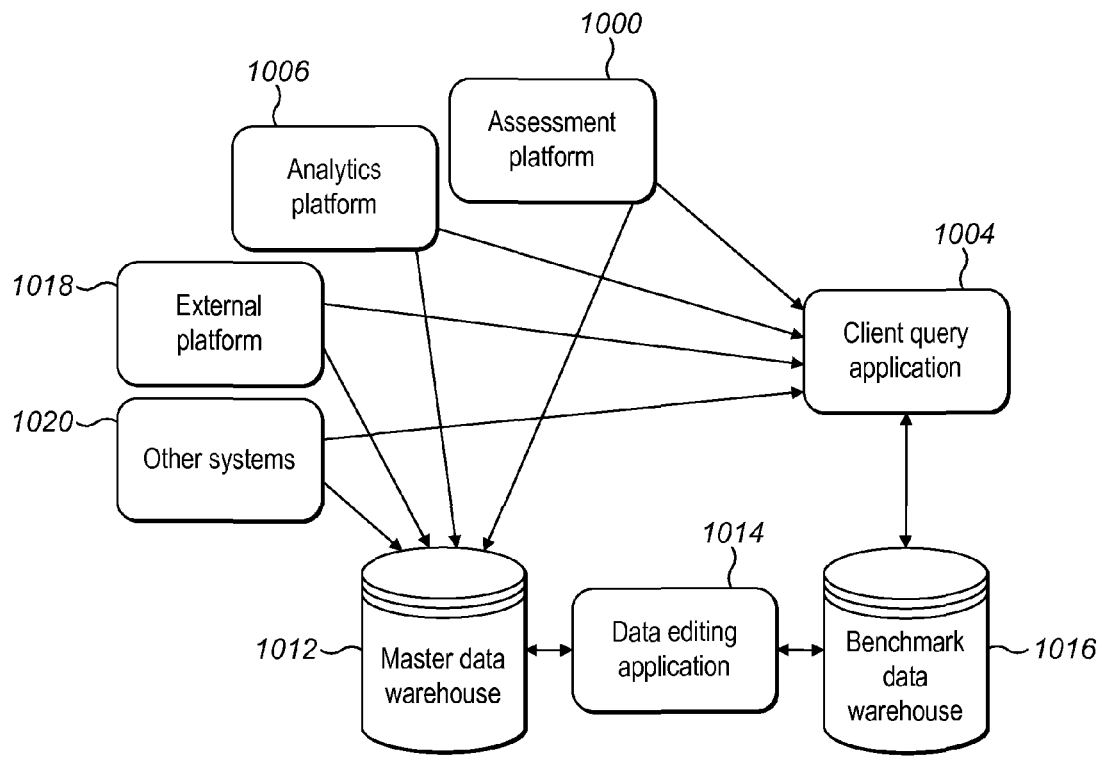
FIG. 38 shows an example of a design overview with multiple platforms.

FIG. 38 shows an example of a design overview with a multiple platforms. A multitude of platforms (including assessment platform 1000, analytics platform 1006, external platforms 1018, and other systems 1020) pass data to and access data from the master data warehouse 1012. Benchmark data from the benchmark data warehouse 1016 is accessed via a client query application 1004.

Figure 39:
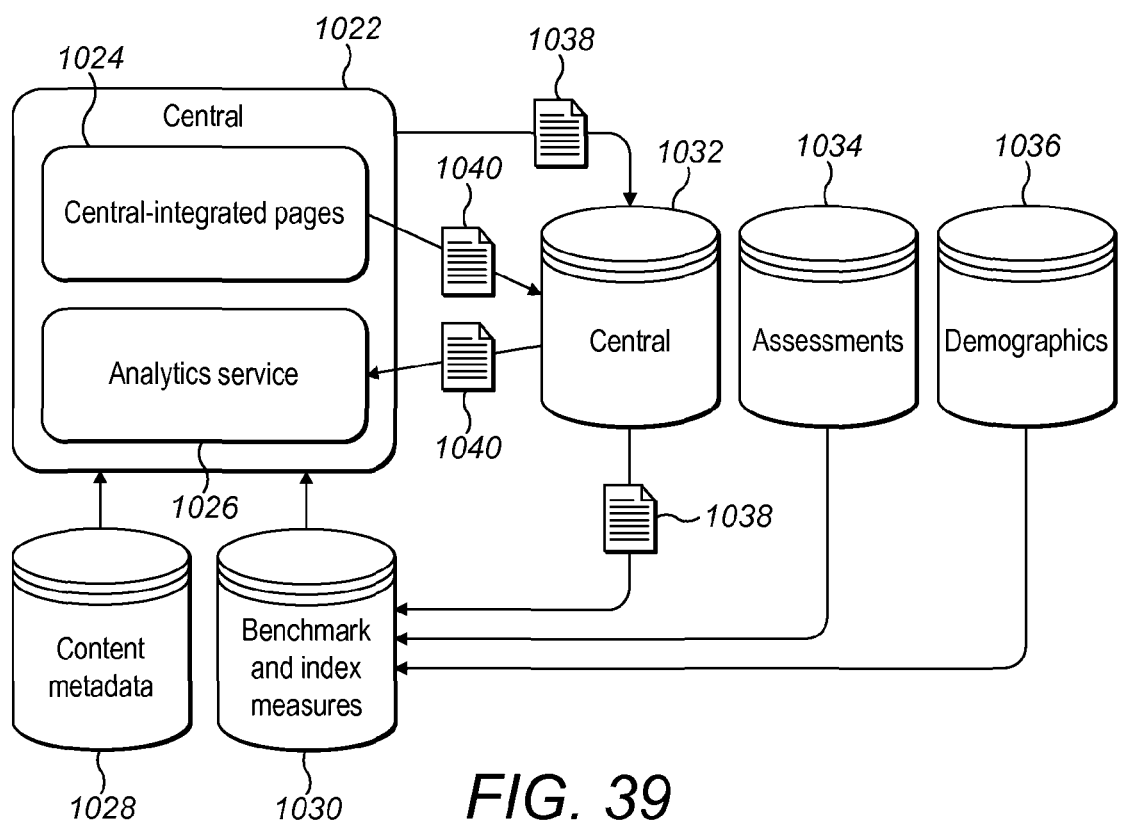
FIG. 39 shows an example of a design overview where the analytics application sits within a central system.

FIG. 39 shows an example of a design overview where the analytics application sits within a central system 1022 but sources its data primarily from external databases (e.g. a content metadata database 1028 and a benchmark and index measures database 1030). These databases are managed and populated via extract, transform, load (ETL) processes using assessment (score) data 1034, demographics (candidate, project) data 1036, and other sources to access.

Central-integrated pages 1024 represents the entities used for presentation of analytics data, the implementation of the charting components, integration changes to the registration process and other miscellaneous interactions Analytics service 1026 represents the service implementation responsible for data access and transformation of raw data into the business model Benchmark and index measures 1030 and content metadata 1028 are logically separate but may be physically together An include client marker 1038 may be passed between the central and the database(s). Demographic direct feedback 1040 may be passed between the different part of the central system.

Figure 40:
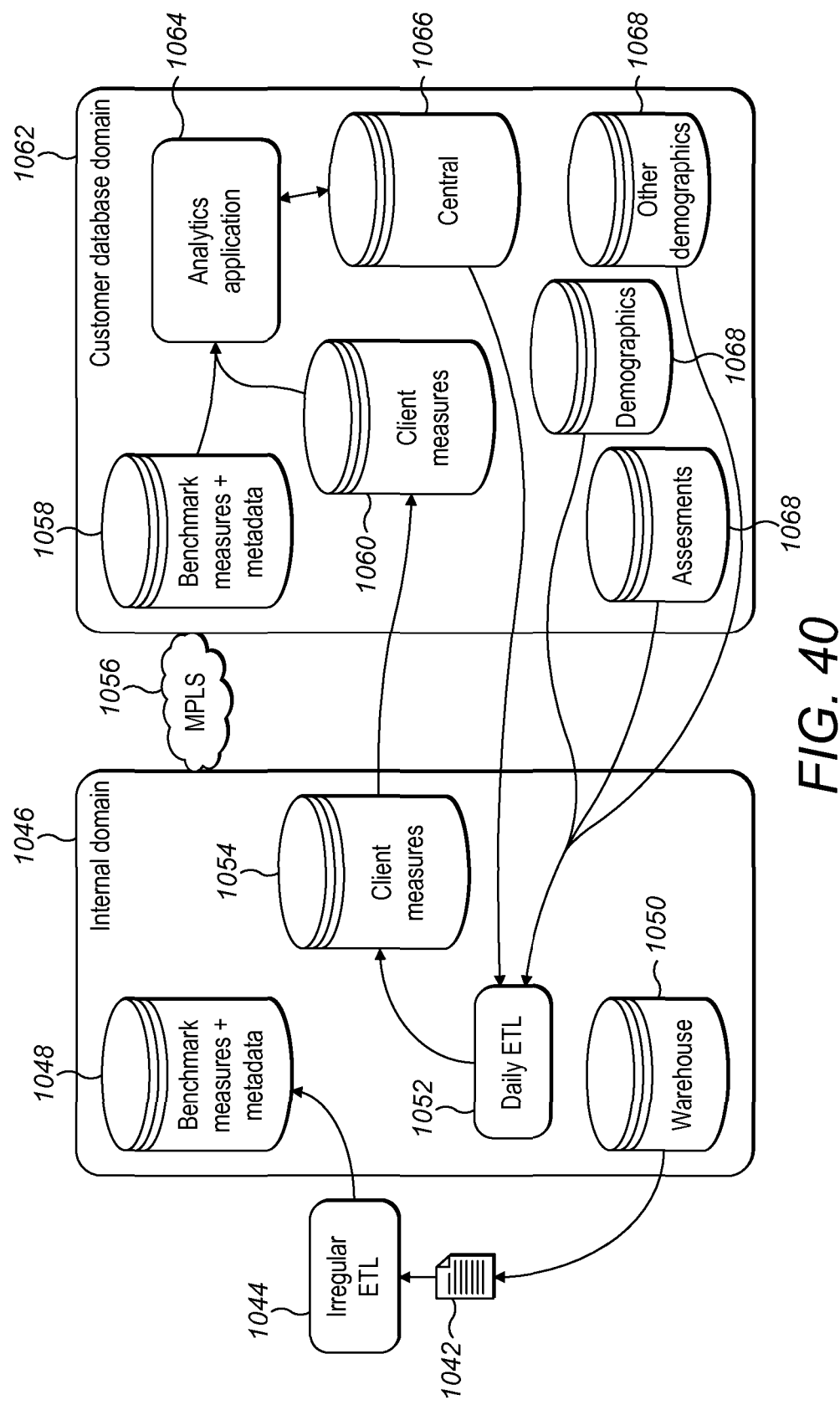
FIG. 40 shows some possible interactions between different elements of the analytics system.

FIG. 40 shows some possible interactions between different elements of the analytics system. Benchmark measures and metadata 1042 from a data warehouse 1050 are subject to an irregular ETL process 1044 to populate a benchmark measures and metadata database 1048. This benchmark measures and metadata database 1048 resides on an internal domain 1046 and may be linked to benchmark measures and metadata database 1058 on a customer database domain 1062 by multiprotocol label switching (MPLS) 1056 or other log shipping procedures. On the customer database domain 1062 reside a plurality of databases 1068 with client data, for example from client assessments, demographics, or other data. The data from these databases 1068 is accessible for daily ETL 1052, for example with open database connectivity (ODBC). During daily ETL 1052 candidate measures are calculated for clients that subscribe to analytics. The daily ETL 1052 deposits data in a client measures database 1054 that resides on an internal domain 1046. Data from the client measures database 1054 may be log shipped daily to a client measures database 1060 that resided on the customer database domain 1062. The analytics 1064 operates from the customer database domain 1062 with data from the client measures database 1054 and the benchmark measures and metadata database 1058. The analytics application 1064 aggregates candidates and benchmarks from the benchmark measures and metadata database 1058. The analytics application 1064 obtains client registration information, as well as information relating to saved projects and candidate metadata from a central database 1066. The analytics application 1064 may operated from the central database. The analytics application output is deposited in the central database 1066, which is included for daily ETL 1052.

| User Story | Notes |
| --- | --- |
| Construct Benchmark Database | Assessment database (data from a variety of different assessments). Other systems may follow. A verify step may be used. Up to 5 years worth of data is included. Include record of data added. |
| Import Assessment Measures Database | Assessment database (data from a variety of different assessments). Other systems may follow. A verify step may be used. Up to 5 years worth of data is included. Include record of data added. Only needed for clients registered for TA. |

The benchmark measures and metadata database 1058 and client measures database 1060 on the customer database domain 1062 may be read-only copies of the benchmark measures and metadata database 1048 and client measures database 1054 on the internal domain 1046. In this case the analytics application 1064 uses the read-only copies 1058 1060. This minimises the risk of any communication latency in querying the data for individual reports. Central 1066 may have knowledge of the schema (i.e., the interface is the schema). A service may be implemented internally to central 1066. Some of the databases are shown as two databases, but may be put into a single database as for example the columns for the benchmarks and the client measures may be very similar, although they will have different lifecycles.

The measures for candidates on project belonging clients that are registered users reside in the measures database 1068. The analytics application 1064 in central 1066 aggregates data (for example: calculate the average for a measure for the set of candidates or projects selected for comparison with a benchmark) but does not do any calculation of measures. The closer central 1066 comes to a simple SQL Select to populate the graph component, the faster the UI may be. Further, central 1066 can then use the benchmark measures and metadata database 1058 and client measures database 1060 read-only.

A mechanism may be necessary to permit central 1066 to inform the daily ETL 1052 (warehouse ETL job) which clients have registered for the analytics application. The ETL needs to note on the projects in the client measure data, which ones can be used for Benchmark measures because the matching measure is available. This can also be used to reduce the volume of client data that is loaded into the client measures database, based on whether the project has measure data that can be used for any of the current benchmark measures. For example, the ETL may read the client list via ODBC similar to other source data.

Augmented metadata on projects and candidates may be stored in central 1066 to avoid the application becoming coupled to the assessments. A service to allow this to be written back can be implemented separately.

Central 1066 retrieves the project and candidate list in the client measures database 1060. This may need to be filtered to projects with data that can be used for the measures. Rules may be defined for hidden projects (such as projects that are not deleted). Data can be deleted from the assessment database, so ETL procedures and central need to cope with that.

Benchmarks may be biodata and demographic data specific, so the client measures feed may need to take this data from the demographics database and other databases.

Range-specific text for labelling benchmarks may be stored with the benchmark data. This means there is one master database for storing benchmark information (that may need to be reused outside the analytics application).

In the following, a new analytics component embedded in a central platform that makes benchmarks (in chart format) available to clients is described. The description includes:
  Prototype screen shots, structure only (layout and style may vary)
  Functional requirements (as User Stories)
  Non-functional requirements
  Entity model (conceptual view of database schema)
Scope
  Main
    Analytics functionality added to central platform
    Construct benchmark database
    User to construct and view a benchmark chart from a predefined set of benchmark templates.
    User to drill down on a benchmark chart.
    User Registration and payment
    Operator verification of user requests and account activation
    Operator management and deactivation of user accounts
    Scheduled import of assessment measures database
    User to filter benchmarks on selected data types and values
    User to save and open user defined benchmark queries
    User to print benchmark displayed on screen
  Preferable
    One off construction of assessment measures database
    User to compare own project data
    Placeholder for Users to update their own data (suitable for discussion during demo)
    Users to drill down on selected benchmark data
    Users to update their own data (with permanent or temporary save option)
  Optional
    Administrators to construct and update benchmark templates
    Administrators to manage benchmark meta data
    Administrators to manage benchmark page content and chart options
    Administrators to manually update benchmark data
    Administrators to export benchmark data in various formats
    User to email a copy of the benchmark displayed on screen
  Further options
    Administrators to create non-standard benchmarks
    Automatic validation of benchmark data
    Synchronise analytics data changes (back to assessment measures database and other systems)
Process Overview
  The analytics system is based around the selection of three options:
    A Theme—client interest, e.g. improving their recruitment process.
    A Benchmark Model—a scale. The data to be enquired on. E.g. people risk
    Primary Data Type—The comparison. E.g. industry sector.
  Each allowable combination of these options is recorded as a Benchmark Template.
  Users create Benchmark Queries by selecting a Benchmark Template and optionally adding filters and chart format preferences. Benchmark Queries are then saved to the analytics database. Users may have the option of saving Benchmark Queries as Global (also referred to as 'Universal') Benchmark Queries (available to all users). Other users may only have the option of saving User Benchmark Queries (for their own use).
  The analytics system will generate graphical representations of Benchmark Queries by linking them with their corresponding Benchmarks and Assessment Measures. These graphical representations can be displayed either externally or within the analytics application itself.
  Note: For demo only one theme may be implemented, so will not be selectable. Also a single Global Benchmark Query will be created for each benchmark.
Storyboard/Screen Prototypes:
User Types
  Unauthorised User—has access to all Global Benchmarks; cannot save as personal user queries.
  Authorised User without assessment access—as above but can save queries as personal user queries.
  Authorised User with assessment access—as above but can add assessment project data.
  Admin User (Administrator)—can update Measures and Chart Type; can save Global and hidden Benchmark Queries. May be done using SQL scripts initially.
Render Chart
  A chart is rendered to represent the selected Benchmark and Data Type Values. The assigned chart type is used for a saved benchmark query. Data is retrieved based on the selected data type values. When multiple filters (data type values from different data types) are selected then use OR operator to select data in the same data type and AND operator between data types, e.g. ('uk' OR 'france') AND ('finance' OR 'marketing').

FIG. 41 shows various examples of render charts:
a) shows how for pie charts and simple bar charts, a one dimensional set of data values is provided, e.g. 6,5,2,4.
b) shows how for grouped and stacked bar charts, a two dimensional set of data values will be provided, e.g. (6,5,2), (8,4,3), (3,7,3).

If multiple measures are assigned to multiple groups (A, B, C) then measures are split accordingly. If one of the data types is set as primary then the data is split into corresponding groups. If no data source is set as primary, then only a one dimensional data set is used (for simple bar chart or pie chart).

For data:

| Record No | Measure1 | Measure2 | Geography | Industry |
|---|---|---|---|---|
| 1 | 1 | 2 | UK | Finance |
| 2 | 3 | 4 | UK | Marketing |
| 3 | 5 | 6 | France | Finance |
| 4 | 7 | 8 | France | Marketing |

C), d) and e) show further examples of output render charts.
c) shows Scenario 1
Single measure (Measure1), and primary data type of geography, render data:
Chart values: 4, 12 (sum of all Measure1 values split by UK and France).
d) shows Scenario 2
Two measure (Measure1 and Measure 2), and no primary data type, render data:
Chart values: 16, 20 (sum of all Measure1 values and sum of all Measure2 values).
e) shows Scenario 3
Two measure (Measure1 and Measure 2), and primary data type Industry, render data:
Chart values: (6, 10), (8,12) (sum for Measure1 and sum for Measure2 split by Finance and Marketing).

When projects are included, project data is filtered on all data type values selected except for primary data type (if enabled). Alternatively, the user may choose for the project data not to be filtered with the benchmark data. The user may be presented with a choice to apply the filters/drilldown to the project data or not. Content (html) is retrieved from the benchmark database. Content may potentially be configured within properties.

The title of the chart is derived from the selected Benchmark and Data Types Values. The title may be defined within properties, and it may be held with the benchmark data.

The Filter Summary (as illustrated in FIG. 105) is derived from the selected Benchmark and Data Types Values. Further logic may be added to this function.

Figure 42:
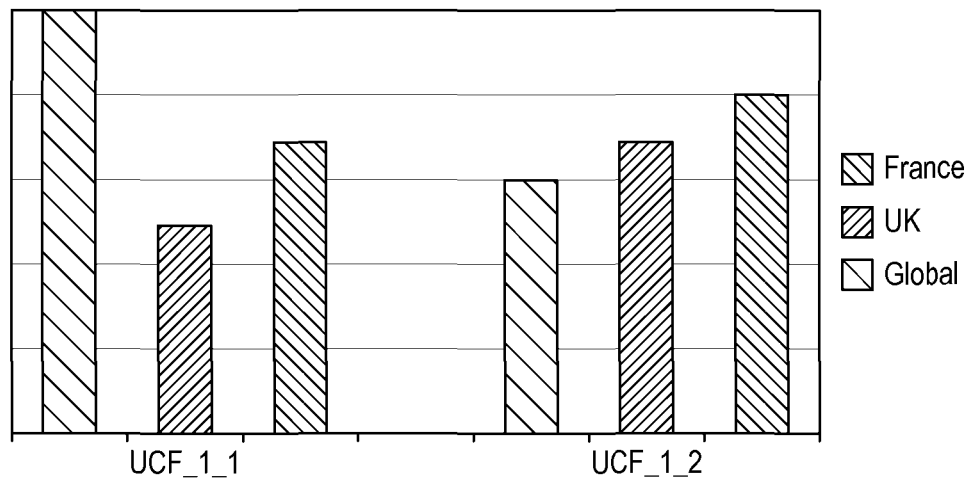
FIGS. 42 and 43 show examples of charts available via drill-down.
Figure 43:
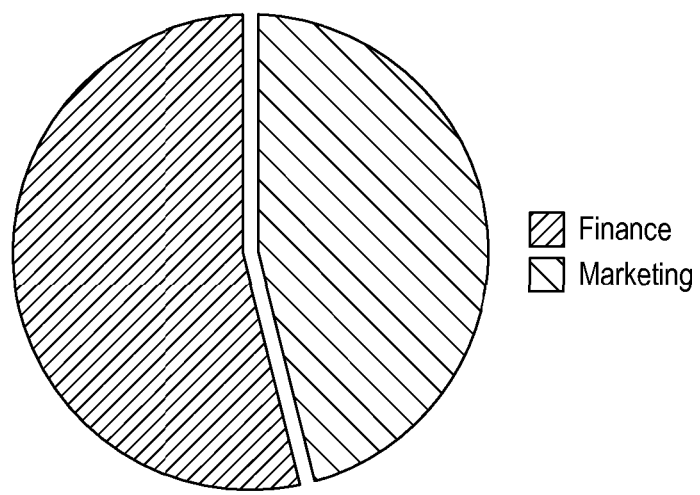

On hover (over a data area) information relating to the following may be displayed:
Associated Content
Drill down options associated with the measure.
Drill Down
FIGS. 42 and 43 show examples of charts available via drill-down.

The functionality to filter and drill down on charts may be available to all SHL Central users (not just Premium Users).

When a drill down option is selected (for example using a link available on hover over a data section), then it is linked to the associated saved benchmark query and inherits the selection for the initial chart.

For example, for a bar chart displaying:
Primary Data Type: Geography (Global, UK and France)
Filter Data Type: Industry (Finance, Marketing)
Measure: UCF_1_1 and UCF_1_2
(bar chart shown in FIG. 116)
and where the Measures are linked to a pie chart for:
Primary Data Type: Industry
Filter Data Type: None (select all)
Measure: UCF_1_1, UCF_1_2 and UCF_2_1
and Inherit filter from parent measures=True If the User clicks on the region corresponding to UCF_1_1 for UK in the bar chart shown in FIG. 116, then a new pie chart as shown in FIG. 117 is generated. The new chart is requested but with a filter inherited from the parent:
Geography: UK
Measure: UCF_1_1

Figure 44:
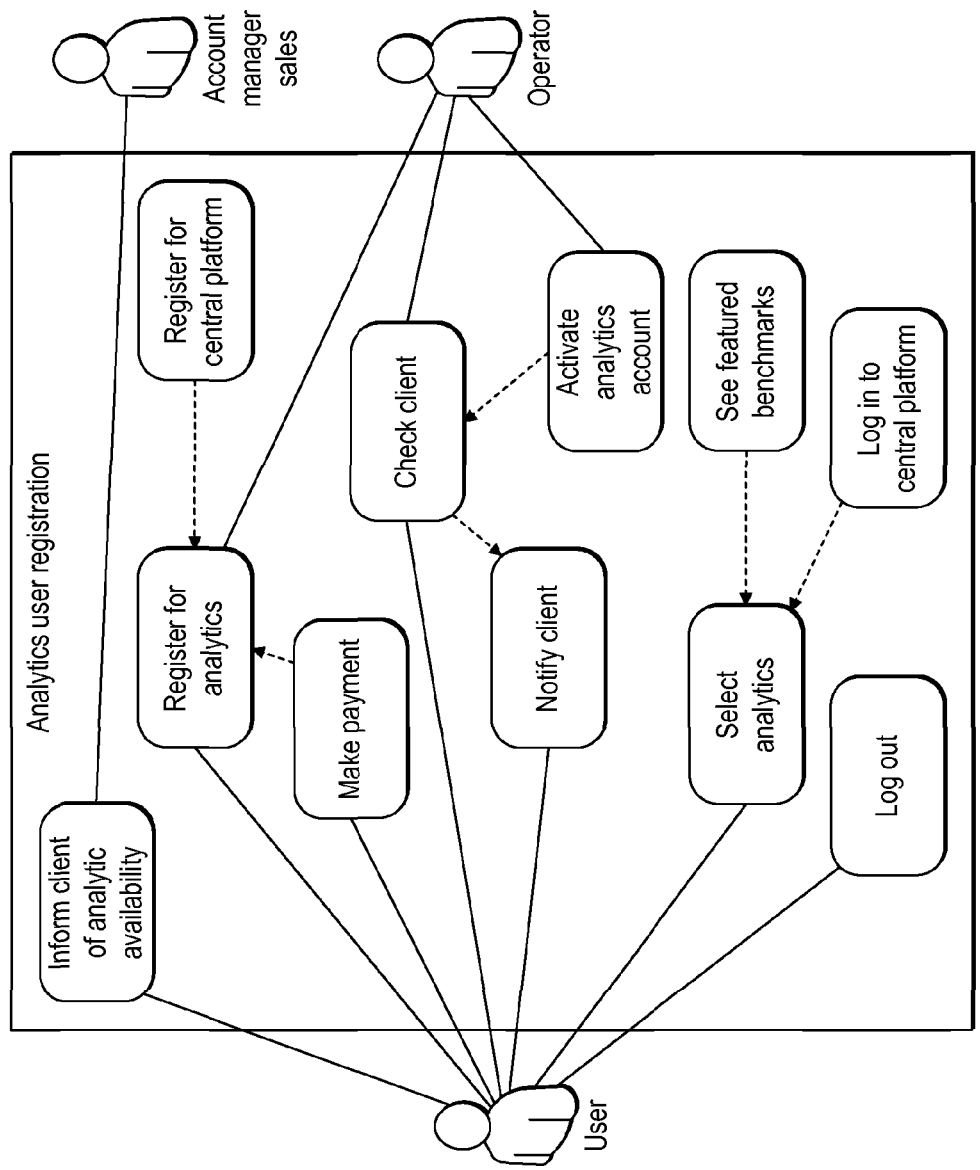
FIG. 44 shows functional requirements that relate to user registration for the analytics tool.

If Inherit filter from parent measures is not true (as above) but false, then the (new) pie chart would show the sum of UCF_1_1, UCF_1_2 and UCF_2_1.
Further Comments A carousel and Side Bar (of associated benchmarks) may be provided. Saved queries may be assigned to Sections. Saved queries may be assigned to Propositions. Some benchmarks may be highlighted (or featured). For administration purposes, Benchmarks may have Draft or Live status. A link to "Latest 10" benchmarks accessed may be shown. A data type value may be defined as corresponding to null (to retrieve other data).
Alternative Storyboard/Screen Prototypes
My Assessment Data The 'My Assessment Data' tab provides access to the user's assessment data.
Functional Requirements FIG. 44 shows functional requirements that relate to user registration for the analytics tool.

| User Story | Notes |
|---|---|
| Inform Client of Analytics availability | Existing functionality. No development. Process required |
| As an Analytics user I want to be informed about Analytics availability so that I can benefit from the service. | Administrators, Sales, and Account Managers promote Analytics to clients. Analytics featured on Central platform Home Page Marketing: Press Release, Trade Shows, website, etc. |
| Register for Analytics | For Premium service (which allows users to compare |
| As an Analytics user I want to register for the service so that I can investigate Analytics. | their own Projects), or a free service will need to link user to a Client. Validation is required to prevent unauthorised users linking to clients. |
| Register for Central platform | Existing process |
| As a user I want to register for the | Users associated with more than one Soda Client must |

| User Story | Notes |
| --- | --- |
| Central platform so that I can register for Analytics. | register a separate account for each one. |
| Make Payment As a user I want to pay for the service so that the account/service will be activated. | Most customers will get the service free of charge. Where users have to pay, an automatic system using existing Central platform credit card process should be used. May need a process to pre-approve specific Clients for free service. Include exception: Refunds. |
| Check Client As an Operator I want to check a users request for the service so that I can restrict the service to approved users and link their account to a Client. | Operator will allocate Client Type: Admin User Employee who will use the system to create standard queries available to all users. Premium User High volume Client who will have option to compare own projects against benchmarks Employee using high volume Client account (on their behalf). Standard User Low volume Client, Partner who only have access to existing standard queries. Operator allocates Payment Type: Free Service Annual payment Operator rejects unwanted requests for access. Include exceptions: Request rejected. |
| Notify Client As a User I want to be notified when my Central and Analytics account is available so that I can start using the service. | |
| Activate Account As an Operator I want to activate accounts once they have been approved so that I can restrict Analytics to approved users, restrict free access to specific accounts and prevent unauthorised users viewing clients' information. | Should use existing Central platform process and functionality |
| Select Analytics As a User I want to select Analytics from my Central account so that I can use the service. | Should use existing Central process and functionality |
| Log into Central platform As a User I want to log into Central platform so that I can access the Analytics service | Existing Central functionality |
| See Featured Benchmarks As a User I want to see featured benchmarks on my Analytics home page so that I can efficiently monitor the latest benchmarks. | Existing Central functionality |
| Logout As a User I want to log out of my Analytics account and Central platform so that I can protect my company's information from unauthorised access. | Existing Central functionality |

Figure 45:
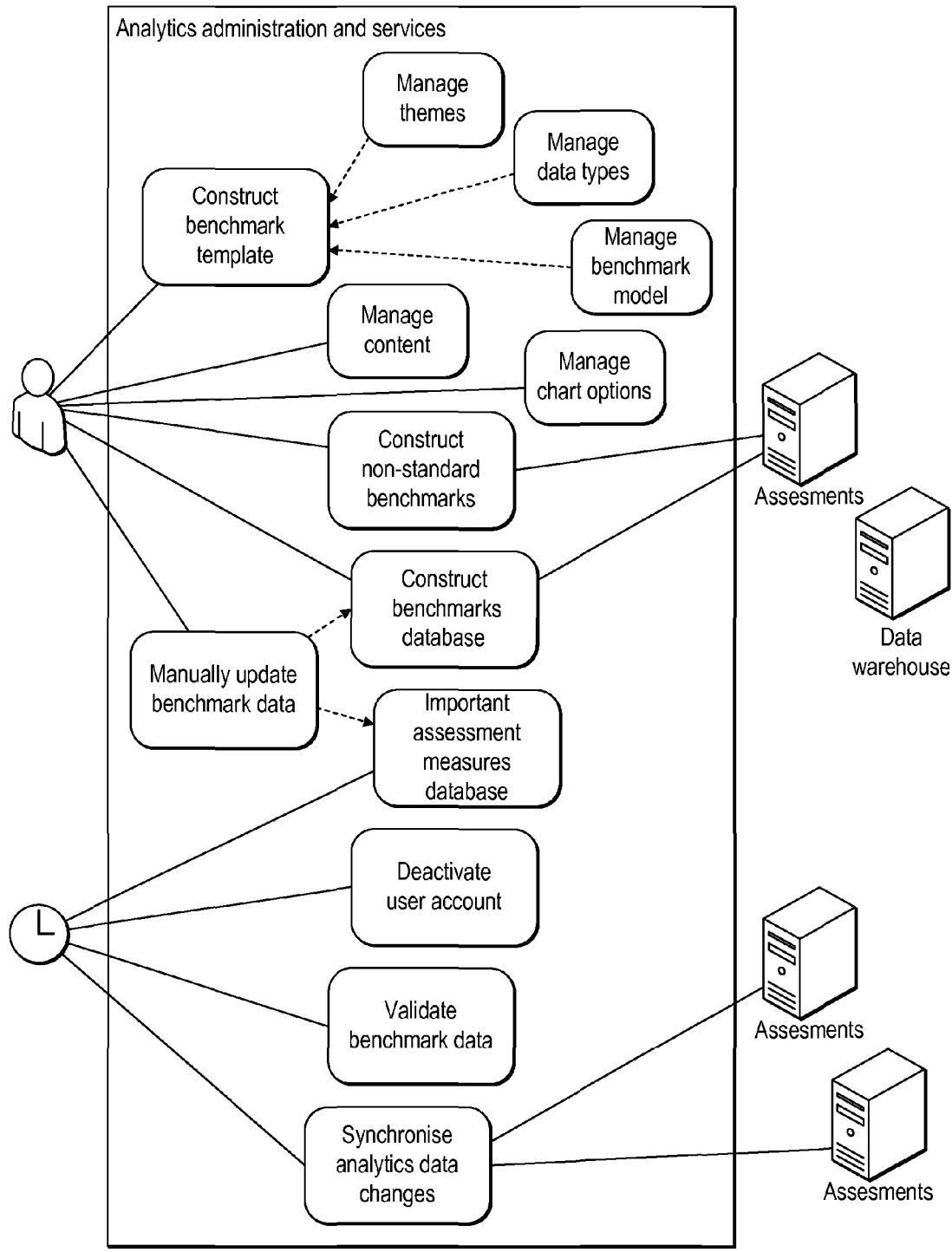
FIG. 45 shows functional requirements that relate to analytics administration and services.

FIG. 45 shows functional requirements that relate to analytics administration and services.

| User Story | Notes |
| --- | --- |
| Construct Benchmark Template As Administrator I want to create a Benchmark Template so that I can manage the options and features available to users querying the Benchmark data. | A Benchmark Template will define: Name The Theme: The reason the client is using the benchmark, e.g. Improving the recruitment process. It will be the option selected by the user for "I want to understand my . . . ". Benchmark Model: the scale that the benchmark will be based on. It will be the option selected by the user for "By looking at . . . ". |

-continued

| User Story | Notes |
|---|---|
| | Benchmark By: The data type that will be charted at the top level, e.g. 'Industry'. It will be the option selected by the user for "benchmarked by . . . ".
Any fixed filters. Data filters that will be hard wired into the benchmark template, e.g. 'Only for Finance and Marketing'.
Allowable filters. Additional data filters that will be optionally available to the user at run time, e.g. 'Show for UK and France'.
Allowable Drill Down. Drill down options available at run time. Only one level of drill down will be supported. E.g. User will click on single bar (for bar chart) and have the option of drilling down on 'Geography' or 'Industry'
Allow User Data Comparison. Can user data be added to the chart for comparison with Global Benchmarks.
Benchmark templates may be created using SQL scripts initially. |
| Manage Themes
As an Administrator I want to manage Themes so that I can add new meta data without the need for further system development. | Add, Delete, Update, Deactivate.
May be SQL scripts initially. |
| Manage Data Types
As an Administrator I want to manage data types and their filter values so that I can add new meta data without the need for further system development. | Add, Delete, Update, Deactivate.
May be SQL scripts initially. |
| Manage Benchmark Models (Scales)
As an Administrator I want to manage Benchmark Models and their band values so that I can add new meta data without the need for further system development. | Add, Delete, Update, Deactivate.
May be SQL scripts initially. |
| Manage Content
As an Administrator I want to manage content so that I can control the information displayed and available to users | Content will be:
Page titles, labels, text, pop-ups, and images displayed on Analytics pages.
Documents and sites linked to Analytics pages
All supporting text for the interface
Supporting documentation/white papers/fact sheets
May attach business outcome link or paper where these match closely enough or refer to these in the support documentation
Content will be conditionally displayed based on current:
Theme (e.g. Improve Recruitment process)
Data Type (e.g. Marketing)
Benchmark Model (e.g. People Risk)
Benchmark Model Band (e.g. Very high risk people)
For each of these categories, content will link to one, many, or all.
Content may be hard coded. |
| Manage Chart options
As an Administrator I want to manage the chart options so that I can control the chart types used to display different content to users. | Chart Types will be:
Bar Chart, Pie Chart, etc.
A variety of Chart tools are possible.
Chart Types available will be conditionally on:
Theme (e.g. Improve Recruitment process)
Data Type (e.g. Marketing)
Benchmark Model (e.g. People Risk)
Volumes (to be confirmed).
For each of these categories, content will link to one, many, or all.
Some bar charts will be designated as default charts. To be used when benchmark is first displayed. There will be no, fixed options initially. |
| Construct non-standard Benchmark
As an Administrator I want to create non-standard Benchmark Queries so that I can publish specialised charts that cannot be | Where possible the system will be used to create and save common saved queries (Standard Benchmarks).
If non-standard benchmarks are required, a new process (possibly SQL script) may be introduced. |

| User Story | Notes |
| --- | --- |
| constructed using standard system functionality | |
| Deactivate user account
As an Administrator I want to deactivate a user's account so that I can block access to ex-employees (provider and Client). | Users are only entitled to access Benchmarks while they are employed by the benchmark provider or the client. A process is required to identify users no longer authorised to view client data and deselect them. |
| Manually Update Benchmark Data
As an Administrator I want to manually update Benchmark Data so that I correct data errors that distort Benchmark charts. | Both Benchmarks database and Assessment measures database
Data may come from SPSS or Excel.
Include an option to delete data (may be all data for a specific candidate or client).
Include option to deactivate specific rows (remain on database but not included in benchmarks) . . . |
| Validate Benchmark Data
As an Administrator I want to validate Benchmark data so that I can be confident that data displayed is correct. | A process is required to validate Benchmark Data against Assessment measures database and report discrepancies.
When candidate scores are common to both databases, data can be compared and differences reported.
Data on both systems can be automatically analysed and inconsistencies, outliers, and invalid vales will be reported. |
| Synchronise TA Data Changes
As an Administrator I want to merge any changes made by users to their data in Analytics back to the source systems so that I can keep all databases up to date with the latest highest quality data. | If client data is held on the Analytics database, and Users make changes to this data, then there will need to be a process to merge this data back to all appropriate Assessment databases. |

Figure 46:
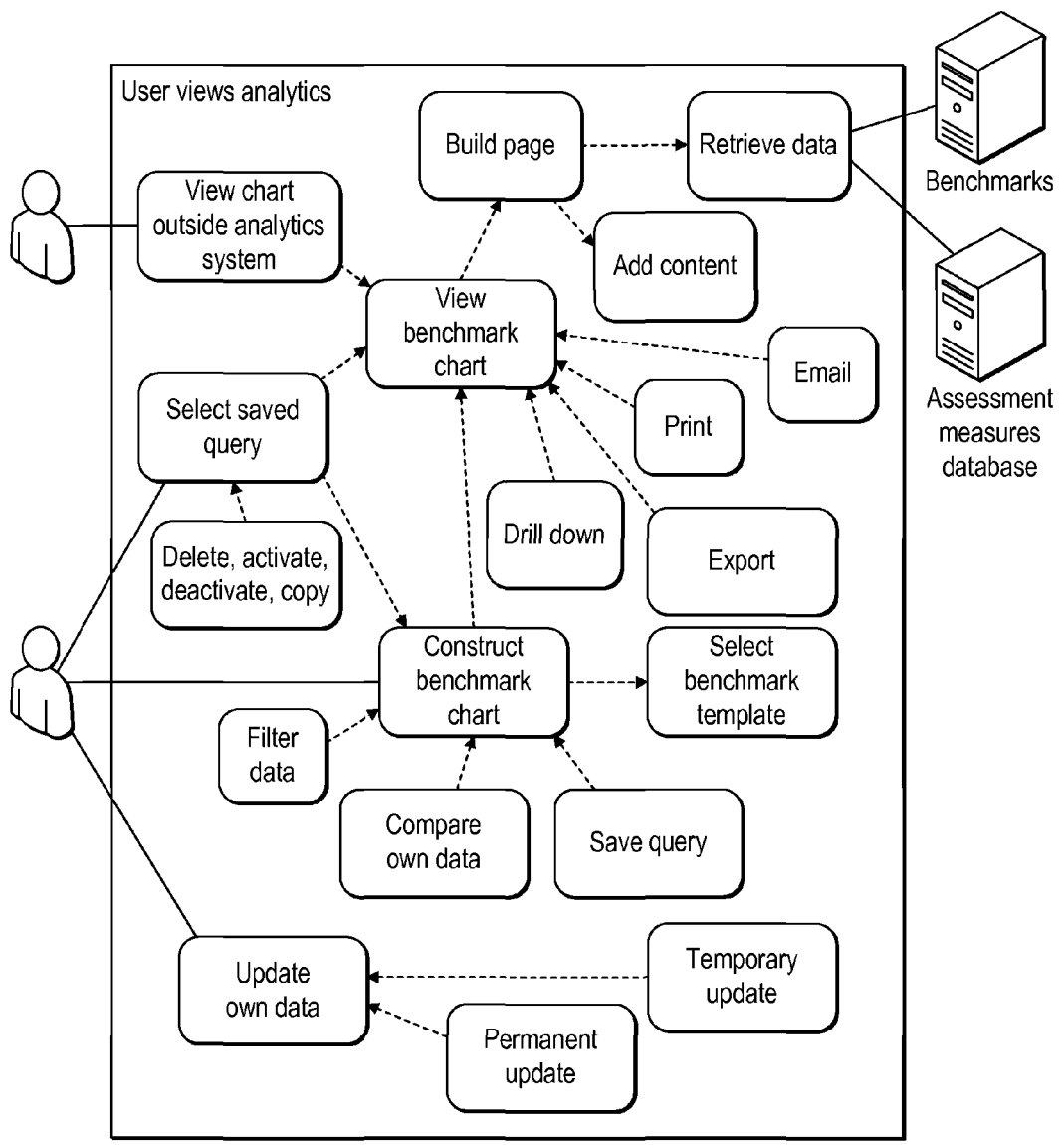
FIG. 46 shows functional requirements that relate to different users viewing the analytics.

FIG. 46 shows functional requirements that relate to different users viewing the analytics.

| User Story | Notes |
| --- | --- |
| View Benchmark Chart
As a user I want to view pre-configured benchmarks so that I can see existing charts without access to the full system or without having to construct new queries. | For a standard user (only able to access pre configured benchmarks), this is the main function, and presented on their Home page.
Non-users of analytics may also have a access to specific charts embedded into other web sites
Premium user (able to construct custom benchmarks) will use this process to view all existing benchmarks they have access to, plus their current (draft/work in progress) benchmark.
For existing saved queries, first Select Saved Query
The draft benchmark (for Premium client users), is saved to the database assigned to the user and with a null name.
Charts never display information that could identify a single candidate or client (other than the owning client).
When there are less than 10 scores in a data section (bar), the exact score may not be displayed. For example, it may be treated as 5 instead. |
| Build Page
Sub component of View Benchmark Chart | The build page process:
Retrieves Chart XML (possibly also Content XML) from the Saved Query entity for the Saved Query reference supplied.
If XML not available (hasn't been cached) then retrieve chart data (and possibly page content) for the specified Saved Query, then construct the Chart XML (and possibly Content XML) saving them to the Saved Query entity.
Construct page from Chart XML (and possibly Content XML), for example using Chart control
Chart Data can be displayed in a 2 dimensional grid. |

Figure 47:
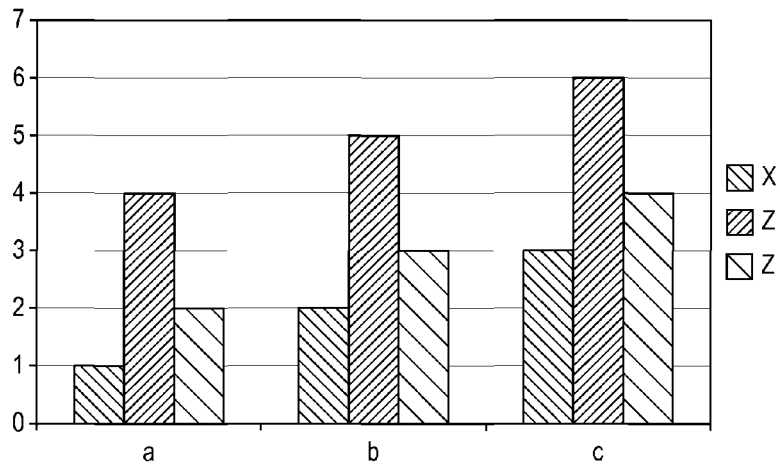
FIG. 47 shows a 2D grid chart.

| User Story | Notes | | | |
|---|---|---|---|---|
| | | a | b | c |
| | x | 1 | 2 | 3 |
| | y | 4 | 5 | 6 |
| | z | 2 | 3 | 4 |
| | FIG. 47 shows a 2D grid chart with the data in the above table. Horizontal labels (a, b, c) from Benchmark Model Names (linked to Saved Query via Benchmark template and Benchmark Model). Vertical Labels (x, y, z) from two sources (data types and projects): a) Filter Names associated with Saved Query via Selected Filter for each bar. But only for filters linked to the same Data Type as recorded on the Benchmark Template. b) Project Names associated with Saved Query via Selected Project for each bar. If more than one Project name is associated with a single bar (data field on Project table), then string names together (comma separated). Retrieving Data is described in Retrieve Data below. Retrieving content is described under Add Content. | | | |
| Add Content Sub component of Build Page | Add chart content using Chart Template's Theme, data Type, benchmark Model, and Benchmark Model Bands. | | | |
| Retrieve Data Sub component of Build Page | The Analytics application in Central aggregates data (i.e., calculate the average for a measure for the set of candidates or projects selected for comparison with a benchmark) but does not do any calculation of measures themselves. Data is retrieved from two sources, the Benchmark Database, and the Assessment Measures Database: In both cases the Scales to be retrieved are determined by the Benchmark Model (which map to a single Assessment scale tag) and the Benchmark Bands (which map to specific scores). For both databases, data is retrieved for Filters linked to the Query (via Selected Filters and Fixed Filter). When filters are of the same Data Type, use the OR condition to link values. When groups of filters are of a different Data Type, use the AND condition to link values. E.g. (Marketing OR Finance) AND (UK or France). Only data from the Assessment measures database belonging to the client (associated with the current user) is available. | | | |
| Select Saved Query As a user I want to select an existing saved benchmark so that I can view or edit the information. | The application shows a list of available saved queries. For standard users these will be common queries only and the only action available will be View Benchmark Chart. Premium Client users will also see their own queries (previously saved) and queries with group access saved by other employees of the same company. Premium Client users will have the option to Edit, Delete, and Deactivate (hide from others) their own queries, and copy all available queries. | | | |
| Construct Benchmark Chart As a user I want to construct my own custom queries so that I can tune benchmarks to my needs and compare my own data (projects, clients) against industry benchmarks. | Corresponds to the Build Benchmark on the Mock Up screen designs. Only accessible by Premium Client users and Admin users. The construction of a Benchmark Chart correlates to the creation of a draft Saved Query on the Analytics database. If an existing benchmark is being edited, then a draft Saved Query will already exist. This may be because the user has selected Edit | | | |

-continued

| User Story | Notes |
|---|---|
| | on the saved templates tab, or because the user is returning to an interrupted session. On entry, if a draft Saved Query exists (a Saved Query for the current user with Name = null), then render the page based on this draft. For a new benchmark, first Select benchmark Template. Once selected, save the details to a draft Saved Query. Create the chart in the chart area (iframe), see Build Query For an existing saved Query: Allow user to update the benchmark, see Select benchmark Template. After any change, regenerate the chart area, see Build Query. Allow user to filter benchmark data, see Filter Data. After any change, regenerate the chart area, see Build Query. Allow user to add own projects, see Compare Own Data. After any change, regenerate the chart area, see Build Query. Allow user to save the current benchmark, see Save Query Once saved, the user may continue to make further changes to the draft. |
| Select Benchmark template As a Premium Client user I want to select an Benchmark Template so that I can view the information and refine the query. | Select: A Theme (I want to understand my . . . ) A Benchmark model (By looking at . . . ) Data Type (Benchmarked by . . . ) This selection uniquely identifies a single Benchmark Template. As each option is selected, the set of available Benchmark Templates is filtered, and any options (in other selections) no longer available are inhibited. If only one option is available for a section, then inhibit all others. A clear option allows the user to clear selected data. If selection is cleared, then clear the corresponding fields on the draft template and clear the chart area. Inhibit action command button (to display chart) until all options are selected (or a single Benchmark template is selected). In some cases (where there are benchmark variants), clicking an option from every section may not result in a singe benchmark being selected. This may result in a fourth section or pop-up selection to choose the variant. |
| Filter Data As a Premium user I want to filter data used in displayed benchmarks so that I can restrict benchmarks to a smaller more relevant data set. | Select one or more filters (data types) and for each, select one or more values to be added to the chart for comparison against the universal benchmark, e.g. Select Industry > Finance and Geography > UK. Use a pop up to filter a subset of data. Options could include: Geography (Country) Year (date) Industry Business Function The same filter is applied to Benchmark and Client data. Selecting no values for a data type corresponds to all data. An option to select all is available. This selects all current items (so data added with a different item is not included in results). When multiple values from multiple data types are selected, the OR operator is used for all items of the same data type, and the AND operator is used between data types. E.g. If Geography > France, Geography > UK, Industry > Finance, and Industry > Marketing, are selected the query is for: (France OR UK) AND (Finance OR |

-continued

| User Story | Notes |
|---|---|
| | Marketing).<br>When filters belong to the same data Type as that linked to the Benchmark Template, then additionally allow the user to assign the filter to a bar (1 to 3). This is used to assign the data to a data set for comparison on the chart. E.g. by assigning UK to bar 1, and France to bar 2, the chart will show a graph of UK compared with France. |
| Compare Own Data<br>As a Premium user I want to add my own data to displayed benchmarks charts so that I can compare my own company against universal benchmarks | Select one or more projects to be added to the chart for comparison against the universal benchmark.<br>Use a pop up with search option to filter a subset of projects.<br>Allow multiple select.<br>Selecting no projects results in all projects being returned to the benchmark query.<br>An option to select all is available. This selects all current projects (so future projects added will not be included in results).<br>Only data from the assessment measures database belonging to the client (associated with the current user) is available.<br>Additionally allow the user to assign projects to a bar (1 to 3). This is used to assign projects to a data set for comparison on the chart. |
| Save Query<br>As a Premium user I want to save my Benchmarks Queries so that I can reuse them again in the future, or share them with other people. | Prompt user for saved Query Name and option to save as:<br>Common (available to all users)<br>Group (available to users linked to same client)<br>User (available to myself only)<br>Only Administrators have the option to save common queries. This option is used to develop new common (universal, global) queries.<br>If Draft Original ID set, then default name and access option to original.<br>Name and access option are mandatory<br>If query already exists with same name (other than draft original) then prompt user to cancel or overwrite.<br>If original query has changed since draft created (using update date on original and creation date on draft, then warn user and prompt to cancel or overwrite.<br>After save, update Creation date to current date on draft query.<br>Save saves query structure only, not actual data. If saved query is reused after data has changed, display may be different. |
| View Chart Outside Analytics System<br>As an Internet user I want to view specific charts so that I can learn more about the Analytics services. | Although charts are normally be displayed in an iframe within the Analytics Application, they are accessible to anyone with the URL.<br>Security tokens are used to protect charts from unauthorised access.<br>May need an option to lock data displayed on Benchmarks displayed outside the system.<br>Could lock XML. |
| Drill Down<br>As a user I want to drill down on a displayed benchmarks element so that I further explore that section. | When the first level chart is displayed, the User can click on any data section in the chart to drill down into the corresponding data.<br>If more than one data type is allowed for drill down, then the user is offered the option to choose the data type to be displayed.<br>On drill down chart y axes may be % of total, x axes are selected data type for drill down.<br>When project data section is selected for drill down, the option to drill down on project is provided.<br>Drill down shows charts at a lower level of granularity, never raw data, and never information that could identify a single candidate or client (other than the owning client). |

| User Story | Notes |
|---|---|
| Export<br>As an Admin user I want to export benchmarks in a variety of formats so that I can include the information in other systems. | Formats:<br>HTML: Copy of Benchmark Display (including chart) for inclusion in other web sites.<br>XML: Data only. For manual validation.<br>Excel: For further analysis of data. |
| Print<br>As a user I want print benchmark charts so that I can keep a hard copy for future use. | Copyright and Terms of Use should limit this. |
| Email<br>As a user I want email benchmark charts so that I can share the information with other people. | Copyright and Terms of Use should limit this. |
| Update Own data<br>As a Premium Client user I want to update my own data so that I can better compare it against universal benchmarks. | For Projects:<br>Industry<br>Business Function<br>Demographics<br>For Candidates<br>Offer made<br>Offer accepted<br>Quality of hire (duration?)<br>May need a way to filter on data not already updated. |
| Permanent Update<br>As a Premium Client user I want to permanently save changes to my own data so that I can reuse the improved data again in the future. | A suitable update/synchronisation procedure may be necessary. |
| Temporarily Update<br>As a Premium Client user I want to temporarily save changes to my own data so that I can use the improved data now but prevent the provider or any of its other clients benefitting from my improved data. | No client sees another clients' data directly, but permanent improvements to client data may be used to improve the quality of future universal benchmarks. |

Entity Model

Figure 48:
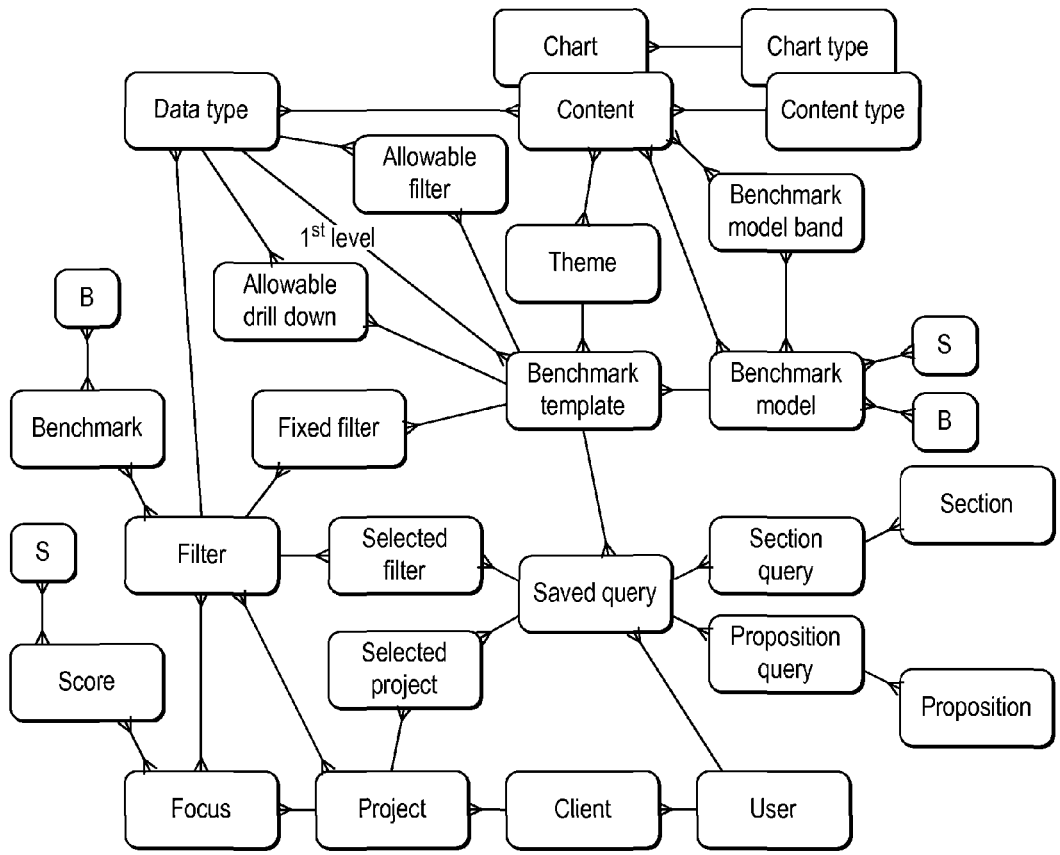
FIG. 48 shows the elements in the entity model.

FIG. 48 shows the elements in the entity model.

Figure 49:
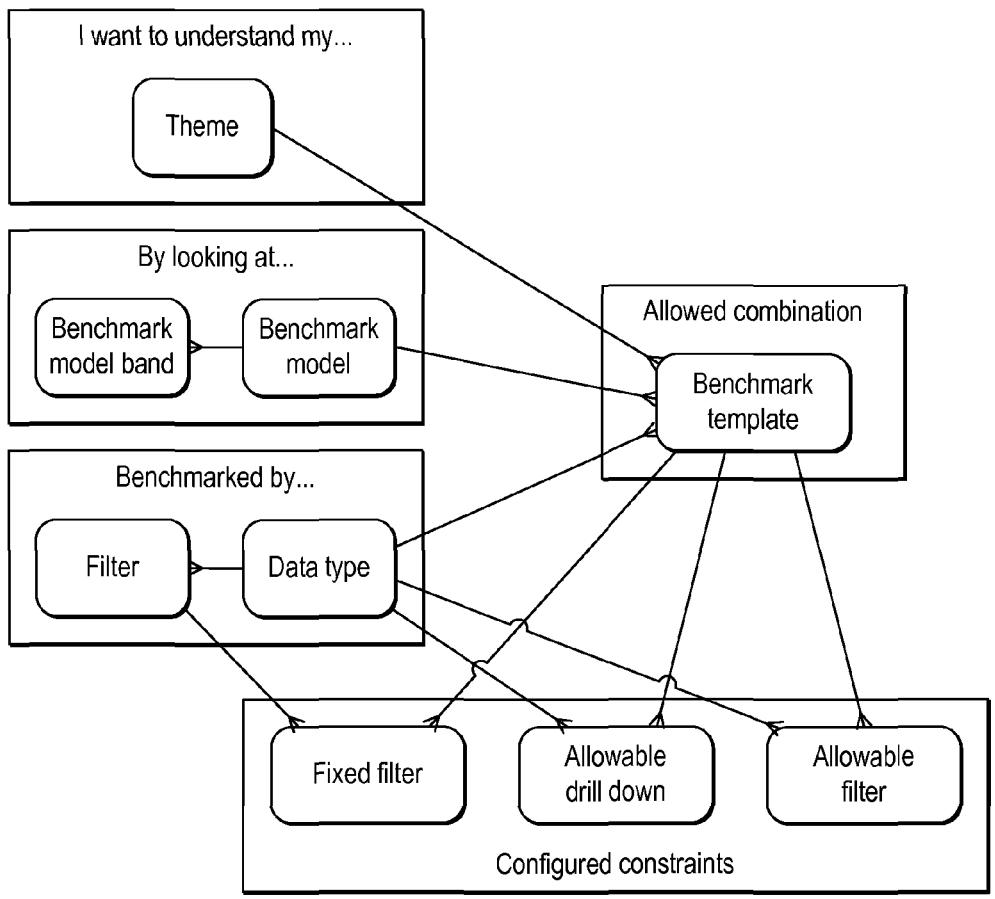
FIG. 49 shows the elements broken down into sections.

FIG. 49 shows the elements broken down into sections.

Theme

Theme or basis for query, e.g. employer Brand, Recruitment Process . . . .

The selection for "I want to understand my . . . "

| Attribute | Description |
|---|---|
| ID | Unique system ID |
| Name | Name. |
| Active | Yes/No |

Benchmark Model

Scale/Measure to be displayed, e.g. Motivation, People Risk . . . .

The selection for "by lookin at . . . "

| Attribute | Description |
|---|---|
| ID | Unique system ID |
| Name | Name. |
| Variant Name | Optional name - But must be provided for duplicate Names.<br>e.g. If there are two "People Risk" models, then one may be for variant "v1" and the other for "v2". |
| Scale Tag | Scale used for Benchmark |
| Benchmark DB SQL | Optional SQL to be used to retrieve data from Benchmark Database<br>This custom SQL statement can be used to retrieve benchmark data in a way not supported by the standard Analytics database structure and process.<br>If SQL is provided the query must return a table in the standard structure corresponding to the benchmark Model Bands. |
| Assessment Measures DB SQL | Optional SQL to be used to retrieve data from Assessment Measures Database<br>This custom SQL statement can be used to retrieve benchmark data in a way not supported by the standard Analytics database structure and process.<br>If SQL is provided the query must return a table in the standard structure corresponding to the benchmark Model Bands. |
| Active | Yes/No |

Benchmark Model Band

Scale Score. Label for X axes, e.g. Very High, High, A,B,C,D . . . .

Standard set of values. Maps 1:1 with bands on Benchmarks database and Assessment measures database.

| Attribute | Description |
|---|---|
| ID | Unique system ID |
| Name | Name. |
| Sequence | Integer. Determines the sequence of bands on the chart.<br>E.g. 1 for 'Low Risk', 2 for 'Medium Risk', and 3 for 'High Risk'. |

Definition of links to Benchmarks and Assesment measures database scores may be necessary.

Data Type

Data Type used for filtering and drill down, e.g. Geography, Industry . . . .

Selection for "benchmarked by . . . "

| Attribute | Description |
| --- | --- |
| ID | Unique system ID |
| Name | Name. e.g. Industry. |
| Active | Yes/No |
| Hidden | Yes/No<br>Used to hide data type from users. Used when filter is only used by template a Fixed Filter (e.g. A specific Instrument like OPQ32R). |

Reference data for benchmark DB. To identify the relevant Benchmark data items (column)
Reference data for Assessment measures database. To identify the relevant project Score (column)

Filter

Filter option. e.g. France, Spain . . . .

| Attribute | Description |
| --- | --- |
| ID | Unique system ID |
| Data Type ID | Link to Data Type |
| Name | Name. e.g. France. |

Mapping for benchmark DB. Code used on Benchmark database.
Mapping for Assessment measures database. Code used on Assessment measures database. May be the same as on Benchmark database (e.g. FR always used for France).

Fixed Filter

A fixed filter for the Benchmark Template selected.
This restricts a Request to a specific data set. e.g. UK and Marketing.

| Attribute | Description |
| --- | --- |
| ID | Unique system ID |
| Benchmark Template ID | Link to Benchmark Template |
| Filter ID | Link to Filter |

Allowable Filter

An allowable query for the Benchmark Template selected.

| Attribute | Description |
| --- | --- |
| ID | Unique system ID |
| Benchmark Template ID | Link to Benchmark Template |
| Data Type ID | Link to allowable Data Type |

Allowable Drill Down

An allowable drill down for the Benchmark Template selected.

| Attribute | Description |
| --- | --- |
| ID | Unique system ID |
| Benchmark Template ID | Link to Benchmark Template |
| Data Type ID | Link to allowable Data Type |

Benchmark Template

Allowable query combination.

| Attribute | Description |
| --- | --- |
| ID | Unique system ID |
| Benchmark Model ID | Link to Benchmark Model. May be null (corresponding to all scales) |
| Data | Link to Data Type. |

| Attribute | Description |
| --- | --- |
| Type ID | Used for 1$^{st}$ level Data Type selection ("benchmarked by . . . ")<br>Filtering is always allowed on this Data type.<br>Drill down is not allowed on this Data type. |
| Theme ID | Link to Theme. May be null (corresponding to all client interests). |
| Active | Yes/No |
| Under Construction | Yes/No |
| Allow User Data | Allow user to include own data. |

Saved Query

Figure 50:
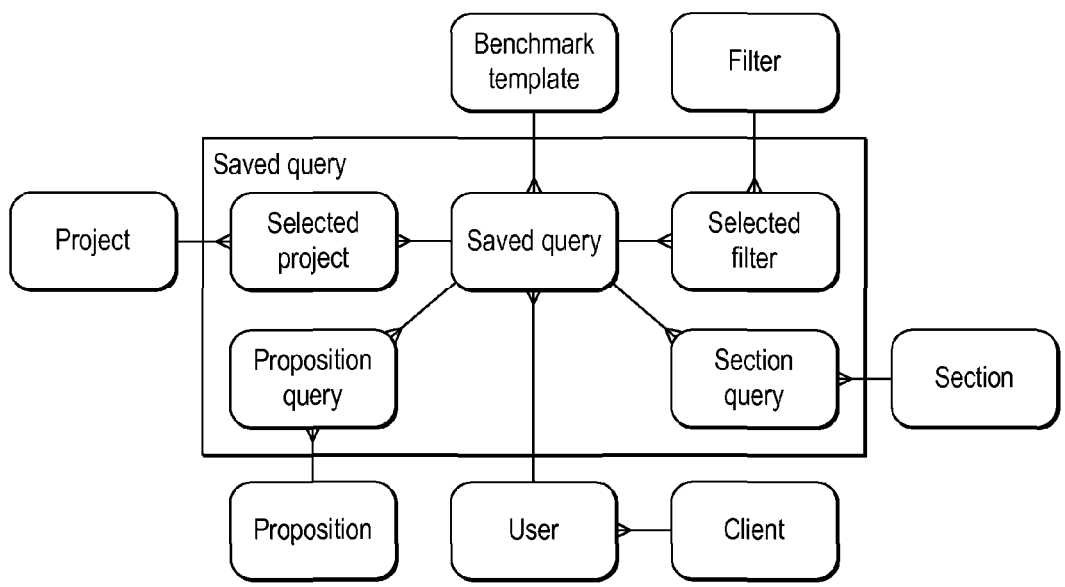
FIG. 50 shows the elements in the entity model elements that relate to the 'Saved Query' section.

FIG. 50 shows the elements in the entity model elements that relate to the 'Saved Query' section. Query constructed using the Analytics system and saved.

| Attribute | Description |
| --- | --- |
| ID | Unique system ID |
| Name | Unique Name entered by user.<br>Null for the draft query. The draft query will be used for work in progress (the current query being updated in the Build Benchmark tab). |
| Token | Random number (in range 1 to 1,000,000,000).<br>Automatically created when the row is created.<br>Used in Benchmark URLs to allow public access to a single benchmark chart while protecting other charts, e.g. http://.com/Benchmark.aspx?ID=56&TOKEN=3646984 |
| Benchmark Template ID | Link to allowable Benchmark Template.<br>Normally mandatory but can be null for draft query. |
| User ID | Link to User who created the query (owning user) |
| Access Level | 0 - Private (for user only)<br>1 - Group (for all users linked to owning user's client<br>2 - Common (visible/usable by everyone)<br>Draft queries always have access set to 0 (private). |
| Draft Original ID | Set only for draft queries when an existing query is being edited. |
| Created date | Set when query is created, or when draft query is initialised. |
| Updated date | Set when query is updated |
| Chart xml | Cache of chart xml (data for chart control).<br>When a request is made to render a chart, use this data if available. If not retrieve data from database using and save a copy in this field.<br>This cache is cleared when related data is updated. |
| Chart xml date | Date chart xml is populated |
| Content xml | Cache of content xml (links, text, images, and pop up messages displayed with benchmark charts).<br>When a request is made to render a chart, use this data if available. If not retrieve data from database using and save a copy in this field.<br>This cache is cleared when related data is updated. |
| Content xml date | Date content xml is populated |
| Feature | Yes/No<br>Highlight Query Name when displayed on TA Home Page. |

May need an option to lock XML

Selected Filter

Filters associated with a saved query, e.g. Germany, France; Marketing and Finance.
For Filters of the same data Type use OR condition, e.g. Germany or France.
For Filters of different Data Types use AND condition, e.g. (Germany or France) and (Marketing or Finance).
A filter with the same data type as the owning Project Template can be assigned to a bar on the top level chart (to show comparisons between different data sets). For example, to show a comparison between Marketing and Finance, assign Marketing to bar 0 and Finance to bar 1.

| Attribute | Description |
| --- | --- |
| ID | Unique system ID |
| Saved Query ID | Link to saved Query |
| Filter ID | Link to Filter |
| Bar | Integer 0, 1, 2 |

Selected Project
  Projects associated with a saved query.

| Attribute | Description |
| --- | --- |
| ID | Unique system ID |
| Saved Query ID | Link to saved Query |
| Filter ID | Link to Filter |

Proposition Query
  Propositions associated with a saved query.
  Only for saved universal queries. Queries are grouped into Propositions, and users have the option to search for queries (benchmarks) for a specified proposition.

| Attribute | Description |
| --- | --- |
| ID | Unique system ID |
| Saved Query ID | Link to saved Query |
| Proposition ID | Link to Proposition |

Section Query
  Section associated with a saved query.
  Only for saved universal queries. Queries are grouped into Sections, and universal Queries (benchmarks) displayed in Analytics are grouped into sections.

| Attribute | Description |
| --- | --- |
| ID | Unique system ID |
| Saved Query ID | Link to saved Query |
| Proposition ID | Link to Proposition |

Figure 51:
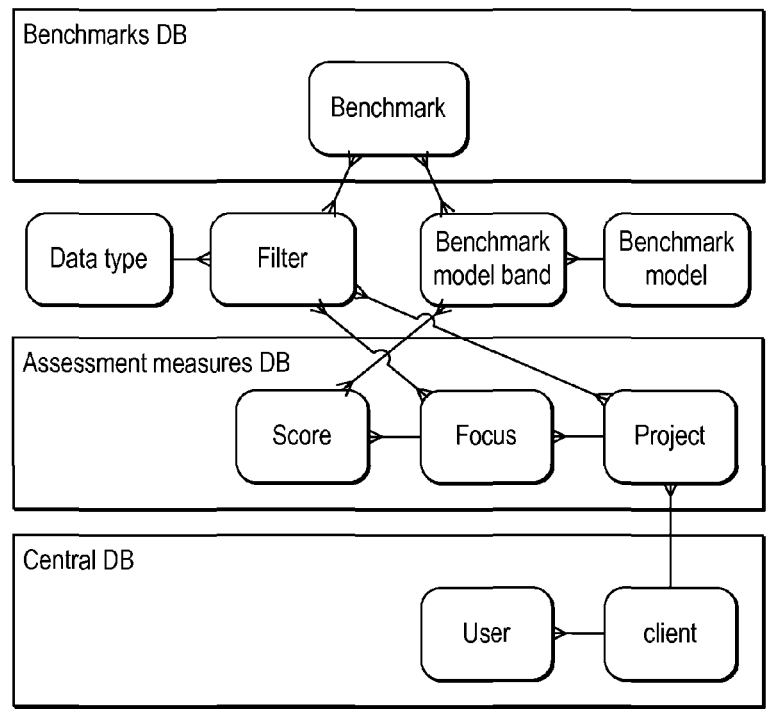
FIG. 51 shows the elements in the entity model elements that relate to different databases.

FIG. 51 shows the elements in the entity model elements that relate to different databases.

Benchmark
  This entity depends on the data structure. It is linked to Benchmark Model bands and Filters.

| Attribute | Description |
| --- | --- |
| Active | Yes/No |
| Further Attributes | Further Attributes are necessary depending on the data structure |

Client
  Central Client

| Attribute | Description |
| --- | --- |
| ID | Unique system ID |
| Analytics Access | True/False. Default False. |
| Source System | Source system (Assessment measures source) |
| Source Client ID | Link to Client on source system |
| Analytics Service | Standard (Common Benchmarks only) Premium (Can generate new queries with own data from Assessment measures database) |

Selection criteria (to be defined. to include data from a variety of measures sources).

User
  Central User

| Attribute | Description |
| --- | --- |
| Analytics Access | True/False. Default False. |
| Further Attributes | Further Attributes are necessary depending on the data structure |

Project

| Attribute | Description |
| --- | --- |
| ID | Unique system ID |
| Source Project ID | Link to project on source system |
| Active | Yes/No |

Selection criteria (may include Firmographics)

Focus

| Attribute | Description |
| --- | --- |
| ID | Unique system ID |
| Source Project ID | Link to project on source system |
| Active | Yes/No |

Selection criteria (may include Demographics).
Must correspond with data held on Benchmark.
May include:
Offer made (Yes/No)
Offer accepted (Yes/No)
Employee Quality Measure - for instance length of service Score

| Attribute | Description |
| --- | --- |
| ID | Unique system ID |

Scores to be defined but expected to contain a scale tag and score value (band)

Figure 52:
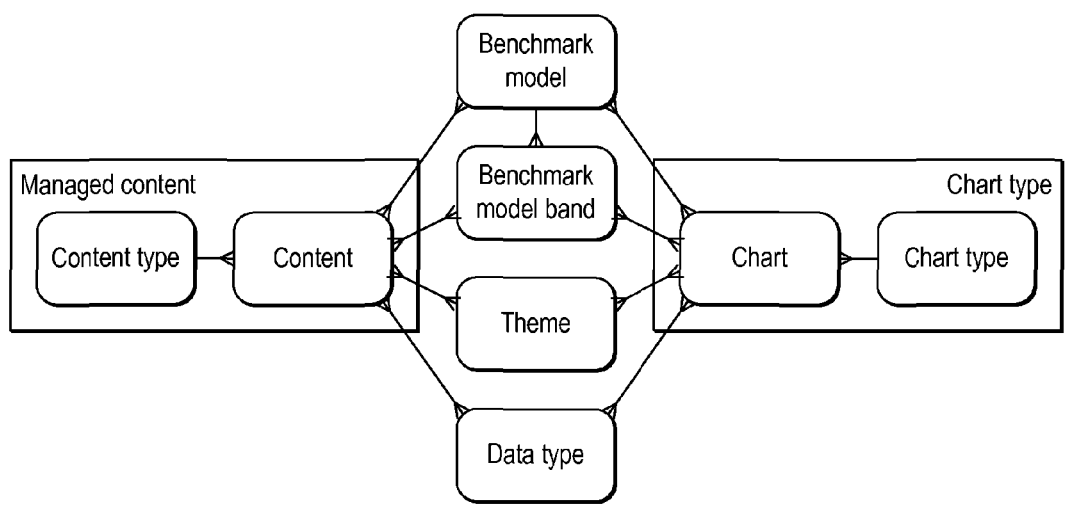
FIG. 52 shows the elements in the entity model elements that relate to content and chart.

FIG. 52 shows the elements in the entity model elements that relate to content and chart.

Content Type
  Type of content, e.g. Pop-u on band.

| Attribute | Description |
| --- | --- |
| ID | Unique system ID |
| Name | Name. |

Content
  Information to be displayed for a band. May be limited to a specific Theme and/or Data Type, e.g. "Employees in this category prove to be 20% more effective"

| Attribute | Description |
| --- | --- |
| ID | Unique system ID |
| Benchmark Model ID | Link to Benchmark Model. May be null (corresponding to all scales) |
| Benchmark Model Band ID | Link to Benchmark Model Band Type. May be null (corresponding to all bands) |
| Data Type ID | Link to Data Type. May be null (corresponding to all data types) |
| Theme ID | Link to Theme. May be null (corresponding to all client interests. |

-continued

| Attribute | Description |
|---|---|
| Content Type ID | Link to Message Type |
| Content Data | Content to be displayed. |

Format Data

Above structure allows one or all benchmark models, bands, data types, and themes to be linked. If one contact row links to several parent entities then an intermediary table is required.

May need conditional content, e.g. when a value is greater than n then use "abc".

May need an option to limit content to Assessment Measures or Benchmark data.

Chart Type

Type of chart (graph), e.g. Pie Chart 1, Bar Chart 3.

| Attribute | Description |
|---|---|
| ID | Unique system ID |
| Name | Name. |

Chart meta data

Chart

Allowable chart type for specific query, e.g. Bar Chart 1 for Geography and Person Risk.

| Attribute | Description |
|---|---|
| ID | Unique system ID |
| Benchmark Model ID | Link to Benchmark Model. May be null (corresponding to all scales) |
| Benchmark Model Band ID | Link to Benchmark Model Band Type. May be null (corresponding to all bands) |
| Data Type ID | Link to Data Type. May be null (corresponding to all data types) |
| Theme ID | Link to Theme. May be null (corresponding to all client interests. |
| Chart Type ID | Link to Chart Type |
| Is Default | Use as default (Initial display) |

Above structure allows one or parents to be linked. If one contact row links to several parent entities then an intermediary table is required.

Proposition

Queries are grouped into Propositions, and users have the option to search for queries (benchmarks) for a specified proposition.

| Attribute | Description |
|---|---|
| ID | Unique system ID |
| Name | Proposition Name |

Section

Queries are grouped into Sections, and universal Queries (benchmarks) displayed in Analytics are grouped into sections.

| Attribute | Description |
|---|---|
| ID | Unique system ID |
| Name | Section Name |

Non Functional Requirements
  Conform to the provider Central standard
Include:
  Archiving of data
  Conform to Central web design styles
  Conform to Central technical architecture
For example:
  Render chart in 5 to 10 seconds
  Display area 980 pixel within Central
  Accessibility requirements
Further Comments
  a) Users may be blocked from selecting data sets of less than 10 rows. The system may block benchmark template selection when there are less than 10 scores in the results. Further action may be defined for when data is changed and the number of scores in a data set (query) drops to below 10. Whenever a bar (in a chart) related to less than 10 scores, a value of 5 may be used.
  b) An option may be provided to clear all (start a new query).
  c) Drafts may be cleared, for example periodically, or when a user logs out. Alternatively a user may always return to current draft.
  d) The following may be returned from queries and saved in chart xml:
    Counts, Percent, averages, . . . .
    One or all
    The user may be provided with an option to select between measures in iframe. Alternatively, each template may relate to a single measurement type (more meaningful and controlled).
  e) A process may be defined to clear data (Benchmark DB and Assessment Measures DB) when over e.g. five years old.
Design Considerations
  FIGS. 53 to 66 show a high-level view of the design considerations for the introduction of the Analytics application into the Central platform, including the overall approach, designs and constraints envisaged at the outset of the project.
  The following abbreviations are used:
    MIS Management Information Systems
    SODA SHL On-Demand Architecture
    ETL Extract Transform and Load
    WCF Windows Communications Framework
  Technology Constraints and Selection
    The implementation needs to fit with the overall Central framework in order to enable integration and ongoing code management. An example of a suitable framework is based on the following components:
      Visual Studio 2010 using a .NET 4 framework target
      .NET Charting component used for charting presentation
      Enterprise Library 4.1 for caching
      SQL Server 2005
      SQL Server Service Broker for feedback updates
  Code Management
    All code is maintained as a branch within a SubVersion installation, accessed via a https link.
  Design Principles
    The following principles will be applied based on balancing the long-term NFRs against rapid implementation of the project:
  Service Layer
    Integration with Analytics data is managed behind a WCF service layer. This allows the solution to meet the security NFRs relating to separation of security contexts and presentation.

In addition, this service is implemented as an IIS-Hosted service on an internal port, allowing for scalability of the deployment.

High-Level Design

Analytics Framework

Figure 53:
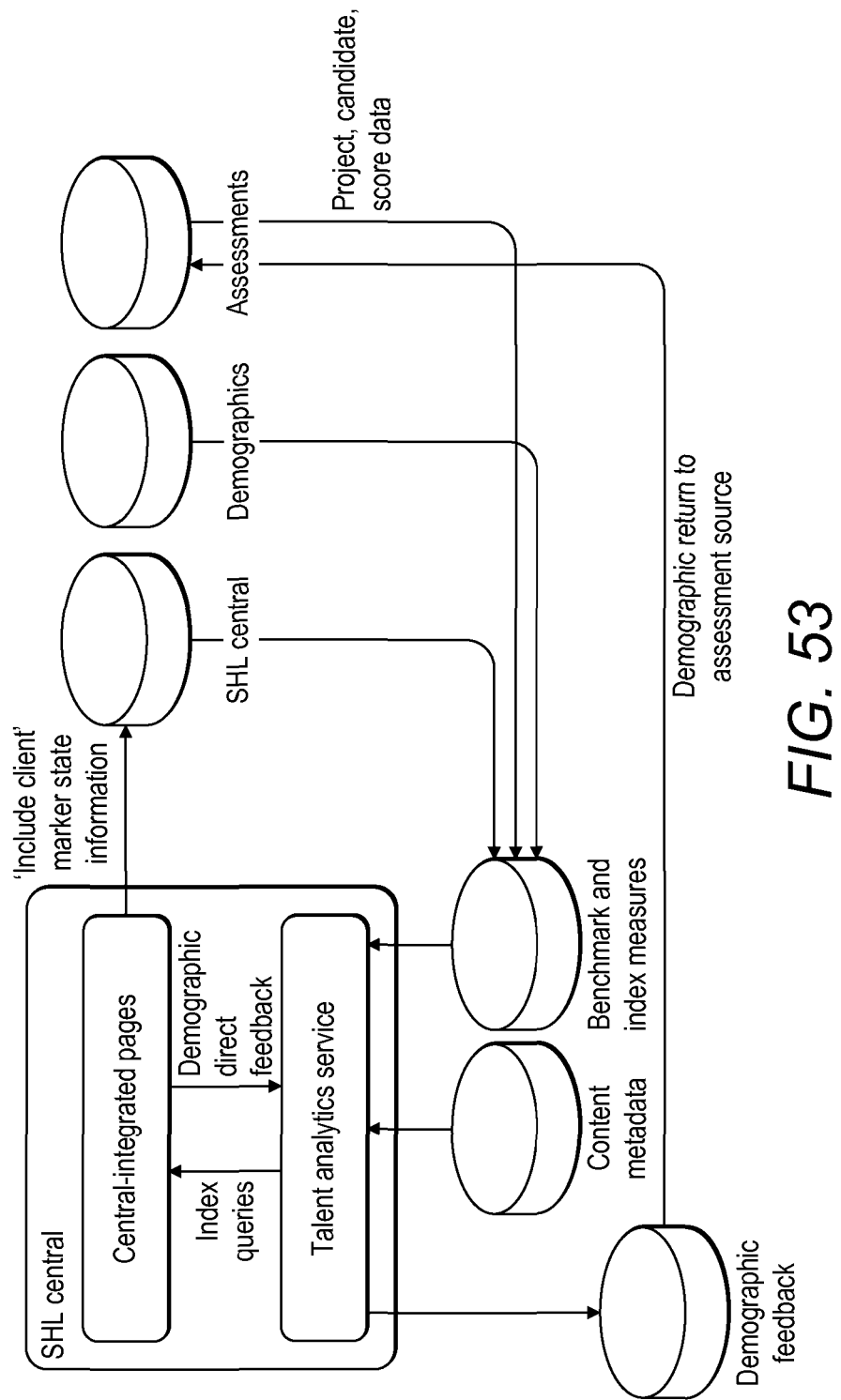
FIGS. 53 to 66 show a high-level view of the design considerations for the introduction of the Analytics application into the Central platform.

FIG. 53 shows how Analytics sits within the Central system but sources its data primarily from external databases. These databases are managed by the MIS team and populated via ETL processes using SODA and other sources—the population of this data is relevant to the overall implementation architecture in that the ETL runs as a daily bulk process and contends with the Analytics services, requiring specific design approaches.

Figure 54:
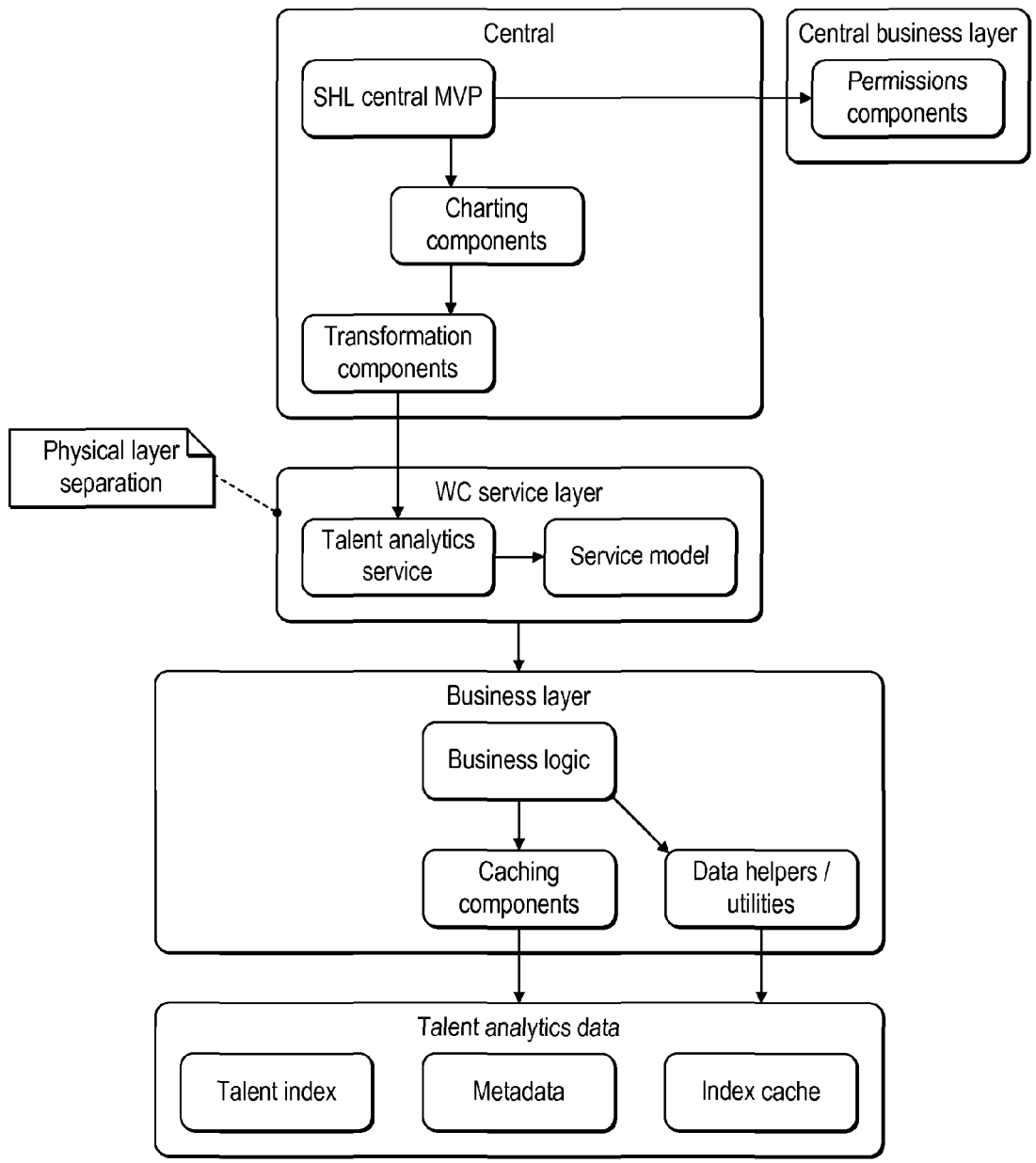

- "Central-integrated pages" represent the entities used for presentation of Analytics data, the implementation of the charting components, integration with the registration process and other miscellaneous interactions
- "Talent Analytics service" represent the WCF service implementation responsible for data access and transformation of raw data into the business model
- "Benchmark and Index Measures" and "Content Metadata" are the data stores that will contain all information relating to Talent Analytics data output. These are logically separate but may be physically together
- Index Measures are populated via a separate ETL process from various SODA data sources and on the basis of the client being registered within Central
- Demographic feedback updates are sent from Central and merged into the Benchmark and Index Measures Analytics Layers FIG. 54 shows the interaction between the Analytics layers (Central, Central Business Layer, WCF Service Layer and Business Layer) with the Analytics Data.

Exception Handling and Logging

Exception handling and logging is also provided.

Databases

Benchmark and Index Measures

Figure 55:
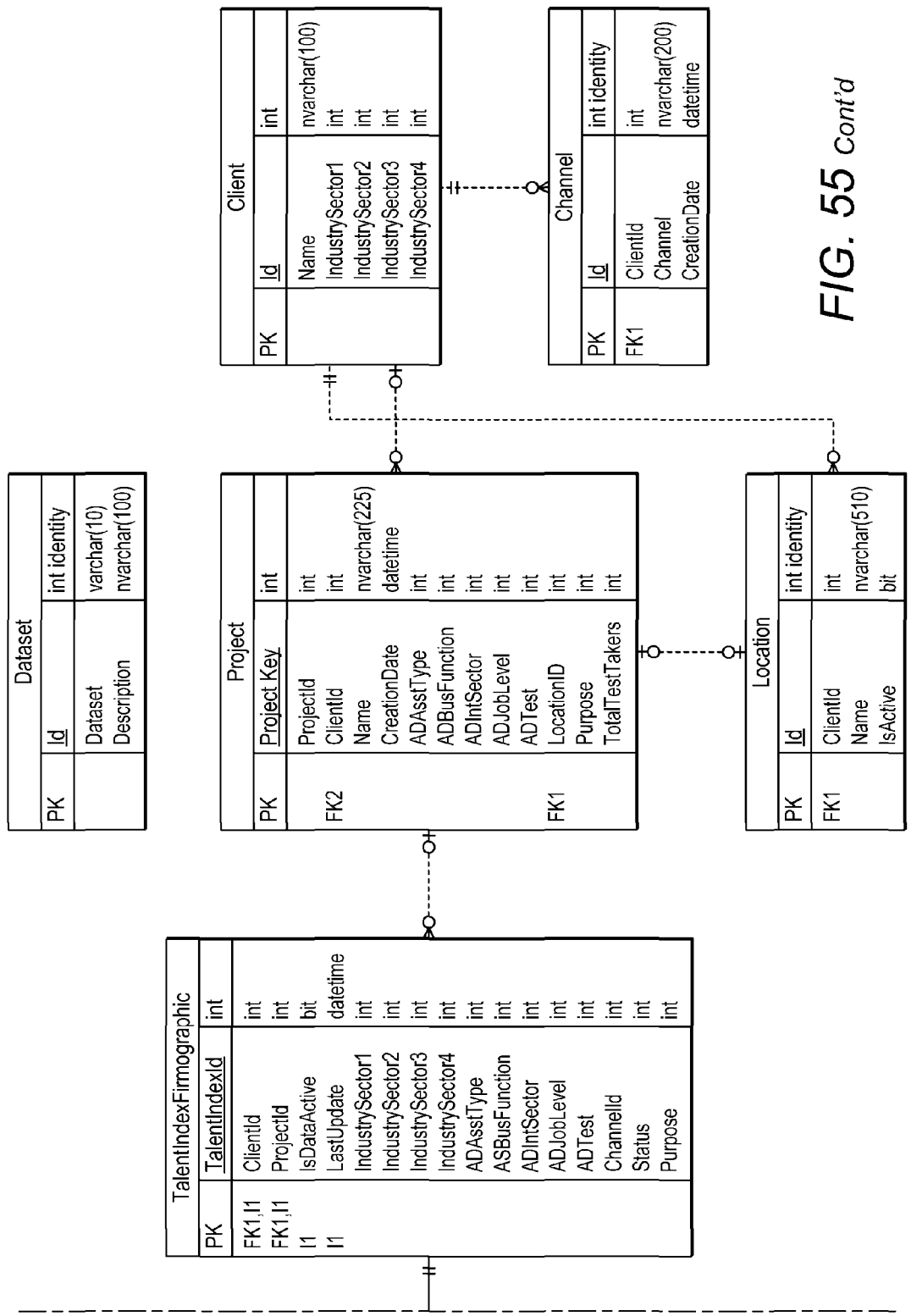

FIG. 55 shows database tables for the Benchmark and index measures.

Figure 56:
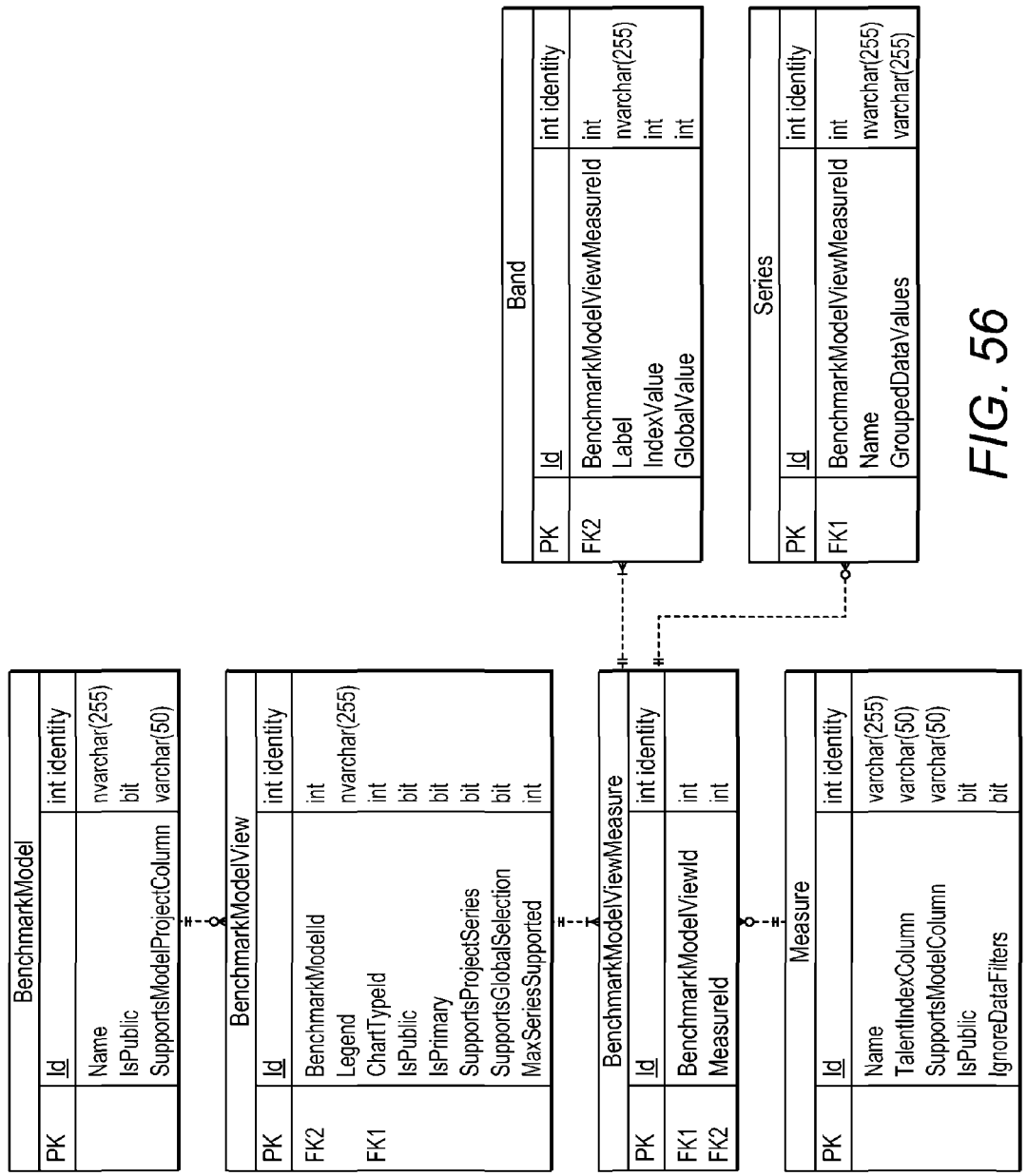

- TalentIndex is the primary de-normalised source for charting data
  - Benchmark data will be client against a pseudo-client id of −1
  - Data is queried dynamically according to the model definition
- Client and Project data is normalised based on the SODA data rules and is used for specific data queries outside of index statistics, e.g. getting a list of all projects
- Dataset details which projects support which underlying data sets, e.g. OPQ
  - Benchmark data is supported by pseudo-projects and datasets to keep this mapping consistent Content Metadata FIG. 56 shows database tables for the Content Metadata.

This is intended to model the business entities defined in the requirements for a Benchmark model and its child entities, and covers various aspects

- DataType and DataTypeValue model a generic lookup for standardised coded values as they appear in TalentIndex, e.g. DataType Id=1 may be column "Country" with supported values 1="France", 2="United Kingdom", etc.
- BenchmarkModel is the primary table for driving on-screen behaviour, each with multiple Views that represent actual displayed charts
- Translations will be held centrally in a loosely keyed mapping table—this will support translation lookups for a variety of entities, e.g. narratives, model names, languages, data types
  - EntityKey will reflect the parent table for translations
  - EntityId will reflect the URN for that table
  - Example: EntityKey="Narrative", EntityId=3 will find the narrative translations for narrative id 3
- Measure represents the physical mapping to the index data for dynamic querying
- Band and Series are optional tables used depending on the type of view being generated Feedback Updates Users of the Analytics system have functionality to be able to provide updates to existing Index, Project and Client data. This data is required to feed back into the main Analytics database and is then used as appropriate for filters and other functionality as if provided by the original ETL process.

Updates can be applied at three levels
- Client-level firmographics
- Project-level firmographics
- Candidate-level firmographics and hire-status fields In principle this is a simple case of updating the corresponding Client, Project and TalentIndex fields, but it is complicated by the competing ETL process for daily updates which will contend with and block access to resources.

To mitigate this all user-provided updates are managed asynchronously through the use of SQL Server Service Broker services. This frees up the user from any time consuming SQL calls while allowing for some level of retry/resilience for blocked database updates.

Figure 57:
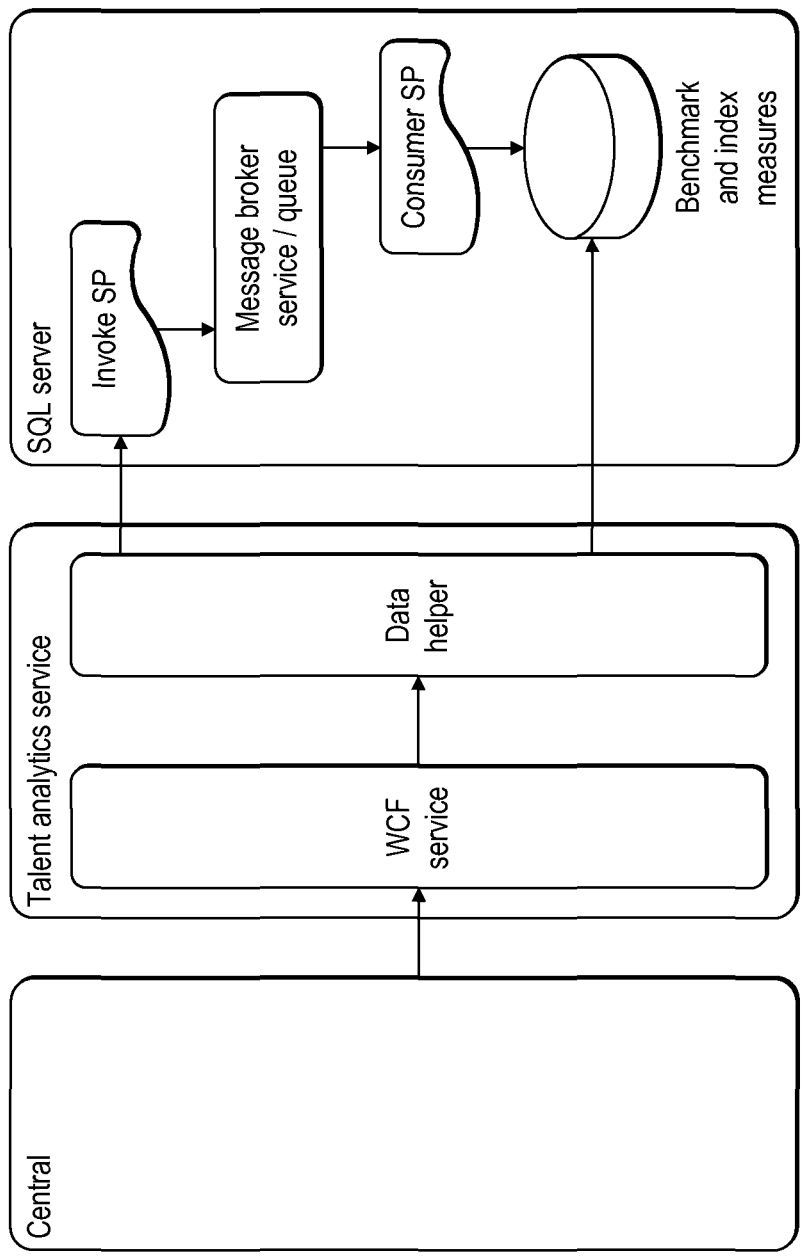

This involves:
- Creation of broker services and underlying queues
- Creation of an invocation stored procedure that will be called from the Talent Analytics service itself and be responsible for submitting the asynchronous request
- Creation of a consuming stored procedure that will consume messages from the queue and perform the actual data updates FIG. 57 shows an overview of the Feedback Updates process.

One set is created for each of the three update areas, resulting in a ClientUpdateService, ProjectUpdateService and an IndexUpdateService.

Messages are structured as XML documents, and are created and consumed using a standard format as below

```
<?xml version="1.0" encoding="utf-8"?>
<updates>
    <data clientid="123" projectid="987" datestamp="201110311218" iteration="1" >
        <update key="AString1" value="AValue"/>
        <update key="AString2" value="AValue"/>
        <update key="AString3" value="AValue"/>
        <update key="AString4" value="AValue"/>
    </data>
</updates>
```

Where
- Multiple <data> nodes may occur
- Id is the project, client or index ix for the updates
- Datestamp is the datetime as YYYYMMDDHHMM
- Iteration is used to track message failure retries (see below)

Key/value pairs represent the updates and each consuming stored procedure is hard-coded to match up keys to fields Service Throughput The number of consuming stored procedures instantiated is configurable during queue creation. Initially this will be set to 1 but no assumption should be made in the implementation over concurrent message processing.

Cascading Updates

Updates to project-level fields will be required to cascade down to the associated index records on the TalentIndex table, e.g. industry sector. This could cover any number of index records so the process needs to be reuse the Service Broker approach in order to mitigate blocking during large updates.

When a project update is performed the procedure will be required to

Update the Project record transactionally
Submit a message to the CandidateUpdateService
Within the consuming Candidate stored procedure
1. Select the top X records for the project where LastDirectFirmographicsUpdate <"Datestamp" from message
2. Transactionally update found records with the fimographics data set set LastDirectFirmographicsUpdate to current datetime
3. If the update succeeds then resubmit the same message to the service
Repeat until the number of records found in 1) is zero
4. If the update fails then
Consume the active message
Submit a new message to the service but increment the Iteration value
Once the iteration value exceeds Y then the message is considered poisoned and is instead moved to the UpdateFailures dead message table for manual processing.

Resource Contention

Figure 58:
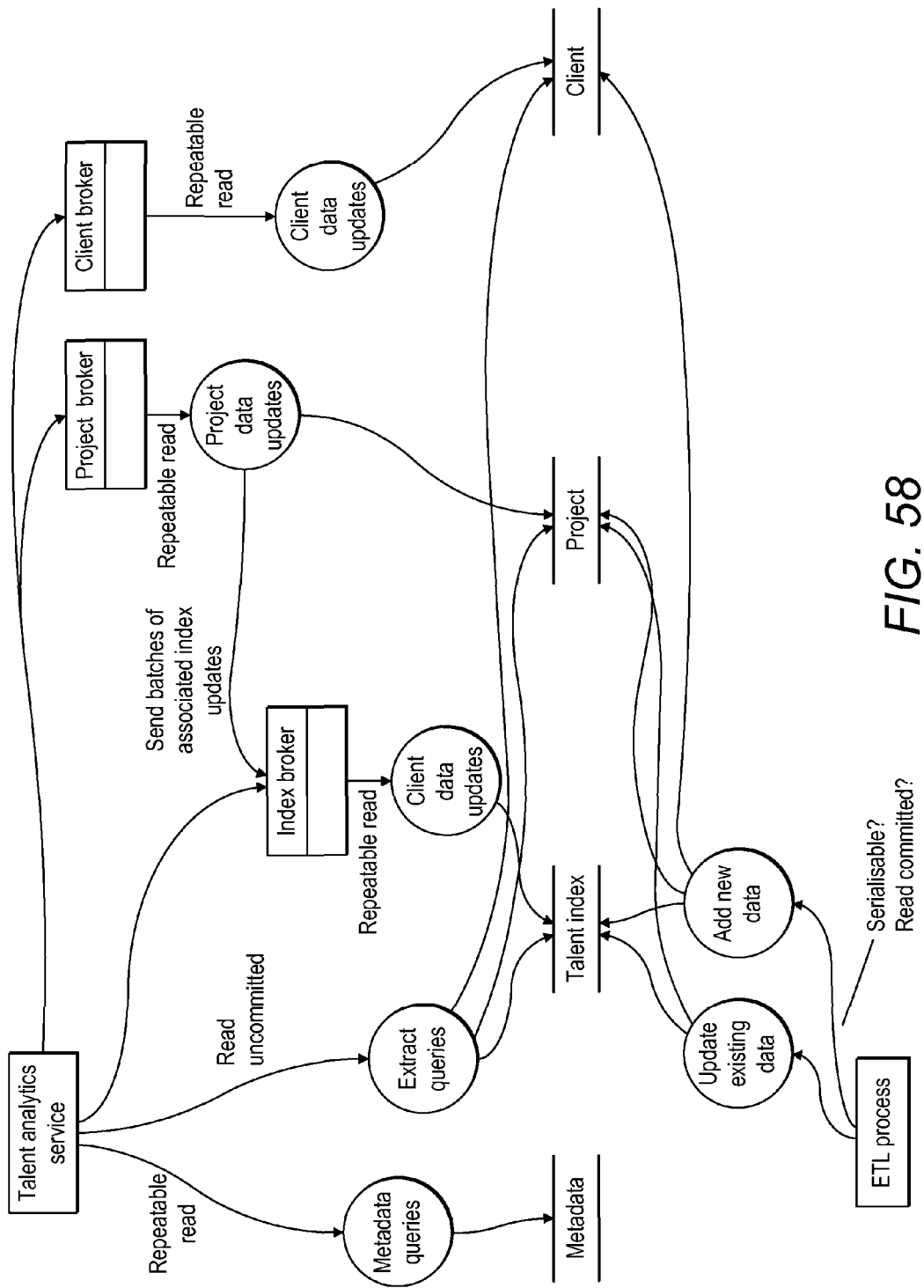

The ETL process is expected to insert and/or update bulk data on a daily basis. As Central is a 24×7 site the risk of resource contention and blocking needs to addressing. In general this will be managed through specific transaction isolation levels against different SQL activities FIG. 58 shows the ETL process in outline.

Extract/benchmark queries against the TalentIndex data will be Read Uncommitted ("Dirty read")
Queries for benchmark metadata will be Repeatable Read
Update queries generated from consuming Service Broker messages will be Repeatable Read while updating the underlying tables
The isolation level for the ETL Process is outside of the scope of this document but is expected to be Read Committed or Serialisable Specific processes are also defined for feedback updates and dealt with in the section Feedback Updates Talent Analytics Service Service Contract This section defines the structure and contents defining the Talent Analytics WCF service implementation.

Service Contract

Figure 59:
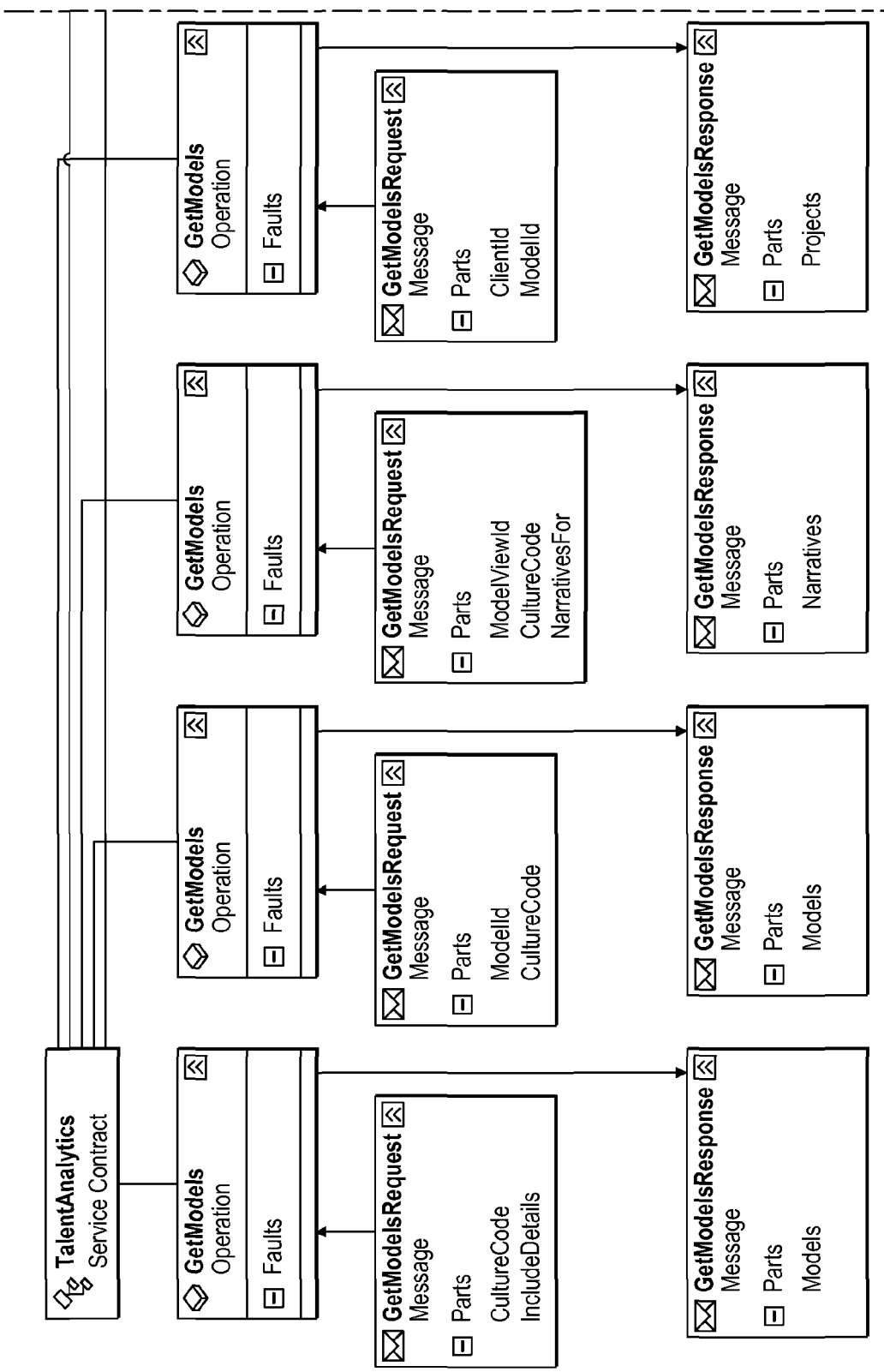
Figure 59:
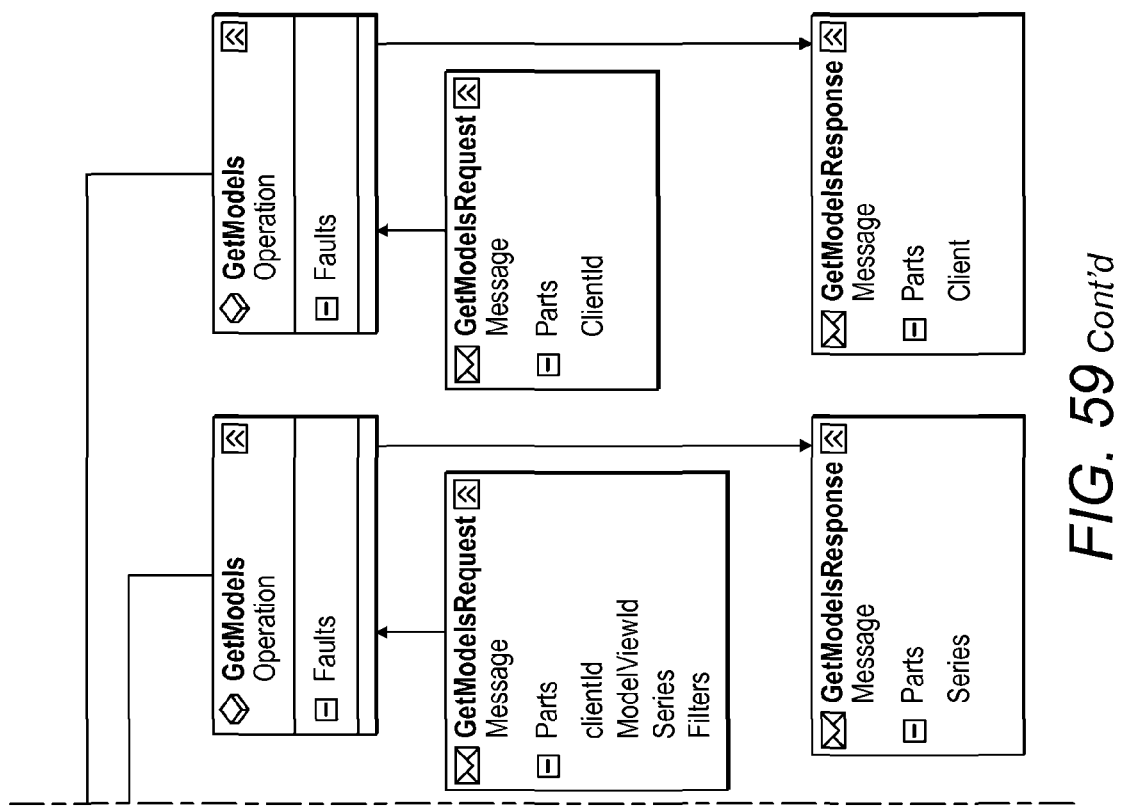

FIG. 59 shows the Service Contract in overview.

Data Contract

Figure 60:
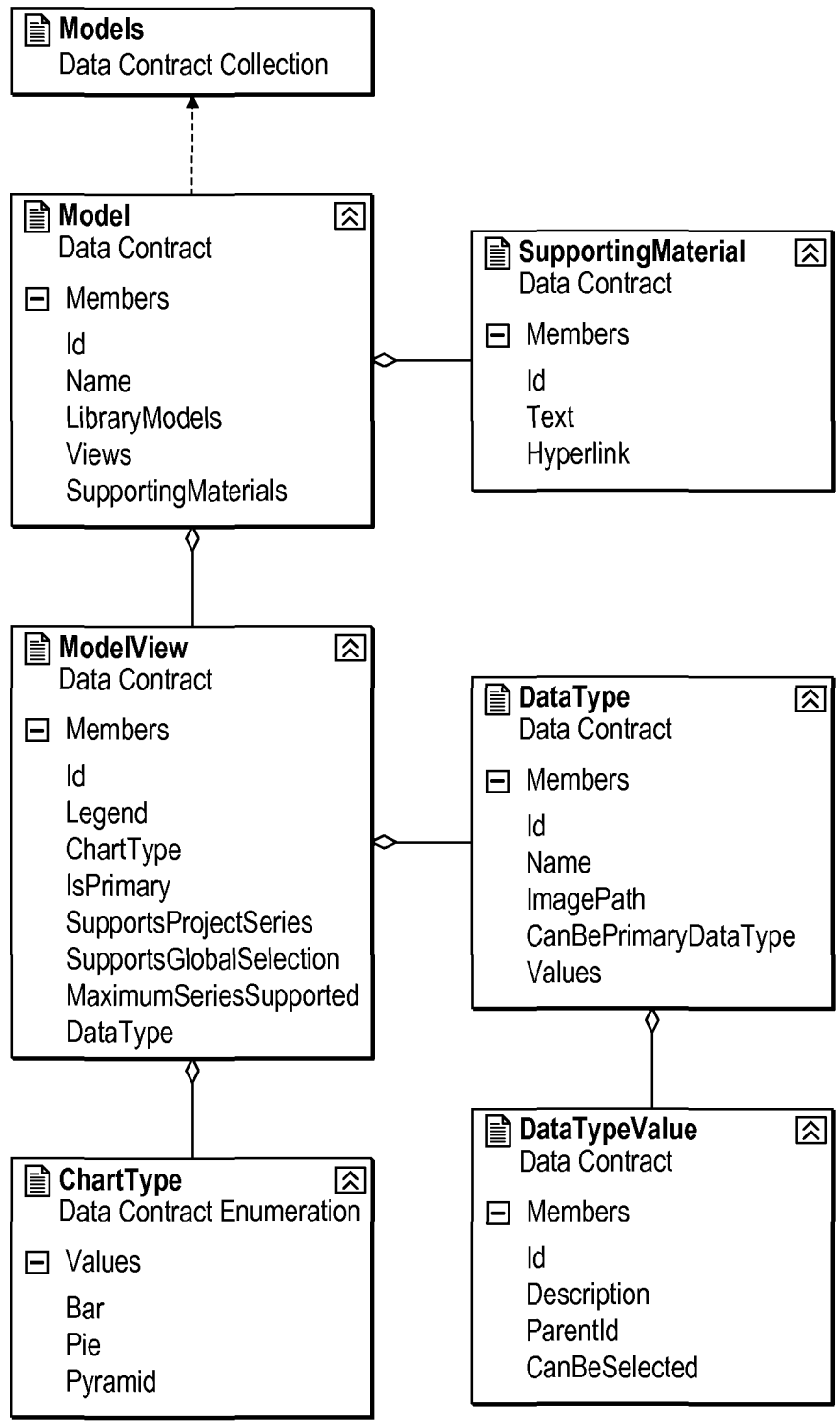
Figure 61:
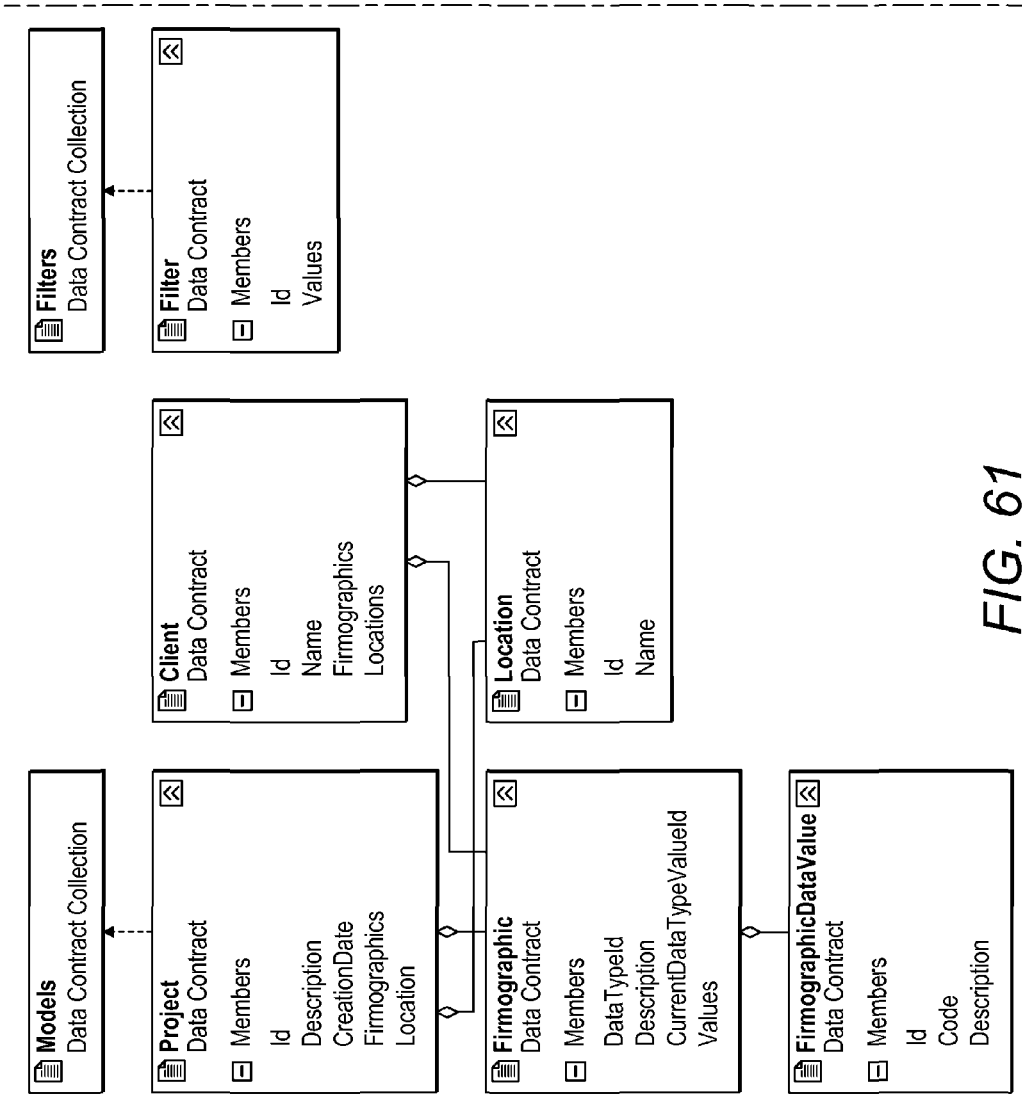
Figure 61:
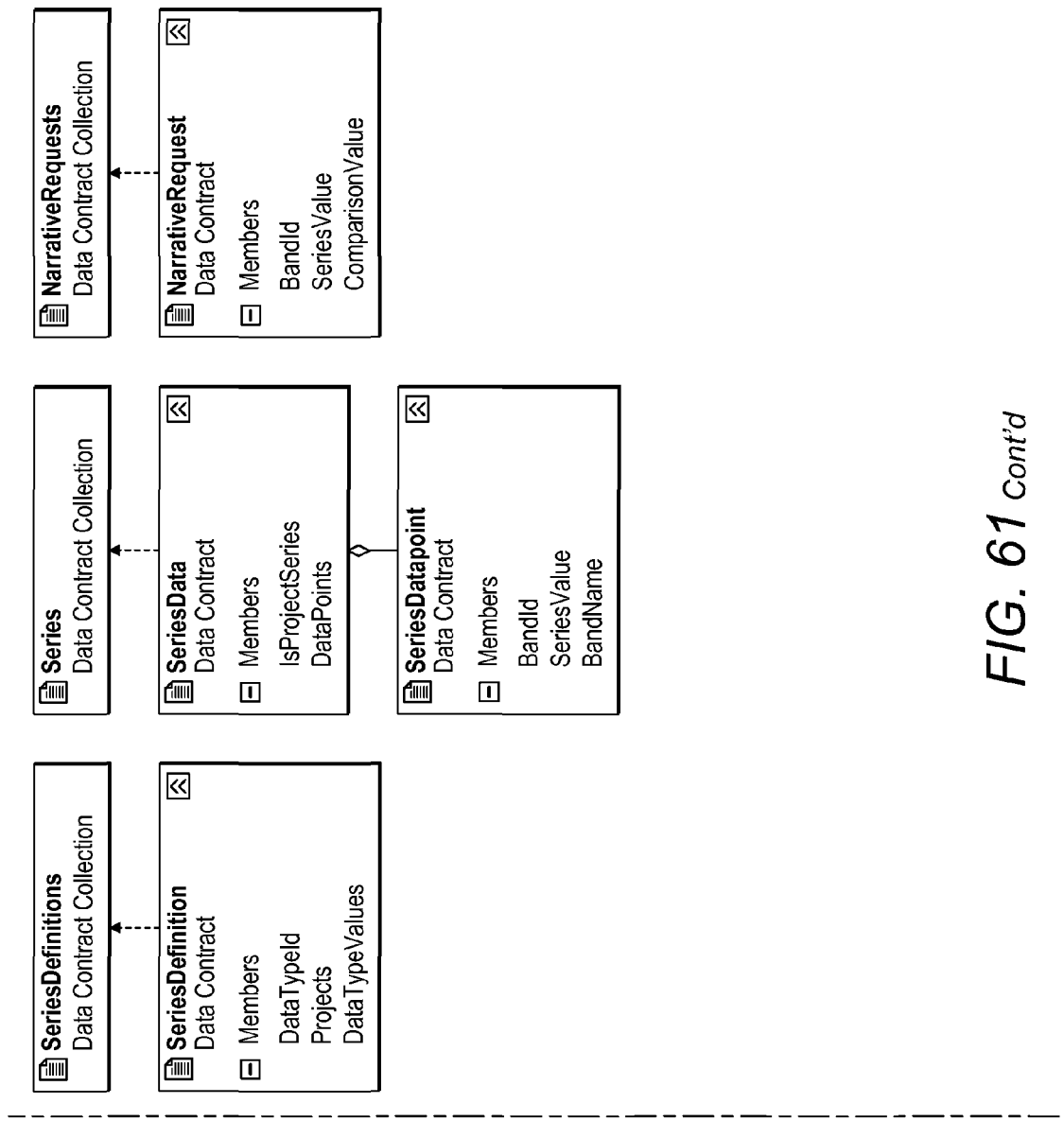

FIGS. 60 and 61 show the Data Contracts in overview.

Sequence Diagrams

Figure 62:
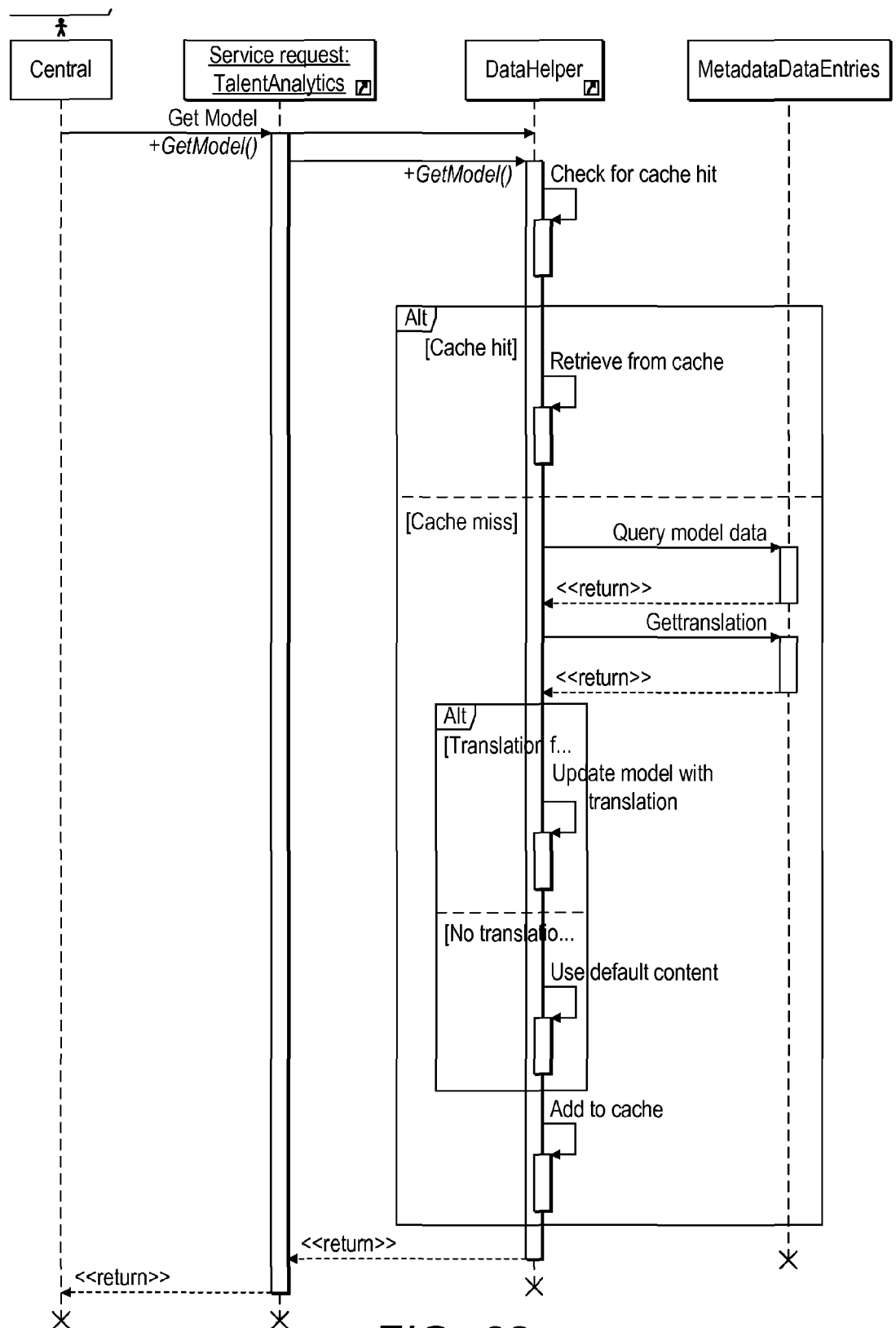
Figure 63:
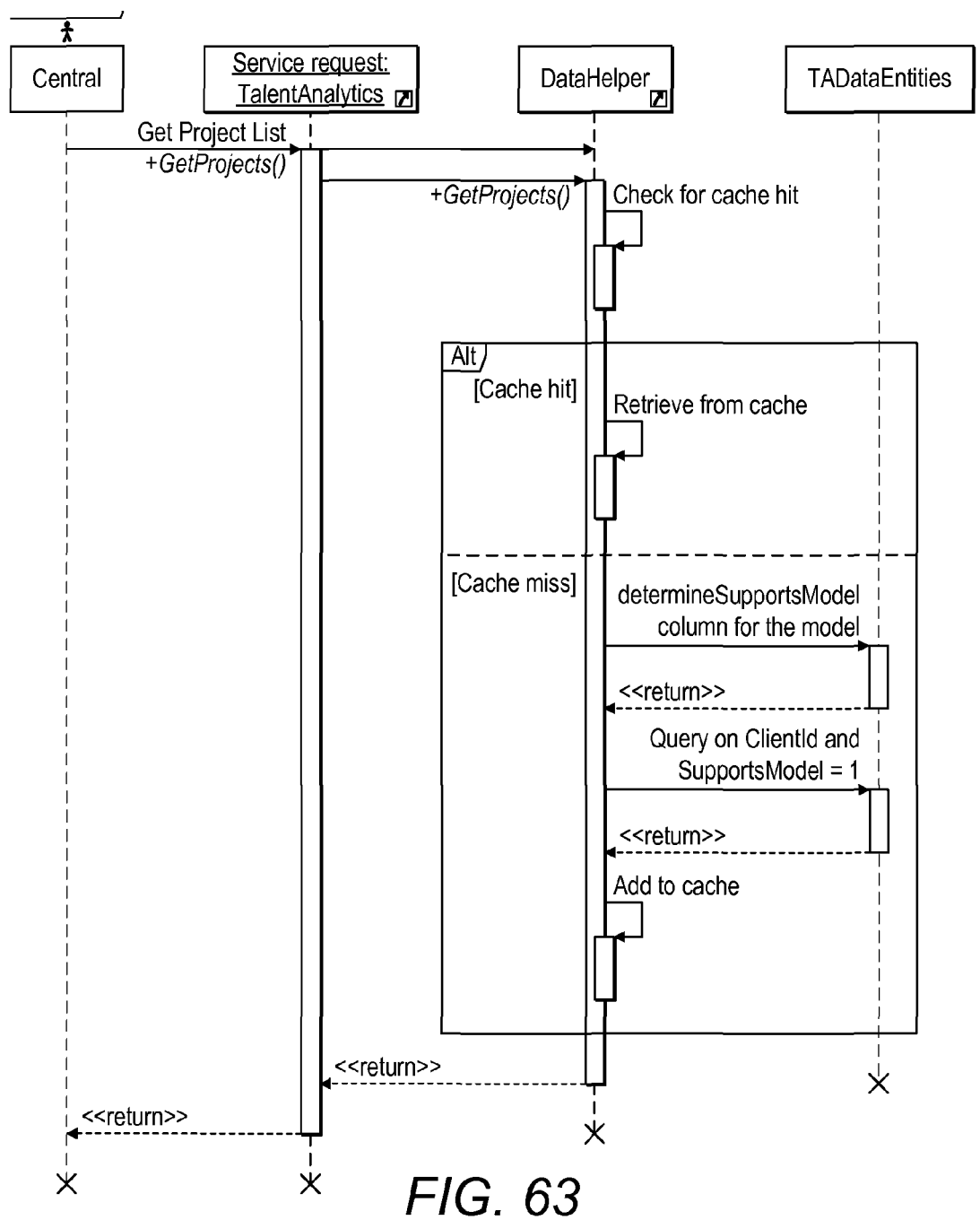

FIGS. 62 and 63 show some sequence diagrams, specifically those for the GetModel and GetProjects sequences. Central to these are the dynamic lookup against the model to find supporting projects—once the column is found a dynamic query is issued against that column for =1.

Caching

Figure 64:
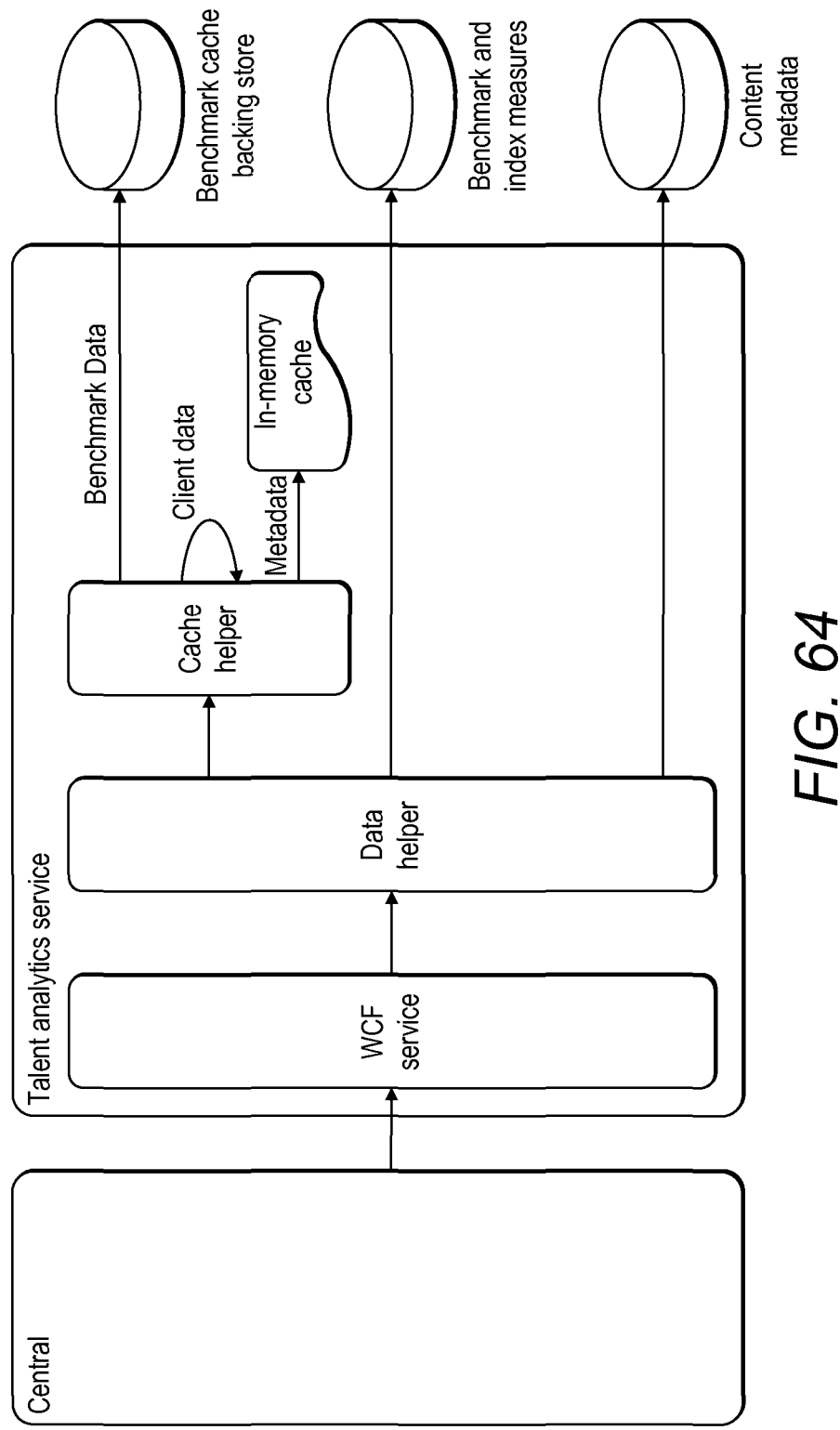

FIG. 64 shows the caching service in overview. Both talent index and metadata are cached by the service in order to improve performance and minimise SQL traffic.

A CacheHelper utility/extension class is implemented in order to encapsulate caching functionality, which in turn implements an Enterprise Library caching framework.

Three data types are identified and are cached separately to give flexibility to the design:

Metadata caching—This is cached as in-memory data and with a configured absolute expiry period (e.g. 24 hours)
Index caching—This is cached using a database backing store as the stored datasets are typically large and to some degree unknown. This will also help with to implement a shared cache across all service nodes by pointing to the same backing store
Client caching—Initially no client data is cached but the cache helper is put in place to enable it. The implementation will simply return a 'not cached' response Caching is implemented via the Enterprise Library caching framework to reuse built-in support for database backing stores and also to introduce some flexibility in the decision-making over how to cache entities. The SQL scripts for the creation of the backing store database are provided as part of the Enterprise Library source code package.

Configuration for the implementation will be as follows, noting the three separate cache manager entries for the three caching types and the connection string to the SQL backing store.

```
<configSections>
    <section name="cachingConfiguration"
type="Microsoft.Practices.EnterpriseLibrary.Caching.Configuration.CacheManagerSetting
s, Microsoft.Practices.EnterpriseLibrary.Caching, Version=5.0.414.0, Culture=neutral,
PublicKeyToken=31bf3856ad364e35" requirePermission="true" />
</configSections>
<connectionStrings>
    <add name="TABenchmarkCacheBackingStore" connectionString="Integrated
Security=SSPI;Persist Security Info=False;Initial Catalog=BackingStore;Data Source=."
        providerName="System.Data.SqlClient" />
</connectionStrings>
<cachingConfiguration defaultCacheManager="BackingStore">
    <cacheManagers>
        <add name="MetadataCache"
type="Microsoft.Practices.EnterpriseLibrary.Caching.CacheManager,
Microsoft.Practices.EnterpriseLibrary.Caching, Version=5.0.414.0, Culture=neutral,
PublicKeyToken=31bf3856ad364e35"
            expirationPollFrequencyInSeconds="60"
```

```
maximumElementsInCacheBeforeScavenging="1000"
            numberToRemoveWhenScavenging="10" backingStoreName="NullBackingStore"
/>
            <add name="ClientCache"
type="Microsoft.Practices.EnterpriseLibrary.Caching.CacheManager,
Microsoft.Practices.EnterpriseLibrary.Caching, Version=5.0.414.0, Culture=neutral,
PublicKeyToken=31bf3856ad364e35"
            expirationPollFrequencyInSeconds="60"
maximumElementsInCacheBeforeScavenging="1000"
            numberToRemoveWhenScavenging="10" backingStoreName="NullBackingStore"
/>
            <add name="BenchmarkCache"
type="Microsoft.Practices.EnterpriseLibrary.Caching.CacheManager,
Microsoft.Practices.EnterpriseLibrary.Caching, Version=5.0.414.0, Culture=neutral,
PublicKeyToken=31bf3856ad364e35"
            expirationPollFrequencyInSeconds="60"
maximumElementsInCacheBeforeScavenging="1000"
            numberToRemoveWhenScavenging="10"
backingStoreName="BenchmarkCacheStorage" />
        </cacheManagers>
    <backingStores>
        <add name="BenchmarkCacheStorage"
type="Microsoft.Practices.EnterpriseLibrary.Caching.Database.DataBackingStore,
Microsoft.Practices.EnterpriseLibrary.Caching.Database, Version=5.0.414.0,
Culture=neutral, PublicKeyToken=31bf3856ad364e35"
            encryptionProviderName=""
databaseInstanceName="TABenchmarkCacheBackingStore"
            partitionName="Benchmark" />
        <add
type="Microsoft.Practices.EnterpriseLibrary.Caching.BackingStoreImplementations.NullB
ackingStore, Microsoft.Practices.EnterpriseLibrary.Caching, Version=5.0.414.0,
Culture=neutral, PublicKeyToken=31bf3856ad364e35"
            name="NullBackingStore" />
    </backingStores>
</cachingConfiguration>
```

Class Design

Figure 65:
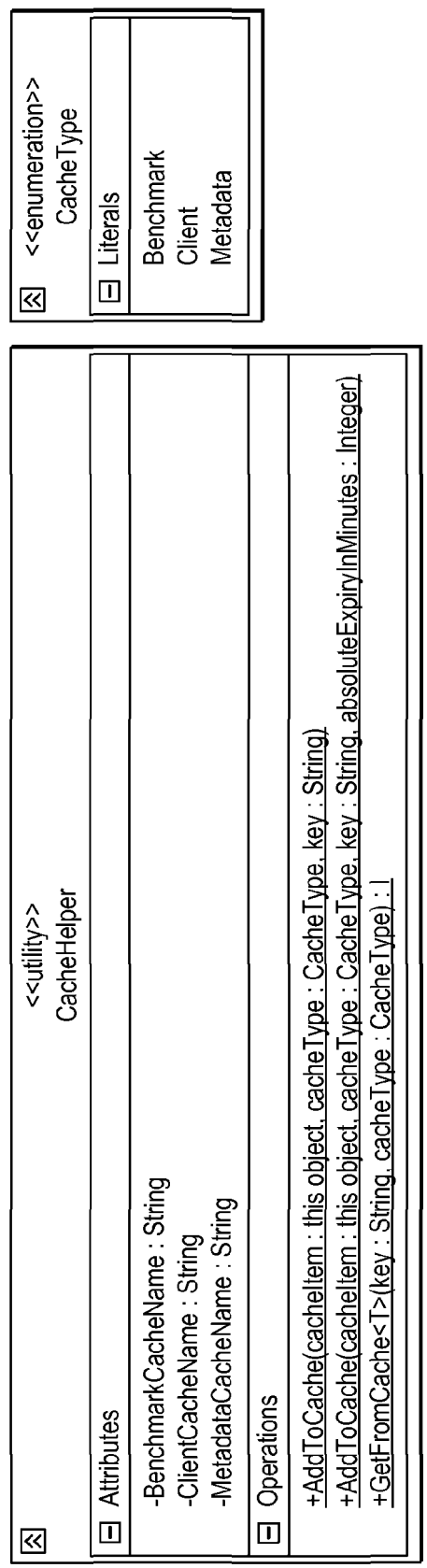

FIG. 65 shows an example of a suitable class design for the caching implementation.

An example of suitable implementation code is as follows:

```
using Microsoft.Practices.EnterpriseLibrary.Caching;
using Microsoft.Practices.EnterpriseLibrary.Caching.Expirations;
public enum CacheType { Metadata, Benchmark, Client }
public static class CacheExtensions
{
    private const string MetadataCacheName = "MetadataCache";
    private const string BenchmarkCacheName =
"BenchmarkCache";
    private const string ClientCacheName = "ClientCache";
    public static void AddToCache(this object
cacheItem, CacheType cacheType, string key)
    {
        cacheItem.AddToCache(cacheType, key, 0);
    }
    public static void AddToCache(this object cacheItem,
CacheType cacheType, string key, int absoluteExpiryInMinutes)
    {
        string cacheName;
        switch (cacheType)
        {
            case CacheType.Metadata:
                cacheName = MetadataCacheName;
                break;
            case CacheType.Benchmark:
                cacheName = BenchmarkCacheName;
                break;
            case CacheType.Client:
                cacheName = ClientCacheName;
                break;
            default:
                throw new ArgumentOutOfRangeException( );
        }
        var cacheManager =
        CacheFactory.GetCacheManager(cacheName);
        if (absoluteExpiryInMinutes != 0)
        {
            var absoluteTime = new
AbsoluteTime(TimeSpan.FromMinutes(absoluteExpiryInMinutes));
            cacheManager.Add(key, cacheItem,
CacheItemPriority.Normal, null, absoluteTime);
        }
        else
        {
            cacheManager.Add(key, cacheItem);
        }
    }
    public static T GetFromCache<T>(CacheType cacheType,
string key)
    {
        string cacheName;
        switch (cacheType)
        {
            case CacheType.Metadata:
                cacheName = MetadataCacheName;
                break;
            case CacheType.Benchmark:
                cacheName = BenchmarkCacheName;
                break;
            case CacheType.Client:
                cacheName = ClientCacheName;
                break;
            default:
                throw new ArgumentOutOfRangeException( );
        }
        var cacheManager =
        CacheFactory.GetCacheManager(cacheName);
        return (T)cacheManager.GetData(key);
    }
}
```

Caching Keys and Expiry

Cached entities are keyed differently depending on their type.

In one example, metadata is held as one or more Benchstrength objects, and so the key is simply the URN of the benchstrength. Each cached entity is cached on a 24 hour basis, configurable at the service level.

Index data is held differently as the actual data being cached depends on usage and once cached will be held for the longer period of time.

Each 'global' query for benchmark data is cached for reuse by other users, and is called upon frequently as most charting users use these for comparison. This data is held speculatively for an open period of time in order to avoid rereading of the raw benchmark data.

The key for this type of data is built as a composite of the id values used for the initial query, in the format <data type id>|<filter id>;<filter value>

For example, if global data is queried with series by industry sector (data type id=1) and filtered by geography (id=3)="Europe" (id=5), then the composite key would be "1|3=5;". Where multiple filters are applied these would be appended accordingly.

If global data is queried for no series split (no data type id) then this would be keyed as "|3=5"

In some embodiments, no intelligence is used at this stage to cater for filters being applied in separate orders.

ETL Workflow

Figure 66:
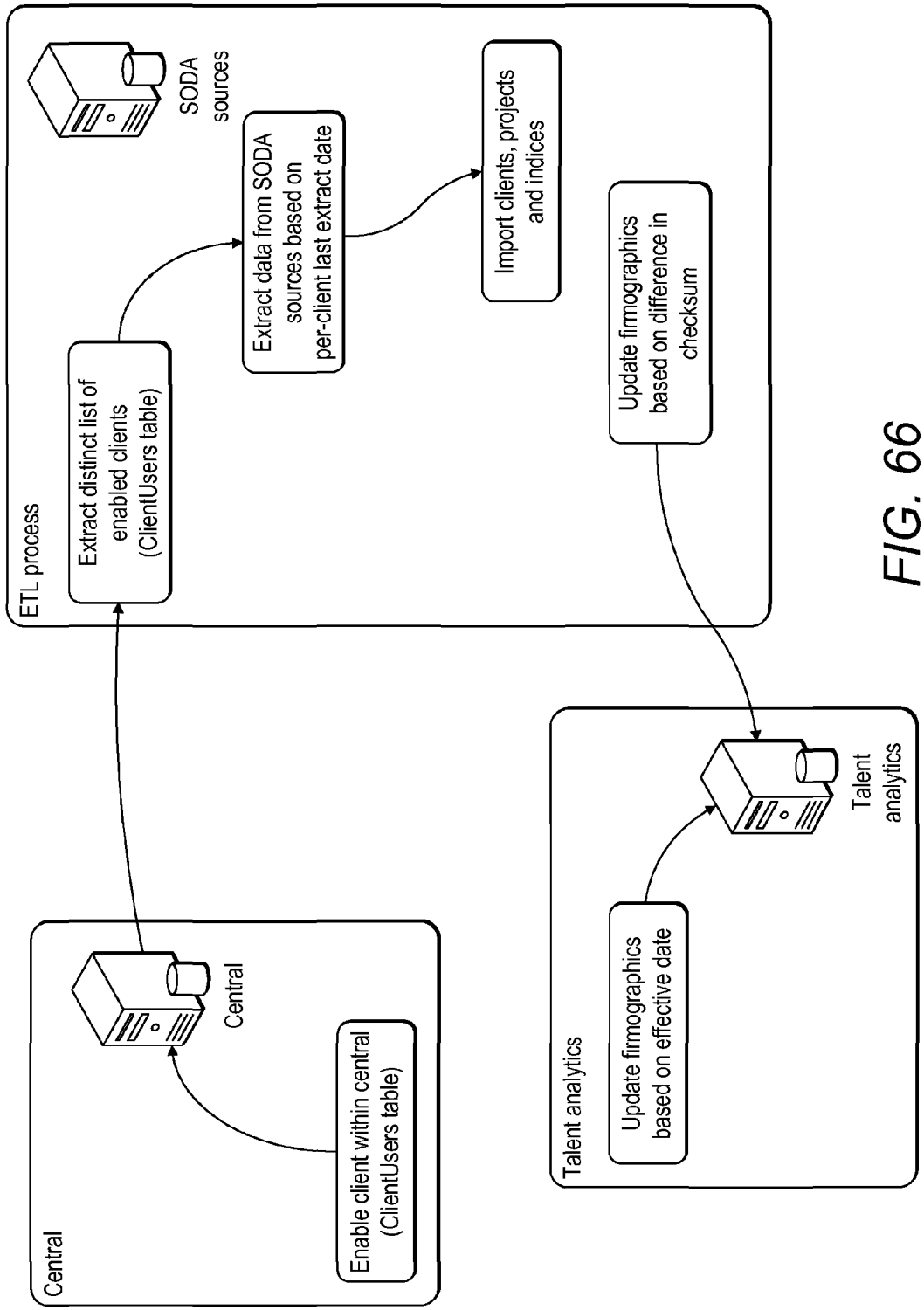

FIG. 66 shows an example of ETL workflow.

There are several important points to be observed:

Central maintains the list of allowed and enabled clients for Talent Analytics—This data needs to be querying as the driving dataset for the ETL process. Where new clients are added a full extract is required, otherwise a partial based on the last extract date for that client Firmographic updates from SODA extracts are based on a checksum comparison against the existing Talent Analytics data. If the value differs then the ETL process will overwrite the data record SODA extracts for project data should take the maximum modified date where firmographic entries are kept in separate data records Firmographic updates directly from within Talent Analytics will check the effective date prior to update. If the timestamp on the update message is earlier than the effective date the update will be aborted Further Features Alternative embodiments may comprise one or more of the following features, in any appropriate combination:

Test taker data updates and improvements
  Recruitment channels
  Employee or not
  When and why did they leave the recruitment process, self selected out, rejected at interview etc.
  Adding filters to support the user cutting data by these classifications as well as the reason for assessment code on project level
An efficient SODA project/candidate data cleaning process pre uploading client data to Talent Analytics
  A process for clean up of client project data where the project structure do not support TA e.g. merge projects, delete candidates
  A process for adding information about test takers and projects in a bulk upload of data—e.g. industry, business function or test taker status information.
Functionality and support for TA annual license model of pricing by talent pools
  US English language version of the Application and essential parts of Central
New SODA instruments added to TA database and score calculations:
  OPQ32r data—Extend DB structure to cope with OPQ32r equated raw scores (may need changes to current OPQ BMs)
  MQ data
  DSI data
  Verify Mechanical comprehension
  Verify Checking
  Verify Calculation
Updates to existing SODA data sets with new annual data
  OPQ32
  Verify Numeric
  Verify Verbal
  Verify Inductive
Add S2P data to TA database and include in benchmarks
  Selected solutions where there are significant enough data sets to create benchmarksb.
  New database fields for solutions scores
  Daily automated data update process for S2P data mirroring the current solution from SODA
Additional benchmarks:
  UCF combined benchmarks for OPQ and Verify scores (and optionally S2P solutions scores)
  Additional Risk benchmarks
  Additional OPQ (and optionally MQ) Sales Model benchmark
  Additional Verify benchmarks for rest of test types in portfolio
    Mechanical
    Checking
    Calculation
  Additional demo/dummy benchmarks for unauthorised users (e.g. cut down version of Competency BM)
  MQ benchmarks
  DSI benchmark
  S2P solutions benchmark
  Custom specific benchmark (e.g. customer's own competency models)
Enhanced graphical displays to be used for additional benchmarks or to change current benchmarks working with bar charts, e.g. heat maps or geographical maps
Further and expanded export functions
  Export to PPT, Word, PDF
Enhanced print function
Enhanced error/warning messages and progress visibility for usability improvements
Administration interface for when creating and maintaining data and the TA benchmarks
  Database updates and management of quarantined data
  Switch on/off filter options as visible to end user (geography, industry, job level and business function)
  Manage minimum data set value (currently 30 test takers) for benchmark displays
Allow custom specific benchmarks to be added to TA and restricted to only that client's users
Advanced user model:
  where different users/level of users can access different sets of benchmarks (the current version only has one access level and all users can access all benchmarks)
  Demo/non restricted access to demo benchmark in TA for unauthorised users
Allow multiple SODA clients to be added to the same TN Central user (it is a 1 to 1 relationship today)

Allow users to set default values for their data in TA, e.g. main industry and reason for assessment.

Additional Clear filters and cancel functions

Further colour/selection combinations on benchmarks and project data

Function to allow user to restructure their groups of projects or candidates inside the application—to create and save their own talent pools Link to help from TA query page Allow for manual cleaned-up project uploads for some clients (quarterly?) rather than automatic ones Allow for different project numbers eg. from 30 to 10

Assorted scalability and performance monitoring/enhancements

Examples of Benchmarks

Examples of Benchmarks include:

Competency

Leadership potential

Ability (including Verbal, Numerical and Inductive Reasoning)

Behavioural Risk

The SHL Competency Benchmark

The SHL Competency Benchmark enables organisations to obtain an overview of the talent they attract and employ, and to identify where they need to invest in talent acquisition, learning/development and succession management programmes.

The SHL Universal Competency Framework

This Competency Benchmark builds on SHL's Universal Competency Framework (UCF). The UCF is based on extensive worldwide scientific research, which examined hundreds of competency models across a wide range of different organisations around the world.

It sets out the key behaviours that drive performance using a standard, proven hierarchy that can be applied to virtually any job at any level in any organisation. It is structured on two main levels, from the 'Great 8' factors, to 20 dimensions linked to those factors.

The 8 factors consist of general categories of behaviours that influence performance across many different jobs, and the 20 dimensions provide a more detailed breakdown of each of the 8 factors, providing a further description of different types of behaviour that impact job performance.

FIG. 67 shows the Universal Competency Framework Great 8 and the benefits they drive.

For each of the Great 8 factors, you can drill down to the dimension level to explore the finer detail that these offer in answering talent questions. Specific views can also be created by mapping an organisation's own competency model to the UCF. Whether they are organisation-wide or role-specific competencies, mapping to the UCF can be overlaid onto Talent Analytics to provide a view of your people and your identified benchmark populations (eg. an external talent pool by industry and geography).

Creating the Competency Benchmark

In developing the Competency Benchmark, we looked at the distribution of scores across more than 1 million assessments conducted between 2006 and 2010 across 37 industry sectors, 30 countries, 31 business functions and 5 job levels. This database will continue to expand as more SHL assessment data is added.

The Benchmark has been calibrated globally, as taking a global view of talent reflects the dynamics of the economic and labour markets in which organisations now operate.

It also provides a flexible lens through which organisations can compare their people and processes to determine actions required to strengthen their talent management. By filtering benchmark populations by geography (several countries can be selected together), industry (several industries can be selected together), business function and job level, you can investigate any number of talent issues in the knowledge that the 'bench strength' views are consistent, reflecting real variations in talent across the populations you choose to benchmark against.

We have defined top talent as the upper quartile (top 25%) range of scores globally on the UCF Great 8 and 20 dimensions. The bench strength views provided by this Benchmark show the proportion of people who fall into the upper quartile range on the factors and dimensions—the higher the proportion, the greater the bench strength.

Case Study

A multinational technology company were undertaking a major change in approach to their markets, product development and engagement with their customer base. This meant a substantial shift in values and key behaviours that will drive achievement of the new business strategy.

They ran a number of assessment programmes and wanted to take a macro view of the data to get an overview of the talent they attract and employ, to identify where they had bench strength to succeed with the change, and where they needed to invest in talent acquisition, learning/development and succession management programmes.

Such an undertaking raised two challenges: how do we benchmark our talent and what do we know of the talent pool in our industry?

SHL Talent Analytics addressed both problems by organising the client's data in a form that presents a clear talent profile, and by giving them a view of what the bench strength of industry talent pool looks like.

Figure 68:
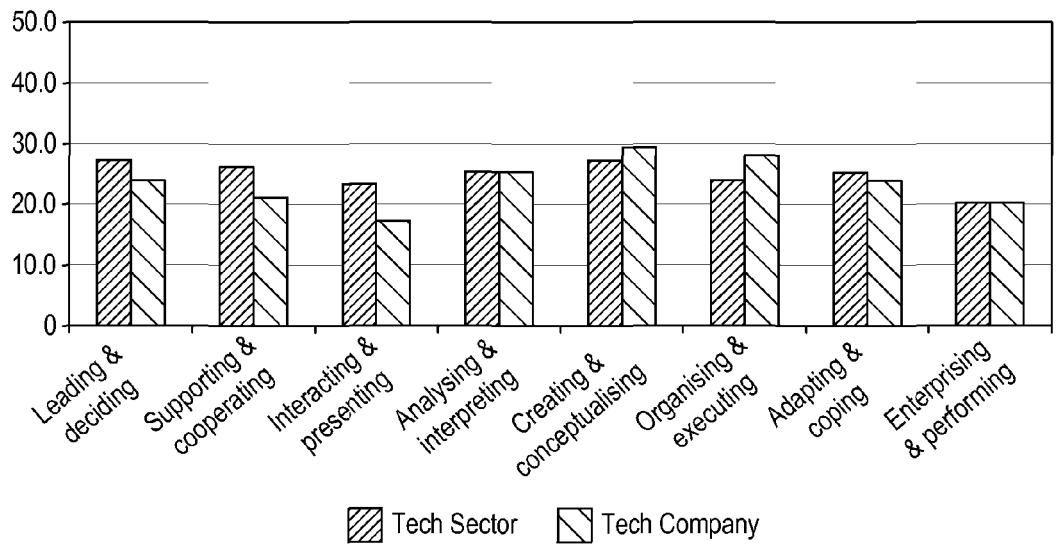
FIG. 68 shows a talent profile.

FIG. 68 shows a talent profile, specifically the talent profile for the company against the technology sector for managers, professionals and graduates. Top talent is defined as those scoring in the top quartile (top 25%) on each of the Great 8 factors. For the industry, you can see the proportions of people qualifying as top talent in each factor, and the client can also see how they stack up against that profile.

Effectively, the Competency Benchmark is used to identify bench strength and areas to address in talent acquisition.

The global view of the technology industry shows bench strength in Leading & Deciding and in Creating & Conceptualising, but lack of bench strength in Enterprising & Performing. We can also see that the company outperformed the sector for Creating & Conceptualising and Organising & Executing, but underperforms the sector for Supporting & Cooperating and Interacting & Presenting.

So how could the company use this insight? A cornerstone of their change was to develop greater engagement with their customer base. To achieve that, a key element of their internal talent management programme was to foster greater engagement across their workforce, as well as reframe their reward and recognition around achievement, where Enterprising & Performing would be a critical driver.

The client saw where they had the appropriate talent and where their talent gaps were. Drilling down by line of business, job levels and geographies enabled them to understand where to invest in terms of targeted learning and development, as well as how to change their performance management processes.

This case study shows how the SHL benchmarks and benchmark populations help to identify how competitive an organisation is in acquiring talent, where variation exists in talent processes and how these insights help identify where to invest to strengthen talent management for an organisation. Talent Analytics can help to identify where potential lies in an organisation and what development needs to focus on to leverage that potential effectively.

While the project for this client was focused on talent acquisition, the analytics also point to where the strongest internal pools of talent are and where the development of analytical skills will deliver the greatest value to the organisation.

Other SHL Benchmarks Available

The SHL Competency Benchmark can be used alongside the SHL Leadership Benchmark to diagnose leadership bench strength and learning/development priorities, and how to strengthen succession planning.

The SHL Ability Benchmarks can also be used to provide detail on the bench strength of cognitive ability supporting specific areas of competency (eg. Interacting & Presenting, Analysing & Interpreting, and Creating & Conceptualising).

The SHL Leadership Potential Benchmark

One of the key issues in effective succession management is identifying clear development needs. In 2011, the Corporate Executive Board (CEB) found that only 43% of country and regional executives had confidence in their successors, while in Asia this dropped to 26%. The study also showed that only 1 in 4 employees had confidence in their employer having the leaders to succeed in the future The SHL Leadership Benchmark builds on the SHL Leadership Model, and provides a benchmark of leadership potential. The Leadership Model takes into account transactional competencies (required to analyse, plan and execute tasks, projects and programmes) and transformational competencies (required to develop new insights and strategies, communicate those insights and strategies effectively to others, and to set out clear goals and motivate others to achieve them).

Creating the Leadership Potential Benchmark

In developing the Leadership Potential Benchmark, we looked at the distribution of scores across more than 1 million assessments conducted between 2006 and 2010 across 37 industry sectors, 30 countries, 31 business functions and 5 job levels. This database will continue to expand as more SHL assessment data is added.

The Benchmark has been calibrated globally, as taking a global view of talent reflects the dynamics of the economic and labour markets in which organisations now operate.

It also provides a flexible lens through which organisations can compare their people and processes to determine actions required to strengthen their talent management. By filtering benchmark populations by geography (several countries can be selected together), industry (several industries can be selected together), business function and job level, you can investigate any number of talent issues in the knowledge that the 'bench strength' views are consistent, reflecting real variations in talent across the populations you choose to benchmark against.

Figure 69:
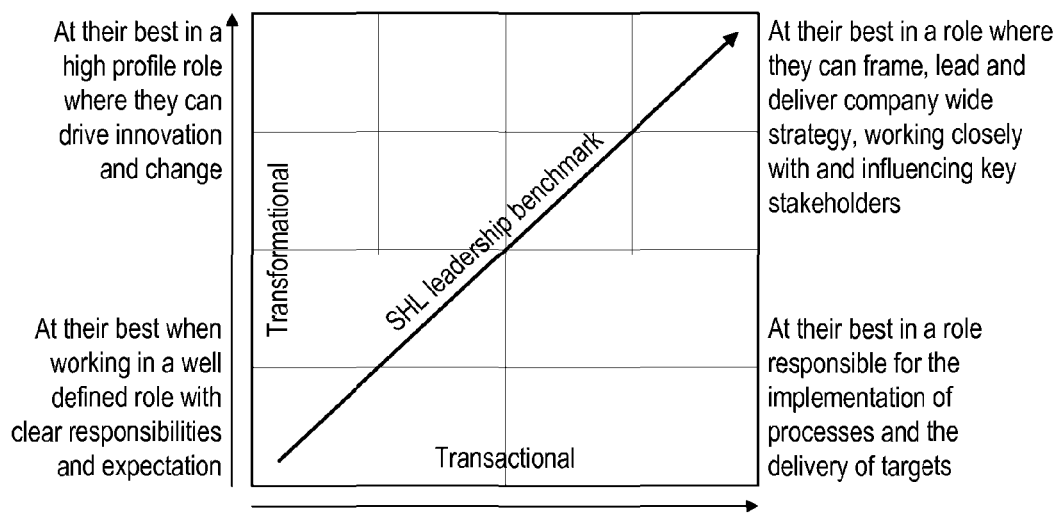
FIG. 69 shows the relationship between the SHL Leadership Potential Benchmark and the SHL Leadership Model.

FIG. 69 shows the relationship between the SHL Leadership Potential Benchmark and the SHL Leadership Model.

Along the horizontal axis, we have the strength of people in terms of transactional competencies that drive the management of processes and delivery against targets. These are competencies that one would expect of operational managers, but are also key competencies underpinning effective performance as a corporate leader.

On the vertical axis, we have the strength of people in terms of transformational competencies that underpin the capacity to drive innovation and change in an organisation. These are competencies that one would expect of functional managers as well as technical specialists, but are also key competencies underpinning effective performance as a corporate leader in giving that leader the capacity to visualise new opportunities for their organisation as well as understanding the dynamics of successful change.

The Leadership Benchmark shows where populations are in terms of their trajectory to the top right of the model, and illustrates an overall competency profile underpinning performance in the transactional and transformational aspects of corporate leadership.

The Leadership Potential Benchmark Levels

Transactional and transformational aspects of effective leadership are summarised in the Leadership Potential Benchmark using a simple five level classification with the proportions against each level derived from the likelihood of having a rounded leadership profile. The levels of the Benchmark and their interpretation are summarised in the table below:

| Level | Definition |
| --- | --- |
| Very Low | Less likely to have the strong and rounded competency profile required of an effective leader and more likely to be effective in a well defined role with clear responsibilities and expectations. |
| Low | May have some strengths but also likely to have significant development needs across both transactional (managing processes and delivering against targets) and transformational (driving innovation and change) competencies. |
| Moderate | Development of several competencies required as shown by a capability to operate in either a transformational or transactional role, but not both, or through a moderate profile across critical leadership competencies. |
| High | A strong overall profile of transformational (setting strategy and change agendas) and/or transactional (turning ideas and concepts into tangible actions and plans) competencies but also likely to require development in specific areas to realise leadership potential. |
| Very High | Very likely to operate effectively in both the transformational (setting strategy and change agendas) and transactional (turning ideas into tangible actions and plans) aspects of effective leadership. |

The Benchmark shows actual proportions of the global population of managers, professionals and specialists across industries that fall into each level of the Benchmark. This reflects the distribution of talent across both the transactional and transformational dimensions of leadership. It can be used in combination with the SHL Competency Benchmark to enable detailed drill-downs at all levels of leadership potential to identify where key development gaps are.

Case Study

A major utility company was reviewing its leadership talent in line with best practice for regular talent reviews. The company had two questions: how do my people compare to the utility industry in the UK and how do they compare to senior managers and executives in the UK?

They wanted an external view of their people to remove subjectivity in decision making. and a clearer sense of how strong their pipeline was in comparison with a) the talent pool for their industry and b) the talent pool for the level of position they were planning succession for—ie. understand whether to develop and promote, or hire external candidates to fill succession gaps.

Figure 70:
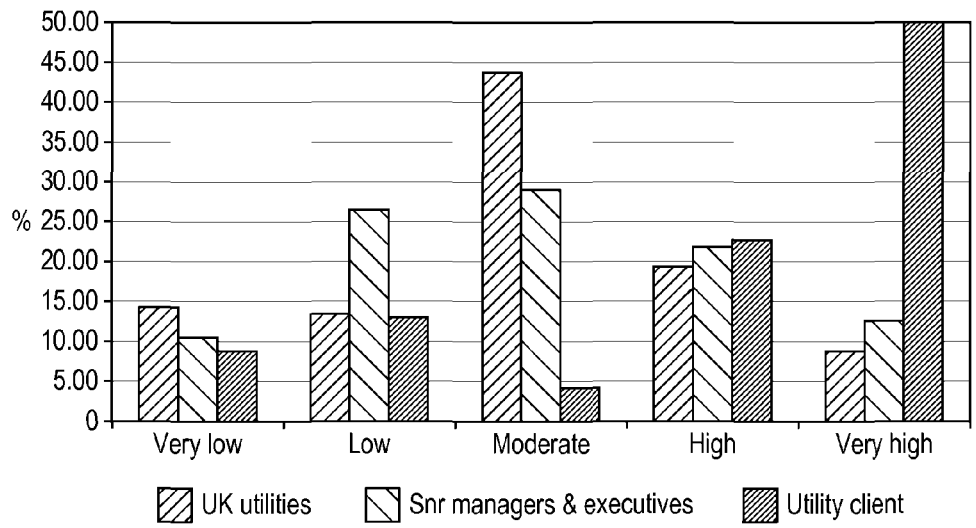
FIG. 70 shows an analysis of leadership potential.

FIG. 70 shows an analysis of leadership potential, specifically that the situation was good in terms of general bench strength of their people, with 73% of their candidates in the High or Very High bands of leadership potential—also in terms of how they compared to their industry sector geographically and the bench strength of senior managers in that geography. However, 27% of their candidates fell into the Very Low to Moderate bands.

Further analysis showed where bench strength was stronger by line of business and functional role Linking to the SHL Competency Benchmark identified key areas to target coaching and development actions in Supporting & Cooperating and Organising & Executing. This suggested a need to focus on how programmes and projects are organised, how standards for quality and customer service were set and followed up, and how some of the leadership cohort maintained positive engagement with their staff Drilling into the data showed that the company had several competitive advantages in its leadership pipeline when compared to the industry and senior managers geographically. There was clear bench strength in Leading & Deciding, Interacting & Presenting, Creating & Conceptualising, Adapting & Coping as well as Enterprising & Performing. This macro view provided a framework to facilitate individually tailored feedback for progression to more senior roles, and greater focus and alignment of coaching and mentoring programmes.

Figure 71:
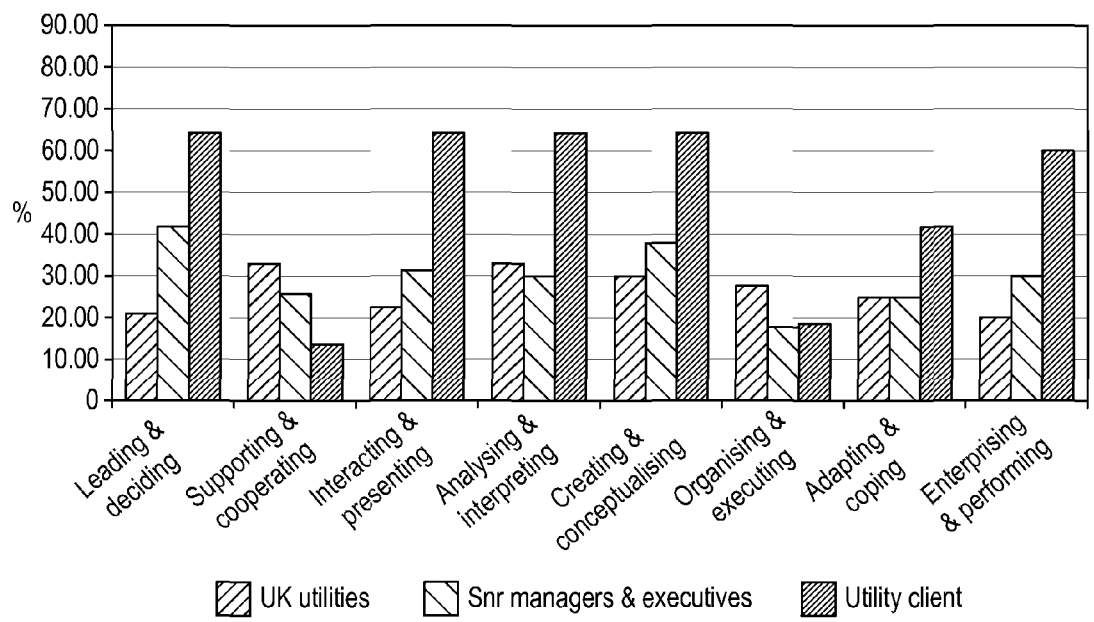
FIG. 71 shows an analysis of the Leadership potential by sector and geography.

FIG. 71 shows an analysis of Leadership potential by sector and geography.

This case study is an example of how the SHL Leadership Potential Benchmark has been deployed in a talent mobility and succession context. The Benchmark can also be applied in the context of talent acquisition to identify how effective talent attraction and acquisition processes are in supplying a strong feed into an organisation's leadership pipeline.

The Benchmark has been used by organisations to gain a proactive view on questions such as whether their graduate or college hire programmes are providing the calibre of employee who has the potential to staff future leadership positions, and whether their current cadre of middle and senior managers will provide the leadership they need to compete with other organisations as well as meet the needs of their organisations today and for the foreseeable future. The SHL Ability Benchmarks The abilities people have are talents that support the execution of tasks and the achievement of critical outcomes for organisations. Many organisations use ability tests to pre-screen and select people for positions where analytical skills and innovation are key requirements. The SHL Ability Benchmarks enable an organisation not only to identify the strength of ability they attract and employ, but also how effective and consistent their talent processes are.

The Ability Benchmarks use a generic classification of ability according to five levels. To maintain consistency with widely used classifications in testing and assessment, the levels associated with each benchmark represent the first decile (Level 1), the next 20% (Level 2), the middle 40% (Level 3), the next 20% (Level 4) and the upper decile (Level 5).

The five levels of the ability benchmarks are described below:

| Level | Definition |
| --- | --- |
| Level 1 | More likely to be comfortable performing tasks where the requirement for this ability is low or where tasks requiring this ability are undertaken with supervision and support |
| Level 2 | Likely to be able to perform tasks where lower levels of this ability are required and where some supervision and support is provided |
| Level 3 | Suggests a reasonable fit to tasks requiring this ability, but also the need for further development where higher levels of this ability are critical |
| Level 4 | Suggests a good fit to tasks where higher levels of this ability are required |
| Level 5 | Suggests a strong fit to tasks where high levels of this ability are required |

Creating the Ability Benchmarks

In developing these Benchmarks, we looked at the distribution of scores across more than 1 million assessments conducted between 2006 and 2010 across 37 industry sectors, 30 countries, 31 business functions and 5 job levels. This database will continue to expand as more SHL assessment data is added.

The Benchmarks have been calibrated globally, as taking a global view of talent reflects the dynamics of the economic and labour markets in which organisations now operate.

They also provide a flexible lens through which organisations can compare their people and processes to determine actions required to strengthen their talent management. By filtering benchmark populations by geography (several countries can be selected together), industry (several industries can be selected together), business function and job level, you can investigate any number of talent issues in the knowledge that the 'bench strength' views are consistent, reflecting real variations in talent across the populations you choose to benchmark against.

Ability Benchmark Levels

The levels of the benchmarks are generic and should be interpreted in the context of the specific ability that is benchmarked. The three most commonly used ability tests for graduates (college), managers and professionals are:

Verbal Reasoning ability and the potential to reason with written information to understand the key relationships in that information and the most logical conclusion to draw Numerical Reasoning ability and the potential to work with numerical information in tabular and graphical form, identify the key relationships in that information and the most logical conclusion to draw Inductive Reasoning ability and the potential to work with novel Information and, from first principles, work out the relationships in that information to be able to identify the next in a sequence of events Our research shows that Verbal Reasoning ability predicts effective communication as well as problem solving where text information is a critical source of information for evaluating issues and problems; Numerical Reasoning ability predicts problem solving where numerical data is critical to evaluating issues and problems; and Inductive Reasoning ability predicts the ability to develop solutions from first principles and innovation.

These abilities have also been mapped to the SHL Universal Competency Framework (UCF) and the links between the three example abilities described above and UCF behaviours are shown in the table below. For organisations using other assessments that can be mapped to the UCF, the ability benchmarks can be used alongside The SHL Competency Benchmark to gain a fuller understanding of the bench strength of an organisation's people and processes.

| Ability | UCF Great B Factor | Behaviors |
|---|---|---|
| Verbal Reasoning | Interacting & Presenting | Builds positive relationships by communicating, networking and influencing effectively |
| | Analysing & Interpreting | Gets to the heart of complex issues and problems through clear analytical thinking and effective application of expertise |
| Numerical Reasoning | Analysing & Interpreting | Gets to the heart of complex issues and problems through clear analytical thinking and effective application of expertise |
| Inductive Reasoning | Creating & Conceptualising | Applies innovation and creativity to develop new solutions in the context of the organisation's wider strategy |

Case Study

An international bank with investment and retail arms wanted to answer the questions: how competitive are we in hiring graduates with strong cognitive ability?, and how consistent are we in the ability levels of those we hire across our geographies, job levels and lines of business?

Since this client operated globally, the global banking industry was chosen as the benchmark population.

Figure 72:
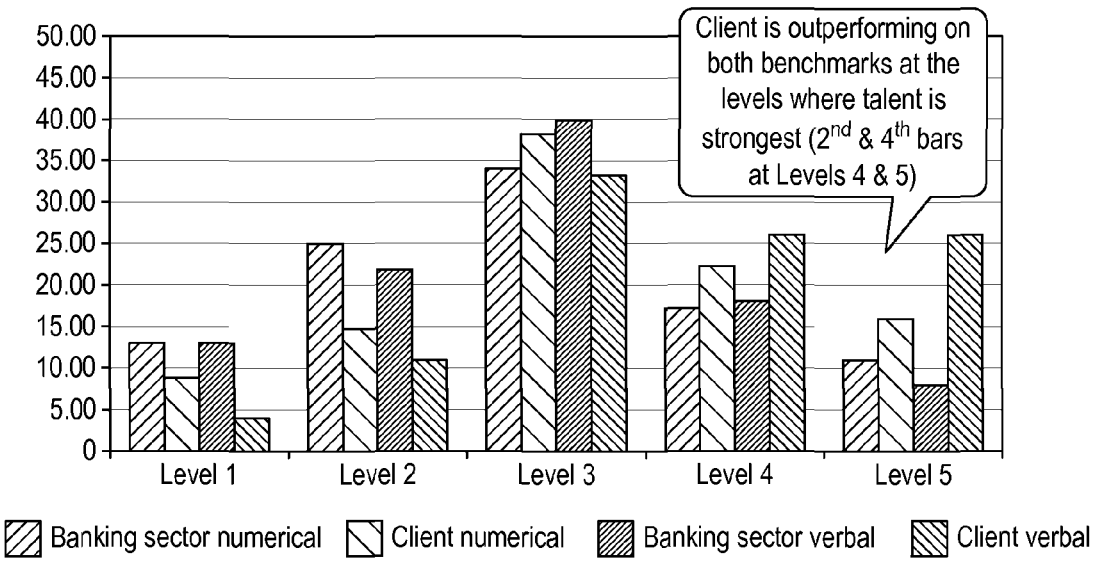
FIG. 72 shows an analysis of ability.

FIG. 72 shows an analysis of ability, specifically Global Banking Client and overall performance against ability benchmarks for sector. You can see that overall they were outperforming the sector globally on both Verbal and Numerical ability benchmarks and so the answer to the first question was good news—they were doing well in competing for graduate talent.

With regard to the second question, analysis showed high consistency by geography and job level. However, when the analysis compared lines of business, there was variation and lower consistency.

Figure 73:
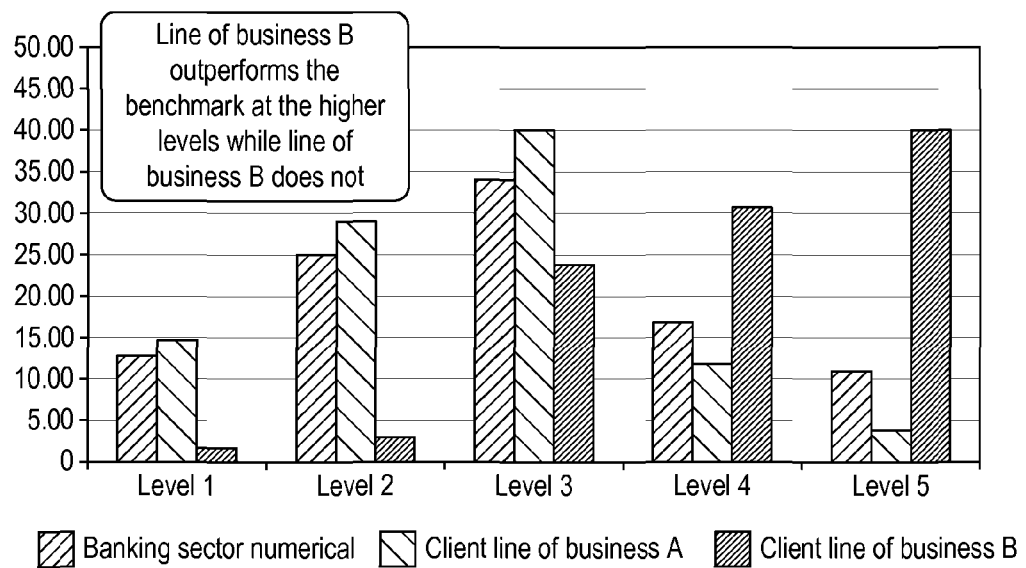
FIG. 73 shows an analysis of ability by line of business.

FIG. 73 shows Global Banking Client and variations in bench strength by line of business (numerical reasoning ability benchmark). Two of their lines of business that exemplified this inconsistency are shown.

Line of Business B was substantially outperforming the sector while Line of Business A was not. This may reflect differences in the attractiveness of this client to potential employees across their lines of business, and may reflect inconsistencies in the processes and standards applied to them.

Either way, the analytics showed the client where to focus their efforts in lifting the effectiveness of their talent attraction and acquisition efforts across their business, as well as where to take deeper dives to address questions such as the competitiveness of packages and career opportunities.

This case study shows how SHL benchmarks and benchmarking populations help to identify how competitive an organisation is in acquiring talent, where variation exists in talent processes and how these insights help identify where to invest to strengthen talent management for an organisation.

Talent Analytics can help to identify where potential lies in an organisation and what development needs to focus on to leverage that potential effectively. While the project for this client was focused on talent acquisition, the analytics also point to where the strongest internal pools of talent are and where the development of analytical skills will deliver the greatest value to the organisation.

The SHL Behavioural Risk Benchmark

The behaviour of your employees may either strengthen the resilience of an organisation to negative events, or increase the likelihood of such events and the magnitude of their impact. We believe that risk is a natural part of organisational life and organizations need people with an appetite for risk if they are going to seize opportunities and move forward—as our model shows, one of the biggest risks for an organisation is to lose momentum and fail to act.

But, if risk is not measured and managed properly, the impact can be both internal and external. Reflecting on any high profile industrial accident of recent times, safety can clearly be put at risk by what people do, or fail to do (see the SHL white paper The DNA of safety and why accidents keep happening).

Safety is not the only risk that organisations face through the behaviour of people. The intangible reputation of an organisation is put at risk when it is seen to have failed in anticipating and managing events effectively. Often it is the failure of an organisation to understand and manage employee behaviour that causes the most lasting damage to its reputation.

"Of all the management tasks in the period leading up to the global recession, none was bungled more than the management of risk" Harvard Business Review—October 2009

The behaviour of employees can cause the risk of losing customers when poor customer service destroys customer loyalty. This with reduced product quality, increased production costs, employee absenteeism and turnover, may all be symptoms of dissatisfaction with the way decisions are made and communicated in an organisation. They will often reflect the way standards for quality as well as behaviour are promoted and reinforced by managers or supervisors. A lack of commitment among front line staff doesn't just happen by itself.

These are some of the reasons why we believe that the behaviour of people is what fundamentally drives risk in organisations. You may have conducted risk reviews and strengthened your policies and procedures, but ultimately it is what your people do and how effectively they are managed that will drive risk.

The SHL Behavioural Risk Model

We believe that a significant value-add from talent management is the contribution it can make to effective organisational risk management. The SHL Behavioural Risk Model brings that to life, and can help you contribute to how your organisation understands and mitigates risk, responding to these questions and challenges.

The Model has eight indices that enable you to look at the process impacts of behaviour, from the quality of decision making, to whether employees are likely to comply with procedures and policies—also at the people impacts of behaviour, from the quality of communication, to taking and promoting responsibility for actions, to effective teamwork and employee commitment. It tells you how the actions of your people position the organisation for risk, where it is more likely to be resilient to risk and where it is not.

Figure 74:
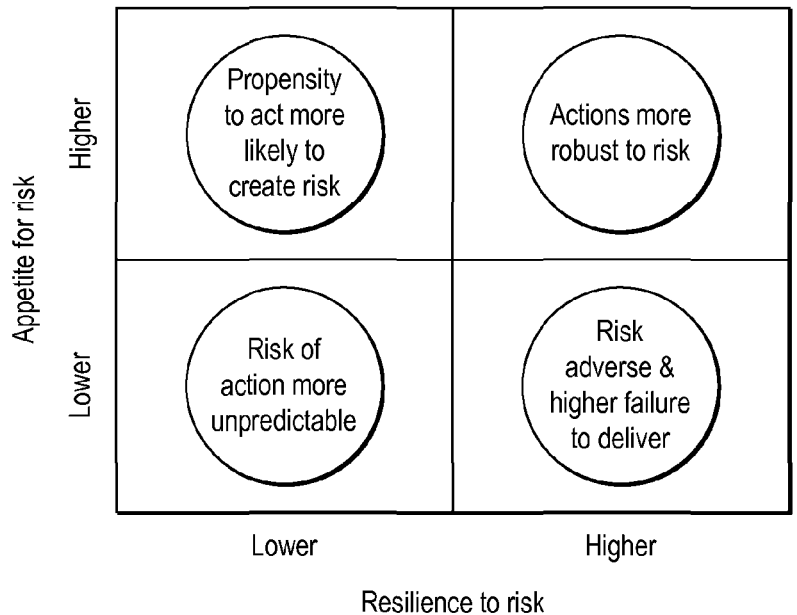
FIG. 74 shows the relationship between appetite for risk and resilience to risk.

FIG. 74 shows the relationship between appetite for risk and resilience to risk.

One of the biggest risks in any organization is the failure to act, so we have incorporated the Momentum to Act alongside Resilience to Risk at the top level of the model:

Appetite for Risk—the propensity of your people to make timely, perhaps tough decisions to seize the initiative, and to see actions through to achievement of a goal. The model recognises the need to take action where there may be risks, and that all organisations need people with an appetite for risk. It also recognises that organisations should be aware of their people's actions that create, rather than mitigate risk.

Resilience to Risk—whether the behaviour of your people mitigates risk through effective decision making, translating into clear standards for how those decisions are realised through the execution of programmes, projects and tasks. Is the quality of communication effective in setting the tone for behaviour in your organisation, by encouraging a shared sense of responsibility and collaboration?

At this level, we can identify four states of organisational health in relation to risk. Organisations at the highest state have the appetite for risk in a way in which risks are more likely to be identified and addressed earlier—higher appetite for risk and higher resilience to risk. Those at the weakest state have low momentum to act and low resilience to risk, making both the positive impact of actions and their associated risks harder to foresee and prepare for.

Resilience to Risk incorporates six behaviours that can be looked at from two perspectives. SHL Talent Analytics enables you to drill down to the detail within these two perspectives, to help you understand the risk profile of your people from senior executives to frontline employees.

The Two Perspectives of Resilience to Risk

Figure 75:
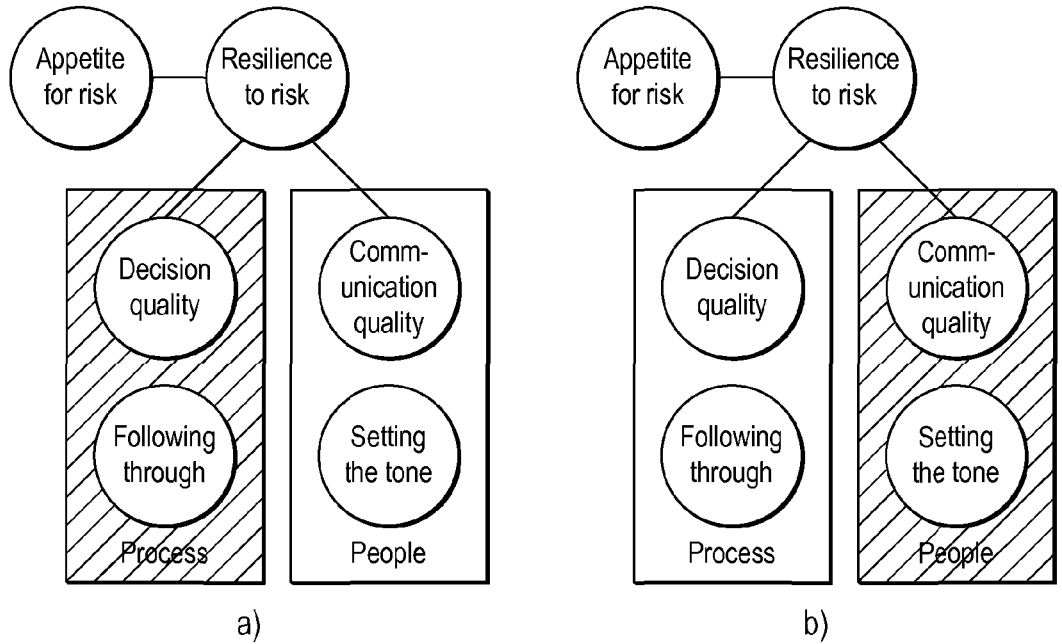
FIG. 75 shows the a) first and b) second perspective of resilience to risk.

FIG. 75 a) shows the first perspective of resilience to risk, which focuses on conditions that promote effective execution of tasks to time, quality and cost, in line with internal/external policies and procedures. This is the process perspective and has three components:

1. Decision Quality—looks at the extent to which decision making is based on a clear commercial evaluation of data and evidence, and at the wider context of the organisation's capability to produce workable solutions. This index is drawn from the OPQ and is relevant to all levels involved in decisions that frame the direction and tasking of front line employees.
2. Following Through—looks at the likelihood that those decisions will, through the know-how of your employees, translate into tangible, customer focused plans of action that will deliver to time, cost and quality. This index is also taken from the OPQ and is particularly relevant for middle managers, supervisors and team leaders and their capacity to leverage expertise to organise resources and execute effectively.

FIG. 75 b) shows the second perspective of resilience to risk, which focuses on conditions that promote a shared sense of responsibility, ethics, and openness and collaboration among employees. This is the people perspective of the model and has three components:

1. Communication Quality—looks at the how clear and effective the communication of decisions is in promoting organisational goals and achieving buy-in. This index is drawn from the OPQ and is relevant to all levels involved in decisions that frame the direction and tasking of front line employees.
2. Setting the Tone—looks at whether buy-in will be reinforced by the behaviours of managers and team leaders, so that a shared sense of ethics, culture of collaboration and mutual responsibility is more likely. This index is also drawn from the OPQ.

Indices

Benchmarks may also be used to determine an "index", for example to describe and rate quantities such as "People Capital", "Talent Pipeline" and "Risk".

People Capital Index

The phrase 1+1=3 is a familiar one for describing the additional value from harnessing the resources in an organisation. We all know from over 30 years of research and client projects that the multiplier of having strong talent has an even greater impact on organisational success.

Our model captures this multiplier through the concept of 2 into 4 and by including the capacity to execute and engage with others effectively. It allows you to take an objective view across your talent acquisition and talent management activities to see whether all of those activities are building an effect talent base to meet your organisation's needs. The index can be applied at any point in your talent processes from the acquisition of new employees through to succession planning and high potential programmes.

Our scientific research shows that effective execution relies on two key talents:

Thinking Agility goes beyond intellectual ability to look at the capacity to handle different levels of complexity, understand problems and issues, and construct effective solutions Capacity to Achieve provides insight into the energies you can call upon from your people and, importantly, how effective they will be in channelling those energies into effective projects and programmes that will deliver quality outcomes You probably run engagement surveys and they will offer you value in terms of perceptions of your organisation and your managers. But, will they tell you how effective they can be in building relationships inside your organisation and outside with your customers and external stakeholders? The People Capital Index gives you the answer to that question by looking at two key talents for effective engagement:

Interpersonal Agility provides insight into the capacities of your people to operate across a range of interpersonal contexts to build strong and positive relationships, and to influence and bring others with them Capacity for Change reflects a simple fact of today's working world—it is constantly changing. This aspect of our people capital model lets you see the capacities you can call upon to overcome obstacles and persevere in the attainment of organisational goals, and to embrace and support others through change You will note that our model captures both the capacities of people (their energies and their scope) and their agility in using their talents to drive success and leverage change as an opportunity.

You can drill down to more detailed information below each of the four people capital talents to understand in detail the behavioural strengths your organisation is building to meet the challenges of today's world.

The Talent Pipeline Index

The world of talent management agrees on at least one thing: a healthy talent pipeline is essential to organisational success. But, do you have to wait months or even years to capture data on how well your talent pipeline is delivering? The Talent Pipeline Index gives you the proactive capability to look at your pipeline and identify the actions you can take at all points in the management of that pipeline, from talent acquisition to learning and development programmes to succession planning, and it offers this insight across your business functions.

You may already have internal metrics that give you a sense of how healthy your pipelines are, but do those metrics tell you how you compare to the organisations with whom you are competing? That's the capability the Talent Pipeline Index gives you so you can anticipate the actions you will need to take and access the data you need to build your business case for those actions.

So, what will the Talent Pipeline Index tell you? Based on our scientific research and the wider literature on the talents required to achieve career success in a senior role, the index will tell you the proportions you attract, acquire and manage against six levels benchmarked globally:

Contributor or those people who may have the talents to add value in an operational and transactional role, but are unlikely to have what it takes to be successful in more senior roles Specialist or those people with the talent to be effective in technical and creative roles, and who are likely to find operational management a challenge Operational Manager or those whose talents indicate that they will excel in the day-to-day management of operations, projects and tasks Middle Manager or those who, in addition to the talents required for day-to-day operations, are also likely to offer talents in communication and engaging staff Senior Manager or those who have the talent to prove themselves in the execution of operational and transactional tasks, and the talent to operate as a functional manager and manager of managers Executive or those with the talent to be successful in transformational roles within organisations, bringing fresh perspectives and new realities combined with the talent to influence and bring others with them If you want to know the talent pipeline that your graduate, manager and professional recruitment programmes are building for the future of your organisation, if you want to anticipate the learning and development investments that will leverage your pipeline most effectively, and where hidden high potential is sitting in your organisation, then the Talent Pipeline Index will guide you towards the answers to those questions.

The Risk Index

Harvard Business Review had this to say in the introduction to its special edition on risk: "Of all the management tasks that were bungled in the period leading up to the global recession, none was bungled more than the management of risk." [Harvard Business Review (2009). Spotlight on risk. October.]

How complete is your organisation's architecture for managing risk? If it doesn't embrace the behaviours of your people that are the real source of risk to your organisation, then it isn't complete. You may have conducted risk reviews and strengthened your policies and procedures, but, ultimately, it is what your people do and how effectively they are managed (what your managers do) that will drive the risks to your organisation.

How strong is the contribution of your talent management processes to the organisation's risk management architecture? Can your talent managers contribute easily and proactively to strengthening the organisation's risk mitigation? If the answers to the first question is that the contribution is weak, and the answer to the second question is no, well you can take some solace from the fact that you are not alone.

The Risk Index gives you the capability to strengthen your risk management by giving you a direct read of the behavioural risks in your organisation, and enables those in talent management to contribute to risk mitigation by quickly and easily identifying behavioural risk from talent acquisition and deployment of staff through to training and development needs throughout an organisation.

Based on research across a wide range of industries from the financial sector to oil and gas, you can look at levels of behavioural risk across your organisation and drill down to identify those risks associated with the day-to-day interactions between people (what we call People Risks), and at those risks associated with following processes, compliance with procedures and ensuring that standards and quality are maintained (what we call Process Risks).

Want to know where your people are more likely to communicate effectively, build a positive team atmosphere, plan ahead and focus on maintaining standards, are committed to the organisation and uphold its values, then the Risk Index will give you the answer.

It will also tell you whether your recruitment and development processes are being effective in screening for and managing those people who are more likely not to listen and fail to communicate, work against company values, create a negative atmosphere, and not commit to standards and procedures, all behaviours captured by the Risk Index.

The behaviour of people is what fundamentally drives risk in organisations. We believe that a value add from talent management is the contribution it can make to effective organisational risk management. The Risk Index makes that contribution a reality.

Our system provides you with evidence-based and scientifically researched guidance to help you identify the effectiveness of your talent programs. You gain instant access to the largest global database of talent data and insights to benchmark your workforce performance and make more informed decisions that can impact organizational effectiveness, productivity and ultimately, competitive positioning.

With our system you can drill down to your specific talent data and benchmark it by geography, industry and business function—simply and easily. You'll uncover key insights about the talent you attract, their performance, as well as their management and leadership potential. And with these insights, you can make better decisions about your talent programs—faster and with greater certainty.

Our system helps you improve the effectiveness of how you plan and execute your talent programs and enables you to accurately measure the bottom line impact of your investment decisions.

Advantages:

Gain evidence-based insight for more informed decisions.

Identify, prioritize and measure talent investments and programs and align them to strategic organizational goals.

Drive focused, systematic change faster more efficiently and with higher value outcomes.

Figure 76:
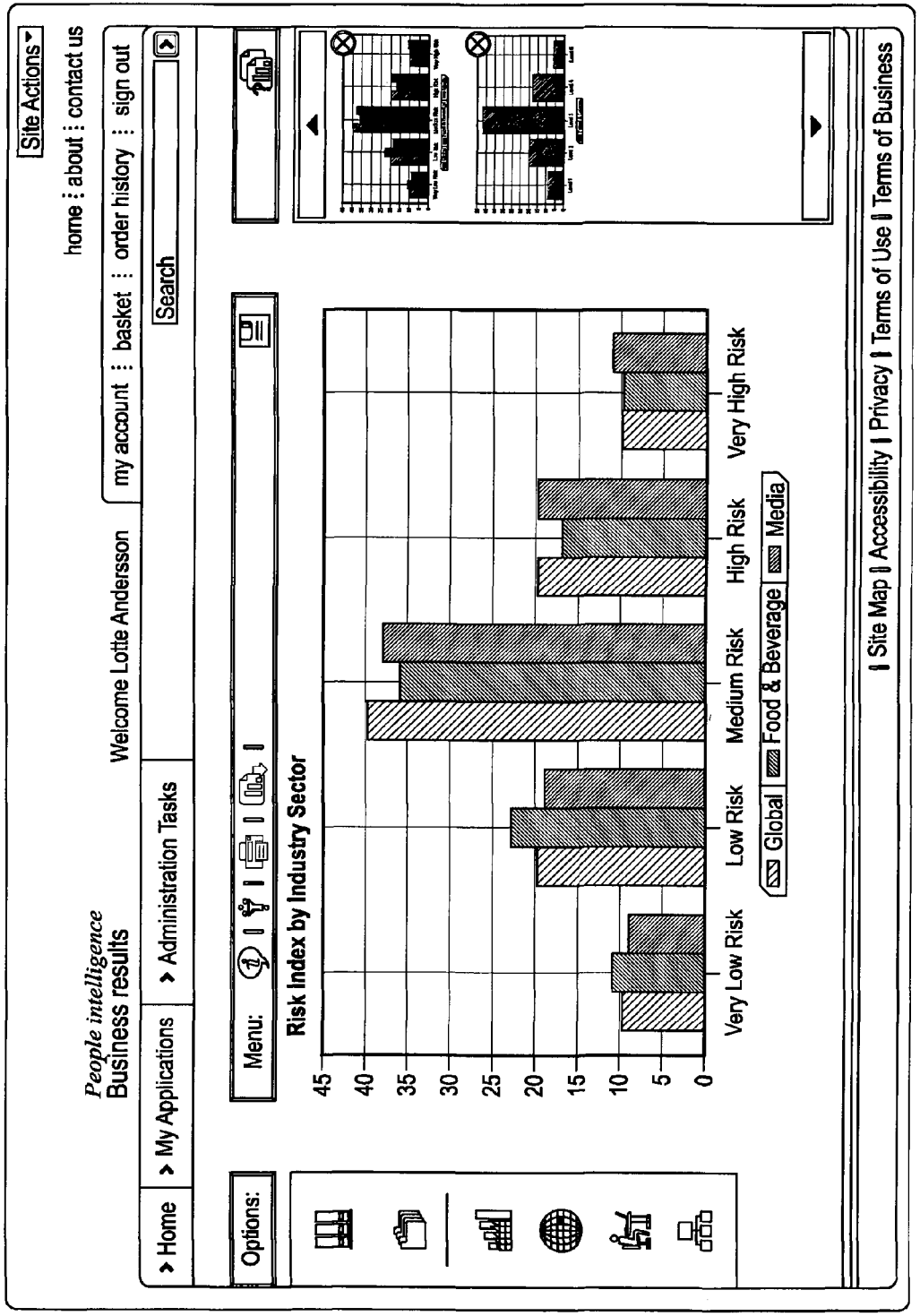
FIG. 76 shows an example of risk index by industry sector.

FIG. 76 shows an example of risk index by industry sector.

Benchmark: Quality of Hire/Overall Risk in Talent Pool

Query statement: I want to benchmark the people risk of the people I attract by talent pool in my industry Required Instrument(s): suitable test(s) that can provide metrics data, for instance SHL's OPQ32i or OPQ32r.

System

Provide 'Overall Risk' benchmark

Need fast accurate data extracts to support analysis

Upload new benchmark data to benchmark database (DB)

Figure 77:
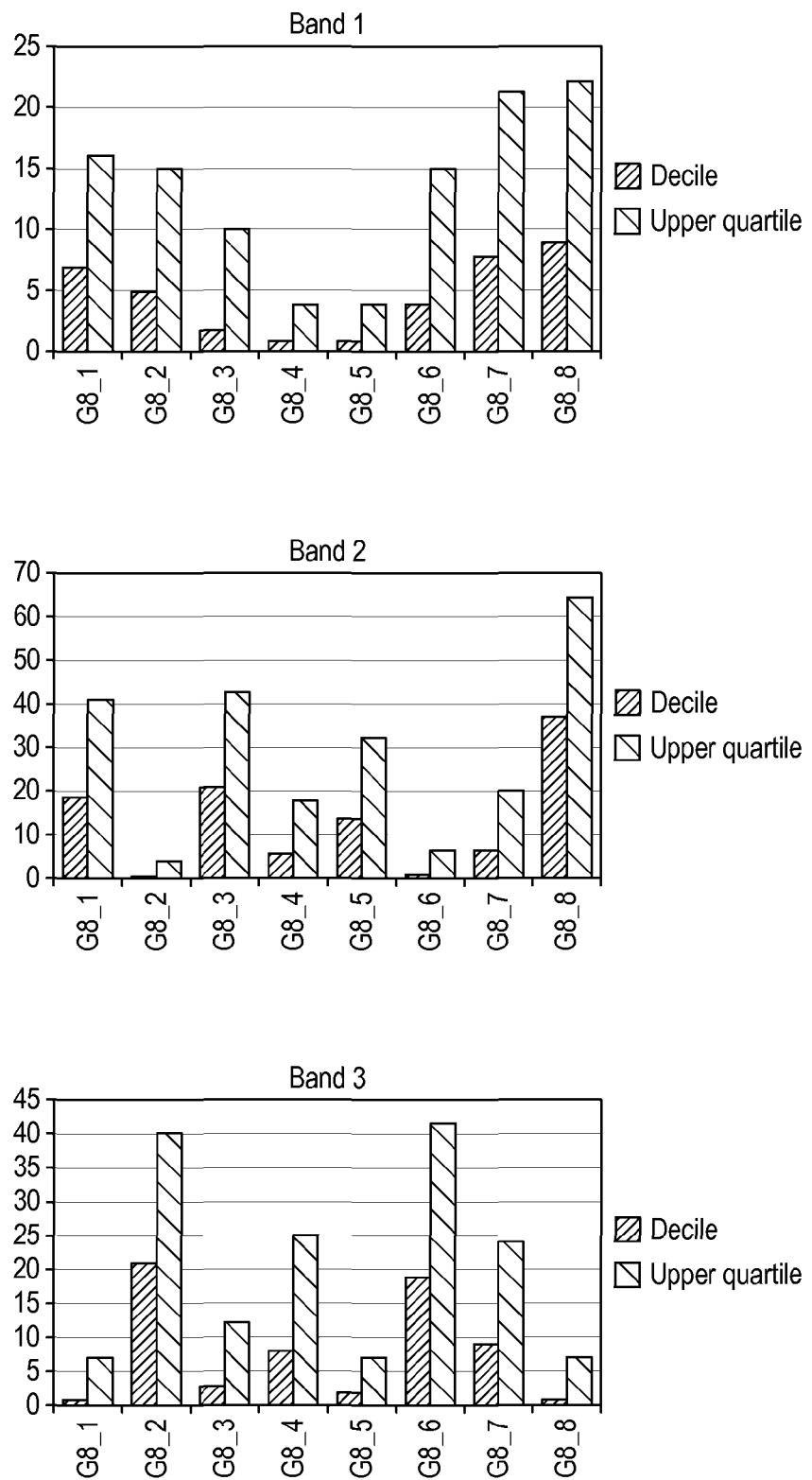
FIG. 77 shows an example of risk banding.
Figure 78:
Figure 79:
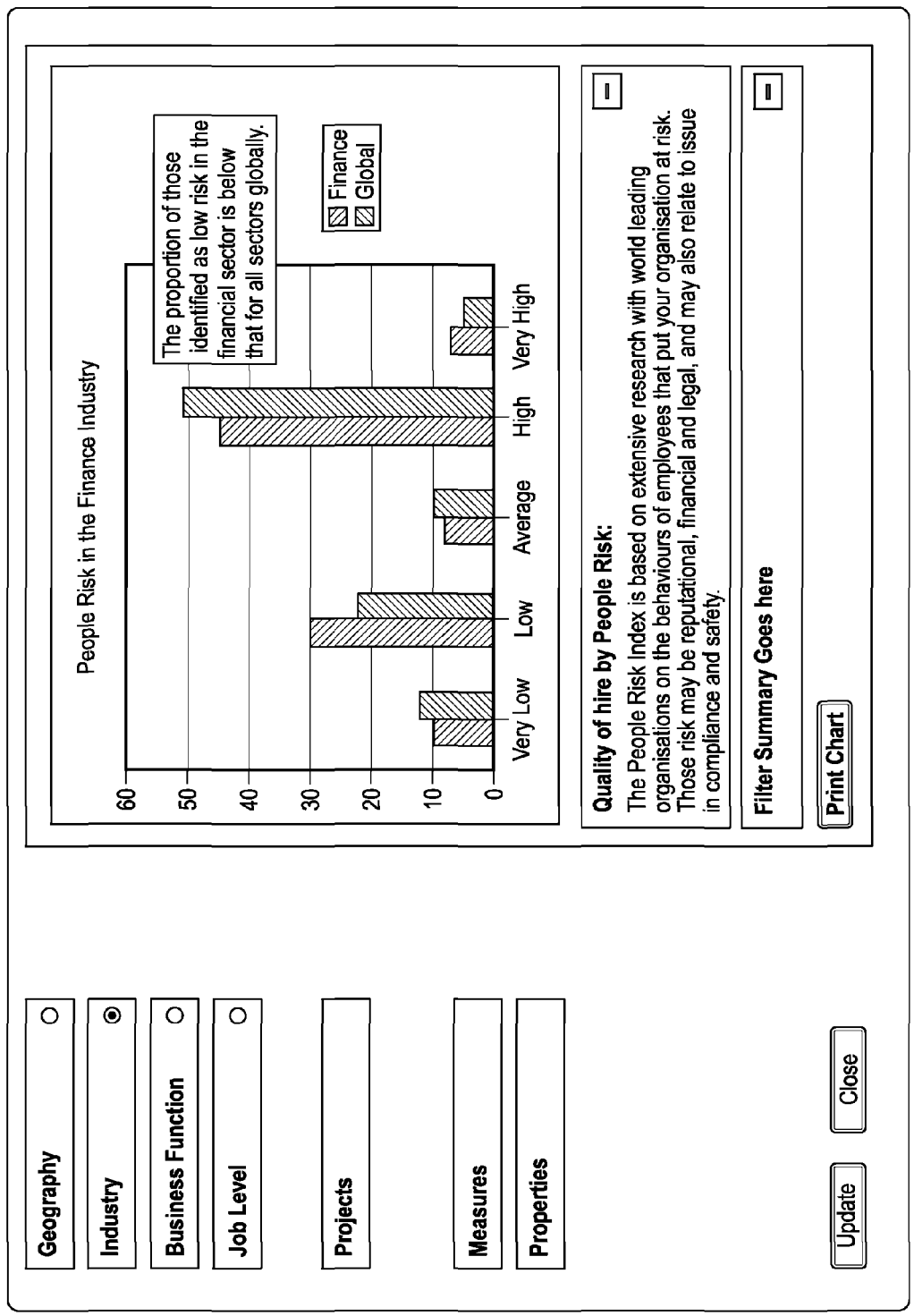

Deliver all supporting text for the interface and supporting documentation/white papers/fact sheets May also attach business outcome link or paper where these match closely enough or refer to these in the support documentation Test database and benchmark results in benchmark DB Equations for risk bands built in to application client data calculation Enable the query and any support data needed on client data to match benchmark
Create and publish draft new benchmark on the platform
  Add all relevant tags such as obligatory instrument, optional instrument, best before date, specify minimum number of cases/data that can be displayed, specify drilldown/sub query options, specify necessary information form client data.
  Attach all support documentation to benchmark
Test benchmark in analysis tool
Publish benchmark on platform (ready for client to start using)
End User
  Log on (assuming access has been enabled)
    Open benchmark library . . . .
    . . . Or use the "I want . . . " combination of query they want to look for benchmarks on
      1. Preview a couple of benchmarks
        1. Read summary info
        2. Open and read "fact sheet"—print/save
      2. Select the desired benchmark (only one)
    Add user data
    Select projects
    If classification data is missing:
      1. Add industry information to projects
      2. Add information regarding the work function (use demographics)
      2. Information regarding candidates
        1. Add information regarding candidates related to:
          1. Who did you make an offer to
          2. Who accepted
          3. Who is still in your organisation (who left)
      2. Save updated data for future use
    View benchmark with my data
      1. Hover over relevant areas of the graph for info on benchmark and "so what" statements related to the data
      2. Filter and drilldown
        1. By geography (e.g. now I want to benchmark the people risk of the people I attract by talent pool in my geography)
        2. By years
        3. By project (if more than one)
        4. By business function (demographics classification)
    Save benchmark and my data for future use
    Print or export graph (not DATA)
    Look for next benchmark or close the application
Proposed Layout of Initial Benchmark Display:
  Benchmark only
  Benchmark and client data
  Hover-over text for benchmark scenarios in graph
  Factsheet/white paper supplied as support material for the benchmark
  Text description for the benchmark library
Equations to be Used in Data Comparison Preparation/Calculation
  A. Create Z scores for Universal Competency Framework (UCF) Great8: 2, 6 and 7
    Z score calculation
      1. Calculate mean of candidate score distribution.
      2. Calculate standard deviation of candidate score distribution.
      3. For each candidate subtract the mean from their score and divide this by the standard deviation.
  B. Add these together to create a new variable called overall risk index
  C. Apply the following cut-offs to the risk index variable to create a new variable called risk bands
    a. Lowest thru −1.98095746718274=band 1)
    b. (−1.98095746718275 thru −1.3043517397815=band 2)
    c. (−1.3043517397816 thru 0.823981688831731=band 3)
    d. (0.823981688831732 thru 1.99568946042002=band 4)
    e. (1.99568946042003 thru Highest=band 5)
FIG. 77 shows an example of risk banding.
Further Features
FIGS. 78 to 96 show various further features of the analytics system; these features may be present either singly or in combination:
Library
FIG. 78 shows an example of a library page with saved queries. A library may be available to all central platform Users. Page name and title, labels, format, style and content may vary. Design (cascading style sheets (CCS) and images) may be added. Public Benchmark Queries may be created by script (for example if the Build Benchmark page does not support Admin functionality). User Benchmark Queries are created when an Authorised User saves an open query. Content for the library page and links (probably PDFs) may be provided. This may be hard coded into the library page. Administrators may additionally see Hidden Projects.
Roller/Drop-Down Select Menu Functionality
  This would provide an alternative way to select a benchmark and set a default primary data type. The selection is linked to a saved query (for example with a cross ref table). Further options include management of content via a content management system (CMS), and grouping of Benchmark Queries into Propositions.
Process
  User selects query: Build Benchmark page opens for selected query.
  User deletes saved query: User prompted "Benchmark Query will be deleted. Click Continue to complete deletion, otherwise Cancel". System deletes or abandons deletion as appropriate.
Build Benchmark
  FIG. 79 shows an example of a Build Benchmark page with a selected query. A Build Benchmark page may be available to all Users. This page may only be available by opening an existing Benchmark Query. Initially all data type selection (primary data type, filters, etc.) is be for the selected query. Data Types may have icons instead of names. The 'Update' function may only available to authorised users and administrators.
Data Types
  On hover over, a data type selection section (see below) may open. Unless an update is made, the data type selection section closes when the cursor moves outside the section. A check box (alternatively a radio button) is used to select the primary data source ('benchmarked by'). The style of the display may very. The selection section may be positioned off the menu bar into the main section, and may normally be hidden. The menu bar may be displayed in a different colour in the case of a primary data type.
  Primary data source is optional. If used, then only one data type can be selected as primary. If user selects (ticks) when another data type is set to primary, then deselect on original and set on new data type.

Projects

Projects may only be displayed for authorised users with assessment data access. Hover and display section as above. See below for details.

Measures

Measures may only be displayed for Admin users. Measures are used to select the measures to be used for the chart. See below for details.

Properties

Properties may only be displayed for Admin users. Properties are used to define for example:

Chart Type (bar radio, etc.)
Chart Content
Drill Down links
Other properties

See below for details.

Chart Area

The chart area renders a chart to represent Benchmark and Data Types Values selected. See below for details.

Update

The 'update' function controls update of the display. A pop-up may provide the option to rename a user query. This function does not allow users to update public or hidden benchmarks. User queries may optionally be saved to an existing group, and a new group created.

Close

The 'close' function closes a Benchmark without saving changes and return to the Library page. If changes have been made, then the user may be warned, for example with a notification and buttons such as "changes will be lost, Continue or Cancel".

Select Primary Filter

Figure 80:
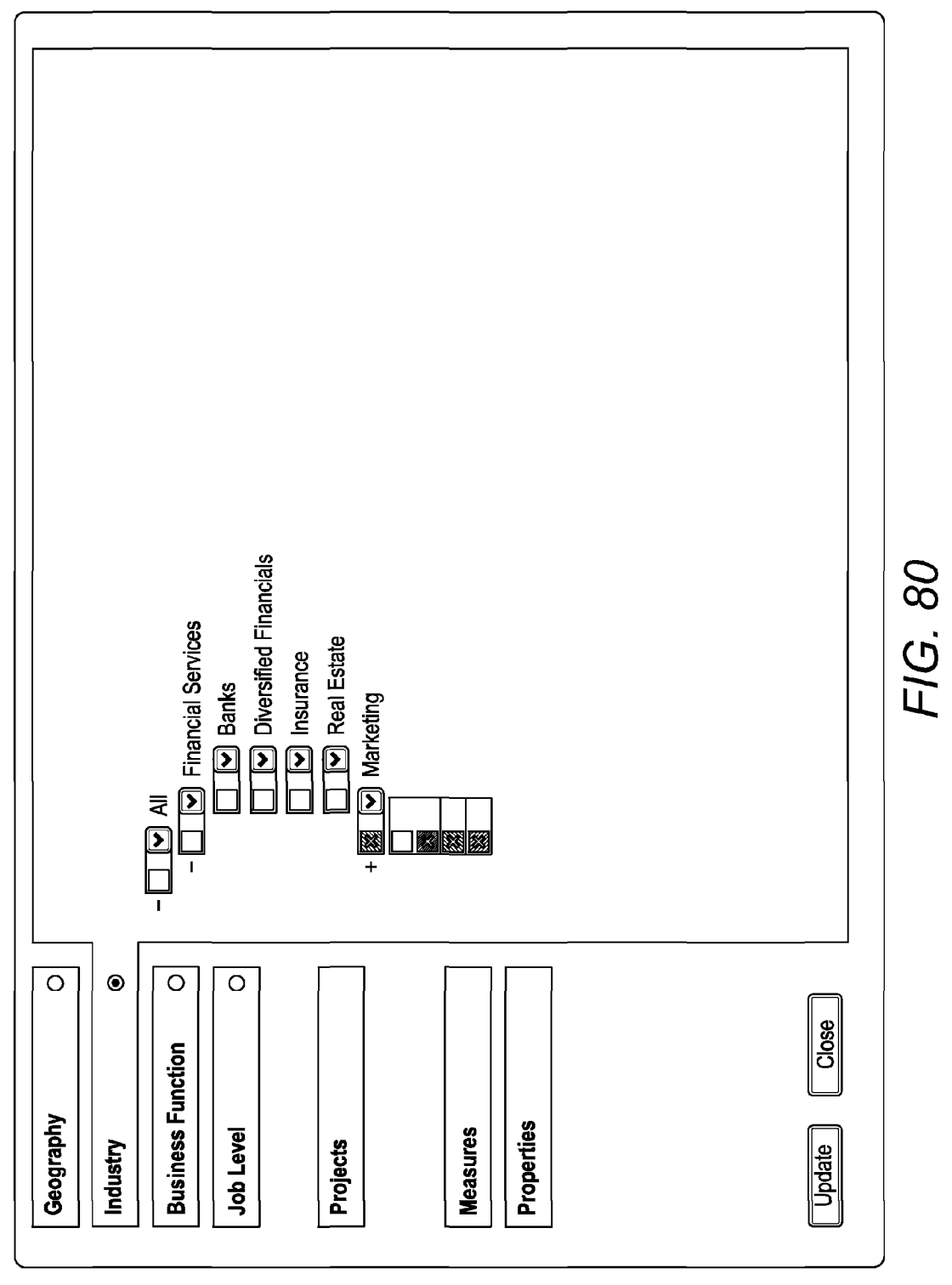

FIG. 80 shows an example illustrating a page for selection of a primary filter. Hovering a cursor over a 'Data Type Name' area opens a data selection section. Moving the cursor out of the section before making a change closes the section. Clicking on a primary tick box or changing any of the options on the page may fix (or pin) the section, and activate 'OK' and 'Cancel' options (e.g. buttons). Moving the cursor off the section then no longer closes the section. Optionally, moving to another data type menu (e.g. a tab) may open that section (overwriting the current section); all data changes are retained and 'OK' and 'Save' buttons remain activated.

From a drop-down selection menu, selecting a checked option selects the corresponding data type value. Assigning the same colour option to data type values adds them to the same bar in the chart. Colours correspond to keys used in the chart. Colours are displayed in a predefined order. Corresponding bars on charts are displayed in the same order. Assigning different colour option to data type values assigns them to separate bars in the chart. A limited number of colours are available.

If the primary data type is changed then any filter options selected for the original primary data type are retained (but unless primary data type, bar colour has no effect on chart rendered).

On selection of the 'OK' option, changes are committed, the data type selection section is closed and the chart is rendered. An appropriate icon or message (e.g. "Creating chart") may be displayed while chart is being generated.

On selection of the 'Cancel' option, the data type selection section is closed (exposing the current chart) without saving any changes made.

Select (Non-Primary) Filter

Figure 81:
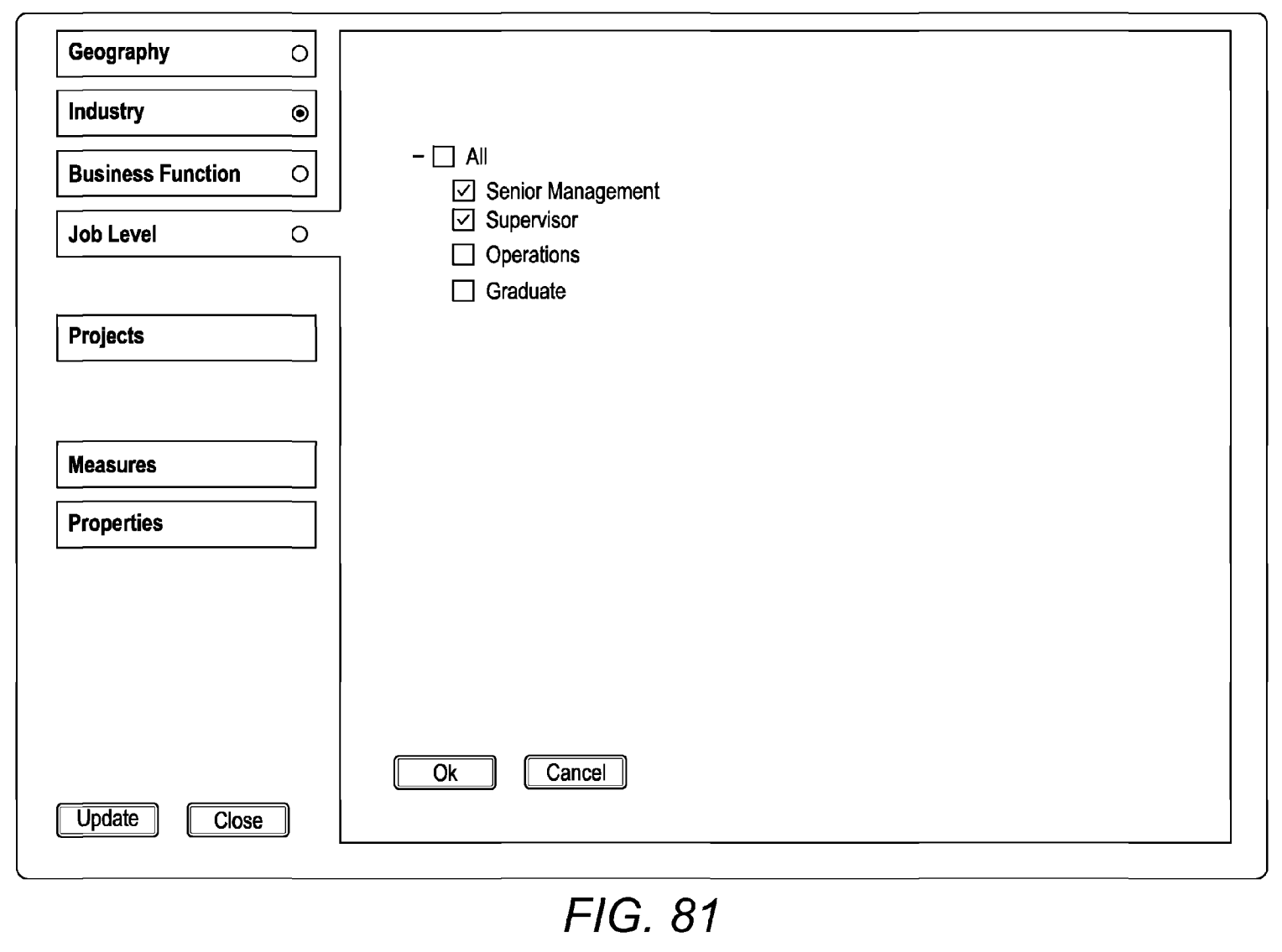

FIG. 81 shows an example illustrating a page for selection of a non-primary filter. The hover, display, and fix (pin) behaviour, and the 'OK' and 'Cancel' function are same as for Primary Data Type (as described above). Selecting (e.g. ticking) a data type value includes data in selection. Although colour selection is not displayed, all data type values are assigned to the default colour group (this only becomes relevant when the current data type is set to primary). Selecting a parent data type value (e.g. Global) includes all subordinate data type values (making selection of subordinates redundant).

When chart data is retrieved, only data corresponding to selected data type values is selected. In the example illustrated, only data with Job Level=('Senior Management' or 'Supervisor') is included in the selection.

Select Projects

FIG. 82 shows an example illustrating a page for selecting projects or other clusters of user data. The hover, display, and fix (pin) behaviour, and the 'OK' and 'Cancel' function are same as for Primary Data Type (as described above). When this section opens only selected projects are displayed.

Searching on Project Name and Date Range may be performed. A failure message may be displayed if the start date is after the end date.

Only projects of a minimum size (e.g. with at least 10 complete assessments) may be returned. In one version, data type filters are included in the selection. For example, if geography='France' is selected, then only French test takers/projects are included. In this case, the number of test takers in projects may vary.

Only projects that have been active within a pre-defined period, e.g. the last 5 years, may be displayed. In this case, a response is defined for when a project (e.g. 4½ years old) is selected and the benchmark query saved, and the benchmark query is re-opened after the defined period has lapsed (e.g. a year later).

If Search text is entered, only projects with the text contained within the project name are returned. If a Start date is entered, only projects with 'last accessed' date greater than or equal to start date are returned. If an End date is entered, only projects with 'last accessed' date less than or equal to end date are returned. Other dates that the 'last accessed' date may be used.

A drop down colour picker is used to select projects and assign a colour. The functionality and order is the same as for primary data type. If the [Select All] function is activated, then the corresponding colour is assigned to all projects retrieved for the search. If the [Clear All] function is activated, then all projects already assigned to the benchmark query are deselected. This de-selection may or may not be included in current search results.

When a user clicks on search table heading, the table is ordered on the corresponding column (alternating ascending and descending order).

Select Measures

FIG. 83 shows an example illustrating a page for selecting measures. This page may only be available to Administrators.

For each measure a group (A-Z) is assigned. Assigning multiple groups to a measure sums the corresponding scores and displays them as a single value (bar). The order of the groups in charts is dictated by group name (A-Z). Management of labels and drill-down links for groups occurs via the properties section (see below). Alternatively, data may be managed using for example a SQL Server.

Properties

Figure 84:
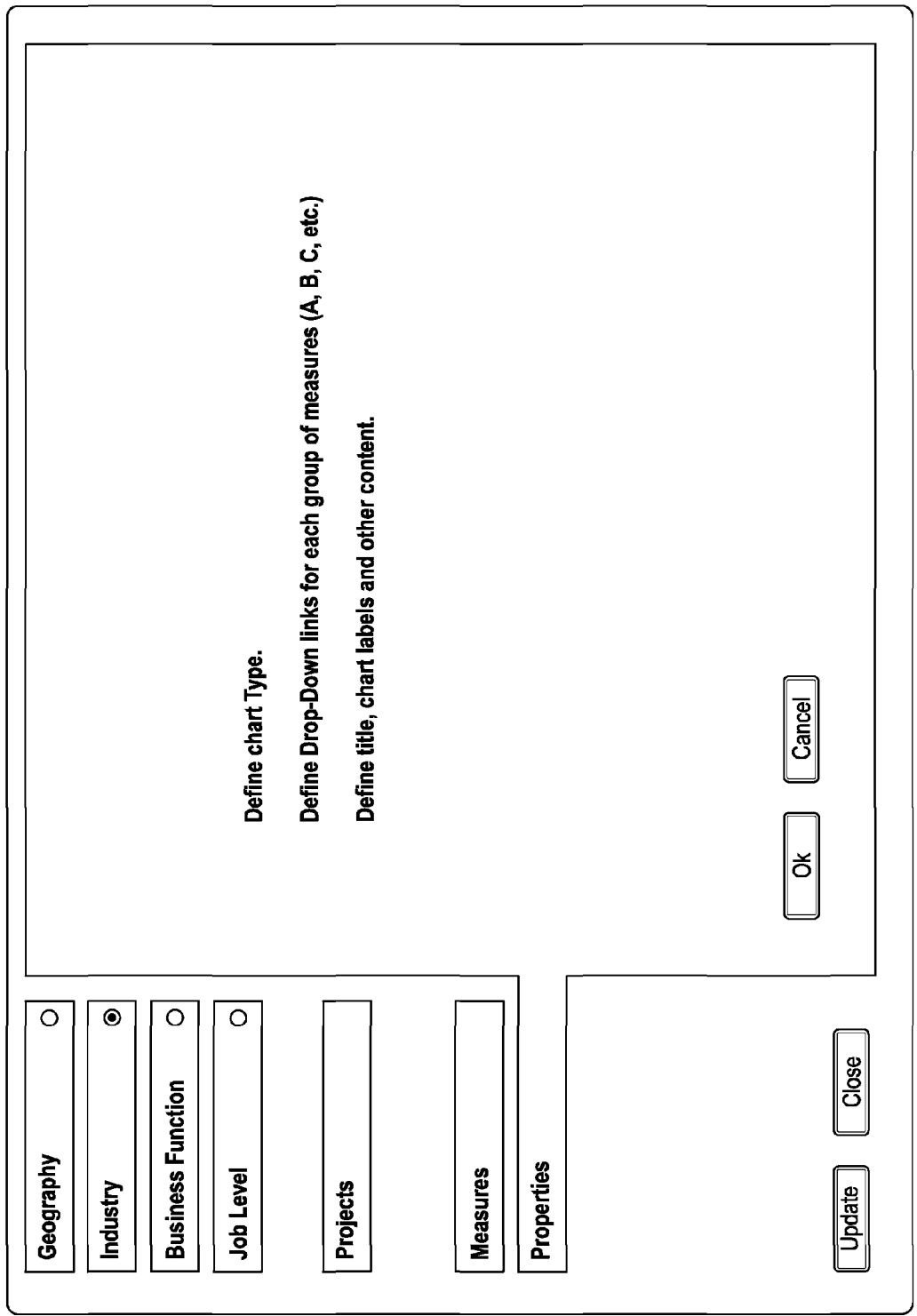

FIG. 84 shows an example illustrating a page for defining properties.

For a Chart, the definition may include properties relating to:
Chart Type
Title
Content
Inherit filter from parent measures (when chart opened as a result of a drill down).
For each measure assign:
Drop Down Links (Name & ID, may be more than one).
Titles
Content
All or parts of this data may be held on the benchmark database.

Build Benchmark

This option is only available to Premium Client Users and Administrators.

FIG. 85 shows an example of a build benchmark page. The function 'Go' should be disabled unless all options are selected. An option is selected from each section. Only options with corresponding Benchmark Template rows are available for selection. So as a user selects options, other options (in other sections) may disappear.

To restore to the initial state (with all options available), the user can click on [Clear].

Figure 86:
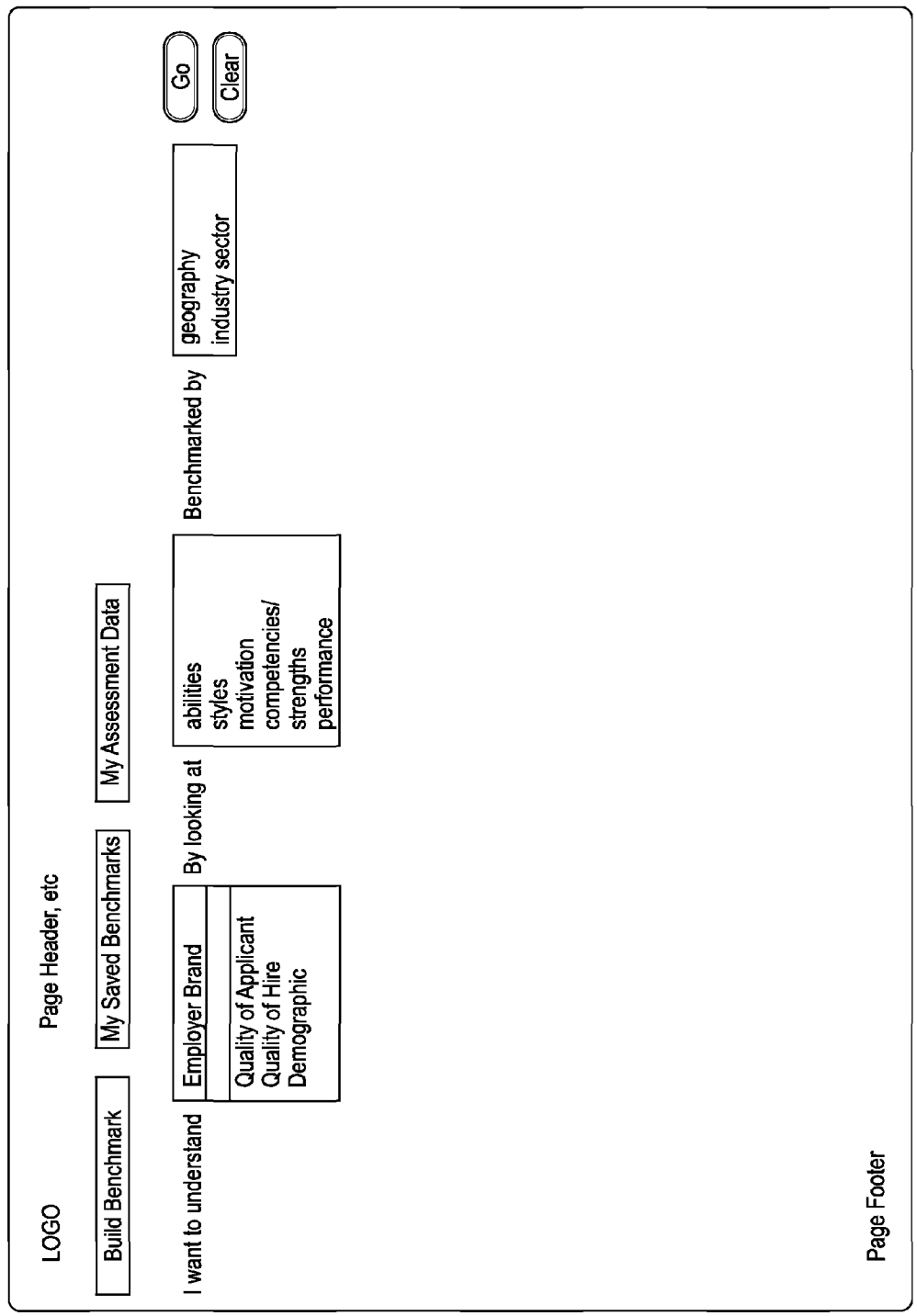

FIG. 86 shows selection of the option 'Recruitment Process' from the section 'I want to understand'.

Figure 87:
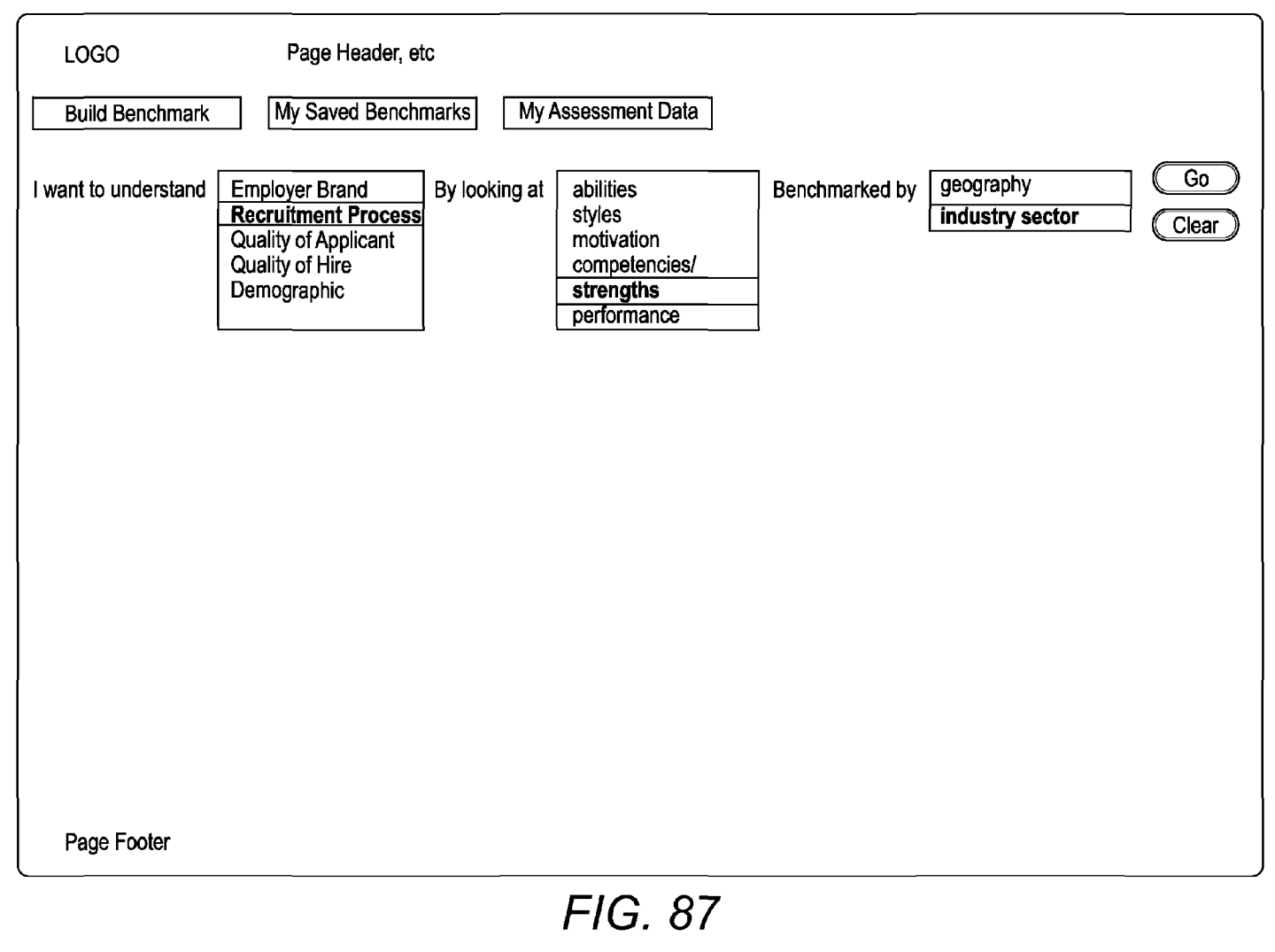

FIG. 87 shows further selection of the option 'strengths' from the section 'By looking at' and the option 'industry sector' from the section 'Benchmarked by'.

In some cases (where there are benchmark variants), clicking an option from every section may not result in a singe benchmark being selected. This may result in a fourth section or pop-up selection to choose the variant.

Once user has selected an option from each section (identifying a single Benchmark Template, click [Go]. The selection is then saved to the database as a Saved Query. Chart parameters (XML) are generated (from Saved Query just created, not values on screen). Relevant content (links, text, images, etc.) may also be used to create an intermediate xml. The Chart and Content xml are saved to the database (linked to Saved Query). The Chart display is rendered from Chart and Content xml and displayed in chart section of the page (iframe). Once the xml is saved (cached), it can be reused with minimal database access. The cache may be cleared every time related data (benchmarks or mete data) is updated.

Figure 88:
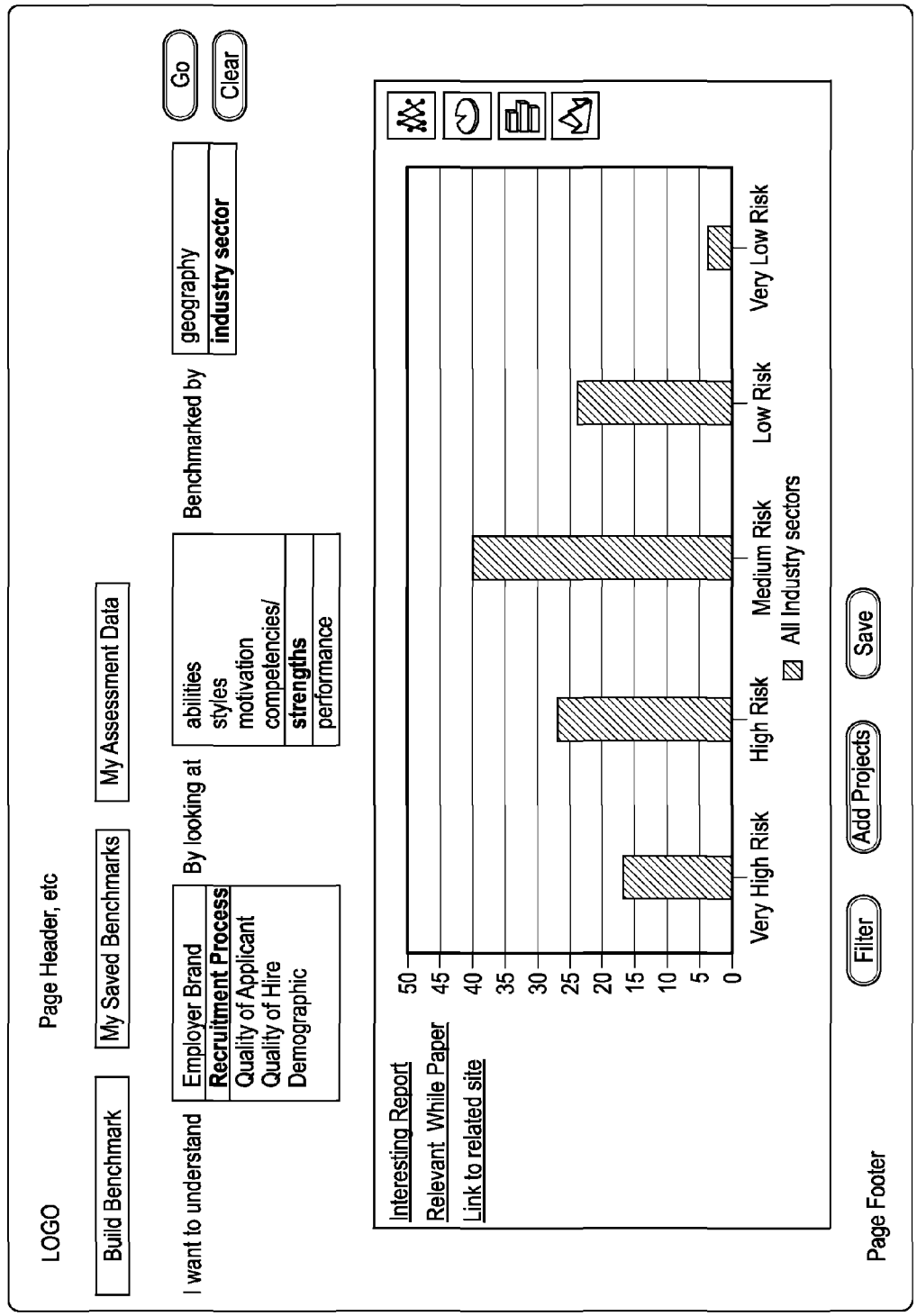

FIG. 88 shows a display with the chart. An option to change the chart type is provided within the iframe. Options to filter and add projects are provided outside iframe (features to update Saved Query).

Figure 89:
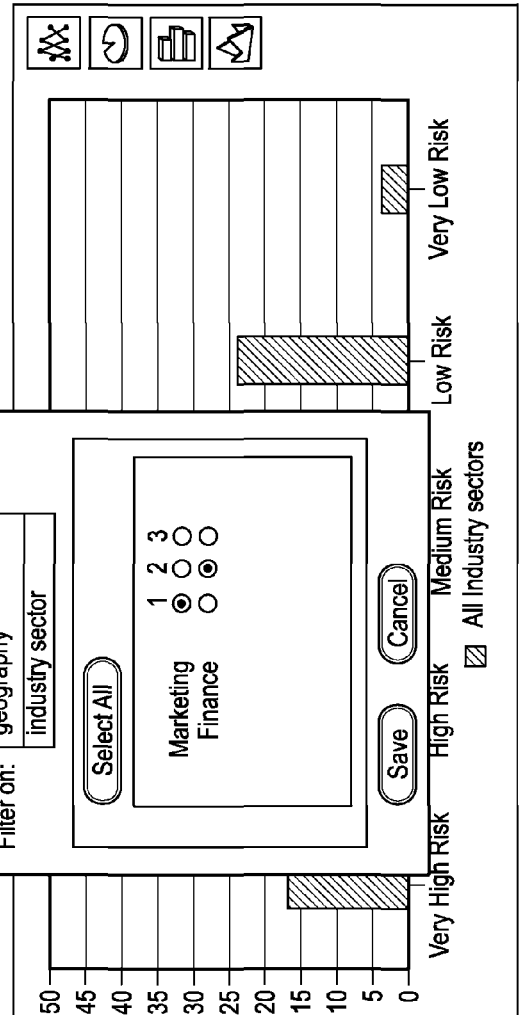

FIG. 89 shows a display with a dialog box that is opened upon clicking on the [Filter] button in FIG. 121, and selecting 'Industry Sector' from the available filters.

Preferably the display uses checkboxes instead of radio buttons, so that a selection can be unchecked. Preferable addition of a category to multiple bars is prohibited. The [Save] label on the command button may alternatively be labelled as [Submit]. Assignment to bars may be more usable to ensure it is easy to see what is going on. As 'Industry sector' matches a Template Data Type, the user is allowed to select bar (in FIG. 122: 1, 2, or 3). The button 'Select All' selects all values not already selected and places them in bar 1. An option 'Clear All' (not shown in FIG. 122) deselects all values. Having no options selected results in no filter for this data type (corresponding to all data). Selecting (ticking) all will also result in all data being retrieved for this data type but won't include data for any new category (eg. Construction) added in the future.

Figure 90:
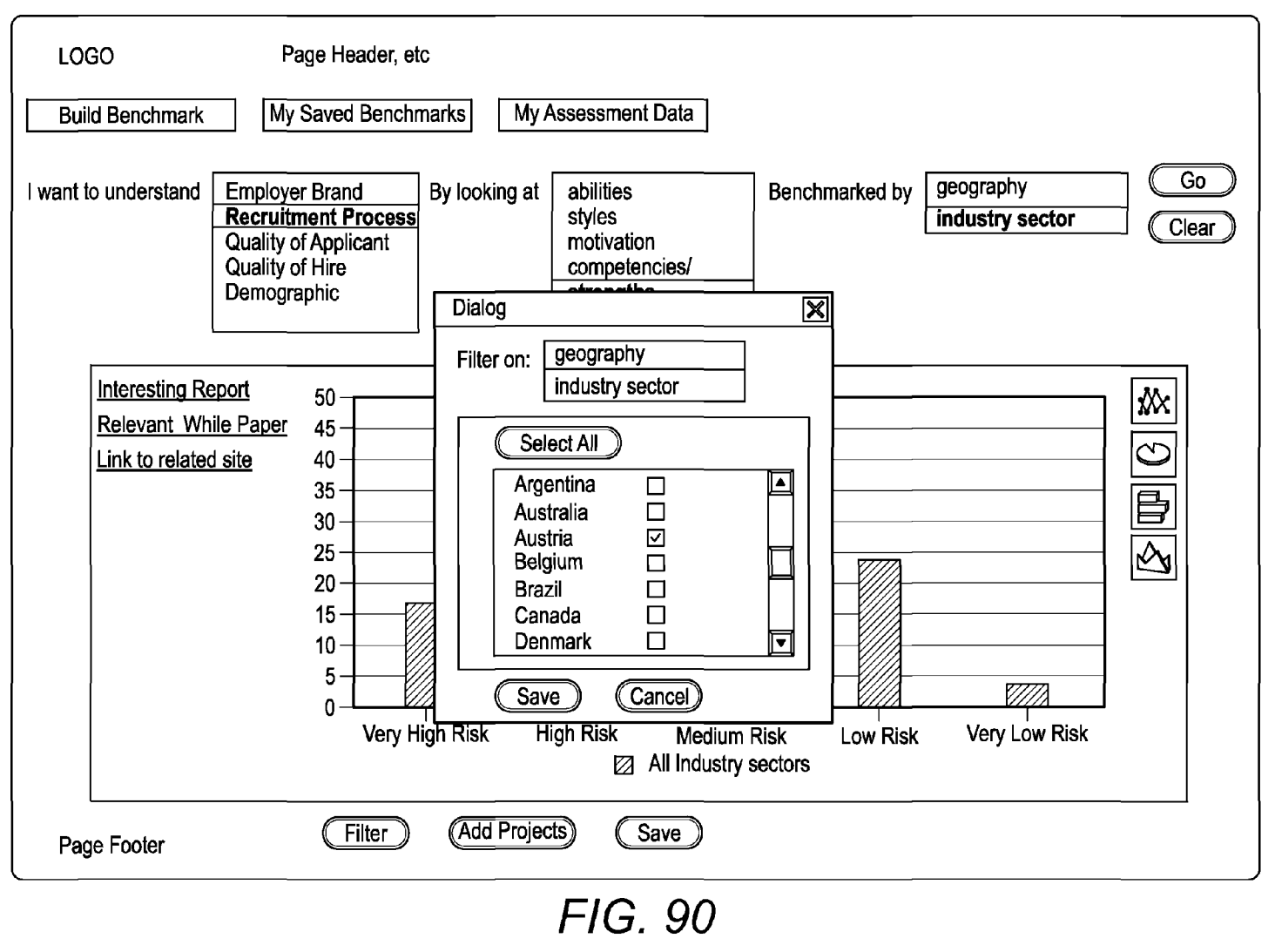

FIG. 90 shows a display with a dialog box that is opened upon clicking on the [Filter] button in FIG. 121, and selecting 'geography' from the available filters. As Geography does not match Template Data Type (which is Industry sector), the user has no option to select bar(s). This selection is used to restrict data that is available to the chart. An option 'Clear All' (not shown in FIG. 123) deselects all values. If [Cancel] is clicked, no changes are applied to the saved Query.

Figure 91:
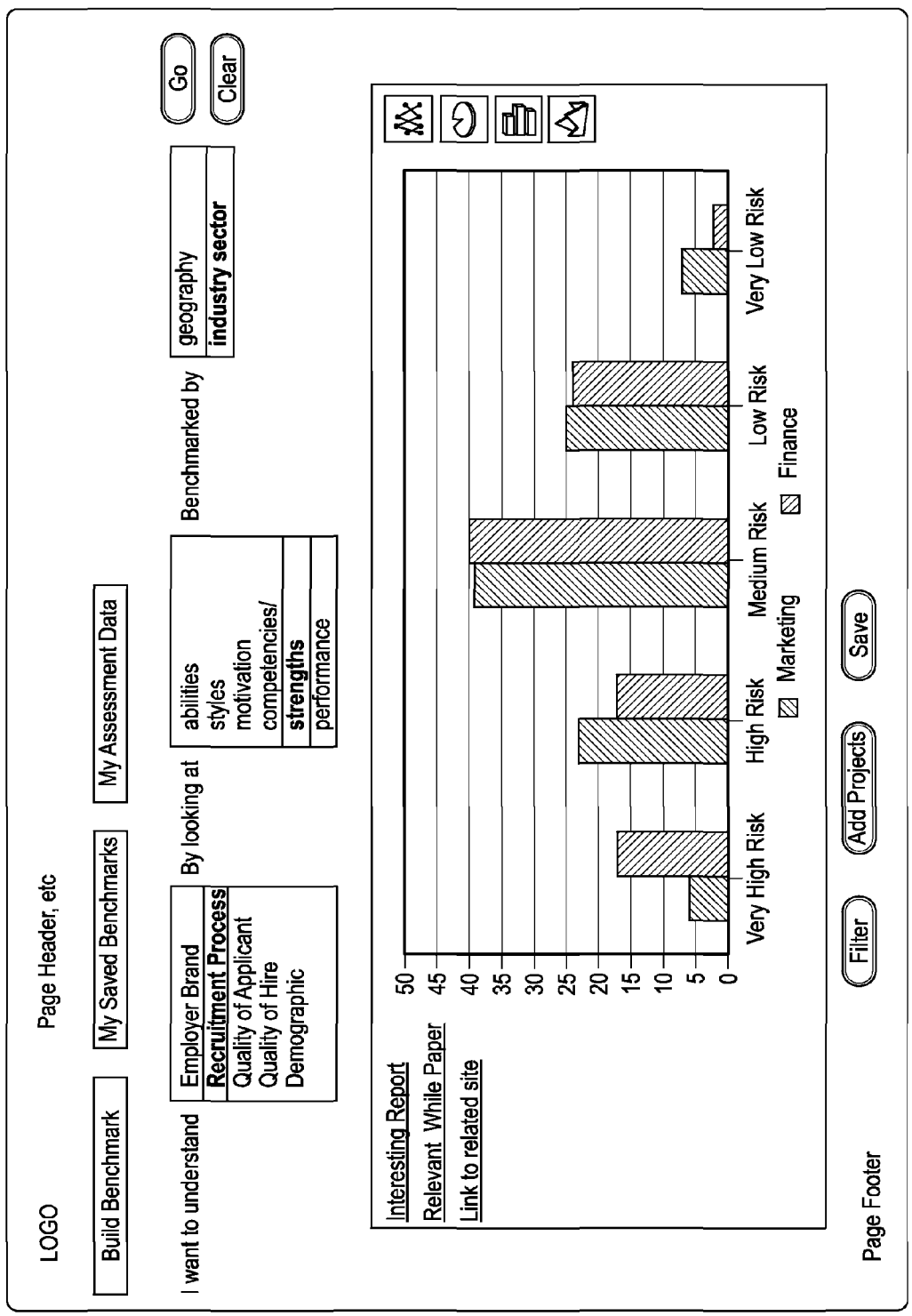

FIG. 91 shows how if [Save] is clicked changes are written to the database, cache is cleared and the chart regenerated.

Figure 92:
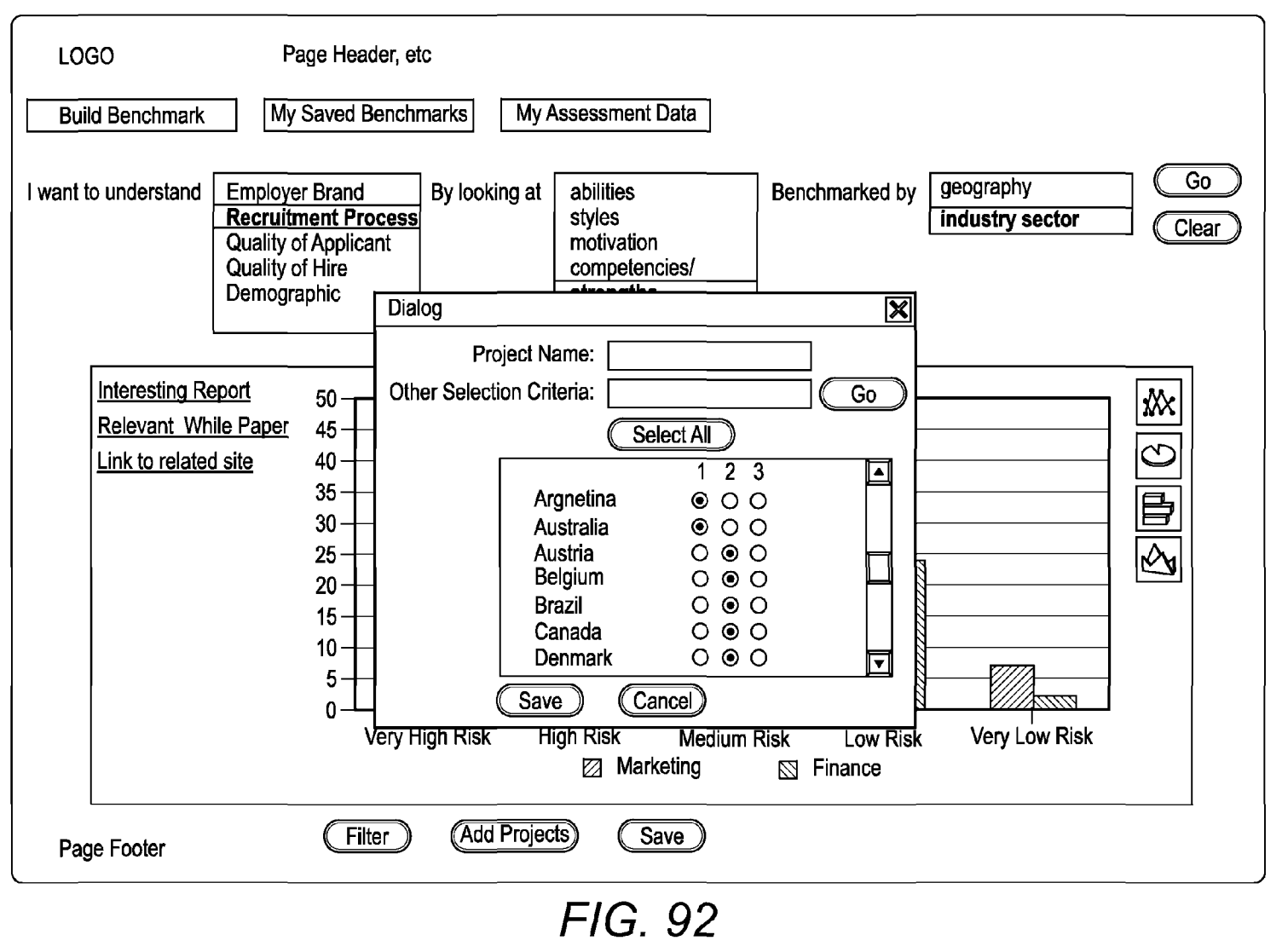

FIG. 92 shows a display with a dialog box that is opened upon clicking on the [Add Projects] button. The [Select All], and [Cancel] buttons perform analogous operations as described for the filter dialogue boxes. The assignment of projects to bars is analogous to filter dialogue boxes. Search options may be provided to search for projects. A term other than 'project' may be used. More project data (for instance project date) may be shown. Only projects that match a filter (the filter having been fixed and selected) may be shown. For example, a fixed filter may limit results to Assessment_A and UK. A Selected filter may limit the results to Marketing. In this case only projects with results for Marketing, Assessment_A and UK are shown.

Figure 93:
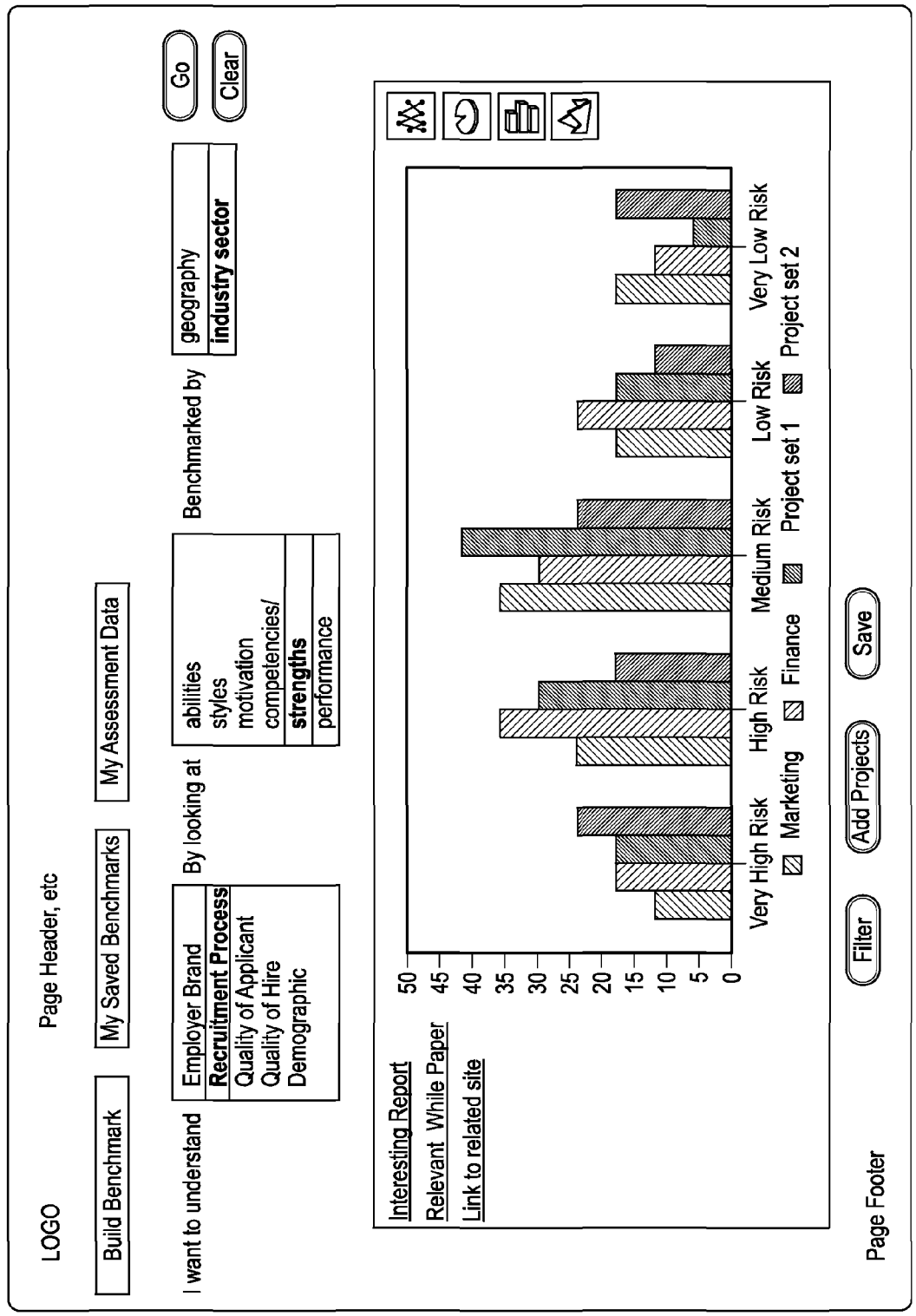

FIG. 93 shows how clicking on the [Save] button saves changes to the database and regenerate the chart.

In the example described here projects are not split between sectors (e.g. Marketing within Project set 1, and Finance within Project set 1). However, both projects are filtered on (limited to) Marketing and Finance. For single projects, the project name could be displayed in the key. For multiple projects, a mouse over, hover could list project names. When multiple categories are added to a bar, names may be shown comma separated with mouse over, hover box for long strings. The filters used may be shown within the chart area.

The dialogue box that is opened upon clicking the [Save] button may include something to allow Save As Name. Access Option may be used to define who may access the saved benchmark, for example: User, Group, or Common. An option may be provided to admin users only that allows assigning a saved Query to Sections. An option may be provided to admin users only that allows assigning a saved Query to Propositions.

Figure 94:
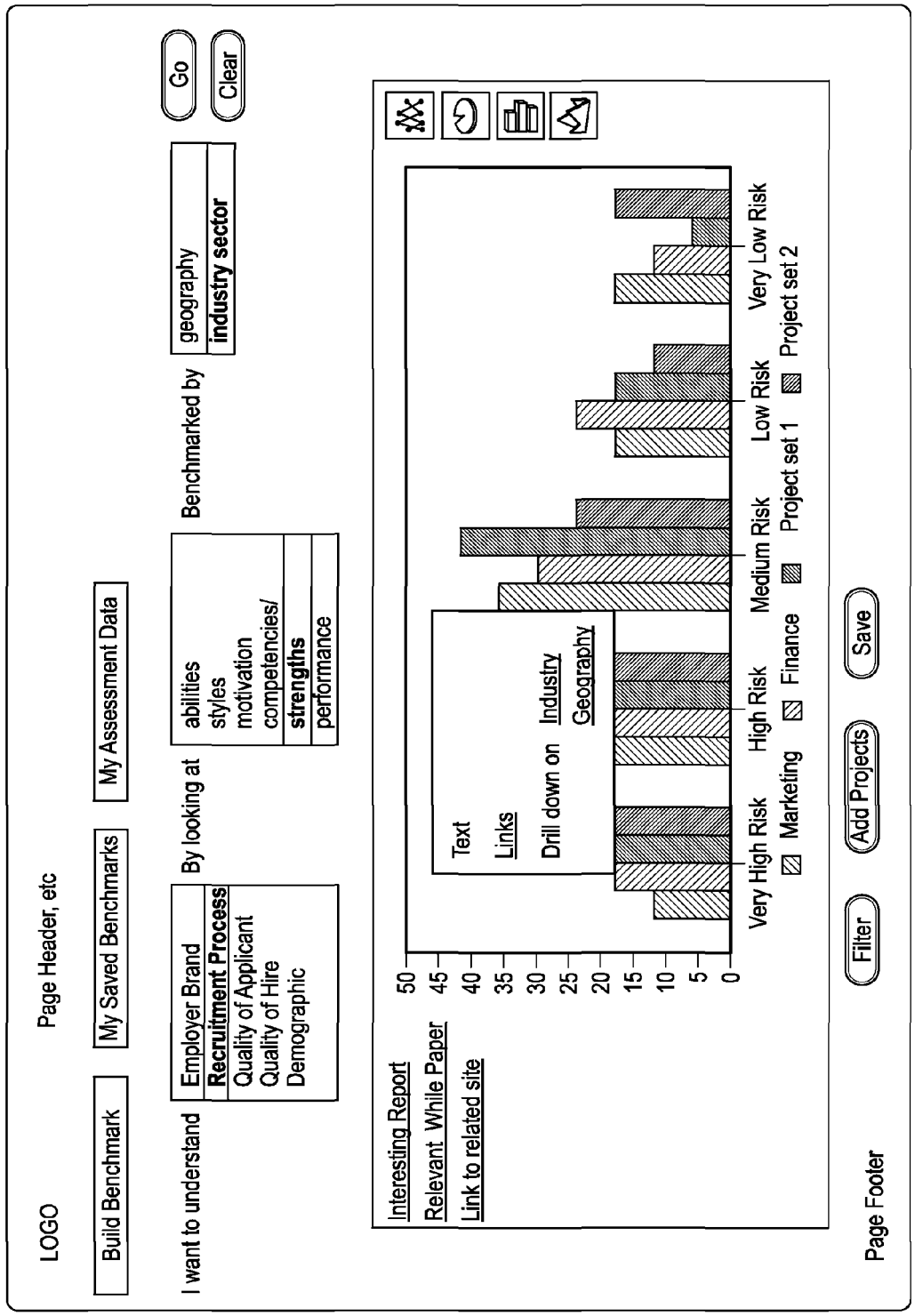

FIG. 94 shows how in a displayed chart, clicking on a single bar (or an equivalent area on an alternative chart) may open a pop up with corresponding content and option to drill down on allowed data types.

My Saved Benchmarks

This function is available to authorised users, but not to unauthorised users. Unauthorised users can only see public benchmarks and not save any views.

FIG. 95 shows an example of a My Saved Benchmarks page. The term "My Saved Benchmarks" may be replaces with a different name. Benchmarks may be split between general Benchmarks and a user's own queries. General benchmarks may be grouped into sections (with section headers). An option may be provided to filter benchmarks on Proposition. Some benchmarks may be highlighted (featured). A link to "Latest 10" benchmarks accessed may be provided.

If a user clicks on [Edit] then a copy of the corresponding saved query is created into a draft query (query with name=null and owned by the current user). The name of the query being edited (on the draft query) may be retained for saving back to the original. Then the operation links to the Build Template tab (where the draft query can be updated).

If a user clicks on [Deactivate] then 'active' is set to 'false' on the corresponding saved query. If a user clicks [Delete] then the corresponding saved template is deleted (after displaying a warning and getting confirmation). If a user clicks on [Copy] then the user is prompted for a new name and a copy of the corresponding saved query is created. A New Name is mandatory and must be unique. Alternatively, instead of the Copy function, the Edit function may allow saving a query under a different name.

If a user clicks on a saved query name, then the chart area is populated using a Build Page process, (using an iframe and populating it using a URL with parameters: Saved Query ID and Saved Query Token).

Figure 96:
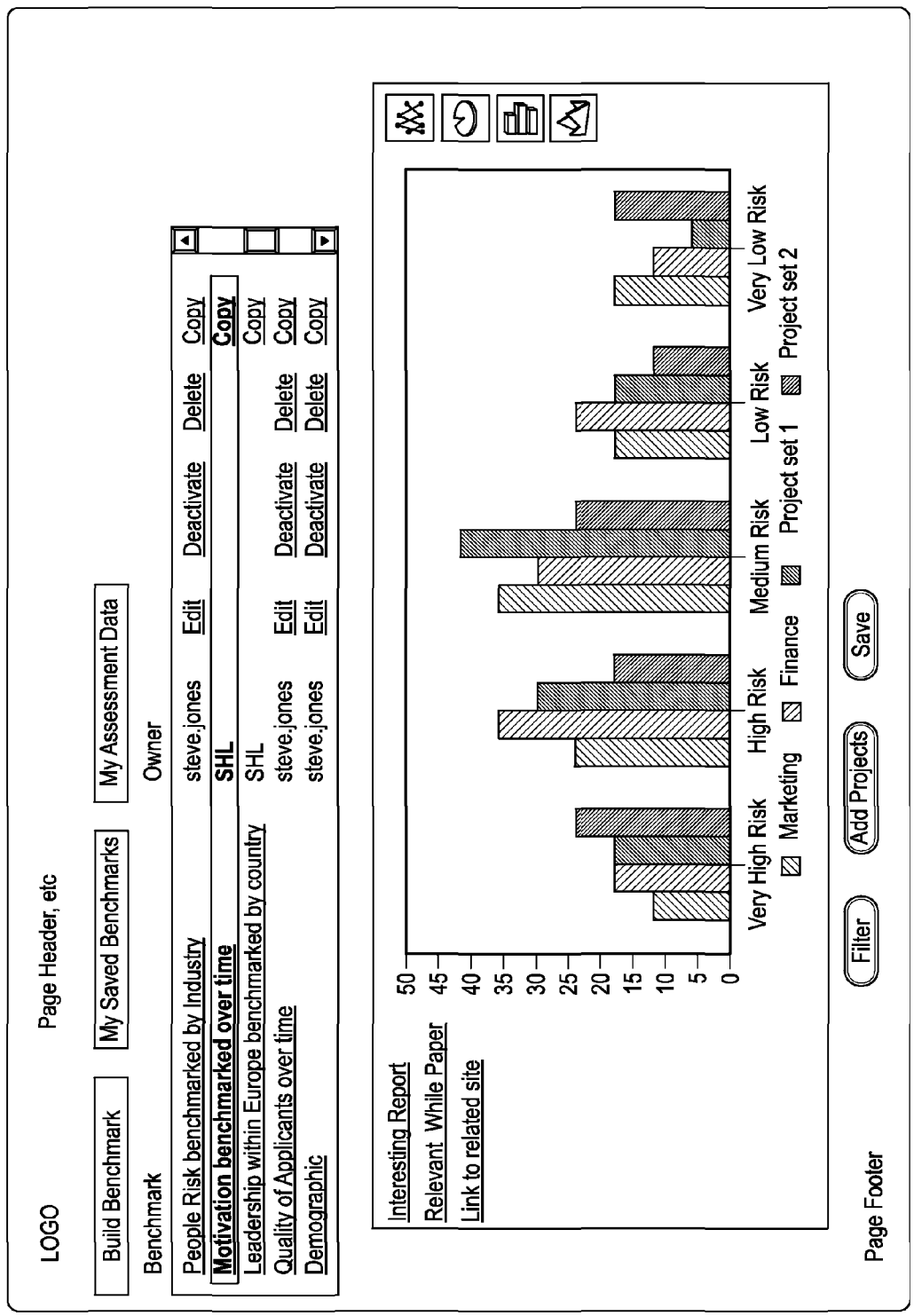
Figure 97:
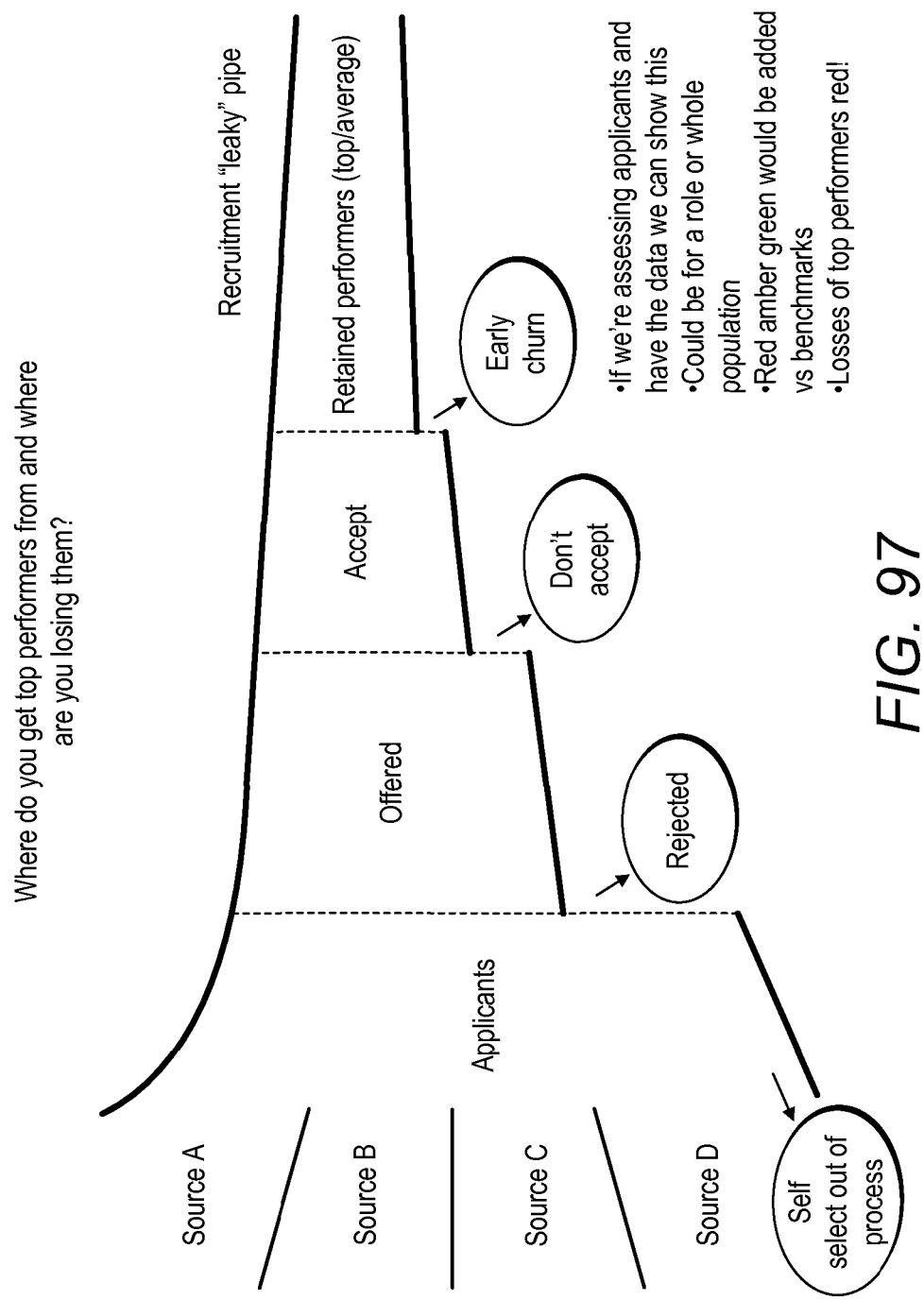
Figure 98:
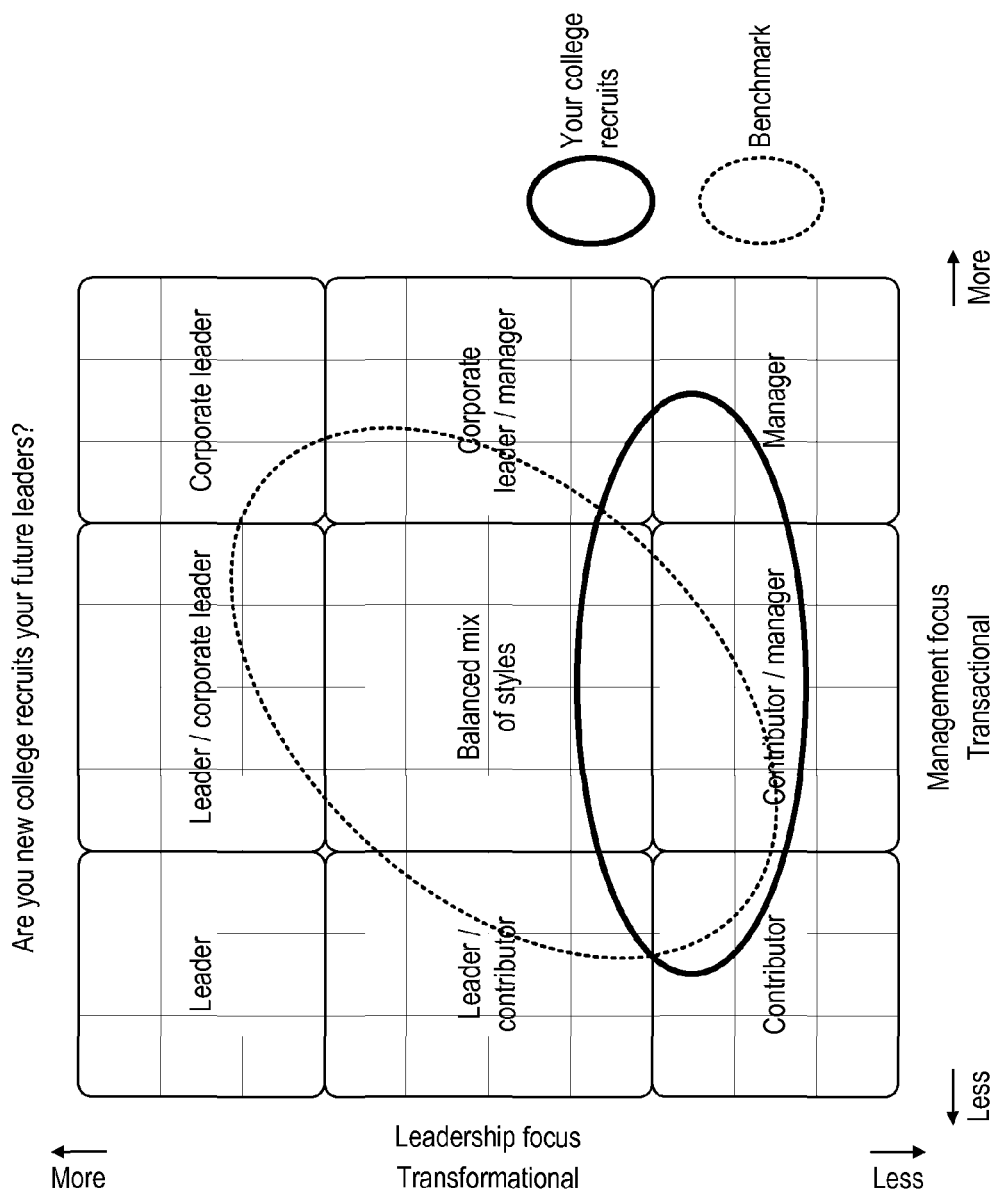
Figure 100:
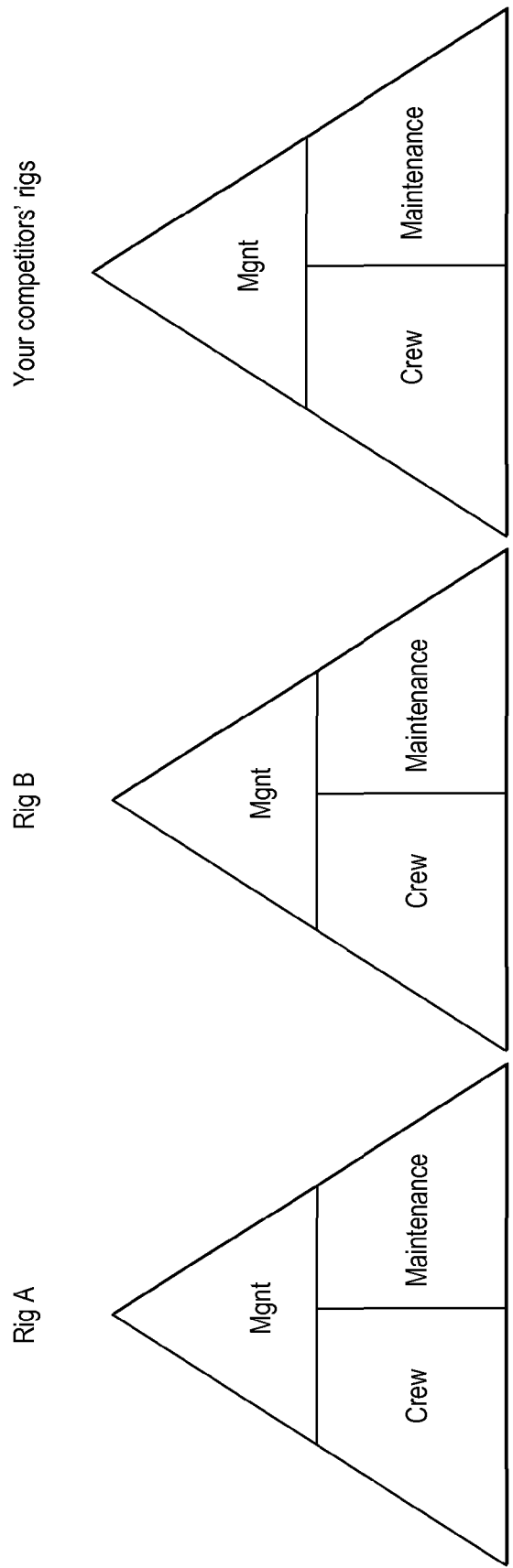

FIG. 96 shows a display with the chart area populated.

FIGS. 97 to 100 show further aspects of the analytics system.

In summary, main features of the invention may include one or more of the following:

An application (or suitable hardware) which enables clients to inquire about their status and view a series of "benchstrength" displays (essentially graphs) drawn from assessment data of various classes The assessment data is converted to a number of proprietary metrics, for example: People Capital, Pipeline Index and the Risk Index These metrics allow clients to answer a number of questions related to "talent acquisition" and "talent mobility" (examples of which are described in the above)

The client can access insights from the application in two ways:
    the first more general way is via a "My Talent Strategy" view which enables them to explore the benchmark data primarily in terms of industry sector and within that by geography and business function using a number of filters;
    the second is by loading their own data to enable them to benchmark themselves with their data being aggregated (i.e. not giving access to an individual)

The client can run filters (industry sector, geography and business function) against their data which is organised inside the application in terms of projects defined by the user They are able to save and export (e.g. print or save a soft copy) of the analytics they have performed The application is available online It will be understood that the present invention has been described above purely by way of example, and modifications of detail can be made within the scope of the invention. For example, rather than being used in the context of an organisation, the present invention could be used in the context of industrial devices. In an example, the performance of a device is measured and supplemented with metadata that may further specify the device; all performance measurements and metadata are pooled, and from this pool groups can be retrieved. The performance data of devices that have a particular characteristic in common (such as size, make, version, etc) can be compared—as a group—to a group of performance measurements a user has undertaken.

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. Apparatus for providing access to comparison data relating to a comparison of properties of a target group with those of a reference group, the apparatus comprising:
   a database of reference metrics data determined from testing of members of a reference population;
   means for selecting target group metrics data, the target group comprising a plurality of members and the metrics data being determined from testing of the members of the target group and the members of the target group being associated with metadata relating to the target group;
   means for selecting at least one item of metadata;
   means for selecting a reference group from the reference population in dependence on the selected metadata, the reference group being associated with reference group metrics data determined from testing of the members of the reference group and associated with metadata relating to the reference group;
   means for selecting a comparison aspect, the comparison aspect being associated with a subset of metrics data;
   means for generating comparison data relating to the comparison of a distribution of metrics data values for the target group with that of the reference group in accordance with the selected comparison aspect; and
   means for outputting the resulting comparison data.

2. Apparatus according to claim 1, further comprising means for preventing a user from gaining direct access to the database of reference metrics data.

3. Apparatus according to claim 1, further comprising means for selecting a particular reference group for comparison with the target group.

4. Apparatus according to claim 1, wherein the metrics data relates to at least one personal characteristic.

5. Apparatus according to claim 4, wherein the personal characteristic comprises at least one of: aptitude, ability, competency, skill, personality, knowledge, motivation, or behavior.

6. Apparatus according to claim 1, wherein the metadata relates to a property of the metrics data, a property, an outcome of the testing, or a property of the target group.

7. Apparatus according to claim 1, wherein the metadata relates to a property of an organization.

8. Apparatus according to claim 7, wherein the property of the organization comprises at least one of: company; industry; sector; location; or size.

9. Apparatus according to claim 1, further comprising means for editing the metadata of the target group metrics data.

10. Apparatus according to claim 1, wherein a value of the metadata is identical for target and reference groups.

11. Apparatus according to claim 1, further comprising means for aggregating or filtering the resulting comparison data, wherein the filtering is optionally in dependence on a selected further item of metadata or a selected comparison aspect.

12. Apparatus according to claim 1, further comprising means for presenting a series of prior comparison data outputs as a carousel or slide deck.

13. Apparatus according to claim 1, further comprising means for periodically updating the database of reference metrics data or the comparison data.

14. Apparatus according to claim 1, further comprising means for generating a comparison parameter in dependence on the comparison data, comprising a value for a proportion of the target group having metrics data values in a predetermined segment of the reference group metrics data value distribution, wherein the comparison parameter preferably comprises a percentage, fraction or segment.

15. Apparatus according to claim 1, further comprising means for providing a commentary relating to at least one element of the comparison data, the commentary optionally being adapted to provide information correlating the metrics data value or value range to an outcome.

16. A method of providing access to comparison data relating to a comparison of properties of a target group with those of a reference group, the method comprising:
   providing a database of reference metrics data determined from testing of members of a reference population;
   selecting target group metrics data, the target group comprising a plurality of members and the metrics data being determined from testing of the members of the target group and the members of the target group being associated with metadata relating to the target group;
   selecting at least one item of metadata;
   selecting reference group metrics data, the reference group comprising a plurality of members and the metric data being of the reference metrics data and the members of the reference group being associated with the selected metadata;
   selecting a comparison aspect, the comparison aspect being associated with a subset of metrics data;
   generating comparison data relating to the comparison of a distribution of metrics data values for the target group with that of the reference group in accordance with the selected comparison aspect; and
   outputting the resulting comparison data.

17. The method according to claim 16, wherein the generation of comparison data is performed by an analytics application running in a first database domain, the first database domain comprising the database of reference metrics, the database of reference metrics linked to a second database of reference metrics in a second database domain, preferably wherein the database of reference metrics in the first database domain is a read-only copy of the second database in the second database domain.

18. The method according to claim 17, wherein the second database of reference metrics is populated from a master data warehouse by an ETL process and/or by a data editing application which interfaces between the master data warehouse and the second database of reference data for cleaning and consolidation of transferred information.

19. A method according to claim 16, further comprising accessing metrics data and metadata via a caching service, the caching service including a first caching function caching reference metrics data using a database backing store and a second caching function caching metadata using an in-memory data cache, preferably wherein the first caching function and the second caching function are encapsulated by a cache helper utility.

20. A non-transitory computer-readable storage device storing software comprising instructions executable by one or more computers which, upon such execution, cause the one or more computers to perform operations comprising:
   providing a database of reference metrics data determined from testing of members of a reference population;
   selecting target group metrics data, the target group comprising a plurality of members and the metrics data being determined from testing of the members of the target group and the members of the target group being associated with metadata relating to the target group;
   selecting at least one item of metadata;
   selecting reference group metrics data, the reference group comprising a plurality of members and the metric data being of the reference metrics data and the members of the reference group being associated with the selected metadata;
   selecting a comparison aspect, the comparison aspect being associated with a subset of metrics data;
   generating comparison data relating to the comparison of the distribution of metrics data values for the target group with that of the reference group in accordance with the selected comparison aspect; and
   outputting the resulting comparison data.

* * * * *